（12）United States Patent
Kano et al.

(10) Patent No.: US 6,992,407 B2
(45) Date of Patent: Jan. 31, 2006

(54) PRECISION MACHINING STAGE EQUIPMENT

(75) Inventors: Yoshio Kano, 2-14-7, Shiroyama-cho, Takasaki-shi, Gunma (JP); Junichi Onozaki, Tokyo (JP)

(73) Assignees: Tamura Corporation, Tokyo (JP); Japan Science and Technology Agency, Saitama (JP); Yoshio Kano, Gunma (JP)

( * ) Notice: Subject to any disclaimer, the term of this patent is extended or adjusted under 35 U.S.C. 154(b) by 0 days.

(21) Appl. No.: 10/512,866

(22) PCT Filed: Jul. 30, 2003

(86) PCT No.: PCT/JP03/09641

§ 371 (c)(1),
(2), (4) Date: Nov. 15, 2004

(87) PCT Pub. No.: WO2004/012260

PCT Pub. Date: Feb. 5, 2004

(65) Prior Publication Data

US 2005/0219025 A1    Oct. 6, 2005

(30) Foreign Application Priority Data

Jul. 30, 2002  (JP)  ............................. 2002-221545

(51) Int. Cl.
*H01L 21/68* (2006.01)
*H02K 41/03* (2006.01)
*G12B 5/00* (2006.01)

(52) U.S. Cl. ............................. 310/10; 310/12; 318/35; 318/135; 318/567; 318/575; 355/53; 355/72

(58) Field of Classification Search .................. 318/34, 318/35, 37, 38, 51, 135, 567, 575, 597, 625, 318/649, 653, 687; 355/53, 72–76; 310/10, 310/12; 378/34, 35; 250/491.1, 492.1, 492.2; 414/935
See application file for complete search history.

(56) References Cited

U.S. PATENT DOCUMENTS 4,952,858 A    8/1990  Galburt (Continued)

FOREIGN PATENT DOCUMENTS

EP    0342639    11/1989

(Continued)

OTHER PUBLICATIONS

English Language Abstract of JP 2001-185604.

(Continued)

*Primary Examiner*—Ramon M. Barrera
(74) *Attorney, Agent, or Firm*—Greenblum & Bernstein, P.L.C.

(57) ABSTRACT

A movable table for supporting a work piece is allowed to move on the same plane in arbitrary directions through a table holding mechanism. Also, a feed within the same plane is supplied to the movable table by the electromagnetic driving means. Further, the movable table is stopped by an electromagnetic braking mechanism at an arbitrary position within the same plane. The electromagnetic driving means generates a feed to the movable table by a mutual magnetic effect between driven magnets and driving coils. The electromagnetic braking mechanism includes braking magnets and a nonmagnetic and conductive braking plate. A pair of the braking magnets and braking plate generates braking force by a magnetic effect between a magnetic force by an eddy current generated in the braking plate in accordance with the movement of the movable table and a magnetic force of the braking magnets.

39 Claims, 78 Drawing Sheets

U.S. PATENT DOCUMENTS

| | | | |
|---|---|---|---|
| 6,147,421 A * | 11/2000 | Takita et al. | 310/12 |
| 6,281,643 B1 * | 8/2001 | Ebihara | 318/35 |
| 6,405,659 B1 * | 6/2002 | Hazelton | 108/20 |
| 6,437,463 B1 * | 8/2002 | Hazelton et al. | 310/12 |
| 6,452,292 B1 * | 9/2002 | Binnard | 310/12 |
| 6,744,228 B1 * | 6/2004 | Cahill et al. | 318/135 |
| 6,750,625 B2 * | 6/2004 | Binnard et al. | 318/592 |

FOREIGN PATENT DOCUMENTS

| | | |
|---|---|---|
| JP | 63-206716 | 8/1988 |
| JP | 1-282493 | 11/1989 |
| JP | 1-282494 | 11/1989 |
| JP | 5-504100 | 7/1993 |
| JP | 6-323803 | 11/1994 |
| JP | 6-327222 | 11/1994 |
| JP | 2871722 | 1/1999 |
| JP | 2001-185604 | 7/2001 |
| JP | 2002-035709 | 2/2002 |
| JP | 2002-323584 | 11/2002 |
| JP | 2003-264974 | 9/2003 |
| WO | 91/15333 | 10/1991 |

OTHER PUBLICATIONS

English Language Abstract of JP 2002-035709.
English Language Abstract of JP 2002-323584.
English Language Abstract of JP 2003-264974.
English Language Abstract of JP 63-206716.
English Language Abstract of JP 1-282493.
English Language Abstract of JP 1-282494.
English Language Abstract of JP 6-323803.
English Language Abstract of JP 6-327222.

* cited by examiner

FIG. 7
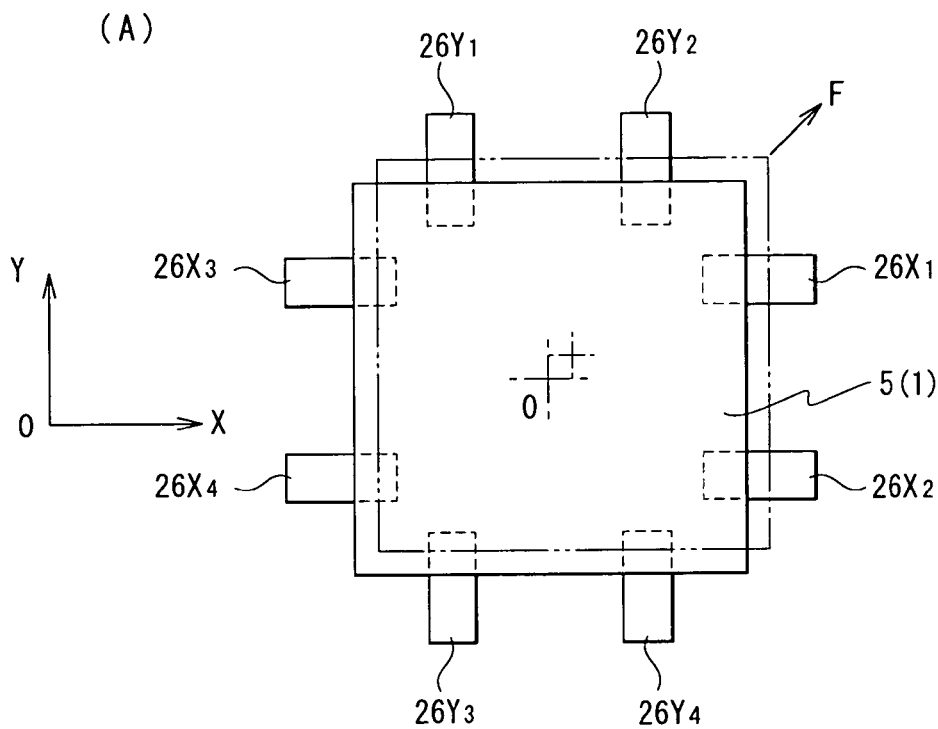
(A)
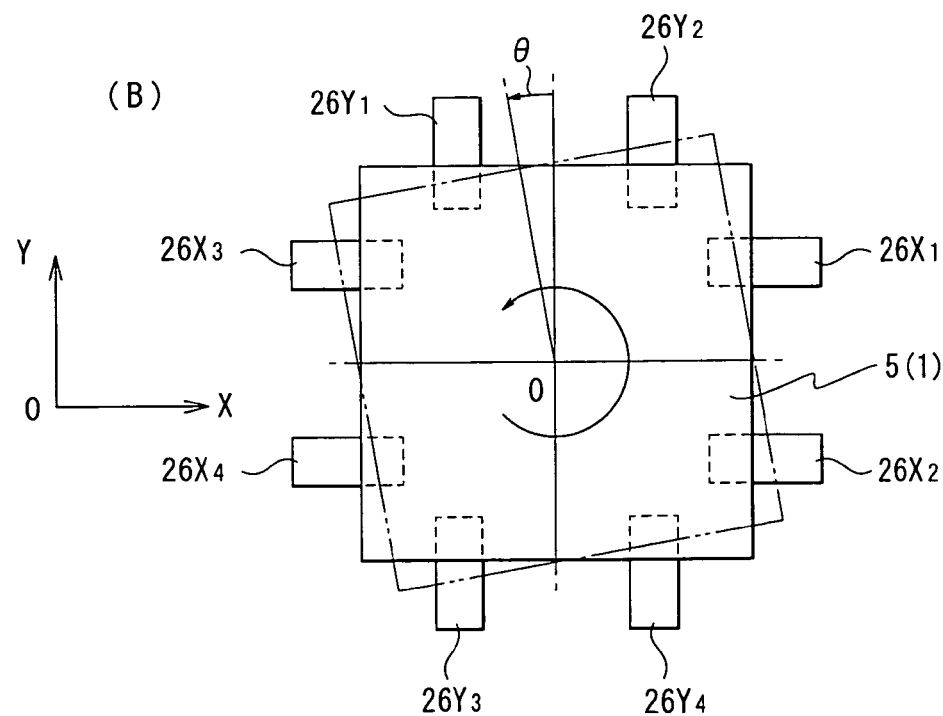
(B)

FIG. 8

| | | A | B | C | D |
|---|---|---|---|---|---|
| STATOR SIDE | RELATION BETWEEN CROSS-IN-SQUARE SHAPE COIL 7 AND EACH SMALL COIL | | 7b 7a / 7c 7d | | |
| | CURRENT PATTERN FLOWN INTO EACH SMALL COIL OF CROSS-IN-SQUARE SHAPE COIL | | | | |
| | DIRECTION OF CURRENT FUNCTIONING IN MAGNET REGION | →$I_A$ | $I_B$← | ←$I_C$ | $I_D$→ |
| NEEDLE SIDE | DIRECTION OF THRUST (REACTION FORCE) OF MAGNET N | ⇐ | ⇒ | ⇓ | ⇑ |
| | DIRECTION OF THRUST (REACTION FORCE) OF MAGNET S | ⇒ | ⇐ | ⇑ | ⇓ |

FIG. 9
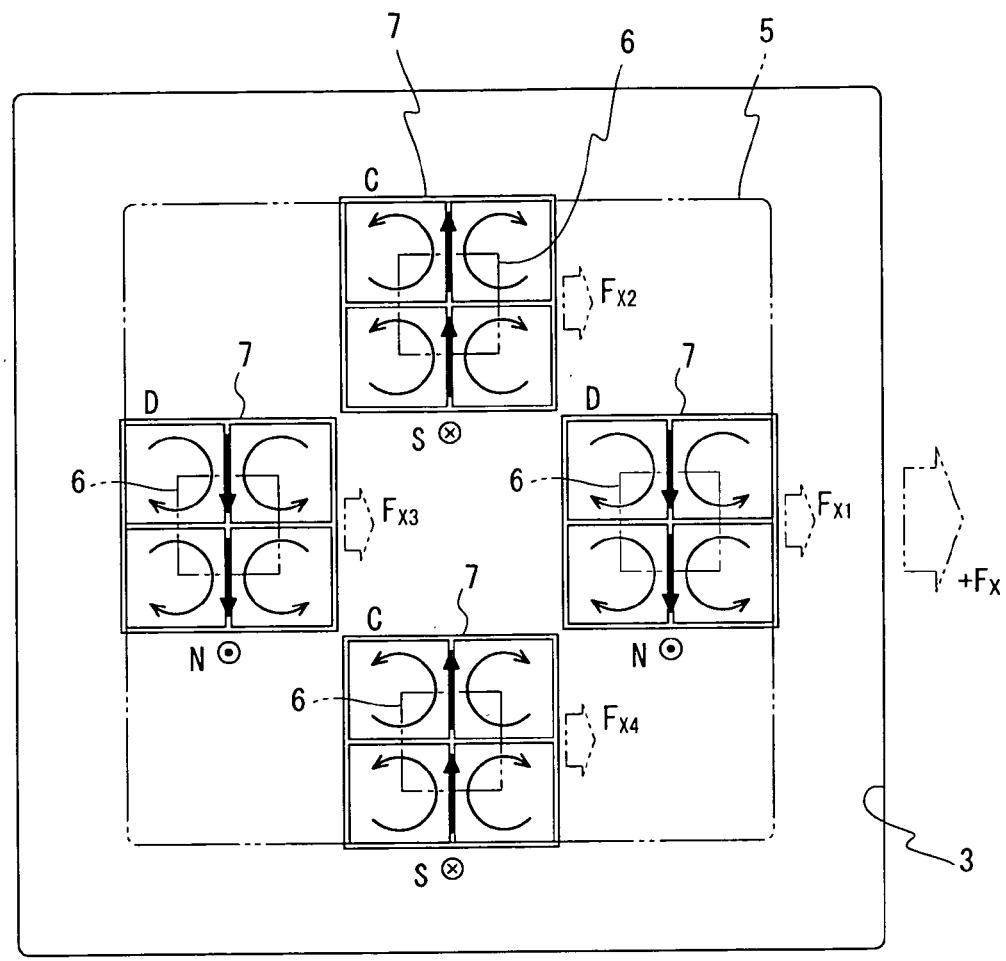
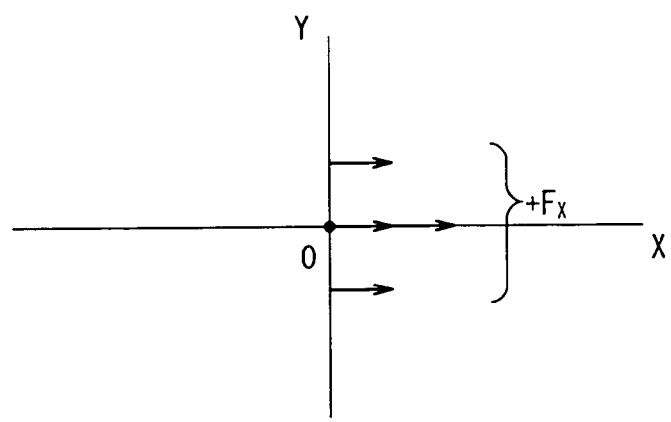

FIG.10
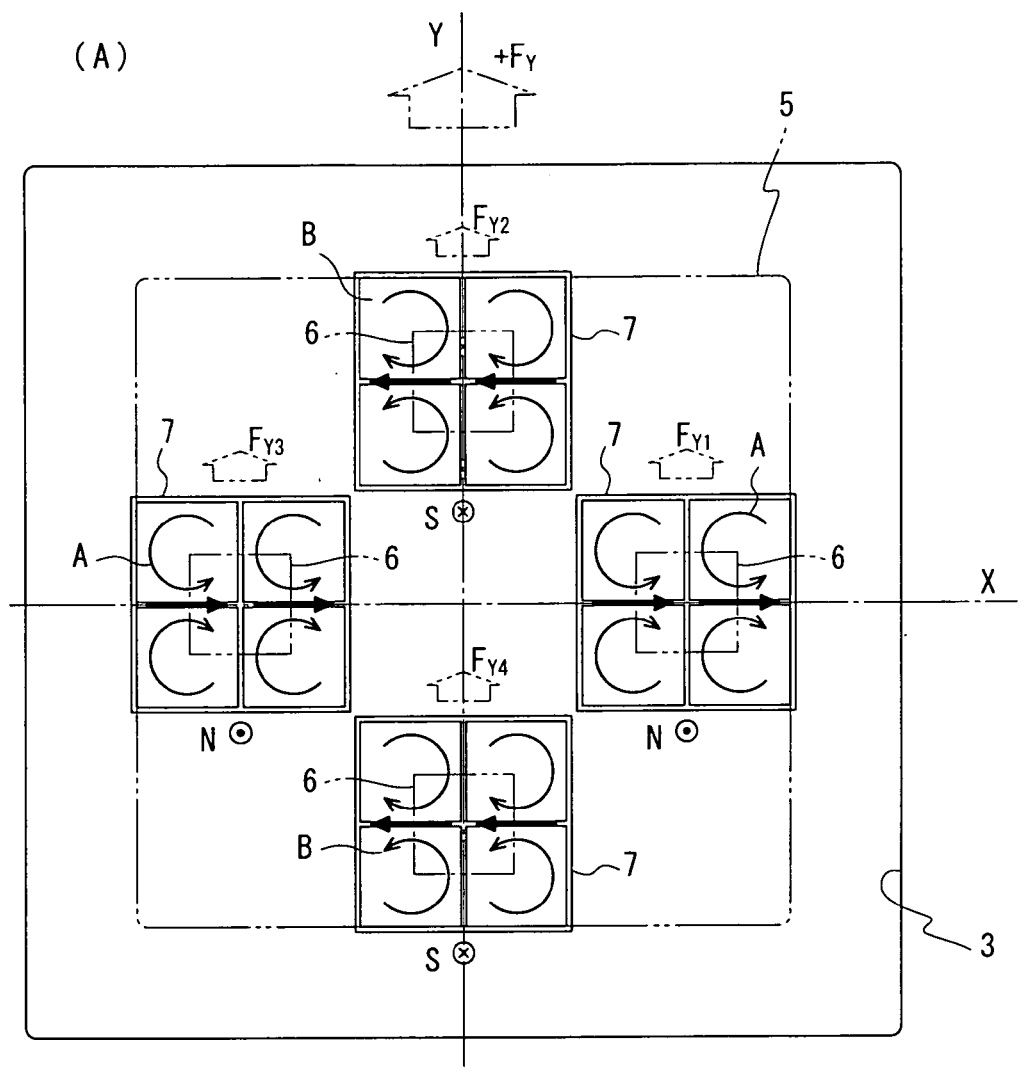
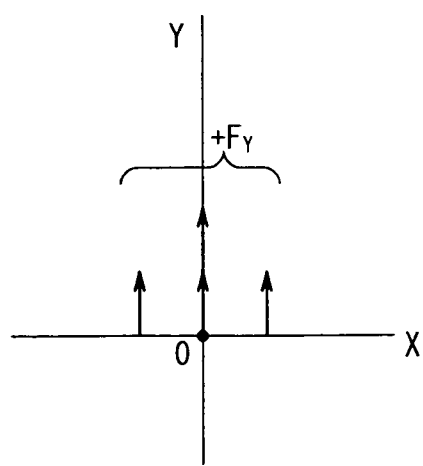

FIG.12
(A)
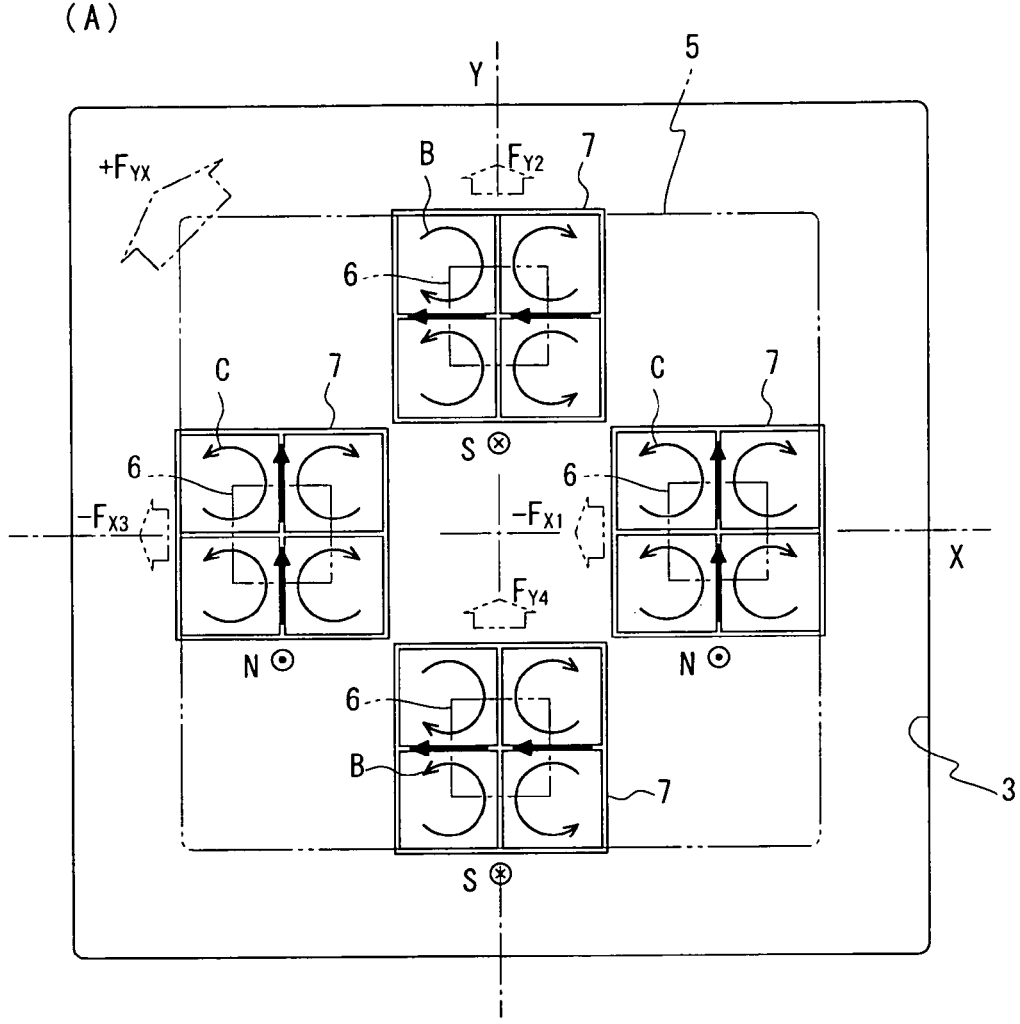
(B)
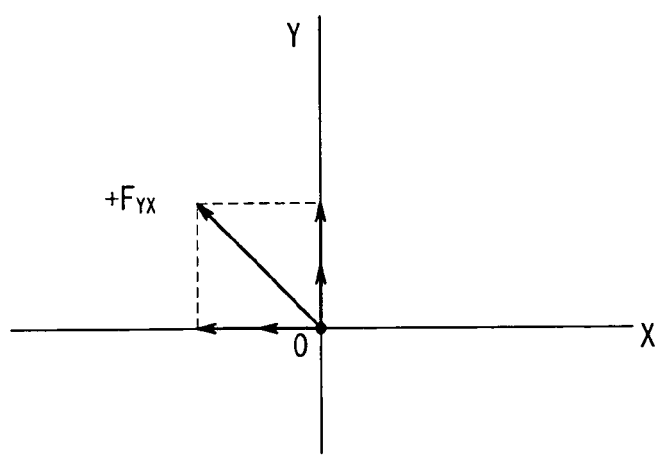

FIG. 13
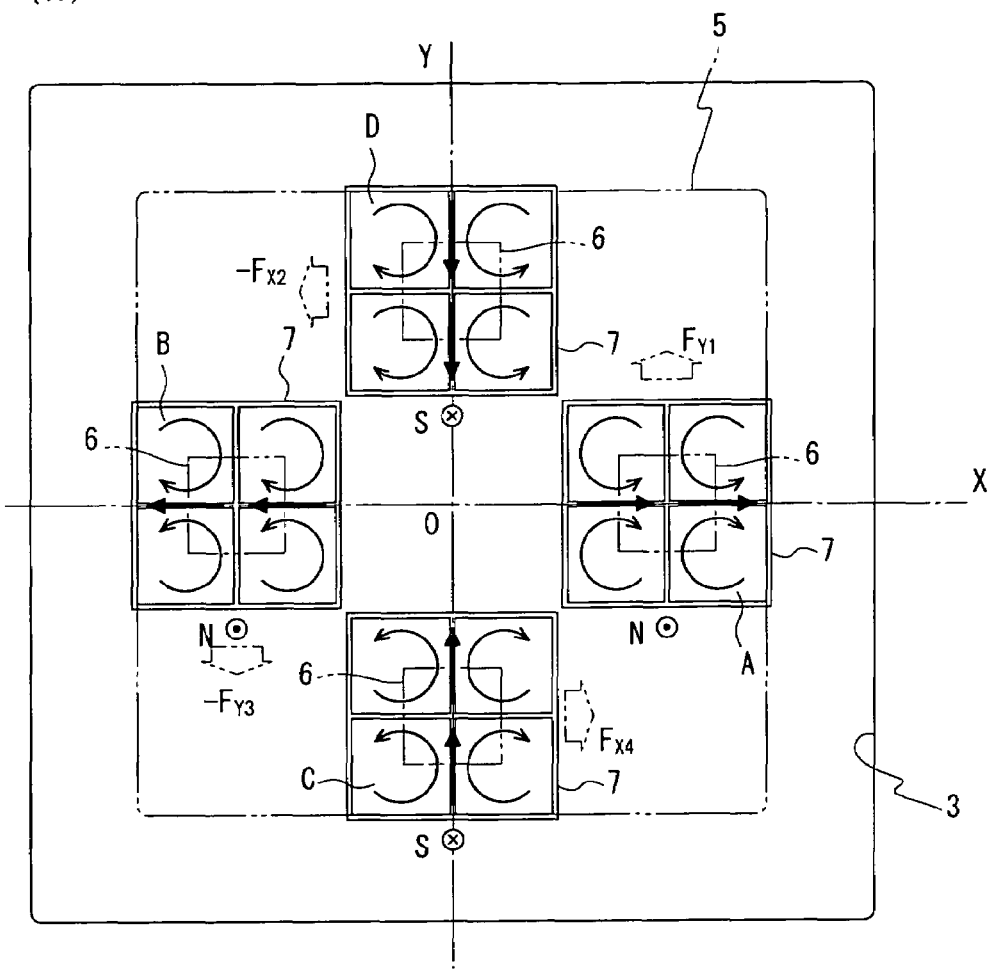
(A)
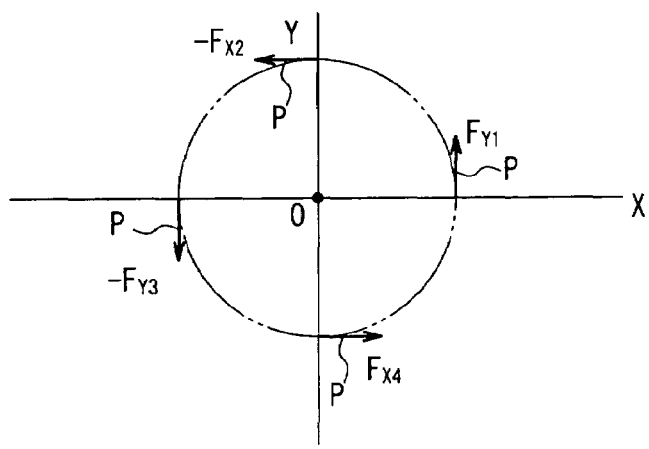
(B)

*FIG.14*
(A)
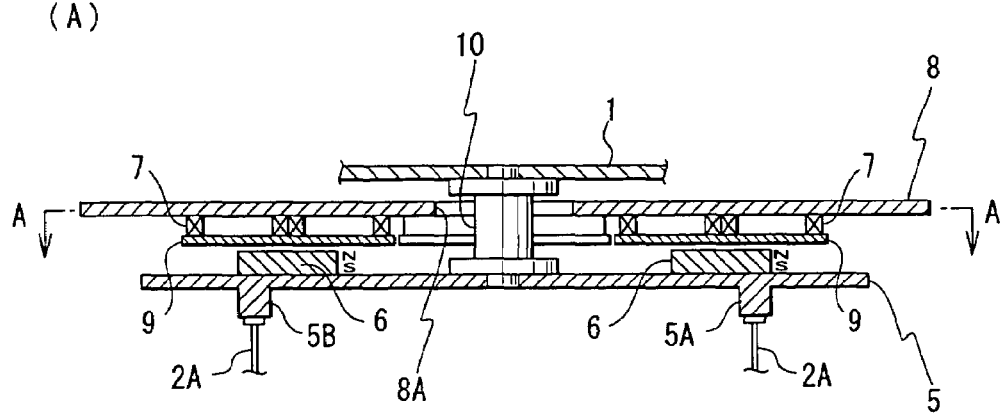
(B)
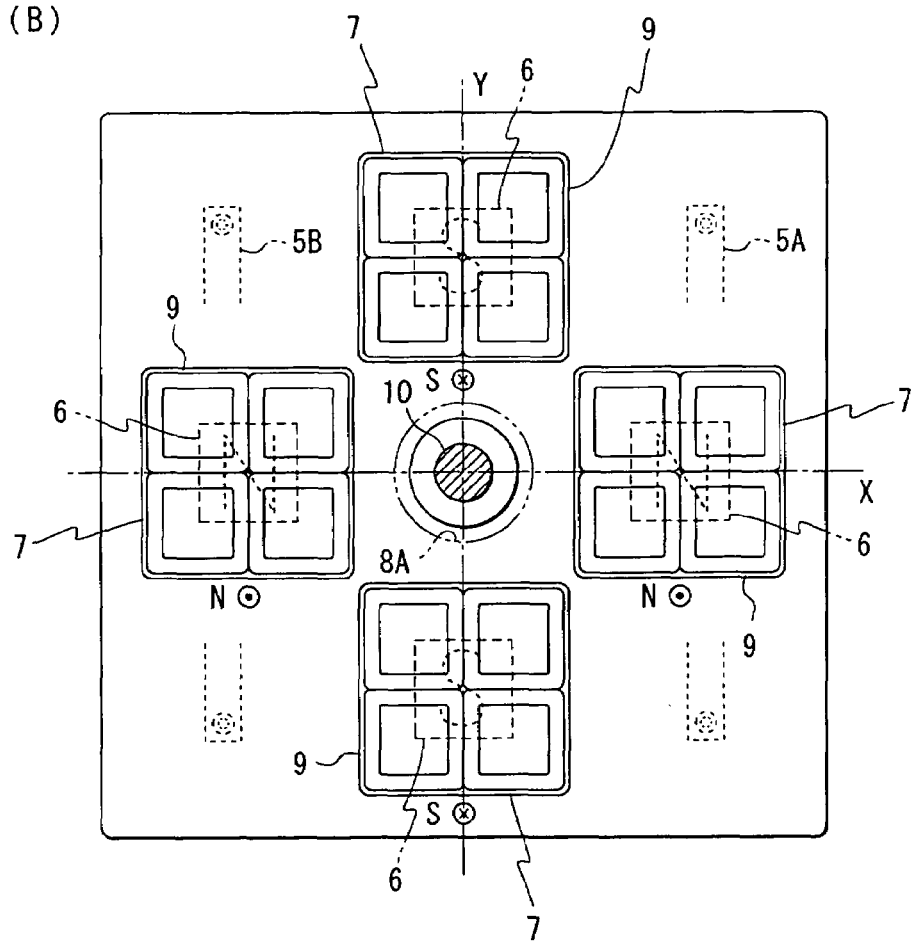

*FIG.15*
(A)
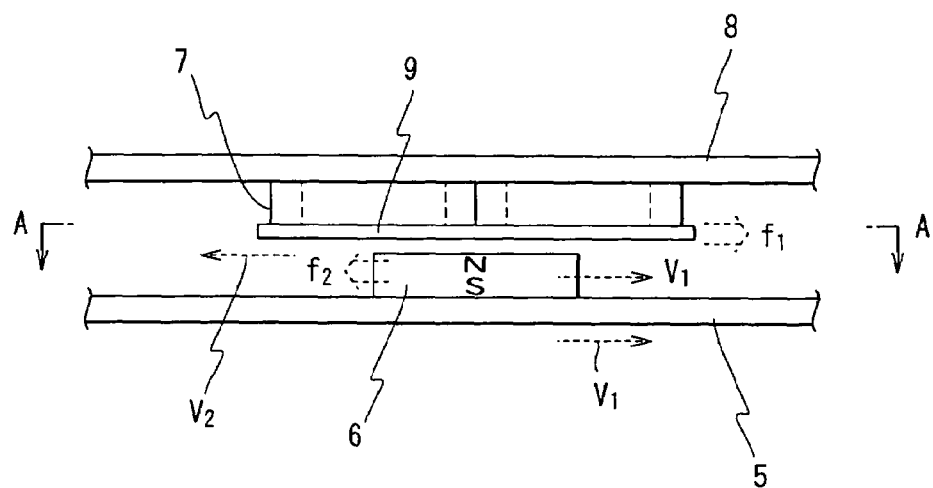
(B)
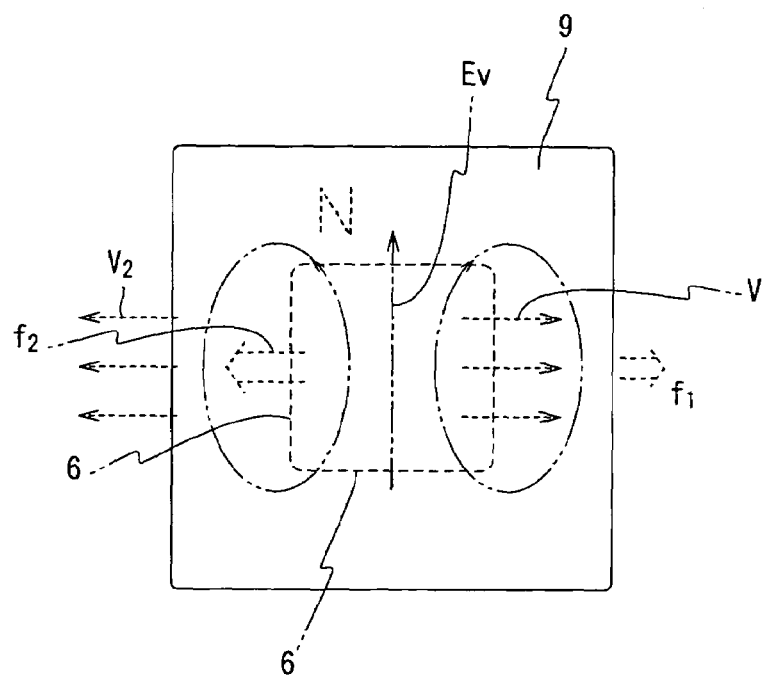

*FIG.16*
(A)
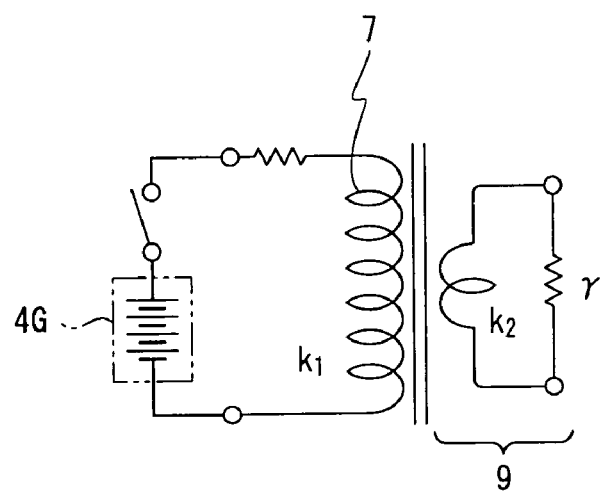
(B)
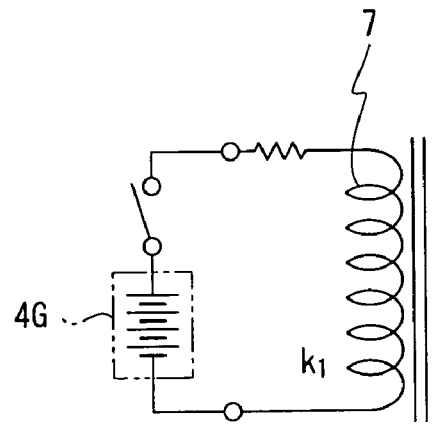

FIG.21
(A)
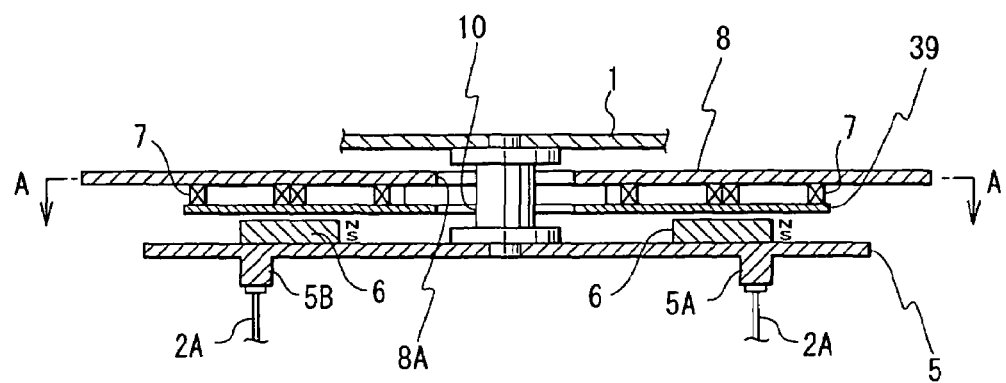
(B)
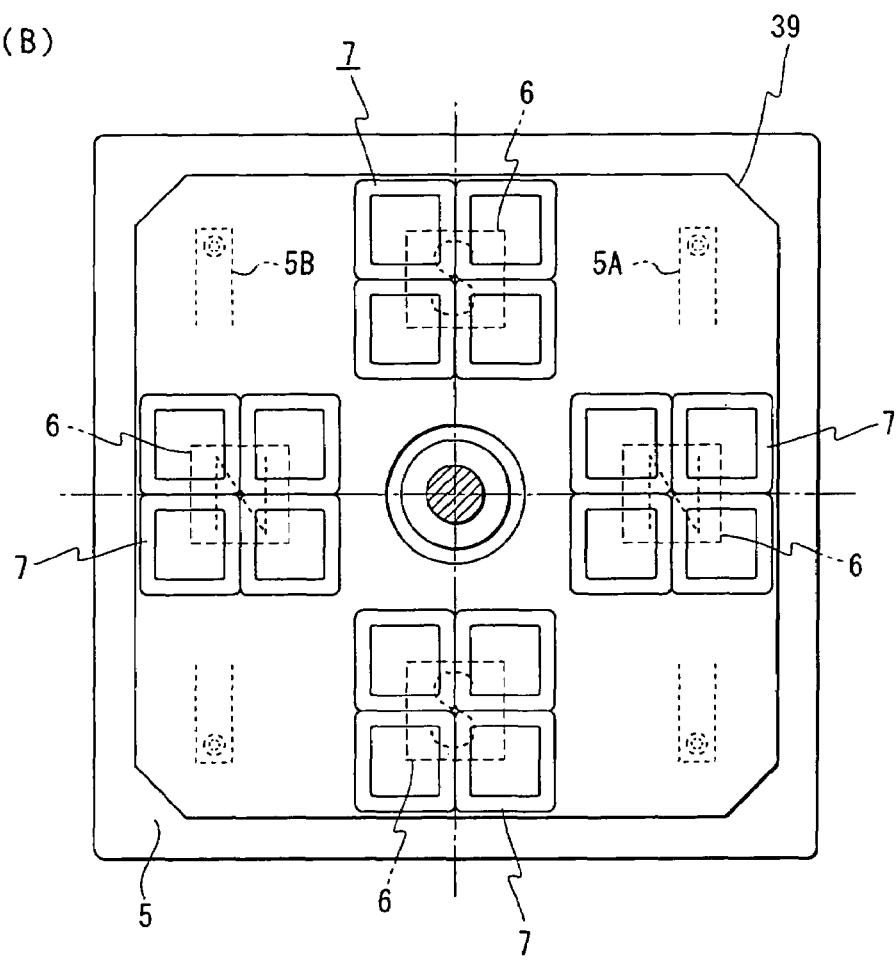

FIG. 26
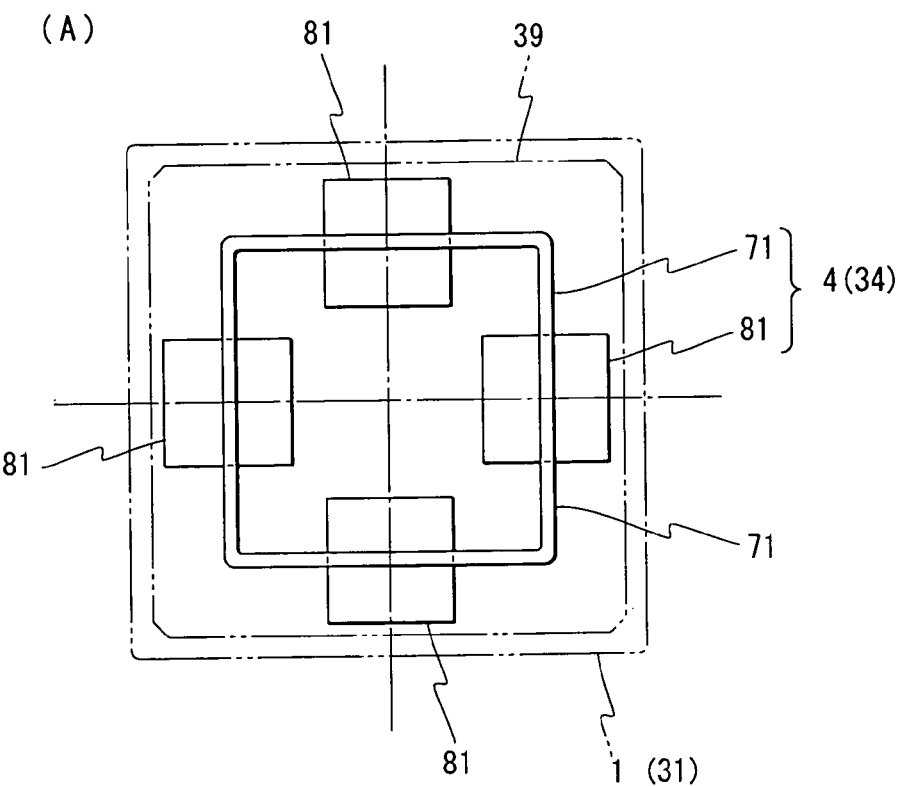
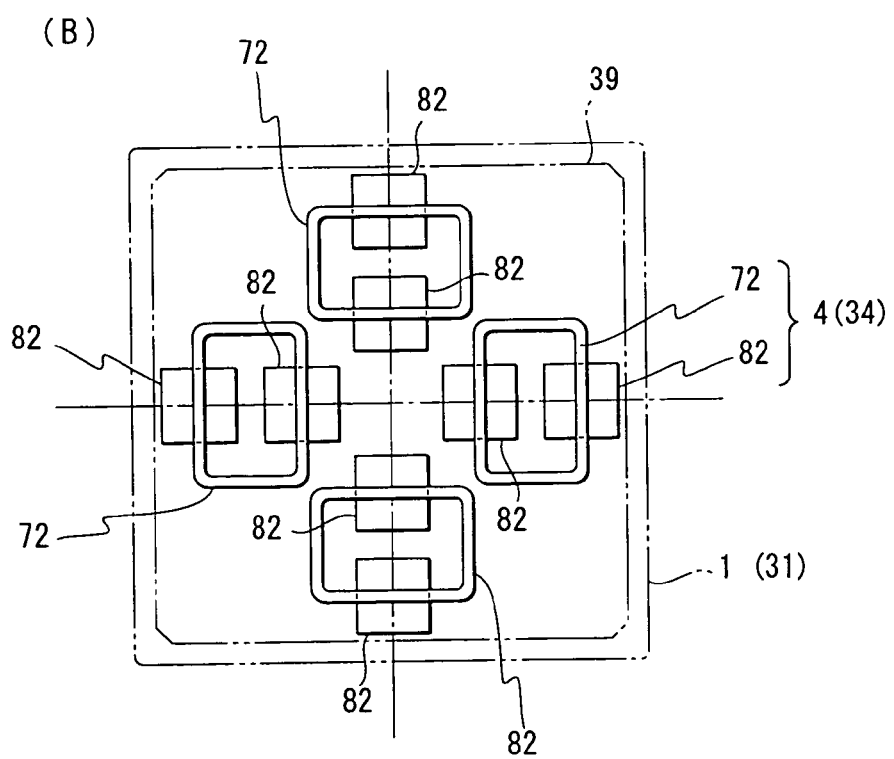

*FIG. 27*
(A)
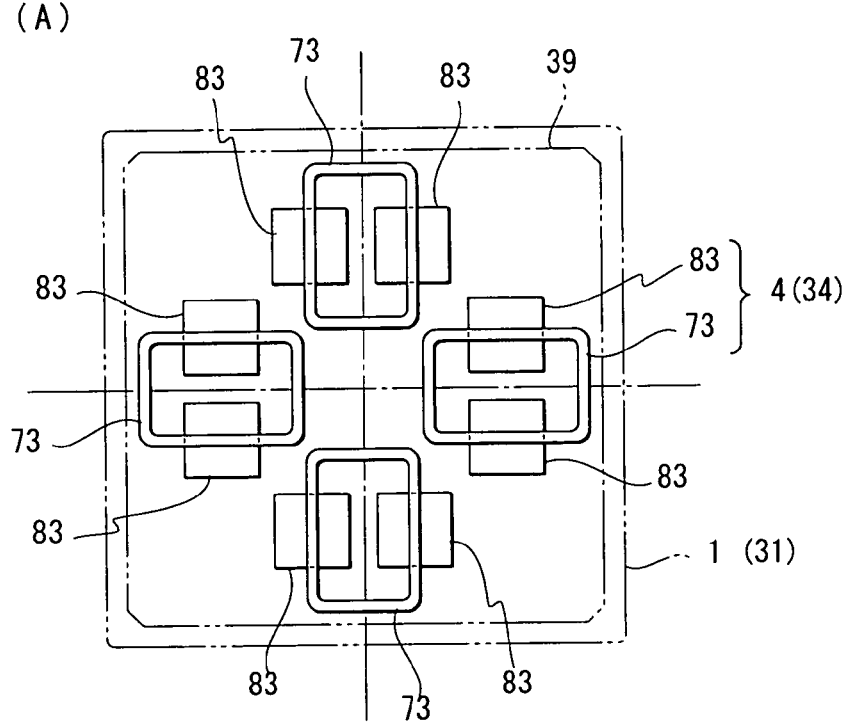
(B)
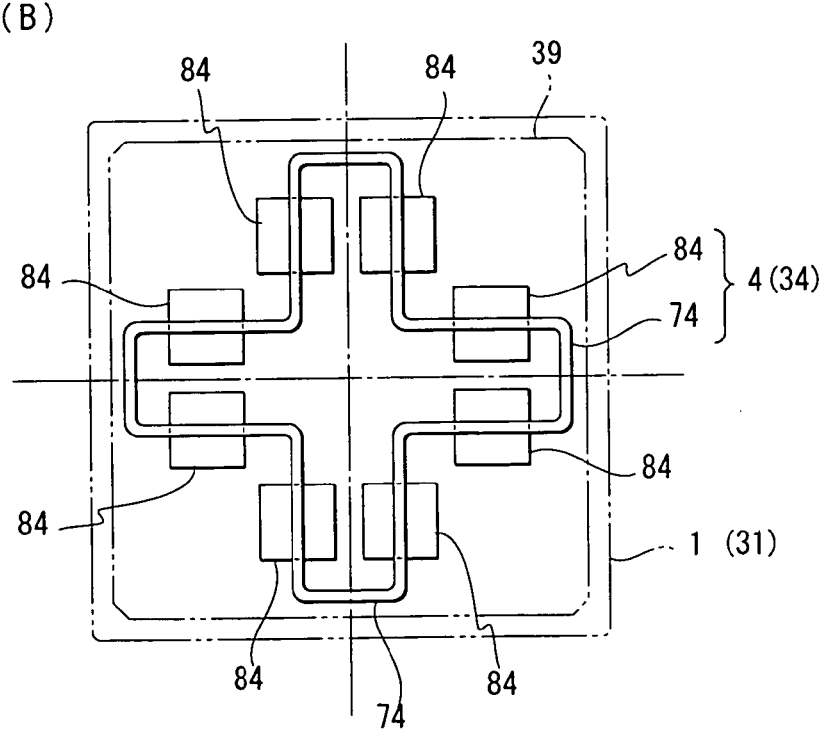

*FIG.38*

| ENERGIZATION CONTROL MODES BY TABLE DRIVING CONTROL MEANS 21 | CONTROL MODE A5 | CONTROL MODE A6 | CONTROL MODE A7 | CONTROL MODE A8 |
|---|---|---|---|---|
| ENERGIZING DIRECTION OF RING-SHAPE DRIVING COIL 7 (EXAMPLE) | | [ENERGIZING DIRECTION: FIXED IN CLOCKWISE DIRECTION] (MAGNETIC POLES & MAGNITUDE OF EACH DRIVEN MAGNET ARE VARIED) | | |
| SETTING OF MAGNETIC POLES OF DRIVEN MAGNETS 6A–6D (ILLUSTRATED BY □ ALONE SHOWS NON-ENERGIZED STATE) | | | | |
| MOVING DIRECTION OF ENTIRE DRIVEN MAGNETS (SYNTHETIC DRIVING DIRECTION) | | | | |

*FIG.39*
(A)
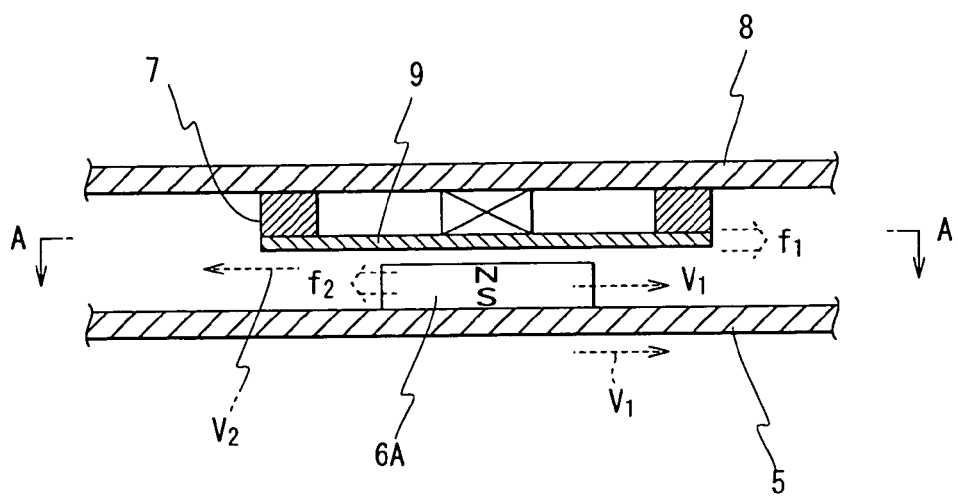
(B)
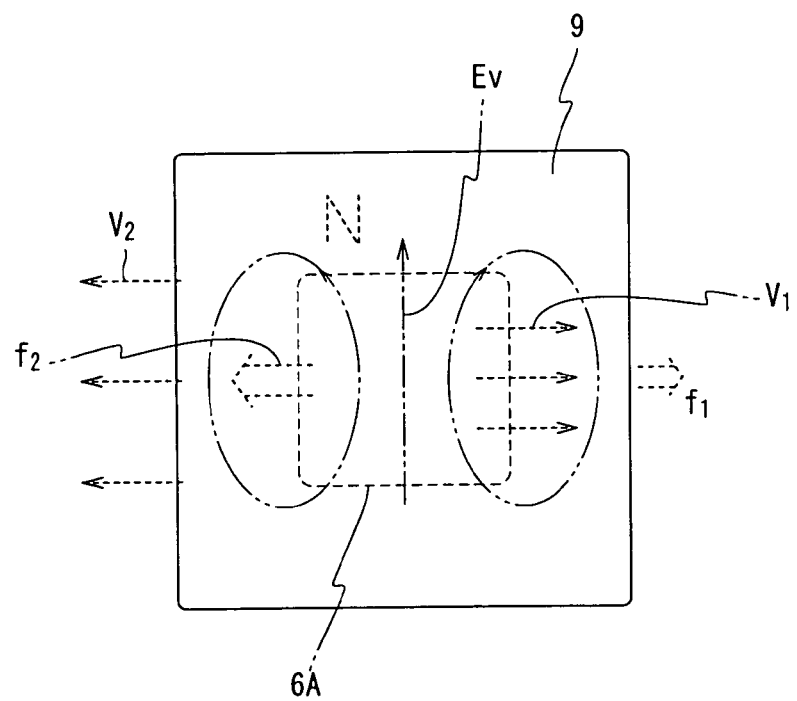

FIG.47

| ENERGIZATION CONTROL MODES BY TABLE DRIVING CONTROL MEANS 142 | CONTROL MODE B1 | CONTROL MODE B2 | CONTROL MODE B3 | CONTROL MODE B4 |
|---|---|---|---|---|
| SETTING OF MAGNETIC POLES OF DRIVEN MAGNETS 6A–6D (EXAMPLE) | 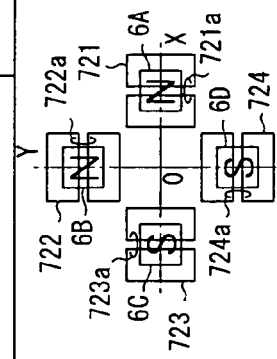 | NORTH POLE, SOUTH POLE ARE FIXED FOR ALL MODES (ENERGIZING DIRECTION & FLOWN CURRENT OF EACH DRIVING COIL ARE VARIED) | | |
| ENERGIZING DIRECTION OF SQUARE ⊖-SHAPE DRIVING COILS 721–724 (COIL WITH NO ARROW SHOWS NON-ENERGIZED STATE) | | 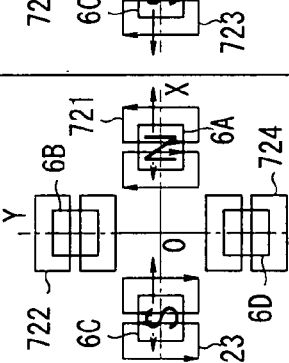 | 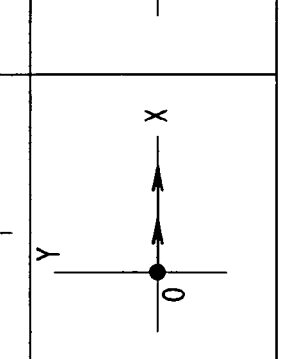 |  |
| MOVING DIRECTION OF ENTIRE DRIVEN MAGNETS | | 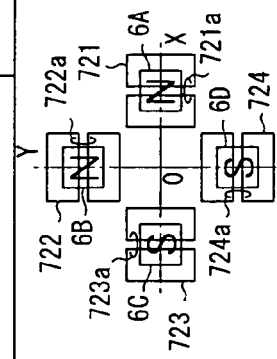 | 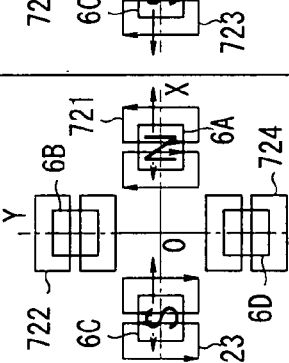 | 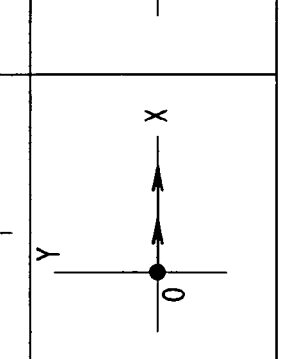 |

| ENERGIZATION CONTROL MODES BY TABLE DRIVING CONTROL MEANS 215 | CONTROL MODE E9 | CONTROL MODE E10 | CONTROL MODE | CONTROL MODE | CONTROL MODE |
|---|---|---|---|---|---|
| SETTING OF MAGNETIC POLES OF DRIVEN MAGNETS 6A-6D (EXAMPLE) | 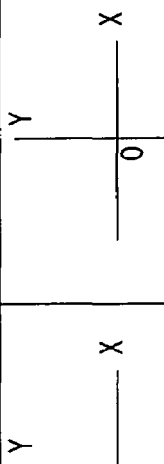 | | NORTH POLE, SOUTH POLE ARE FIXED FOR ALL MODES (ENERGIZING DIRECTION & FLOWN CURRENT OF EACH DRIVING COIL ARE VARIED) | | |
| ENERGIZING DIRECTION OF SQUARE ⊖-SHAPE DRIVING COILS 751-754 (COIL WITH NO ARROW SHOWS NON-ENERGIZED STATE) | 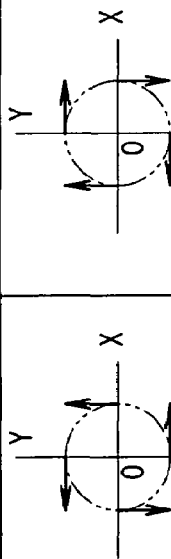 | | | | |
| MOVING DIRECTION OF ENTIRE DRIVEN MAGNETS (SYNTHETIC DRIVING DIRECTION) | 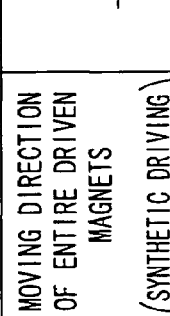 | | | | |

| ENERGIZATION CONTROL MODES BY TABLE DRIVING CONTROL MEANS 217 | CONTROL MODE K9 | CONTROL MODE K10 | CONTROL MODE | CONTROL MODE |
|---|---|---|---|---|
| ENERGIZING DIRECTION OF CROSS-SHAPE DRIVING COIL 771 (EXAMPLE) | | [ENERGIZING DIRECTION: FIXED IN CLOCKWISE DIRECTION] (MAGNETIC POLES & MAGNITUDE OF EACH DRIVEN MAGNET ARE VARIED) | | |
| SETTING OF MAGNETIC POLES OF DRIVEN MAGNETS 6A-6D, 16A-16D (EXAMPLE) (ILLUSTRATE BY □ ALONE SHOWS NON-ENERGIZED STATE) | | | | |
| MOVING DIRECTION OF ENTIRE DRIVEN MAGNETS (SYNTHETIC DRIVING DIRECTION) | | | | |

FIG. 79
(A) 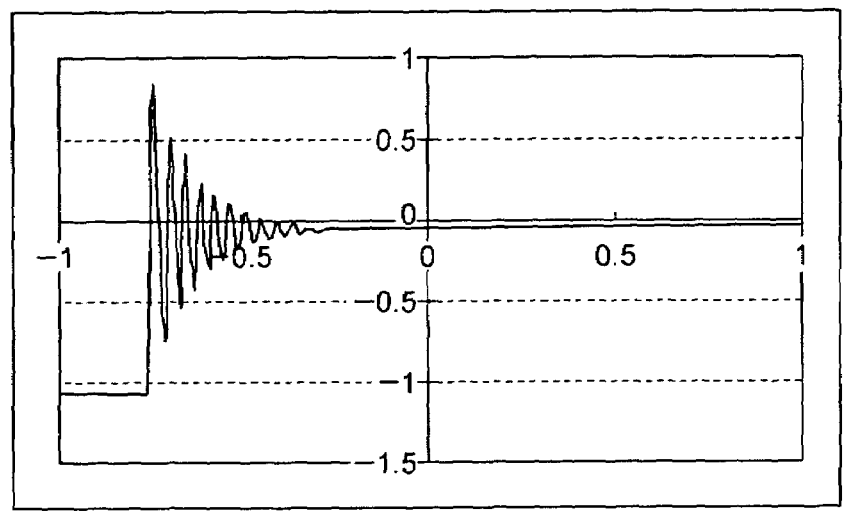
(B) 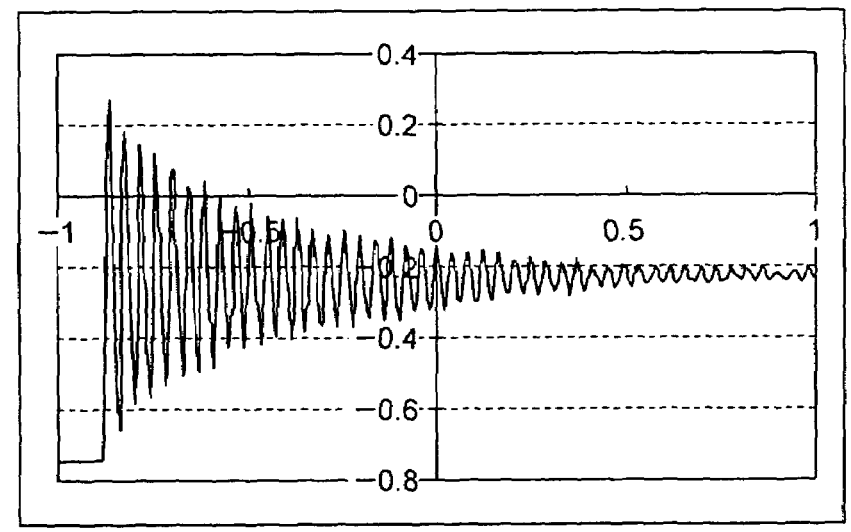

PRECISION MACHINING STAGE EQUIPMENT

TECHNICAL FIELD

The present invention relates to a precision processing stage apparatus and, more specifically, to a precision processing stage apparatus used in precision processing, wiring works, or inspections performed afterwards, etc. during a process of manufacturing semiconductors such as IC and LSI.

BACKGROUND ART

Conventionally, in the semiconductor industry and the like, generally used is a processing stage apparatus which comprises a movable table capable of precise movement in order to set and hold a workpiece in a position for precision processing or for an inspection, etc. in a manufacturing process of IC, LSI and the like.

In this case, in order to precisely move the movable table to an arbitrary position on an X-Y plane, generally used is a type of apparatus comprising a moving-body holding mechanism in a double structure, in which, first, the entire movable table is moved by an X-direction moving mechanism in the X direction and subsequently (or simultaneously) the entire movable table and the X-direction moving mechanism are moved by a Y-direction moving mechanism in the Y direction.

Further, most of the processing stage apparatus of this kind comprises a mechanical braking mechanism which drives at a relatively slow speed for controlling the movement of the movable table in the X direction and Y direction.

However, the conventional stage apparatus comprises: the moving-body holding mechanism in a double structure in which, as described above, the X-direction moving mechanism for movements in the X direction and the Y-direction moving mechanism for movements in the Y direction intersect with each other; and the in-contact moving section which especially requires the precision has a running-in structure. Therefore, it is time-consuming to perform processing and also requires a skill to perform precise adjustment at the time of assembling, thereby causing inconvenience. Thus, the productivity is deteriorated so that the price of the whole apparatus is increased in many cases.

Furthermore, for automating the system in connection with moving the table, it requires a large space for connecting the double-structures driving mechanism and mounting a positioning sensor and the like. Thus, the whole apparatus becomes large-scaled.

Moreover, in most of the conventional stage apparatuses, a return spring for returning to the original position is provided to the movable table. In this case, a slight reciprocal movement is likely to be generated in the movable table at a stop position due to the acceleration or deceleration of the driving force applied to the movable table at the time of stopping the movable table. Thus, a mechanical braking device utilizing friction is essential for making a stop at a prescribed position.

In the meantime, this type of mechanical friction braking is likely to generate small oscillation at the time of operation, so that the movement when making a stop becomes unstable when performing precision movement by micron unit. Also, the whole apparatus becomes large-scaled since the mechanical braking mechanism is provided, so that there always faces the shortcomings that the portability is bad and the maintenance characteristic is also deteriorated.

An object of the present invention is to provide a precision processing stage apparatus comprising a function of smoothly carrying out a precise moving of a precision processing movable table on the same plane in prescribed directions, which is capable of a dramatic improvement in assembling work, reduction of the size and weight of the whole apparatus and, further, of suppressing the reciprocal movement and small oscillation or the like at the time of stopping the movable table, thereby achieving fast and smooth precision movement of the movable table.

DISCLOSURE OF THE INVENTION

In order to achieve the foregoing objects, a precise processing stage apparatus according to the present invention comprises:
- a movable table installed in a main body part for supporting a work piece;
- a table holding mechanism installed in the main body part for allowing a movement of the movable table in arbitrary directions within a same plane;
- an electromagnetic driving means installed in the main body part for supplying a feed to the movable table within the same plane; and
- an electromagnetic braking mechanism for generating a braking force to stop the movable table at an arbitrary position on the same plane, wherein:
- the electromagnetic driving means comprises: as a pair, a plurality of driven magnets and a driving coil for generating a magnetic force working on a magnetic force of the driven magnets according to an energizing direction so as to supply a feed to the movable table through a mutual magnetic effect between the driven magnets and the driving coil;
- either the driven magnet or the driving coil is fixed at a prescribed position while the other is disposed to be integrally movable with the movable table;
- the electromagnetic braking mechanism includes braking magnets which face with each other and relatively move by synchronizing with the movement of the movable table and a nonmagnetic/conductive braking plate; and
- either the braking magnets or the braking plate is fixed at a prescribed position and the other is disposed to be movable by synchronizing with the movement of the movable table, and a pair of the braking magnets and the braking plate is for generating a braking force based on a mutual magnetic effect between a magnetic force by an eddy current generated in the braking plate in accordance with the movement of the movable table and a magnetic force of the braking magnets.

In the present invention, when the electromagnetic driving means is started, first, a mutual magnetic effect is generated between the driving coils and the driven magnets of the electromagnetic driving means and a feed in a prescribed direction is supplied to the movable table by the mutual magnetic effect. In this case, the movable table is allowed to move within the same plane by the table holding mechanism so that it can be smoothly moved in a prescribed direction without a vertical movement. Especially, when an original position returning force is given to the movable table, it is moved to a position (that is, a prescribed moving stop position) in balance between the original position returning force and the magnetic force of the electromagnetic driving means.

The movable table, when being moved, is suddenly accelerated in many cases by the electromagnetic driving means or the original position returning force applied to the movable table. When the moving range of the movable table is in micron unit, it is suddenly decelerated to be stopped while being suddenly accelerated. Therefore, when the movable table is stopped, it is likely to generate a slight reciprocal action at the time of stopping the movable table due to inertia of the movable table and the original position returning force of the table holding mechanism.

In the present invention, when the movable table makes a sudden movement, the braking magnets and the non-magnetic and conductive braking plate of the electromagnetic braking mechanism are relatively displaced by synchronizing with the movement of the movable table. As for the electromagnetic braking mechanism, an eddy current in a magnitude proportional to the moving speed of the movable table is generated in the braking plate so that the braking force is generated based on the mutual magnetic effect between the magnetic force by the eddy current generated in the braking plate and the magnetic force of the braking magnets. By receiving the braking force of the electromagnetic braking mechanism, the slight reciprocal action of the movable table is converged within a short time.

Therefore, the stopping time required for stopping the movable table at a desired position is shortened. Moreover, the overall time required for moving the movable table within the same plane is shortened so that the working efficiency can be improved.

In the embodiment, the electromagnetic braking mechanism may apply braking to the movable table or to the movable table and the table holding mechanism.

Therefore, by applying the braking force of the electromagnetic braking mechanism to the movable table, it is possible to shorten the braking time of the movable table as described above. Further, by applying the braking force of the electromagnetic braking mechanism to both the movable table and the table holding mechanism, it is possible to further shorten the braking time of the movable table.

Further, in the present invention, the electromagnetic braking mechanism has a simple configuration, comprising braking magnets which face with each other and relatively move by synchronizing with the movement of the movable table, and the non-magnetic and conductive braking plate.

Accordingly, the size and weight of the entire apparatus can be reduced. Therefore, inertia of the movable table is not increased and the movement of the movable table is not to be interfered. Also, special skills are not required for the assembling work, so that the workability becomes excellent. In this respect, the productivity can be largely improved compared to the conventional case comprising the double-structured moving mechanism.

Further, as for the braking magnets of the electromagnetic braking mechanism, it is possible to use the driven magnets forming the electromagnetic driving means or to form separately from the driven magnets.

Therefore, in the case where the braking magnets of the electromagnetic braking mechanism are formed with the driven magnets, the braking plate forms a circuit equivalent to a secondary circuit of transformer, since the part formed with the driving coils of the electromagnetic driving means linking a magnetic flux functions similarly with respect to the coils. At the same time, the secondary circuit constitutes a form being short-circuit at all times through an electric resistance component (generates eddy current loss) of the braking plate.

As a result, an eddy current is flown to the braking plate forming the secondary circuit in this case for canceling the magnetic flux generated by the driving coils, so that there is only the magnetic flux of the original driving magnets. Thus, the driving force can be generated without distortion. Further, the braking plate exhibits the same effect as that of a short ring of a voice coil motor. Thus, impedance of a primary circuit from the electric power point of view is small and it is possible to energize a relatively large magnitude of current without phase delay compared to the case where the secondary circuit is in the open state (the case without the braking plate). As a result, it is possible to output a relatively large magnitude of the electromagnetic force between with the driven magnets without phase delay compared to the case without the braking plate.

Moreover, the braking plate also functions as a radiator plate. In this respect, the flown current can be set in a constant level for a long time by effectively suppressing an increase in the resistance under high temperatures and decrease in the flown current value (that is, deterioration of the electromagnetic driving force) caused in accordance with the continuous operation of the driving coils. Thus, it enables to continue, in the stable state, the current control from outside for the driving force by the magnetic force outputted from the electromagnetic driving means, so that change by aging (dielectric breakdown by heat) can be suppressed. Therefore, the durability of the entire apparatus and, moreover, the reliability of the entire apparatus can be improved.

Further, it is desirable to mount the electromagnetic braking mechanism in the center of the movable table. With this, the braking force by the electromagnetic braking mechanism can be uniformly and non-eccentrically applied to the movable table so that the reciprocal action at the time of stopping the movable table can be suppressed to a short time.

Further, the braking plate of the electromagnetic braking mechanism may be formed as a single plate for a plurality of the braking magnets. Thereby, it is possible to shorten the time required for mounting the braking plate, and the efficiency of the assembling work can be improved.

Furthermore, the movable table may be held by the table holding mechanism directly or through an auxiliary table which is connected in parallel and integrally with the movable table.

As described above, the manner of holding the movable table by the table holding mechanism can be selected appropriately, and it can be installed in a condition which can effectively utilize the braking force of the electromagnetic braking mechanism using the movable table and the auxiliary table.

Moreover, as for the table holding mechanism, it is possible to employ a condition, comprising: at least one set of three rod-type elastic members provided in parallel on a same circumferential of a peripheral edge of the movable table with a prescribed space in between, whose one end being planted to the movable table;

at least another set of three rod-type elastic members in same length provided in parallel on a same circumferential with a prescribed space in between on an outer side of the one set of each rod-type elastic member by corresponding to the each rod-type elastic member, whose one end being held by the main body; and an intermediate member for integrally holding other ends of the one and the another sets of each rod-type elastic member while maintaining the parallel state, wherein each of the three pairs of rod-type elastic members of the table holding mechanism is formed with a rod-type elastic member such as a piano wire in same strength and same length.

As described, by forming the table holding mechanism as a link mechanism, the movable table can be precisely moved when being moved by a micron unit without moving the movable table vertically on the same plane.

As described above, when the table holding mechanism is formed as the link mechanism, it is desirable that one be provided to be integrally movable with the movable table and the other be provided to the main body part.

Further, as for the braking magnets or the braking plate of the electromagnetic braking mechanism, one may be provided to be integrally movable with the movable table and the other may be provided to the main body part and, further, as for the braking magnets or the braking plate of the electromagnetic braking mechanism, one may be provided to be integrally movable with the intermediate member and the other may be provided to the main body part.

As described, by appropriately providing the electromagnetic braking mechanism to the movable table and the intermediate member of the table holding mechanism, the braking force of the electromagnetic braking mechanism can be effectively applied to the movable table.

Further, the braking magnets of the electromagnetic braking mechanism can be formed with the driven magnets, or can be formed separately from the driven magnets. Thereby, the set position of the electromagnetic braking mechanism can be appropriately selected so that the electromagnetic braking mechanism can be set in a position where the braking force by the electromagnetic braking mechanism can be effectively utilized.

Further, the braking magnets of the electromagnetic braking mechanism can be formed with either permanent magnets or electromagnets. Thereby, the configuration of the driven magnets of the electromagnetic driving means can be variously modified. Moreover, by forming the driven magnets using the electromagnets, the drive-control of the movable table can be variously changed. For example, for acceleration/deceleration at the time of moving the movable table, the movable table can be moved by drive-controlling both the driving coils and the electromagnets so that the moving direction of the movable table can be promptly changed.

Furthermore, the table holding mechanism may comprise an original position returning force for returning the movable table to an original position. Thereby, the configuration of the apparatus can be formed compact compared to the case where the original position returning mechanism is provided separately from the table holding mechanism.

Moreover, it is desirable that the driven magnets be disposed, respectively, on a plurality of axes, which are obtained by being equally divided in a circumferential direction with a reference being a single axis passing through an origin set within a plane where the movable table moves. In this case, a plurality of the axes are set as a plurality of axes which are orthogonal to each other, passing through the origin set within the plane where the movable table moves, or a plurality of the axes are set as a plurality of axes which extend towards radial directions with the center being the origin set within the plane where the movable table moves.

Furthermore, it is desirable that the original position of the movable table returned by the table holding mechanism may coincide with the origin which is the reference of the axes set within the plane where the movable table moves.

Thereby, the returned position of the movable table by the table holding mechanism coincides with the position as a starting point for moving the movable table. Thus, the movable table can be precisely positioned for being moved.

Further, it is desirable that a plurality of driven magnets forming the electromagnetic driving means be disposed on each axes at positions at equivalent distances from the origin and a plurality of driving coils forming the electromagnetic driving means be disposed by corresponding to a plurality of the driven magnets.

Since the driven magnets and the driving coils forming the electromagnetic driving means are disposed on the axes, it enables to eliminate an excessive rotational force applied to the movable table and an accurate positioning control of the movable table can be achieved. By disposing a plurality of the driven magnets on the axes at linear-symmetrical positions, it is possible to surely eliminate a force which interferes with the movement of the movable table.

It is desirable that the electromagnetic braking mechanism be disposed on the axes. However, the pair of the driven magnets and the driving coils may be disposed in positions shifted from the axes. In the case where the set positions of the pair of the driven magnets and the driving coils are changed at will, it is also possible to stop the movable table in a prescribed position using the braking force of the electromagnetic braking mechanism. Thereby, it enables to provide a stage apparatus with an extremely wide applicability.

Further, the driven magnets of the electromagnetic driving means may be formed with permanent magnets or electromagnets.

By forming the electromagnetic driving means using the permanent magnets, an energizing circuit becomes unnecessary unlike the case of using the electromagnets. For this, it enables to avoid complication of work at the time of assembling and maintenance inspection.

In the case where the driven magnets of the electromagnetic driving means are formed with the electromagnets, energization to the driven magnets is selectively controlled either in a forward direction or reverse direction by synchronizing with the energization to the driving coils. Thereby, it is possible to apply various changes in the drive-control of the movable table. Further, by individually controlling the energization to a plurality of the driving coils, extent of the feed supplied to the movable table by the electromagnetic force can be modified at will.

Moreover, the driving coils comprise coil sides for generating a magnetic force working on a magnetic force of the driven magnets. In this case, it is desirable that the coil side of the driving coil be formed in cross shape or linear shape, or be positioned in a state to be along the axes where the driven magnets are disposed. Thereby, the mutual magnetic effect can be surely generated between the coil sides of the driving coil and the driven magnets. Further, by selectively forming the coil sides in cross shape or linear shape, the direction of the mutual magnetic effect generated between with the driven magnets can be arbitrarily selected. Thus, various changes can be applied to the movement of the movable table.

Moreover, the driving coils can be formed with a plurality of coils in different sizes being arranged on inner and outer sides. Thereby, the mutual magnetic force generated between the driving coils and the driven magnets can be doubled. Therefore, the feeding force to the movable table can be improved and the portability by the movable table can be doubled.

In this case, it is desirable that the linear-shape coil sides of the driving coil be disposed in a state to be along or crossing with respect to the axes where the driven magnets are disposed. Thereby, the mutual magnetic force generated between the driving coils and the driven magnets can be arbitrarily selected and the driving force for the movable table can be variously modified.

Further, the driving coils can be formed by combining a plurality of small coils which can be individually energized, and the cross-shape or linear shape coil sides can be formed in the area where the small coils abut with each other. Thereby, the coil sides can be formed in the driving coils easily.

In this case, the small coils are formed in an angular shape. Especially, it is desirable to be in a quadrangular, triangular, pentagonal or fan shape. The angular shape of the driving coil is so determined that the coil sides are easily formed. Thus, it is not limited to the quadrangular, triangular, pentagonal or fan shape.

Furthermore, it is desirable that an outer dimension of the driving coil be set larger than that of the driven magnet. Thereby, the electromagnetic driving force generated between a plurality of the driving coils and the driven magnets can be generated in the outward direction from the starting position of the movable table at all times. Thus, the resultant force of these electromagnetic driving forces can be also generated in the outward direction from the starting position of the movable table at all times.

Moreover, the electromagnetic driving means may comprise an operation control system for linearly moving or linearly and rotationally moving the movable table through controlling energization to the driving coil. Thereby, it is possible to apply changes in the movement of the movable table.

Further, it is possible to form the operation control system, comprising: a coil driving control means for energize-controlling the driving coils of the electromagnetic driving means according to a control mode; a program storage to which a plurality of control programs for a plurality of control modes specifying the moving directions, rotation directions, the amount of operation and the like of the movable table are stored; a data storage to which prescribed coordinate data and the like are stored to be used at the time of executing each of the control programs; and an operation command input section for giving a command to the coil driving control means for performing a prescribed control operation on the driving coils.

In this case, control codes of the operation control system comprise: a first to a fourth control modes for moving the movable table in positive and negative directions of each axis with an intersection point of the two orthogonal axes being an origin; a fifth to an eighth control modes for moving the movable table in directions within each quadrant being sectioned by the two orthogonal axes; and a ninth and a tenth control modes for rotating the movable table in a clockwise direction or counterclockwise direction within a plane formed by the two orthogonal axes.

In the above-described configuration, the coil driving control means is started according the a command from the operation command input section and information of the moving target position and a prescribed control mode for moving are fetched from the program storage and the data storage. Based on this, the driving coils of the electromagnetic driving means are drive-controlled, thereby moving the movable table in a prescribed direction.

Therefore, it is possible to drive-control the driving coils based on the control mode for the driving coils stored beforehand, so that it enables to promptly correspond to a command from the operation command input section.

Further, as for the operation control system, in addition to the above-described configuration, it is possible to employ a configuration, comprising: a plurality of position detecting sensors for detecting moving information of the movable table to be outputted outside; and an positional information arithmetic circuit for specifying the moving direction of the movable table and amount of change and the like through performing a prescribed arithmetic calculation based on information detected by the position detecting sensors so as to output it outside as positional information.

Therefore, moving information of the movable table and the positional information after being moved can be outputted outside in real-time, so that operators can easily obtain from outside the moving direction of the movable table and the position shift after being moved. Thus, it is possible to highly precisely and promptly perform the moving work of the movable table.

Further, as for the electromagnetic driving means, it may employ a configuration, comprising an operation control system which is started according to a command from outside for moving the movable table in a prescribed moving direction through individually controlling the driving coils and the driven magnets of the electromagnetic driving means.

Thereby, it is possible to selectively activate one, two or more of the driven magnets which effectively function towards the moving direction of the movable table. Thus, it is possible to surely move the movable table in a prescribed direction.

Moreover, it is possible that the operation control system comprises: an energizing direction setting function for setting and maintaining an energizing direction of the driving coils in one direction; a driving coil energizing control function for variably setting magnitude of the energizing direction of the driving coils; a magnetic pole variably setting function which operates according to the energizing direction of the driving coils for individually setting and maintaining the magnetic poles of the driven magnets; a magnetic force magnitude setting function for individually and variably setting the magnitude of the magnetic force of each driven magnet according to a command from outside; and a table action control function for adjusting the transporting direction and transporting force for the movable table by appropriately actuating the various functions.

Thereby, it is possible to specifically and surely move the movable table in a prescribed direction.

BRIEF DESCRIPTION OF THE DRAWINGS

FIG. 7 are illustrations showing an operation example of the auxiliary table (movable table) which is operated by the operation control system disclosed in FIG. 6, in which FIG. 7(A) is an explanatory illustration showing the case where the movable table is two-dimensionally moved in the upper right direction at 45° while FIG. (B) is an explanatory illustration showing the case where the auxiliary table (movable table) is rotated by an angle of θ;

FIG. 8 is a diagram showing four energizing patterns (the energizing programs are stored in the program storage beforehand) for energizing four small angular coils of the driving coil disclosed in FIG. 1 to FIG. 4 and their functions;

FIG. 9 are illustrations for showing the control mode and the operating direction of the auxiliary table (movable table) in the case were the operation control system disclosed in FIG. 6 drive-controls the four driving coils, in which FIG. 9(A) is an explanatory illustration showing a first control mode and the operation of the auxiliary table (movable table) in the X-axis (positive) direction while FIG. 9(B) is an explanatory illustration for showing the relation between the magnitude of the driving force and the point of action of this case;

FIG. 10 are illustrations for showing the control mode and the operating direction of the auxiliary table (movable table) in the case were the operation control system disclosed in FIG. 6 drive-controls the four driving coils, in which FIG. 10(A) is an explanatory illustration showing a third control mode and the operation of the auxiliary table (movable table) in the Y-axis (positive) direction while FIG. 10(B) is an explanatory illustration for showing the relation between the magnitude of the driving force and the point of action of this case;

FIG. 11 are illustrations for showing the control mode and the operating direction of the auxiliary table (movable table) in the case were the operation control system disclosed in FIG. 6 drive-controls the four driving coils, in which FIG. 11(A) is an explanatory illustration showing a fifth control mode and the operation of the auxiliary table (movable table) in the first quadrant direction on the X-Y coordinates while FIG. 10(B) is an explanatory illustration for showing the relation between the magnitude of the driving force and the point of action of this case;

FIG. 12 are illustrations for showing the control mode and the operating direction of the auxiliary table (movable table) in the case where the operation control system disclosed in FIG. 6 drive-controls the four driving coils, in which FIG. 12(A) is an explanatory illustration showing a seventh control mode and the operation of the auxiliary table (movable table) in the second quadrant direction on the X-Y coordinates while FIG. 12(B) is an explanatory illustration for showing the relation between the magnitude of the driving force and the point of action of this case;

FIG. 13 are illustrations for showing the control mode and the operating direction of the auxiliary table (movable table) in the case were the operation control system disclosed in FIG. 6 drive-controls the four driving coils, in which FIG. 13(A) is an explanatory illustration showing a ninth control mode and the rotation of the auxiliary table (movable table) with the center being the origin on the X-Y coordinates while FIG. 13(B) is an explanatory illustration for showing the relation between the magnitude of the driving force and the point of action of this case;

FIG. 14 are illustrations showing the positional relation of the braking plate, the four driving coils and the driven magnets disclosed in FIG. 1, in which FIG. 14(A) is a fragmentary cross section showing the configuration including the braking plate part while FIG. 14(B) is a plan view viewed along a line A—A of FIG. 14(A);

FIG. 15 are illustrations showing the principle of generating the braking force of the braking plate disclosed in FIG. 1, in which FIG. 15(A) is a partly enlarged cross section showing the braking plate part of FIG. 1 while FIG. 15(B) is an explanatory illustration showing the generating state of an eddy current braking generated in the braking plate viewed along the line A—A of FIG. 14(A) of this case;

FIG. 16 are illustrations showing the electrical relation between the driving coils and the dumping plate disclosed in FIG. 1, in which FIG. 16(A) is an equivalent circuit showing the state where the both are connected while FIG. 16(B) is an equivalent circuit showing the state of the driving coils without the dumping plate;

FIG. 21 are illustrations showing a third embodiment of the present invention, in which FIG. 21(A) is a fragmentary schematic cross section while FIG. 21(B) is a plan view taken along the line A—A of FIG. 21(A), in which a part is being omitted;

FIG. 26 are illustrations showing another example of the electromagnetic driving means of the present invention, in which FIG. 26(A) is an explanatory illustration showing an example of the case comprising a single square-shape driving coil and four driven magnets, while FIG. 26(B) is an explanatory illustration showing an example of the case comprising four driving coils and eight driven magnets;

FIG. 27 are illustrations showing another example of the electromagnetic driving means of the present invention, in which FIG. 27(A) is an explanatory illustration showing an example of the case comprising a single driving coil and four driven magnets, while FIG. 27(B) is an explanatory illustration showing an example of the case comprising a cross-shape frame driving coil formed in cross-shape frame type and eight driven magnets;

FIG. 38 is a diagram showing the control contents of a plurality of energizing control modes $A_5$–$A_8$ executed by the table driving control means of the tenth embodiment disclosed in FIG. 35 and the moving directions (transporting directions of the movable table) of the entire driven magnets;

FIG. 39 are illustrations showing the braking plate disclosed in FIG. 32, in which FIG. 39(A) is an explanatory illustration showing the configuration while FIG. 39(B) is an explanatory illustration showing the operation principle;

FIG. 43 are illustrations showing another example of the driving coil disclosed in FIG. 32, in which FIG. 43(A) is an explanatory illustration showing the case of using a triangular driving coil, FIG. 43(B) is an explanatory illustration showing the case of using a circular driving coil, FIG. 43(C) is an explanatory illustration showing the case of using a hexagonal driving coil, and FIG. 43(D) is an explanatory illustration showing the case of using an octagonal driving coil;

FIG. 47 is a diagram showing the control contents of a plurality of energizing control modes $B_1$–$B_4$ executed by the table driving control means of the embodiment disclosed in FIG. 46 and the moving directions (transporting directions of the movable table) of the entire driven magnets;

FIG. 58 is a diagram showing the control contents of a plurality of energizing control modes D5–D8 executed by the table driving control means of the embodiment disclosed in FIG. 54 and the moving directions (transporting directions of the movable table) of the entire driven magnets;

FIG. 63 is a diagram showing the control contents of a plurality of energizing control modes E5–E8 executed by the table driving control means of the embodiment disclosed in FIG. 59 and the moving directions (transporting directions of the movable table) of the entire driven magnets;

FIG. 64 is a diagram showing the control contents of a plurality of energizing control modes E9–E10 (rotating action) executed by the table driving control means of the tenth embodiment disclosed in FIG. 59 and the moving directions (transporting directions of the movable table) of the entire driven magnets;

FIG. 74 is a diagram showing the control contents of a plurality of energizing control modes K1–K4 executed by the table driving control means of the embodiment disclosed in FIG. 71 and the moving directions (transporting directions of the movable table) of the entire driven magnets;

FIG. 75 is a diagram showing the control contents of a plurality of energizing control modes K5–K8 executed by the table driving control means of the embodiment disclosed in FIG. 71 and the moving directions (transporting directions of the movable table) of the entire driven magnets;

FIG. 76 is a diagram showing the control contents of a plurality of energizing control modes K9–K10 (rotating action) executed by the table driving control means of the embodiment disclosed in FIG. 71 and the moving directions (transporting directions of the movable table) of the entire driven magnets;

FIG. 79 are characteristic diagrams showing the results of comparison between the braking characteristic of the seventeenth embodiment and that of a conventional case.

BEST MODE FOR CARRYING OUT THE INVENTION

In the followings, embodiments of the present invention will be described by referring to accompanying drawings.

First Embodiment

Figure 1:
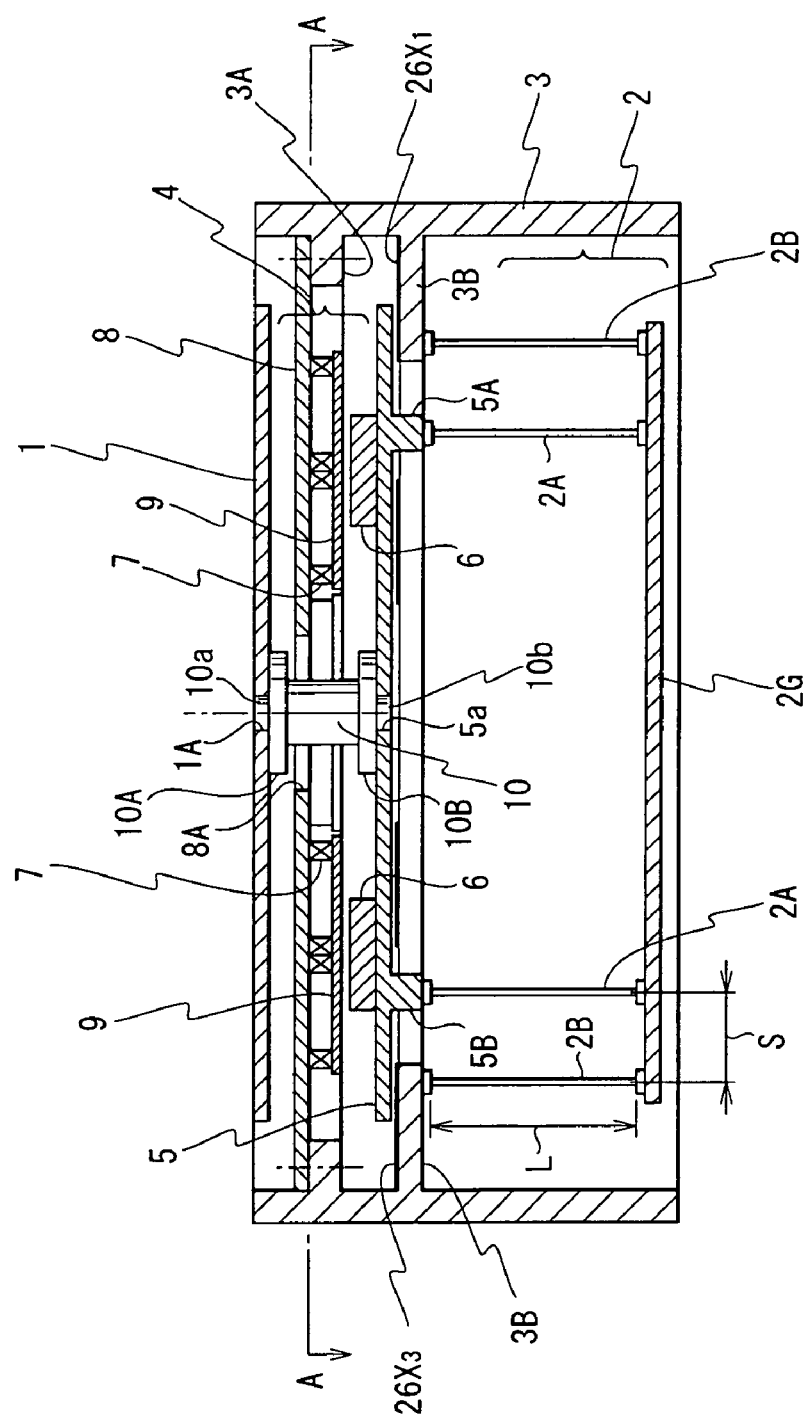
FIG. 1 is a schematic cross section showing a first embodiment of the present invention, in which a part is being omitted.

A first embodiment of the present invention is shown in FIG. 1 to FIG. 18. In FIG. 1 to FIG. 18, numeral reference 1 is a movable table and numeral reference 2 is a table holding mechanism. The table holding mechanism 2, as shown in FIG. 1, is disposed in the lower part of a case main body (main body part) 3. The table holding mechanism 2 is configured to allow the movable table 1 to move in an arbitrary direction on a same plane, while holding the movable table 1 in the state where original position returning force is applied to the movable table 1.

The table holding mechanism 2 is supported by the case main body 3 which is the main body part.

The case main body 3 according to the embodiment is formed in a box shape with the top and bottom being opened as shown in FIG. 1.

Numeral reference 4 is an electromagnetic driving means. The electromagnetic driving means 4 has a function of applying a moving force (feed) to the movable table 1, with the main part being held by the case main body 3 side. Numeral reference 3A is a main-body protrusion which is provided in the periphery of the inner wall of the case main body 3 by being protruded in the inward direction.

The electromagnetic driving means 4 according to the embodiment is disposed between the movable table 1 and an auxiliary table 5 which will be described later.

The auxiliary table 5 is made of a magnetic material, and is mounted by being connected to the movable table 1 by facing and also being in parallel with respect to the movable table 1 with a prescribed space in between. Further, the table holding mechanism 2 is mounted to the auxiliary table 5 side so as to hold the movable table 1 through the auxiliary table 5.

The electromagnetic driving means 4 comprises: four driven magnets 6 in a square shape being fixed to prescribed positions of the auxiliary table 5; cross-in-square-shape driving coils 7 having a cross-shape coil side being disposed by facing each driven magnet 6, which applies a prescribed moving force (feed) to the movable table 1 by the magnetic force along a prescribed moving direction by associating with each driven magnet 6; and a fixing plate 8 which is mounted to the auxiliary table 5 on the movable table 1 side for holding the cross-in-square-shape driving coil 7 at a fixed position. This fixing plate 8 is formed with magnetic member. Although the driving coil 7 is illustrated as a closed circuit for clearly showing the shape of the rolled end part, the driving coil 7 is wound in solenoid form having two terminals on both ends for energization so as to generate the magnetic force by the energization. This manner of illustrating the driving coil applies also to each embodiment as will be described hereinafter.

Further, a plurality of the cross-in-square-shape driving coils 7 described above comprise a braking plate 9 made of nonmagnetic metallic member (for example, a copper member with less electric resistance), respectively, on the end faces facing the driven magnets 6. The braking plate 9 is adjacent to the pole face of the facing driven magnet 6. The braking plates 9 are fixed to the fixing plate 8 side.

This will be described in more detail.

[Movable Table and Auxiliary Table]

In FIG. 1 to FIG. 4, the movable table 1 is formed in a circular shape and the auxiliary table 5 is formed in a square shape. The auxiliary tale 5 is disposed by facing and in parallel with respect to the movable table 1 with a prescribed space in between, and the center is integrally connected to the movable table 1 through a connecting brace 10. Thus, the movable table 1 can integrally move and integrally rotate with the auxiliary table 5 while maintaining the parallel state therebetween.

The connecting brace 10 is a connecting member for connecting the movable table 1 and the auxiliary table 5, and is formed to have an H-letter shaped cross section with flange parts 10A, 10B provided on both ends. In the center of both ends on the outer side, provided are protrusions 10a, 10b for engaging with positioning holes 1a, 5a formed in each center of the movable table 1 and the auxiliary table 5.

The movable table 1 and the auxiliary table 5 are integrated by being positioned through the protrusions 10a, 10b and the flange parts 10A, 10B and fixed to the connecting brace 10. For this integration, adhesive is used in this embodiment. However, they may be joined partially by welding or the protrusions 10*a*, 10*b* may be press-fitted into the positioning holes 1*a*, 5*a* and other parts may be integrated by adhesive, welding or the like. Further, either the movable table 1 or the auxiliary table 5 may be fixed to the flange part 10A or 10B of the connecting brace 10 through a screw to be removable. In this case, after being fixed by a screw, a number of knock pins may be engaged and driven in between both tables for positioning fixation (not shown). Thereby, the movable table 1 and the auxiliary table 5 can be surely integrated.

[Table Holding Mechanism]

The table holding mechanism 2 according to the embodiment has a function of, while holding the movable table 1, moving it in any directions at will on the same plane without changing the height position. This is carried out through the auxiliary table 5.

The table holding mechanism 2 is obtained by applying a link mechanism three-dimensionally. Four pairs of two piano wires placed with a prescribed space in between are prepared beforehand by corresponding to the corner parts on the periphery of the edge portion of the auxiliary table 5. Each pair of the four pairs of piano wires is provided facing upward direction in each of the four-corner parts of an intermediate plate 2G in a quadrangular shape. The table holding mechanism 2 holds the auxiliary table 5 from the bottom side through the four piano wires 2A placed on the inner side and suspends the intermediate plate 2G to be swingable from the main body part 3 through the four piano wires 2B placed on the outer side. The two piano wires may be any other members as long as they are rod-type elastic wire materials with a sufficient and appropriate rigidity for supporting the movable table 1 and the auxiliary table 5.

Thereby, the auxiliary table 5 (that is, the movable table 1) is held stably in the air by the intermediate plate 2G and each of the four piano wires 2A, 2B. Thus, it is movable in any directions at will in the horizontal plane while maintaining the same height position as will be described later. The auxiliary table 5 (that is, the movable table 1) can be rotated on the same plane in substantially the same manner.

This will be described in more detail.

The table holding mechanism 2 comprises: the four table-side piano wires 2A planted in each of the four corner parts on the peripheral edges of the auxiliary table 5 towards the downward direction in FIG. 1; the intermediate plate 2G mounted to the lower end part of each table-side piano wire 2A in FIG. 1; and the main-body-side piano wires 2B being mounted on the outer side of the table-side piano wires 2A, which are configured to suspend the intermediate plate 2G from the main body part 3 side.

As for the four table-side piano wires 2A, the upper end parts in FIG. 1 are fixed to the auxiliary table 5 and the lower end parts are fixed to the intermediate plate 2G. Numeral references 5A, 5B are lower protrusions provided in two areas on the lower side of the auxiliary table 5. The fixing positions of the table-side piano wires 2A are set by the lower protrusions 5A, 5B.

On the outer side of each of the four table-side piano wires 2A, the main-body-side piano wires 2B are provided individually and in parallel with each other with a prescribed space S in between. As for the main-body-side piano wires 2B, the lower end parts are fixed to the intermediate plate 2G in the same manner as the case of the table-side piano wires 2A, and the upper end parts are fixed to main-body-side protrusions 3B provided in the inner wall of the case main body 3.

Each of these piano wires 2A, 2B is formed with a rod-type elastic wire material with a sufficient and appropriate rigidity for supporting the movable table 1 and the auxiliary table 5.

Thereby, the movable table 1, together with the auxiliary table 5, is supported by the four table-side piano wires 2A on the inner side on the intermediate plate 2G, and is allowed to move in parallel and to rotate within the plane within the limit of elasticity of the four table-side piano wires 2A according to a principle of the link mechanism.

In the meantime, the intermediate plate 2G is suspended from the main-body-side protrusions 3B by the four table-side piano wires 2B placed on the outer side on the intermediate plate 2G. Thus, it is also allowed to move in parallel with respect to the case main body 3 and to rotate within the plane in the same manner.

Figure 17:
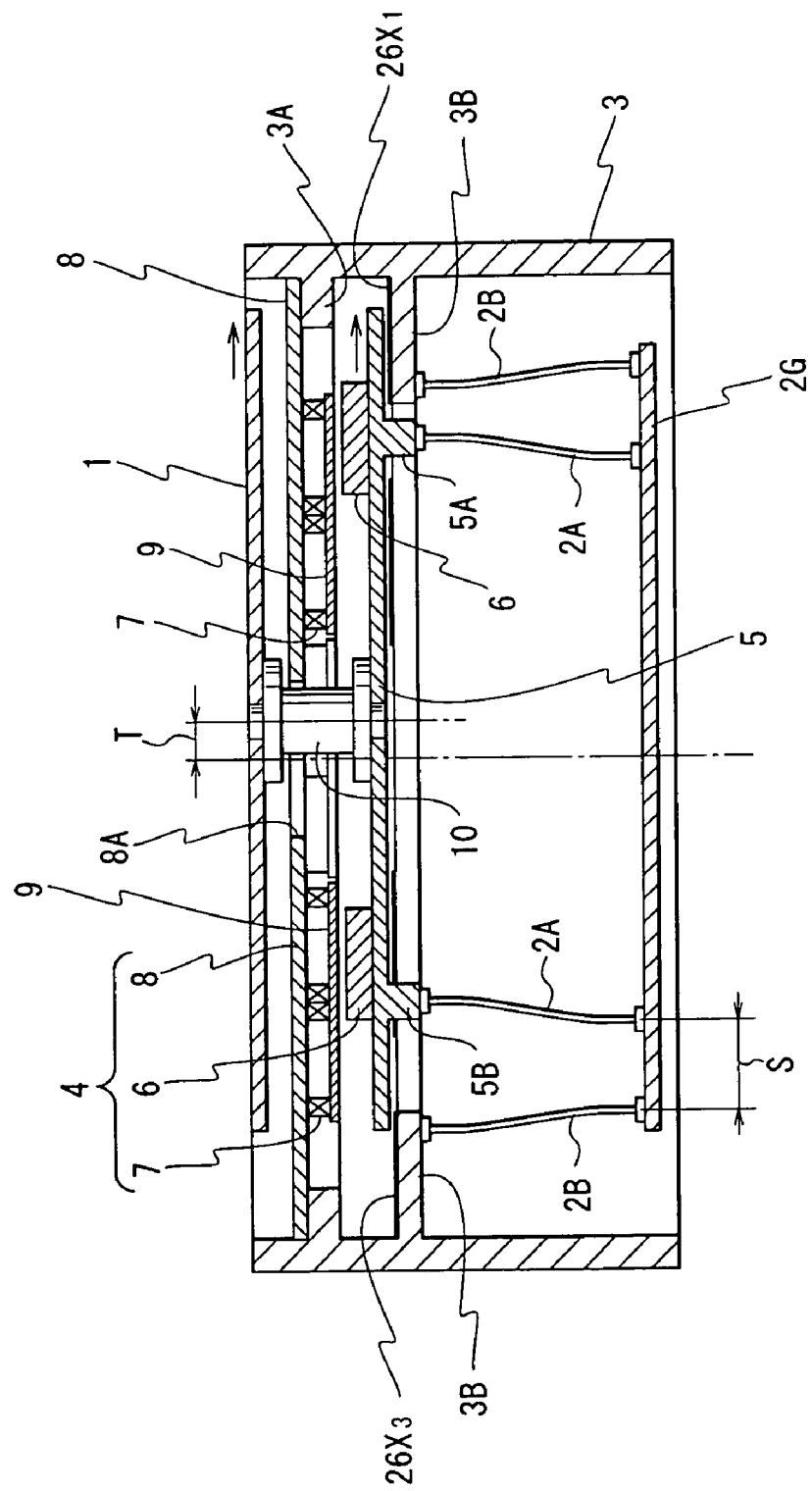
FIG. 17 is an explanatory illustration showing an example of an overall operation of the first embodiment disclosed in FIG. 1.

Therefore, when the auxiliary table 5 (that is, the movable table 1) moves or rotates within the plane upon receiving the external force, each of the piano wires 2A, 2B on the table side and case main body side is elastically deformed simultaneously as shown in FIG. 17 which will be described later, and the intermediate plate 2G moves vertically while maintaining the parallel state. Thus, when the auxiliary table 5 (that is, the movable table 1) moves or rotates within the plane upon receiving the external force, changes in the height position are absorbed since the height of the intermediate plate 2G changes vertically.

Thereby, the movable table 1 can move in any directions within the limit of elasticity of each piano wire 2A, 2B while maintaining the same height, when moved by receiving the external force.

Each of the piano wires 2A, 2B on the table side and the case main body side has the same diameter and same elasticity, and each of the effective lengths L is set to be completely the same. Further, although each of the piano wires 2A, 2B is provided along the lateral direction as shown in FIG. 1 and FIG. 3, for example, they may be provided in positions other than the positions shown in FIG. 2 as long as they are disposed on the X-Y plane in the positions to be in line-symmetrical to each other with respect to the X-axis and Y-axis.

There is elastic stress generated uniformly in each of the piano wires 2A, 2B for moving the movable table 1. Thus, it is advantageous in respect that the movable table 1 can be smoothly moved including the return of the movable table 1 to the original position.

As described above, in the table holding mechanism 2, all the piano wires 2A, 2B in each pair are identically deformed when, for example, the entire auxiliary table 5 is slide-moved in the same direction. In this case, the main-body-side piano wire 2B is elastically deformed while the end part is being held so that, by the deformation of the table-side piano wire 2A which is elastically deformed in the same manner, the height position of the auxiliary table 5 becomes unchanged. Instead, the height position of the intermediate plate 2G which is commonly supported by the both piano wires 2A, 2B changes.

In other words, the intermediate plate 2G absorbs the change in the height position caused by the deformation of the both piano wires 2A, 2B. Thereby, the auxiliary table 5 (that is, the movable table 1) is slide-moved within the same plane without changing the height as a whole. In this case, when the auxiliary table 5 is released from the external force, the auxiliary table 5 is returned straight to the original position by the spring action (restoring force) of each piano wire 2A, 2B.

Moreover, when the auxiliary table 5 (that is, the movable table 1) is rotationally driven on the same plane, the auxiliary table 5 (that is, the movable table 1) rotates within the same plane while maintaining substantially the same heights as a whole due to the same reasons. In this case, when the auxiliary table 5 is released from the external force, the auxiliary table 5 is also returned straight to the original position by the spring action (restoring force) of each piano wire 2A, 2B.

[Electromagnetic Driving Means]

Between the movable table 1 and the auxiliary table 5, as described above, an electromagnetic driving means 4 is mounted which supplies a prescribed moving force to the movable table 1 through the auxiliary table 5 (see FIG. 1).

The electromagnetic driving means 4 according to the embodiment comprises: four driven magnets (permanent magnets are used in this embodiment) 6 mounted on the auxiliary table 5; four cross-in-square-shape driving coils 7 for generating a prescribed electromagnetic force to the movable table 1 towards a prescribed moving direction through each driven magnet 6; and a fixing plate 8 for holding each cross-in-square-shape driving coil 7.

As shown in FIG. 1, the fixing plate 8 is mounted to the auxiliary table 5 on the movable table 1 side (between the auxiliary table 5 and the movable table 1) and its periphery is fixed to the case main body 3 to be mounted thereto. As for the fixing plate 8, only the both end parts on the left and right sides in FIG. 1 may be fixed to the case main body 3 to be mounted. In the center of the fixing plate 8, formed is a through-hole 8A for allowing the parallel movement within a prescribed range of the connecting brace 10. Although the through-hole 8A according to the embodiment is formed in a circular shape, it may be in a quadrangular-shape or other shapes. In short, the through-hole 8A of the fixing plate 8 may be in any shapes as long as it is the shape which allows the movement of the connecting brace 10.

As described above, the entire periphery of the fixing plate 8 is held by the main-body-side protrusion 3. In this case, for strong integration, the fixing plate 8 and the main-body-side protrusions 3A may be integrated by knock pins or the like after being screwed, or may be integrated by welding or the like. With this, it is possible to smoothly correspond to the displacement or movement of the movable table 1 by micron ($\mu$) unit without generating a position shift of the fixing plate 8 with respect to the case main body 3.

Figure 2:
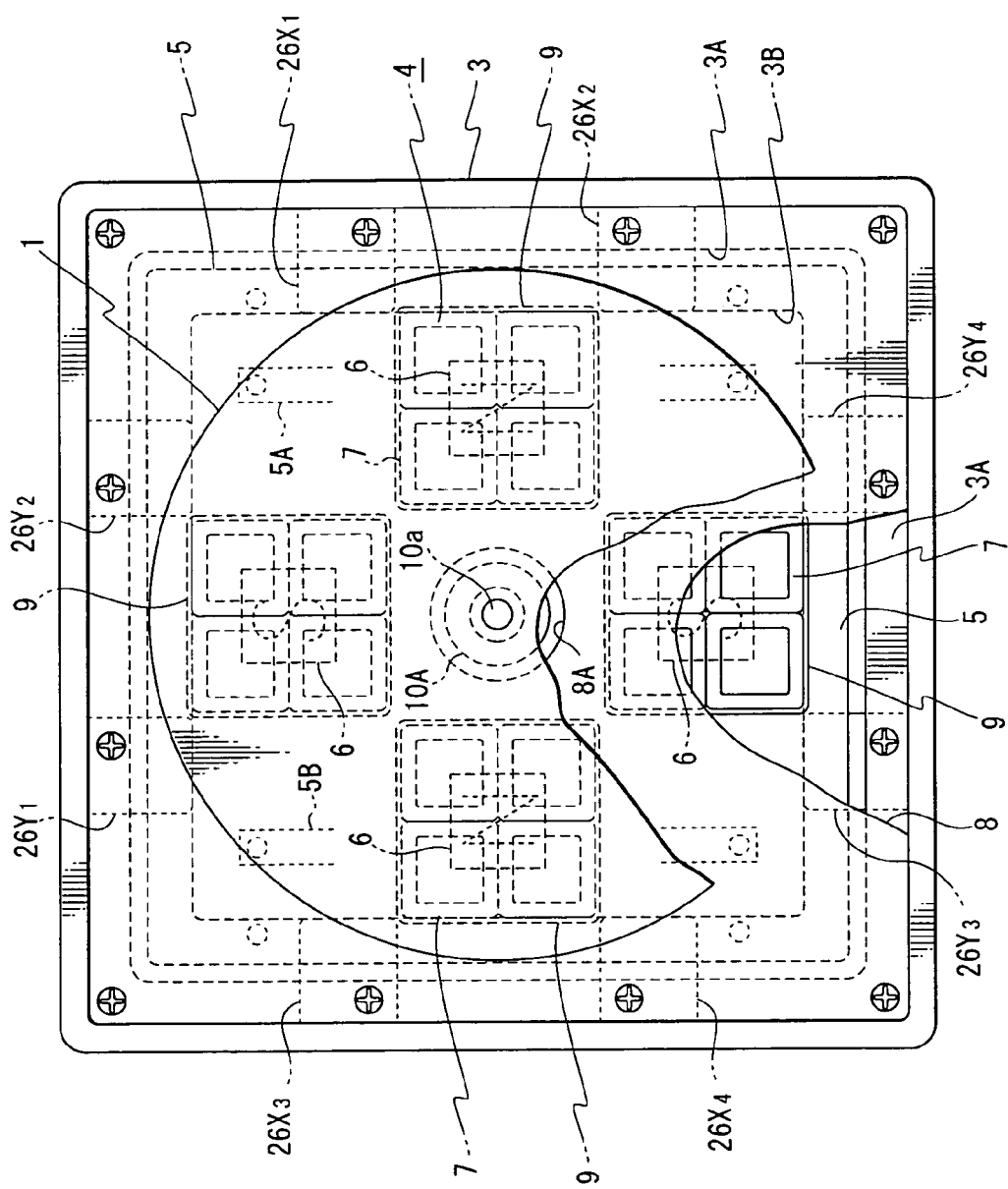
FIG. 2 is a fragmentary sectional plan view of FIG. 1.
Figure 3:
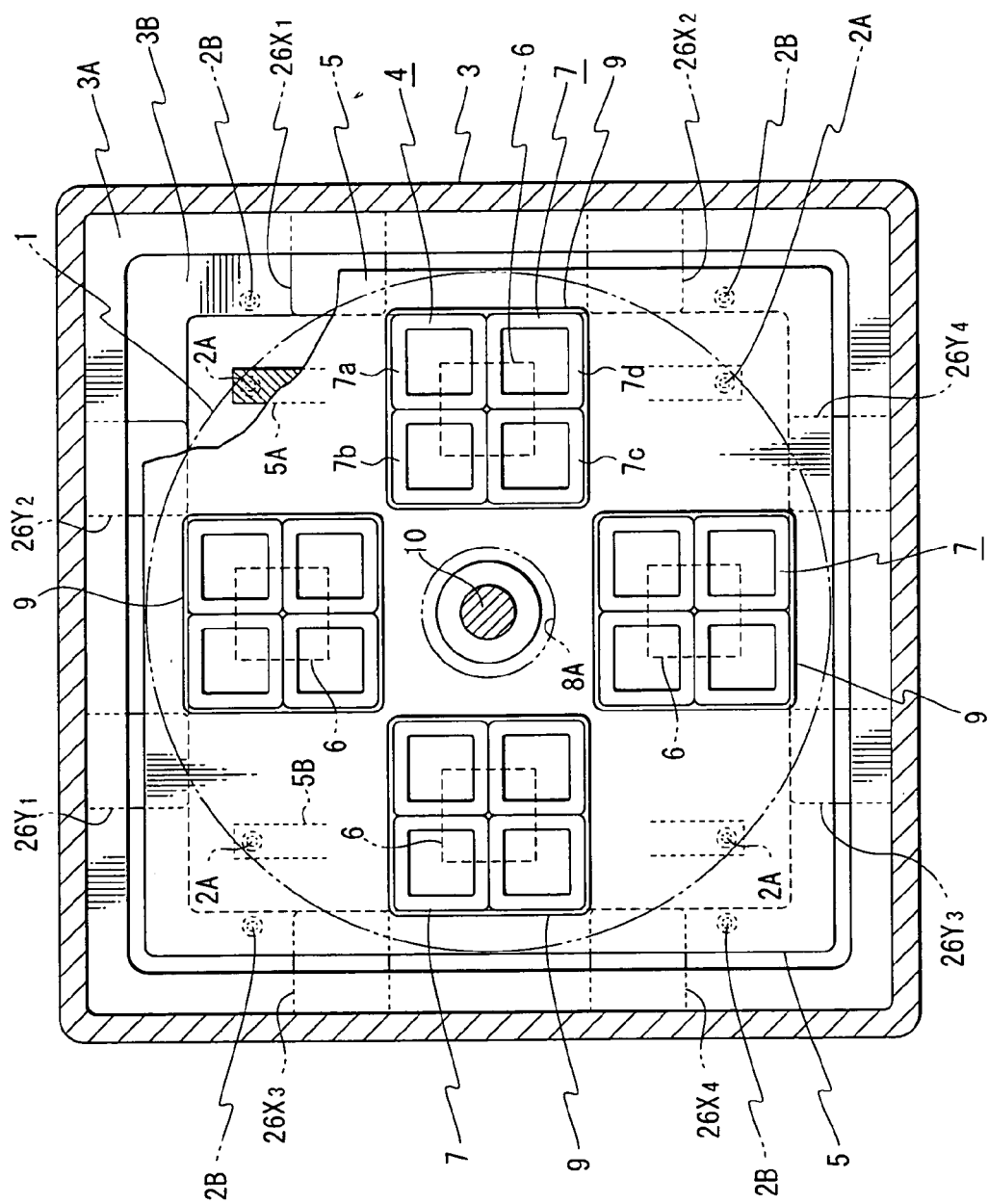
FIG. 3 is a schematic cross section taken along a line A—A of FIG. 1.

As shown in FIG. 2 and FIG. 3, the four driven magnets 6 according to the embodiment are formed with permanent magnet whose surface facing the driving coil 7 is formed in a square shape.

Here, in order to control the position shift of the movable table 1, a plurality of axes are set by being equally divided in the circumferential direction with the reference being an axis passing through the origin which is set on the same plane where the movable table 1 moves. In the case of this embodiment, the origin is set to coincide with the center of the fixing plate 8.

In the embodiment shown in FIG. 2 and FIG. 3, four axes are set by being divided equally into four in the circumferential direction with the reference being an axis passing through the origin which is set on the same plane where the movable table 1 moves. A pair of two axes which pass through the origin and extend in the opposite direction from each other are referred to as the X axis and Y axis, respectively, and the directions consistent with the X axis and Y axis are supposed to be the X direction and Y direction. Therefore, the X direction and Y direction cross at right angles at the origin.

Further, the position of the movable table 1 as the starting point of the movement is set as the center position of the connecting brace 10 when the movable table 1 is on the main body part 3 under a free state without receiving an external force, that is, the center position of the movable table 1. The center position of the fixing plate 8 and the origin at which the X-Y directions cross each other are made to coincide with each other.

As shown in FIG. 2 and FIG. 3, the four driven magnets 6 are respectively disposed and fixed on the auxiliary table 5 at the positions in the X-Y directions (on the four axes) being away from the origin by the same distance.

In the positions opposing the four driven magnets 6, the cross-in-square-shape driving coils 7 are fixed and mounted to prescribed positions on the fixing plate 8 by individually corresponding to the four driven magnets 6. The cross-in-square-shape driving coil 7 has a cross-shape coil side in its center along the X-Y axes, and supplies a moving force (feed) to the movable table 1 along a prescribed moving direction by the mutual magnetic effect between the magnetic force generated by energization and the magnetic force of each driven magnet 6.

In this case, as for the facing direction of the four driven magnets 6 according to the embodiment, the magnetic pole on the side facing the cross-in-square-shape driving coil 7 on the X axis is set as the north pole and the one on the Y axis as the south pole, respectively (see FIG. 2 and FIG. 3).

Thus, the magnetic force generated between the magnetic force which is generated in the cross-shape coil side of the driving coil 7 in the longitudinal direction or the lateral direction and the magnetic force of the driven magnet 6 are always set to be in the X or Y direction, and the resultant force always becomes the maximum value. Thereby, the generated magnetic force can be effectively outputted as the driving force of the movable table 1.

As for the cross-in-square-shape driving coil 7, the size is set so that the cross-shape coil side provided inside allows the driven magnets 6 to move in the maximum moving range.

Therefore, the electromagnetic force of the cross-in-square-shape driving coil 7 generated between the four driven magnets 6 can be surely outputted to the auxiliary table 5 as a moving force in a prescribed direction through the driven magnet 6, since the cross-in-square-shape driving coils 7 are fixed in the prescribed positions on the fixing plate 8.

[Driving Coil in Cross-in-Square Shape]

Figure 5:
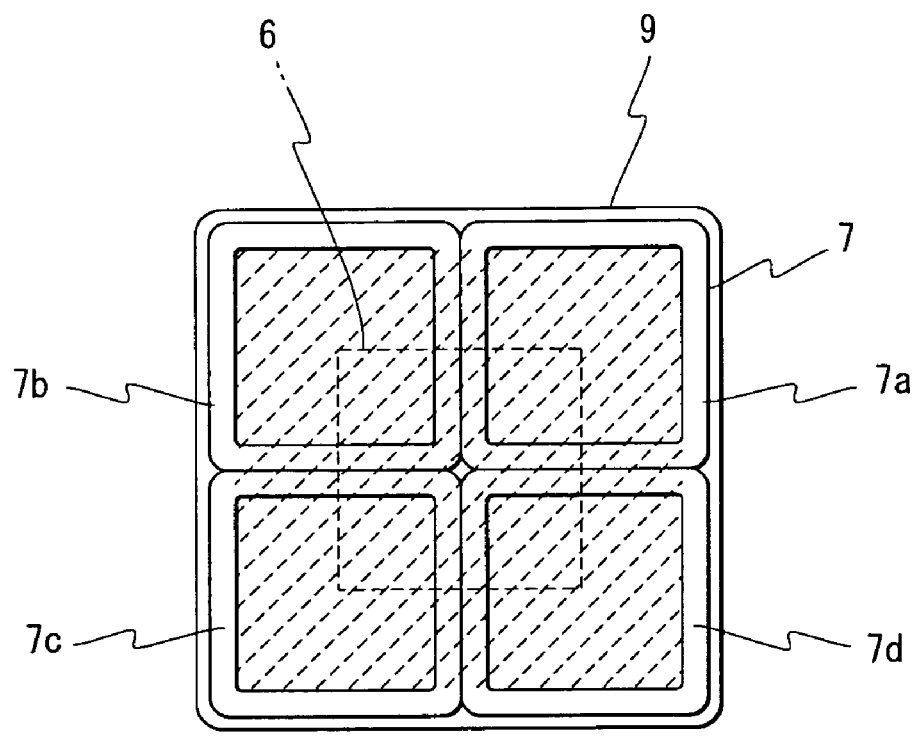
FIG. 5 is an explanatory illustration showing the positional relation of the cross-in-square shape driving coil, the driven magnets and the braking plate disclosed in FIG. 1.

The cross-in-square-shape driving coil 7 forming the main part of the electromagnetic driving means 4 is formed with, as shown in FIG. 5 for example, four small angular coils 7a, 7b, 7c, 7d, which can be individually energized. The coil parts on the inner side of the four small angular coils 7a, 7b, 7c, 7d, which abut with each other in cross-shape form the cross-shape coil sides described above.

Thereby, by controlling the switching of the energizing directions of each small angular coils 7a–7d by an operation control system from outside, which will be described later, the electric current flowing in the cross-shape part inside the cross-in-square-shape driving coil 7, for example, can be energized by specifying in either the longitudinal direction or lateral direction of the figure (including the positive direction or the reverse direction). Thereby, it is possible to output the electromagnetic force (reaction force) to the driven magnets 6 disposed in correspondence for pressing them to a prescribed direction according to Fleming's left-hand rule.

By combining the directions of the electromagnetic force generated in the four small angular coils 7a–7d, the cross-shape coil side parts positioned on the inner sides of the cross-in-square-shape driving coils 7 are energized in either the longitudinal direction or the lateral direction, etc. Thereby, the electromagnetic driving force is outputted to the corresponding driven magnets 6 in a prescribed direction. Thus, by the resultant force of the electromagnetic driving forces generated in the four driven magnets 6, the moving force is supplied to the auxiliary table 5 towards any directions including rotating action on the X-Y axes.

A series of energizing control methods for the four small angular coils 7a–7d will be described in detail in the description of a program storage 22 (FIG. 6, FIG. 8) which will be described later.

Further, the four small angular coils 7a–7d may be hollow coils or may be the ones having conductive magnetic materials such as ferrite being filled inside. In FIG. 5, the part on the inner side of the coil, which is filled with slash lines, shows a flux linkage region.

Numeral reference 9 is a braking plate mounted to the cross-in-square-shape driving coil 7 side by adjacently facing the driven magnet 6.

[Position Detecting Sensor Mechanism]

The moving state of the auxiliary table 5 (that is, the movable table 1) driven by the electromagnetic driving means 4 is detected by a position detecting sensor mechanism 25.

The position detecting sensor mechanism 25 shown in FIG. 6 has a configuration, comprising: a capacity sensor group 26 having a plurality of capacitance detection electrodes (eight electrodes in the embodiment); and a positional information arithmetic circuit 27 which converts a plurality of capacity change components detected by the capacity sensor group 26 into voltage and transmits the voltage to a table driving control means 21 (which will be described later) as a positional change information after carrying out a prescribed arithmetic operation.

The positional information arithmetic circuit 27 comprises: a signal conversion circuit 27A for individually converting a plurality of the capacity change components detected by the capacity sensor group 26 into the voltage; and a position signal arithmetic circuit 27B which converts the voltage signals of a plurality of the capacity change components converted by the signal conversion circuit 27 to a position signal VX in the X direction and a position signal VY in the Y direction for indicating the position on the X-Y coordinates by carrying out a prescribed arithmetic operation, and also outputs a rotation angle signal θ by carrying out the arithmetic operation.

As shown in FIG. 1 to FIG. 4, the group 26 of a plurality of capacity sensors comprises: eight angular capacity detection electrodes 26X1, 26X2, 26X3, 26X4, 26Y1, 26Y2, 26Y3, 26Y4 provided with a prescribed space in between on the top face of the main-body-side protrusions 3B by facing the bottom face part of the periphery of the auxiliary table 5; and a common electrode (not shown) with a relatively wide width being provided to the bottom face part of the periphery of the auxiliary table 5 by corresponding thereto.

Among each of the above-described capacity detection electrodes 26X1, 26X2, 26X3, 26X4, 26Y1, 26Y2, 26Y3, 26Y4, the capacity detection electrodes 26X1, 26X2 are mounted vertically in the right-end part of FIG. 2 and FIG. 3 with a prescribed space in between, while the capacity detection electrodes 26X3, 26X4 are mounted vertically in the left-end part of FIG. 2 and FIG. 3 with a prescribed space in between.

Among each of the above-described capacity detection electrodes 26X1, 26X2, 26X3, 26X4, 26Y1, 26Y2, 26Y3, 26Y4, the capacity detection electrodes 26Y1, 26Y2 are mounted laterally in the upper-end part of FIG. 2 and FIG. 3 with a prescribed space in between, while the capacity detection electrodes 26Y3, 26Y4 are mounted laterally in the lower-end part of FIG. 2 and FIG. 3 with a prescribed space in between.

For example, when the auxiliary table 5 (that is, the movable table 1) is moved in a direction of arrow F (in the upper-right direction in the figure) as shown in FIG. 7(A) by a feeding force from the electromagnetic driving means 4, in the embodiment, the capacity change components detected by the capacity detection electrodes 26X1, 26X2 (26Y1, 26Y2) on one side and the capacity detection electrodes 26X3, 26X4 (26Y3, 26Y4) on the other side positioned on both sides (and in vertical direction) of the auxiliary table 5 are transmitted to the position signal arithmetic circuit 27B after being converted to voltage by the signal conversion circuit 27A. Then, each of the converted voltage is inputted by the position signal arithmetic circuit 27B for differentially outputting it as the position signal VX in the X direction and the position signal VY in the Y direction.

When the auxiliary table 5 is rotated in an arrow direction as shown in FIG. 7(B) by a feeding force from the electromagnetic driving means 4, in the embodiment, each section operates and functions in the same manner as that of the above-described case for differentially outputting a prescribed rotation angle signal θ by converting the change components into the voltage.

Therefore, in the embodiment, noise added simultaneously to each capacity detection electrode on the left and right sides (and top and bottom) in FIG. 3 can be cancelled by the differential output (for example, obtaining the difference in the capacity change detected by the capacity detection electrodes disposed in one end and the other end in the X-axis direction: external noise eliminating function). At the same time, after converting the measured value to the voltage, the change amount is added to be outputted (that is, the reduced amount is subtracted as a minus component, e.g., A–(–A)=2A). Therefore, it is advantageous in respect that the positional information of the auxiliary table 5 (movable table 1) can be outputted in highly sensitive manner.

[Operation Control System]

Figure 6:
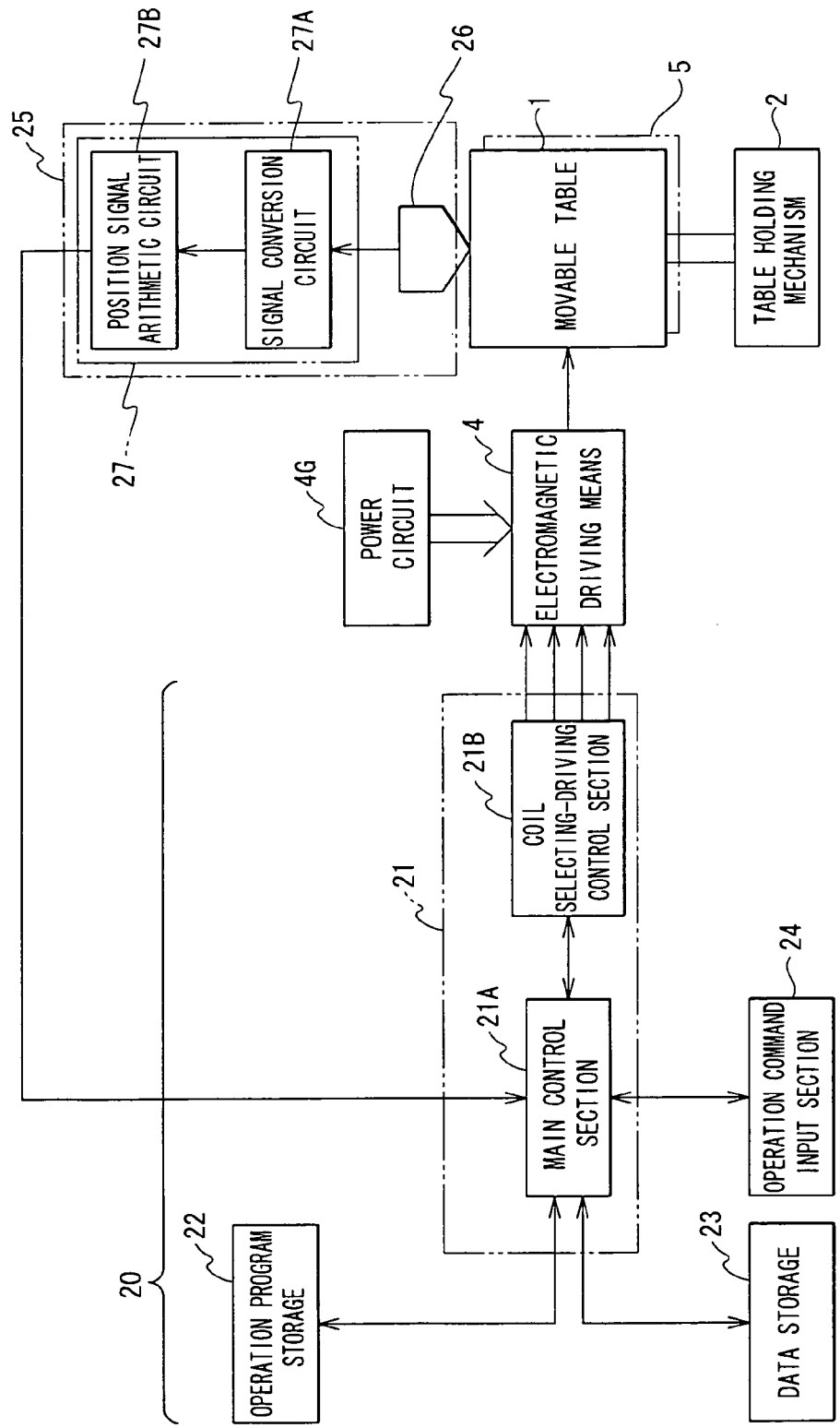
FIG. 6 is a block diagram showing the relation of each structural part shown in FIG. 1 and the operation control system.

In the embodiment, provided to the electromagnetic driving means 4 is an operation control system 20 which restricts the movement or the rotation of the movable table 1 by individually drive-controlling a plurality of the cross-in-square-shape driving coils 7 (see FIG. 6).

As shown in FIG. 6, the operation control system 20 comprises: a table driving control means 21 which individually drives each of a plurality of the cross-in-square-shape driving coils 7 of the electromagnetic driving means 4 according to a prescribed control mode for controlling the movement of the movable table 1 in a prescribed direction; a program storage 22 being provided along with the table driving control means 21, to which a plurality of control programs for a plurality of control modes are provided and in which the moving direction, rotation direction, the operation amount and the like of the movable table 1 are specified;

and a data storage 23 to which prescribed data and the like are stored to be used at the time of executing each control program.

In the table driving control means 21, provided is an operation command input section 24 for giving a command of a prescribed control operation to each of a plurality of the cross-in-square-shape driving coils 7. The positional information of the movable table 1 during the movement and after the movement is detected by the position detecting sensor mechanism 25 and arithmetic-processed in a highly sensitive manner to be transmitted to the table driving control means 21 as will be described later.

The table driving control means 21 according to the embodiment comprises a main control section 21A and a coil driving control section 21B. The main control section 21A operates according to the command from the operation command input section 24 and has a function of selecting a prescribed control mode from the program storage 22 and controlling to energize a prescribed electric current to each of a plurality of the cross-in-square-shape driving coils 7. The coil driving control section 21B has a function of controlling to drive prescribed four cross-in-square-shape driving coils 7, 7 - - - simultaneously and individually according to the control mode set by the main control section 21A.

The main control section 21A, in addition to the above-described function, also has a function of calculating the position of the movable table 1 according to the input information from the position detecting sensor mechanism 25 for detecting the table position or carrying out other various arithmetic operations.

Numeral reference 4G is a power circuit for supplying a prescribed current to each of a plurality of cross-in-square driving coils 7 of the electromagnetic driving means 4.

The table driving control means 21 comprises: a position shift calculating function which is for carrying out a prescribed arithmetic operation through inputting the information from the position detecting sensor mechanism 25 and, based on this, calculating the difference between with the reference position information of the target position set by the operation command input section 24 beforehand; and a table position correcting function which controls to transport the movable table 1 to the reference position of the target position which is set beforehand by driving the electromagnetic driving means 4 based on the calculated position shift information.

Thus, in the embodiment, when the moving direction of the movable table 1 is shifted by disturbance or the like, the movable table 1 is controlled to be transported in a prescribed direction by correcting the position shift. Thereby, the movable table 1 is transported to the target position set beforehand promptly and in highly precise manner.

[Program Storage]

The table driving control means 21 is configured to individually drive-control the four cross-in-square-shape driving coils 7 of the electromagnetic driving means 4 individually according to a prescribed control program (a prescribed control mode which is a combination of a prescribed energizing pattern and the selection), which is stored in the program storage 22 beforehand.

That is, in the embodiment, stored in the program storage 22 is the program for executing the basic four energizing patterns for each of the four cross-in-square-shape driving coils 7, 7 - - - (see FIG. 6, FIG. 8).

FIG. 8 shows, respectively, four types of energizing patterns A, B, C, D for the four small angular coils 7a, 7b, 7c, 7d of the cross-in-square-shape driving coil 7 (on a stator side), the direction of the electric current generated at this time in the cross-shape side part of each cross-in-square-shape driving coil, and the direction of the electromagnetic driving force (thrust) correspondingly generated in the driven magnet (permanent magnet) 6 on a needle side.

In FIG. 8, in the case of the energizing pattern A, a counterclockwise electric current is supplied to the small angular coils 7a, 7b on one side and a clockwise electric current is supplied to the small angular coils 7c, 7d on the other side, respectively. Thereby, in the cross-shape coil side part positioned in the center, the magnetic fluxes to be outputted outside are collectively added or offset. As a result, it becomes to be under the state similar to the case where only an electric current IA in the positive direction of the X axis is supplied.

In the energizing pattern B, as shown in the figure, each of the small angular coils 7a–7c is individually energized. Thereby, it becomes to be under the state similar to the case where only an electric current IB in the negative direction of the X axis is supplied. In the energizing pattern C, as shown in the figure, each of the small angular coils 7a–7c is individually energized. Thereby, it becomes to be under the state similar to the case where only an electric current IC in the positive direction of the Y axis is supplied. Similarly, in the energizing pattern D, as shown in the figure, each of the small angular coils 7a–7c is individually energized. Thereby, it becomes to be under the state similar to the case where only an electric current ID in the negative direction of the Y axis is supplied.

The four energizing patterns A, B, C, D are executed according to a prescribed control program stored beforehand in the program storage 22.

The white arrows shown in FIG. 8 respectively show the direction of the electromagnetic driving force (thrust) generated between with the driven magnet (permanent magnet) 6 on the needle side by corresponding to the energizing patterns A, B, C, D.

In this case, each corresponding electromagnetic force is generated in the energizing coil side part of the cross-in-square-shape driving coil 7 according to Fleming's left-hand rule. However, since the cross-in-square-shape driving coil 7 is fixed on the fixing plate 8, the reaction force is generated as the electromagnetic driving force (thrust) towards the driven magnet (permanent magnet) 6 side.

The white arrows shown in FIG. 8 show the reaction force (electromagnetic driving force). The direction of the reaction force (the electromagnetic driving force) is reversed according to the types of the magnetic poles, that is, north or south, of the driven magnet 6.

In the program storage 22, stored is each operation program for the first to fourth control modes for moving the movable table 1 in both the positive and negative directions of the X axis and both the positive and negative directions of the Y axis on the X-Y plane supposed with the origin being the center of the fixing plate 8, for the fifth to eighth control modes for moving the movable table 1 in a prescribed direction within each quadrant set on the X-Y plane, and for the ninth and tenth control modes for rotating the movable table 1 at a prescribed position in the clockwise direction or the counterclockwise direction.

FIG. 9 to FIG. 13 show, respectively, the function of each cross-in-square-shape driving coil 7 and the operation state of the auxiliary table (the movable table 1) at the time of executing the operation program for each of the first to tenth control modes.

FIGS. 9(A), (B) show the state of executing the first control mode. As shown in the figures, in the first control mode, the two cross-in-shape driving coils 7, 7 on the X axis are energized by the method of the current pattern D, respectively, while the two cross-in-shape driving coils 7, 7 on the Y axis are energized by the method of the current pattern C. In FIG. 9(A), numeral references N, S indicate the type of the magnetic poles of each driven magnet (permanent magnet) 6.

As a result, in the first control mode, the electromagnetic driving force is generated in each driven magnet (permanent magnet) 6 in the directions of arrows FX1, FX2, FX3, FX4. Thereby, the auxiliary table 5 is driven towards the positive direction (an arrow +FX) on the X axis.

FIG. 9(B) shows an example of the direction on the X-Y coordinates in the case where the same electromagnetic driving force is generated in each of the cross-in-square-shape driving coils 7, 7 - - - . According to this, it is important, especially, to generate the same magnitude of the driving force to each of the cross-in-square-shape driving coils 7, 7 on the Y axis when transporting the auxiliary table 5 in the positive direction on the X axis.

The case of the second control mode is for transporting the auxiliary table 5 in the negative direction (not shown) on the X axis, so that the current pattern to be supplied to each of the cross-in-square-shape driving coils 7, 7 - - - may be set completely inversely with respect to the case of the first control mode.

That is, in the second control mode, the two cross-in-square-shape driving coils 7, 7 on the X axis are energized by the method of the current pattern C, respectively, and the two cross-in-square-shape driving coils 7, 7 on the Y axis are energized by the method of the current pattern D, respectively. Thereby, the auxiliary table 5 is smoothly transported to the negative direction on the X axis (not shown).

FIGS. 10(A), (B) show the state where the third control mode is executed. As show in the figures, in the third control mode, the two cross-in-square-shape driving coils 7, 7 on the X axis are energized by the method of the current pattern A, respectively, and the two cross-in-square-shape driving coils 7, 7 on the Y axis are energized by the method of the current pattern B, respectively.

As a result, by the third control mode, the electromagnetic driving force is generated in each of the driven magnet (permanent magnet) 6 in the directions of arrows FY1, FY2, FY3, FY4. Thereby, the auxiliary table 5 is driven towards the positive direction (arrow+FY) on the Y axis.

FIG. 10(B) shows an example of the direction of the resultant force on the X-Y coordinates in the case where the same electromagnetic driving force is generated in each of the cross-in-square-shape driving coils 7, 7 - - - . According to this, it is important, especially, to generate the same magnitude of the driving force in each of the cross-in-square-shape driving coils 7, 7 on the X axis when transporting the auxiliary table 5 in the positive direction on the Y axis.

The case of the fourth control mode is for transporting the auxiliary table 5 in the negative direction (not shown) on the Y axis, so that the electric current pattern to be supplied to each of the cross-in-square-shape driving coils 7, 7 - - - may be set completely inversely with respect to the case of the third control mode.

That is, in the fourth control mode, the two cross-in-square-shape driving coils 7, 7 on the X axis are energized by the method of the current pattern B, respectively, and the two cross-in-square-shape driving coils 7, 7 on the Y axis are energized by the method of the current pattern A, respectively. Thereby, the auxiliary table 5 is smoothly transported in the negative direction on the Y axis (not shown).

FIGS. 11(A), (B) show the state where the fifth control mode is executed. As show in the figures, in the fifth control mode, the two cross-in-square-shape driving coils 7, 7 on the X axis are energized by the method of the current pattern D, respectively, and the two cross-in-square-shape driving coils 7, 7 on the Y axis are energized by the method of the current pattern B, respectively.

As a result, by the fifth control mode, the electromagnetic driving force is generated to the two driven magnets (permanent magnets) 6 on the X axis in the directions of arrows FX1, FX3, and the electromagnetic driving force is generated to the two driven magnets (permanent magnets) 6 on the Y axis in the directions of arrows FY2, FY4. Thereby, the auxiliary table 5 is driven towards the first quadrant direction (arrow FXY) from the center point on the X-Y axes.

FIG. 11(B) shows an example of the direction of the resultant force on the X-Y coordinates in the case where the same electromagnetic driving force is generated in each of the cross-in-square-shape driving coils 7, 7. According to this, when driving the auxiliary table 5 in the direction (arrow FXY) towards the first quadrant direction from the center point on the X-Y axes, it is possible to change the moving direction by appropriately setting the magnitude of the current value supplied to each of the cross-in-shape driving coils 7, 7 - - - . The magnitude of the electric current to be supplied is set and controlled by the main control section 21A.

The case of the sixth control mode is for transporting the auxiliary table 5 towards the third quadrant direction (not shown) from the center point on the X-Y axes, so that the current pattern to be supplied to each of the cross-in-square-shape driving coils 7, 7 - - - may be set completely inversely with respect to the case of the fifth control mode.

That is, in the sixth control mode, the two cross-in-square-shape driving coils 7, 7 on the X axis are energized by the method of the current pattern C, respectively, and the two cross-in-square-shape driving coils 7, 7 on the Y axis are energized by the method of the current pattern B, respectively. Thereby, the auxiliary table 5 is smoothly transported towards the third quadrant direction from the center point on the X-Y axes (not shown).

FIGS. 12(A), (B) show the state where the seventh control mode is executed. As show in the figures, in the seventh control mode, the two cross-in-square-shape driving coils 7, 7 on the X axis are energized by the method of the current pattern C, respectively, and the two cross-in-square-shape driving coils 7, 7 on the Y axis are energized by the method of the current pattern B, respectively.

As a result, in the seventh control mode, the electromagnetic driving force is generated to the two driven magnets (permanent magnets) 6 on the X axis in the directions of arrows −FX1, −FX3, and the electromagnetic driving force is generated to the two driven magnets (permanent magnets) 6 on the Y axis in the directions of arrows FY2, FY4. Thereby, the auxiliary table 5 is driven towards the second quadrant direction (arrow FYX) from the center point on the X-Y axes.

FIG. 12(B) shows an example of the direction of the resultant force on the X-Y coordinates in the case where the same electromagnetic driving force is generated in each of the cross-in-square-shape driving coils 7, 7 - - - . According to this, when driving the auxiliary table 5 in the direction (arrow FYX) towards the second quadrant direction from the center point on the X-Y axes, it is possible to change the moving direction by appropriately setting the magnitude of the current value supplied to each of the cross-in-shape driving coils 7, 7 - - - -. The magnitude of the electric current to be supplied is set and controlled by the main control section 21A.

The case of the eighth control mode is for transporting the auxiliary table 5 towards the fourth quadrant direction (not shown) from the center point on the X-Y axes, so that the current pattern to be supplied to each of the cross-in-square-shape driving coils 7, 7 - - - may be set completely inversely with respect to the case of the seventh control mode.

That is, in the eighth control mode, the two cross-in-square-shape driving coils 7, 7 on the X axis are energized by the method of the current pattern D, respectively, and the two cross-in-square-shape driving coils 7, 7 on the Y axis are energized by the method of the current pattern A, respectively. Thereby, the auxiliary table 5 is smoothly transported towards the fourth quadrant direction from the center point on the X-Y axes (not shown).

FIGS. 13(A), (B) show the state where the ninth control mode is executed. As show in the figures, the ninth control mode is for rotating the auxiliary table 5 (that is, the movable table 1) by a prescribed angle θ. This control operation allows the auxiliary table 5 with no center shaft to perform counterclockwise rotary motions within a prescribed allowable range and to stop at a prescribed position.

That is, in the ninth control mode as shown in FIG. 13, the cross-in-square-shape coil 7 on the positive axis of the X axis is energized by the method of the current pattern A, the cross-in-square-shape coil 7 on the negative axis of the X axis by the method of the current pattern B, the cross-in-square-shape coil 7 on the positive axis of the Y axis by the method of the current pattern D, and the cross-in-square-shape coil 7 on the negative axis of the Y axis by the method of the current pattern C, respectively.

Figure 11:
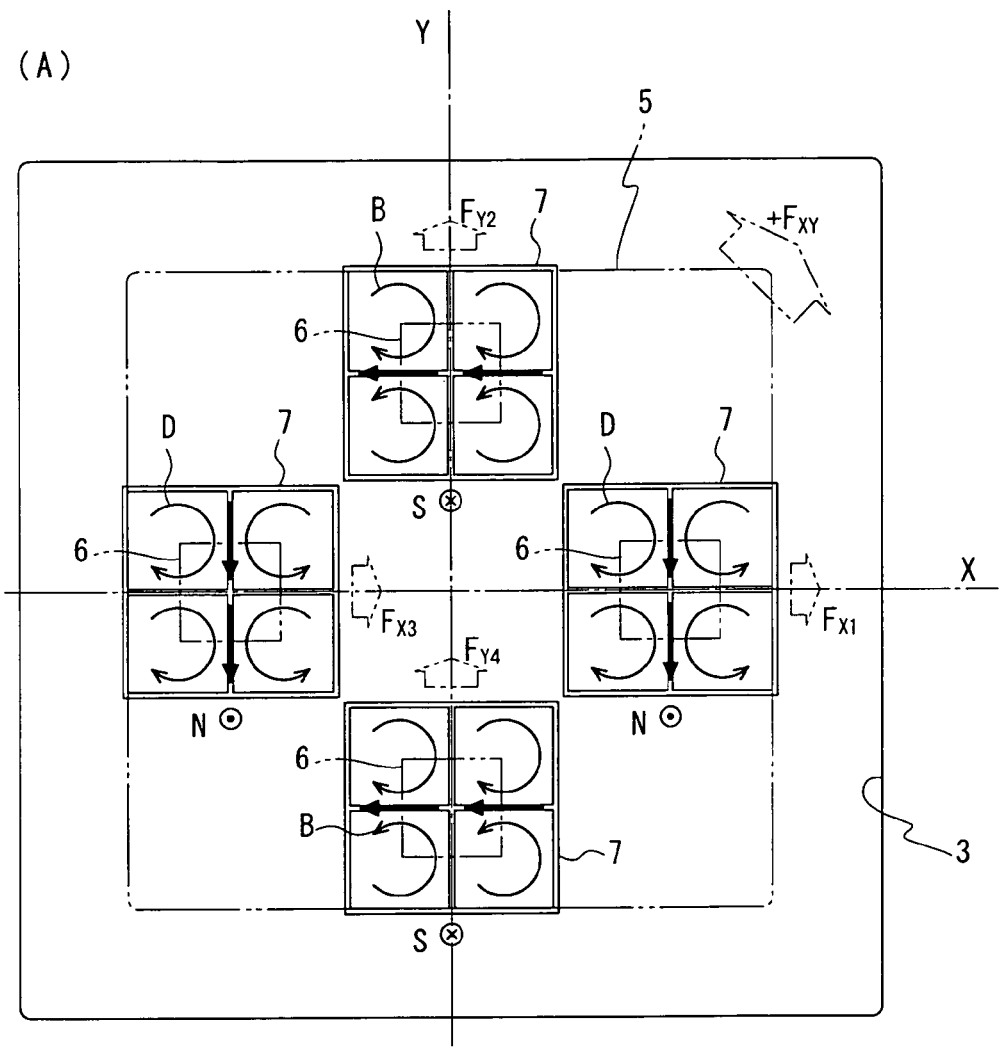

As a result, in the ninth control mode, the electromagnetic driving force is generated to each of the driven magnet (permanent magnet) 6 corresponding to each of the cross-in-square-shape driving coil 7, 7—towards the directions FY1, -FX2, -FY3, or FX4, which cross at right angles with each axis, respectively, along the counterclockwise direction as shown in FIG. 11.

Therefore, as shown in FIG. 13(A), by setting the magnitude of each electromagnetic driving force generated in each driven magnet (permanent magnet) 6 to be in the same magnitude P, the auxiliary table 5 without the center shaft can perform counterclockwise rotary motion within the allowable range and stop at a prescribed position.

In this case, the stop position after the rotary motion is a balanced point (position after being rotated by a prescribed angle θ) between the entire electromagnetic driving force and the original position returning force by a spring action of the table holding mechanism 2. The position is experimentally specified beforehand as the relation between the set rotation angle and the electromagnetic driving force, and is put into a diagram (a map) to be retrievable and stored in the data storage 23.

FIG. 13(B) shows an example of the direction on the X-Y coordinates in the case where the same electromagnetic driving force is generated in each of the cross-in-square-shape driving coils 7, 7 - - - -. According to this, the auxiliary table 5 (that is, the movable table 1) is rotated counterclockwise by a prescribed angle θ with a center point 0 on the X-Y axes being the rotation center and stopped.

In this case, the degree of the rotation angle θ for setting the stop position after the rotation can be determined by appropriately setting the magnitude of the same current value which is supplied to each of the cross-in-square-shape driving coils 7, 7. The magnitude of the current to be supplied is set by the main control section 21A.

The case of the tenth control mode is for rotating the auxiliary table 5 (that is, the movable table 1) clockwise. Thus, in the tenth control mode, the directions of the same current supplied to each of the cross-in-square-shape driving coils 7, 7 - - - - may be set inversely.

That is, the cross-in-square-shape driving coil 7 on the positive axis of the X axis is energized by the method of the current pattern B, the cross-in-square-shape driving coil 7 on the negative axis of the X axis by the method of the current pattern A, the cross-in-square-shape driving coil 7 on the positive axis of the Y axis by the method of the current pattern C, and the cross-in-square-shape driving coil 7 on the negative axis of the Y axis by the method of the current pattern D, respectively.

Thereby, the auxiliary table 5 is smoothly rotated clockwise by a prescribed angle θ (not shown).

The operation programs for each energizing pattern and each control operation are stored in the operation program storage 22 to be outputted, which is provided along the table driving control means 21. The table driving control means 21 selects one of each operation program according to a command from the operation command input section 24 and drive-controls the electromagnetic driving means 4 based thereupon.

[Electromagnetic Braking Mechanism]

The electromagnetic braking mechanism comprises braking magnets and a non-magnetic/conductive braking plate 9, which face each other and move relatively by synchronizing with the movement of the movable table 1. Either the braking magnet or the braking plate 9 is fixed to a prescribed position, while the other is provided movable by synchronizing with the movement of the movable table 1, thereby enabling to generate the braking force based on the magnetic effect between the magnetic force by eddy current which is generated in the braking plate 9 due to the movement of the movable table 1 and the magnetic force of the braking magnet.

As the braking magnets of the electromagnetic braking mechanism according to the embodiment, the driven magnets 6 are used. In the end face part of the each of the four cross-in-square-shape driving coils 7 facing the driven magnets 6, as shown in FIG. 14, the metal braking plates 9 made of a non-magnetic member are fixed adjacent from each other to be mounted thereto by facing the pole faces of the driven magnets 6, respectively, in the state being isolated from the peripherals.

The electromagnetic braking mechanism comprises a function of slowly moving the auxiliary table 5 (the movable table 1) by suppressing a sudden moving action of the auxiliary tale 5 (the movable table 1).

FIG. 14(A) is a fragmentary sectional view of FIG. 1 showing the braking plate 9. Also, FIG. 14(B) is a plan view taken along the arrow line of A—A in FIG. 14(A).

When the auxiliary table 5 to which the four driven magnets 6 are mounted or the movable table 1 rapidly makes a moving action, electromagnetic braking (eddy-current brake) works between each driven magnet 6 and each corresponding braking plate 9. Thereby, the auxiliary table 5 (that is, the movable table 1) is gradually moved by suppressing the sudden moving action.

Generation of the electromagnetic braking (eddy-current brake) is shown in FIGS. 15(A), (B).

In the figures, the braking plate 9 is fixed to the end part of the cross-in-square-shape driving coil 7 by facing the north pole of the driven magnet 6.

When the auxiliary table 5 rapidly moves at a speed v1 in the right direction of the figure, relatively, the metallic braking plate 9 (since it is fixed) rapidly moves at the same speed v2 (=v1) in the left direction of the figure. Thereby, the electromotive force EV in the magnitude in proportion to that of the speed v2 is generated inside the braking plate 9 in the direction (upward direction in the figure) shown in FIG. 15(B) according to Fleming's right-hand rule. Thereby, eddy current which is in bilateral symmetry flows in the directions of the same arrows.

Next, since there is magnetic flux from the north pole in the region where the electromotive force EV is generated, a prescribed moving force f1 is generated inside the braking plate 9 (towards the right direction in the figure) between the magnetic flux of the driven magnet 6 and the eddy current (in the direction of the electromotive force EV) inside the braking plate 9 according to Fleming's left-hand rule.

In the meantime, since the braking plate 9 is fixed on the fixing plate 8, the reaction force f2 of the moving force f1 is generated on the driven magnet 6 as the braking force, thereby reversing the direction from that of the moving force f1. Specifically, the braking force f2 is in the reverse direction from that of the initial rapid-movement of the driven magnet 6 (that is, the auxiliary table 5) and, in addition, the magnitude is proportional to the moving speed of the auxiliary table 5. Therefore, the rapid movement of the auxiliary table is suppressed by an appropriate magnitude of braking force f2 to be smoothly moved under the stable state.

A prescribed braking force f2 is also generated in the areas of other braking plates 9 in completely the same manner.

Thus, in the auxiliary table 5 comprising the driven magnets 6, a reciprocal movement is likely to be caused at a stop position at the time of, for example, making a sudden stop. However, it is appropriately suppressed for achieving a smooth and slow movement. Therefore, as a whole, each braking plate 9 effectively functions for enabling to move the auxiliary table 5 (the movable table 1) under the stable state. Further, in the case where the auxiliary table 5 is reciprocally and slightly oscillated by oscillation applied from the outside, it also functions in the same manner for effectively suppressing the reciprocal and slight oscillation.

Each of the metallic braking plate 9 made of a non-magnetic member, which is mounted to the end face part of each cross-in-square-shape driving coil 7, as shown in FIG. 16, constitutes a transformer secondary circuit in the relation between with each cross-in-square-shape driving coil 7, while being in a form which is short-circuit through a prescribed low resistance r (generates eddy current loss).

In FIG. 16, K1 is a primary-side winding representing the cross-in-square-shape driving coil 7 and K2 is a secondary-side winding corresponding to the braking plate 9. FIG. 16(A) shows the state where the secondary-side winding part is short-circuit through the electric resistance component (low resistance r: generates eddy current loss) inside the braking plate 9. In this case, inside the braking plate 9, the similar current (that is, the eddy current in proportion to the magnitude of the magnetic flux of the driving coil 7) as the short-circuit state of the secondary-side winding is flown. The areas to which other braking plates 9 are placed are to be in completely the same state as well. Moreover, FIG. 16(B) shows the state without the braking plate 9 (the state where the secondary-side winding part is open).

Therefore, each cross-in-square-shape driving coil 7 constituting the primary-side circuit in this case can effectively reduce, through the secondary-side short-circuit, the affect of a large resistance generated by the inductance component of the coil at the time of start-up (transient). In this respect, a relatively large current can be supplied from the starting time so that the electromagnetic driving force can be quickly outputted between with the driven magnet compared to the case where there is no braking plate 9.

Each braking plate 9 comprises a function of releasing the heat generated at the time of driving each cross-in-square-shape driving coil 7. In this respect, it is possible to set the supplied current in substantially the constant level for a long time through effectively suppressing an increase in the resistance and a decrease in the supplied current value (that is, a decrease in the electromagnetic driving force) at a high temperature caused by a continuous operation of the driving coil. Thus, the current control from outside for the electromagnetic driving force outputted from the electromagnetic driving means can be continued under the stable state and the secular change (dielectric breakdown by the heat) can be effectively suppressed. Thereby, the durability of the entire apparatus and, moreover, the reliability of the entire apparatus can be improved.

In the embodiment, the braking plate 9 is described by referring to the case where the braking plates are respectively mounted to each cross-in-square-shape driving coil 7. However, the braking plate 9 may be formed as a single braking plate which commonly works for two or more of the cross-in-square-shape driving coils 7 and a plurality of the cross-in-square-shape driving coils 7 may be placed by facing the single braking plate.

[Overall Action of the Embodiment]

Next, the overall action of the first embodiment will be described.

In FIG. 6, first, when an operation command for moving the movable table 1 to a prescribed position is inputted from the operation command input section 24, the main control section 21A of the table driving control means 21 is immediately started and the reference positional information of the target position is selected from the data storage 23 according to the operation command. At the same time, the control program for a corresponding prescribed control mode is selected from the program storage 22. Subsequently, the coil selection driving control section 21B is started for drive-controlling the four cross-in-square-shape driving coils 7 of the electromagnetic driving means 4 according to a prescribed control mode.

Figure 18:
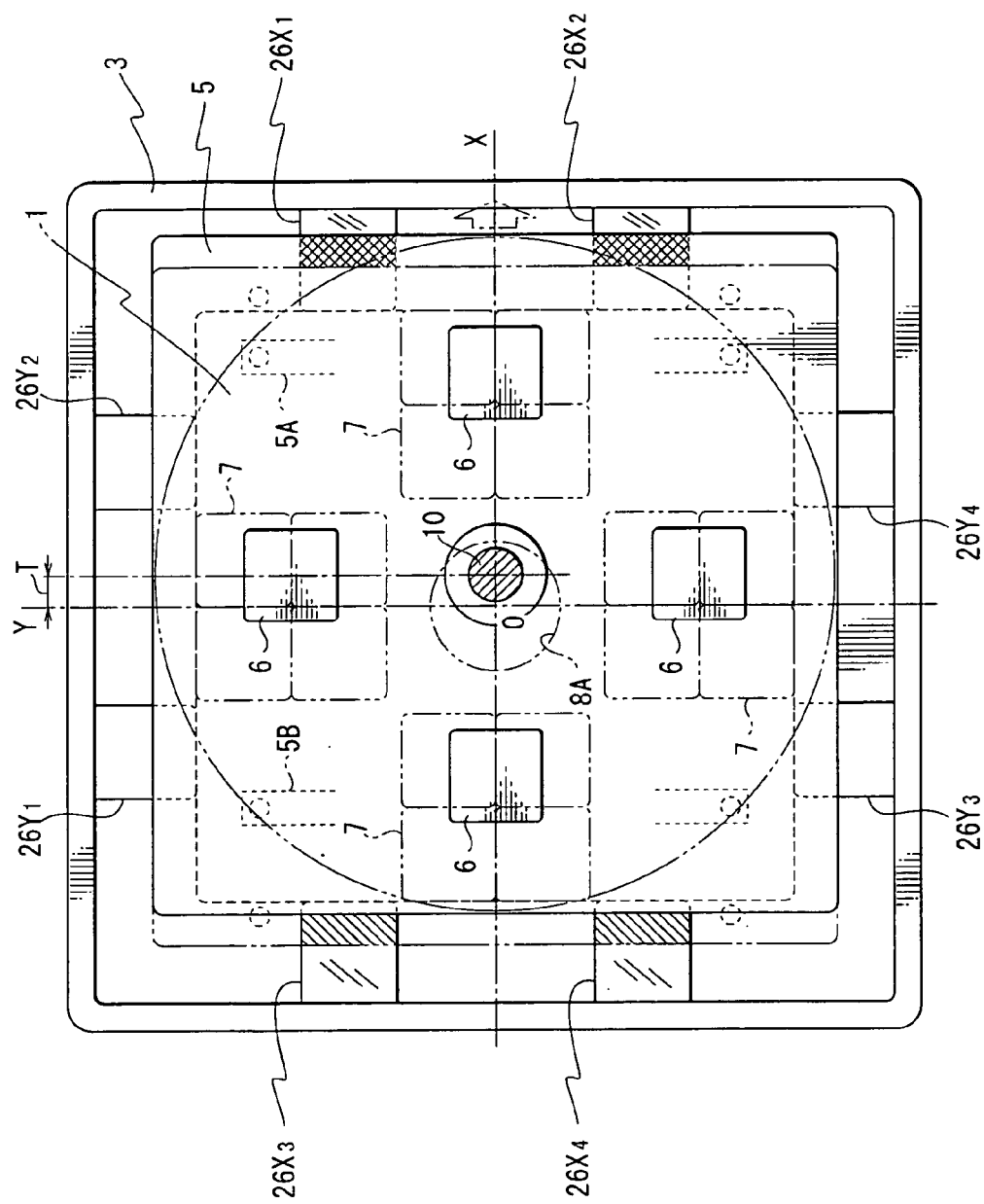
FIG. 18 is an explanatory illustration showing an example when the operation example of FIG. 17 is viewed two-dimensionally.

FIG. 17 and FIG. 18 show the state where the entire apparatus is operated according to the command to move the movable table 1 to a prescribed position in the positive direction of the X-axis, which is inputted from the operation command input section 24.

In this example, the first control mode shown in FIG. 9 is selected as the control mode and, accordingly, the energizing patterns are selected in the state shown in FIG. 9, respectively, to each of the four cross-in-square-shape driving coils 7 to be in operation.

In this case, in the stage holding mechanism 2, when a feed is supplied to the auxiliary table 5 by the electromagnetic driving means 4 in the right direction of the figure, the auxiliary table 5 is moved against the elastic force (original position returning force) of each of the piano wires 2A, 2B. Then, the auxiliary table 5 (that is, the movable table 1) makes a stop at a balanced point (target moved position) between the elastic returning force of each of the piano wires 2A, 2B and the electromagnetic driving force of the electromagnetic driving means 4, which is supplied to the auxiliary table 5.

In FIG. 17 and FIG. 18, numeral reference T shows the moved distance.

In FIG. 18, the portion with slashed lines shows the capacity detection electrodes 26X3, 26X4 on one side where the capacity component is reduced due to the movement of the auxiliary table 5, while the portion with cross-over slashed lines shows the capacity detection electrodes 26X1, 26X2 on the other side where the capacity component is increased due to the movement of the auxiliary table 5. In FIG. 18, shown is a case where there is no position shift in the Y direction.

During the operation, when the moved position of the auxiliary table 5 is shifted from the target position due to disturbance or the like, the actual position after being moved is detected based on the information on increase/decrease of the capacity component of the capacity detection electrodes 26X1, 26X2, 26X3, 26X4, and the feedback control for preventing the position shift is to be carried out.

In the meantime, when the electromagnetic driving force applied to the auxiliary table 5 is released from such a state, the auxiliary table 5 returns to the original position by the elastic returning force of the piano wires 2A, 2B.

In a series of the operation, in general, the moving action of the auxiliary table 5 is carried out rapidly in both cases of the supply control or release control of the electromagnetic driving force. Therefore, in the auxiliary table 5 (or the movable table 1), when being stopped at the moved position and at the stopping position when returned to the original position, repeating action (reciprocal action) is caused by the inertia and spring force.

However, in the embodiment, the repeating action (reciprocal action) is suppressed by the electromagnetic braking current brake generated between the braking plate and the driven magnet for achieving a smooth movement towards a prescribed position and achieving a stop-control under the stable state.

In the case where an operation command for moving the movable table 1 to another prescribed position is inputted from the operation command input section 24, the main control section 21A of the table driving control means 21 is immediately started as well, and the reference positional information of the target position is selected from the data storage 23 according to the operation command. At the same time, the control program for a corresponding prescribed control mode is selected from the program storage 22. Subsequently, the coil selection driving control section 21B is started for drive-controlling the four cross-in-square-shape driving coils 7 of the electromagnetic driving means 4 according to a prescribed control mode.

Also in this case, the same control operation and the braking operation by the braking plate are executed so that the auxiliary table 5 (movable table 1) is smoothly moved towards a prescribed position and stopped under the stable state.

As described, in the first embodiment, without using a holding mechanism for moving in X-Y axes in a heavy double structure which is essential in the case of the related art, the auxiliary table 5 can be smoothly moved in any directions on the X-Y plane from the center position (within a prescribed range) while maintaining the same height position, or can be rotated on the same plane.

Therefore, with the first embodiment, it is possible to reduce the size and weight of the entire apparatus due to the simple structure. In this respect, not only enabling to remarkably improve the portability, but the number of the parts can be reduced compared to the case of the related art. Moreover, due to the reduced number of parts, the durability can be remarkably improved and a skill is not required for adjustment at the time of assembling, thereby improving the productivity.

Even if action of the auxiliary table 5 (movable table 1) to which driven magnets 6 are mounted rapidly changes, the electromagnetic braking (eddy current brake) force in the magnitude in proportion to the rapid change works between the driven magnet 6 and the braking plate 9 made of non-magnetic metal material, thereby suppressing the rapid action of the movable table 1 to be smoothly moved in a prescribed direction under the stable state.

As for the braking plates 9, they are simply mounted to the cross-in-square-shape driving coil 7 by respectively facing each driven magnet 6. The electromagnetic driving means 4 for generating the electromagnetic driving force also has a simple structure comprising the driving magnets 6 mounted to the auxiliary table 5, and the cross-in-square-shape driving coils 7 mounted to the fixing table 8 facing the driven magnets. Thus, it enables to reduce the size and weight of the entire apparatus, thereby achieving the excellent portability. Moreover, the workability becomes also excellent since there is no special skill required at the time of assembling.

Further, the metallic braking plate 9 made of non-magnetic member mounted to the end face part of the driving coil 7 on the driven magnet 6 side, constitutes a circuit similar to a transformer secondary circuit in the relation between with the driving coil 7, while being in a form which is short-circuit through an electric resistance component (generates eddy current loss) of the braking plate 9.

Therefore, in the cross-in-square-shape driving coil 7 constituting the primary circuit, a relatively large current can be flown compared to the case where the secondary circuit is in the open state. Thereby, it enables to output a relatively large electromagnetic force between with the driven magnet compared to the case without the braking plate 9.

Moreover, the braking plate 9 also functions as a radiation plate so that the secular change (dielectric breakdown by the heat) due to the continuous operation of the cross-in-square-shape driving coil 7 can be effectively suppressed. Thereby, the durability of the entire apparatus, and the reliability of the entire apparatus can be improved as a result.

The first embodiment has been described by referring to the case where the driven magnets 6 are mounted on the auxiliary tale 5. However, the driven magnets 6 may be mounted to the movable table 1 side and each cross-in-square-shape driving coil 7 may be provided to prescribed positions on the fixing table 8 correspondingly. In this case, each cross-in-square-shape driving coil 7 may be mounted by piercing through fixing table 8 and the driven magnets 6 may be mounted on both the movable table 1 side and the auxiliary table 5 side by facing each cross-in-square-shape driving coil 7.

Moreover, the first embodiment has been described by referring to the case where the cross-in-square-shape driving coils 7 are mounted as the driving coils. However, in the present invention, the driving coils are not necessarily limited to the cross-in-square-shape driving coils but driving coils in any other form may be used as long as they can perform the similar functions.

Second Embodiment

Figure 19:
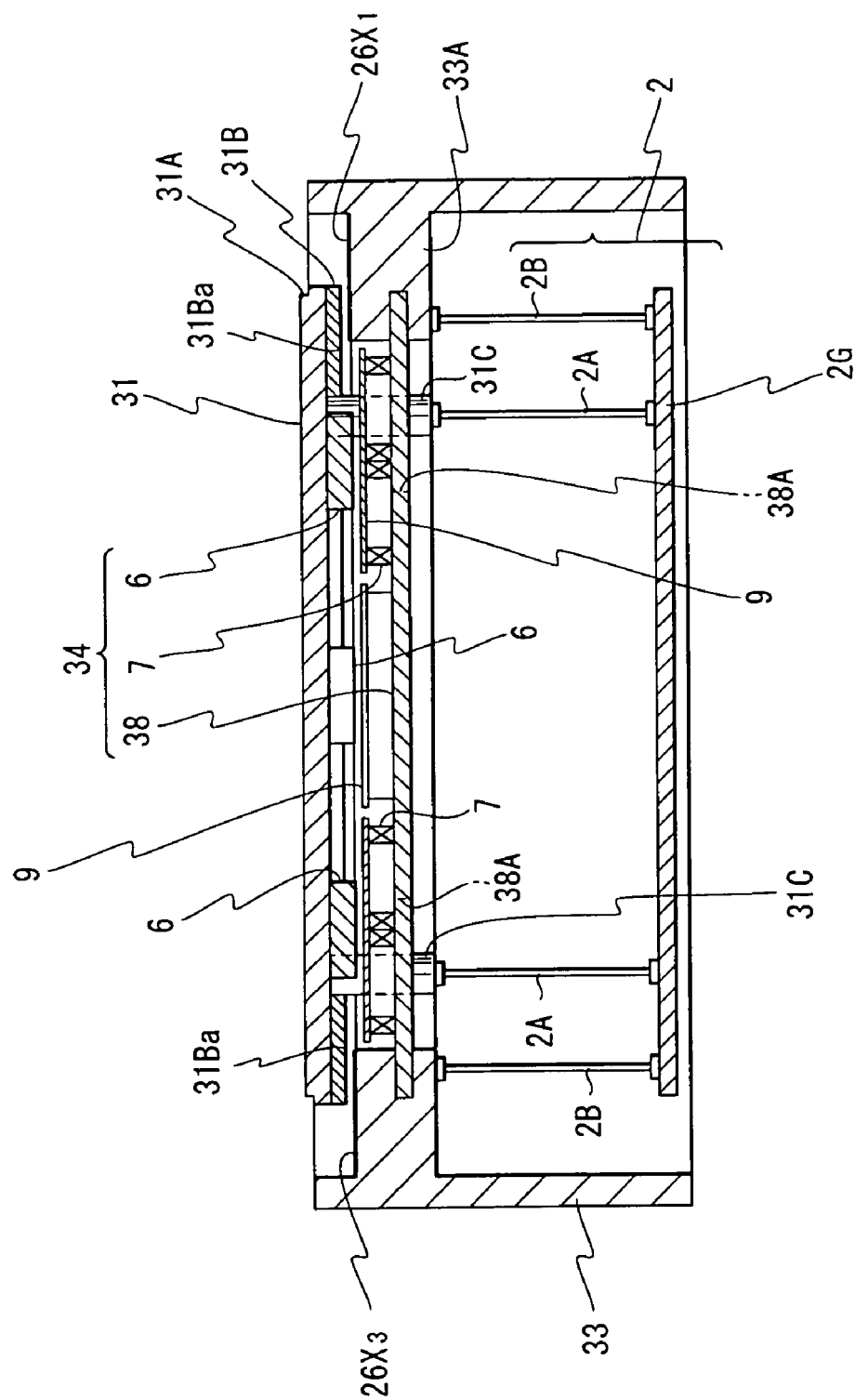
FIG. 19 is a fragmentary schematic cross section of a second embodiment of the present invention, in which a part is being omitted.
Figure 20:
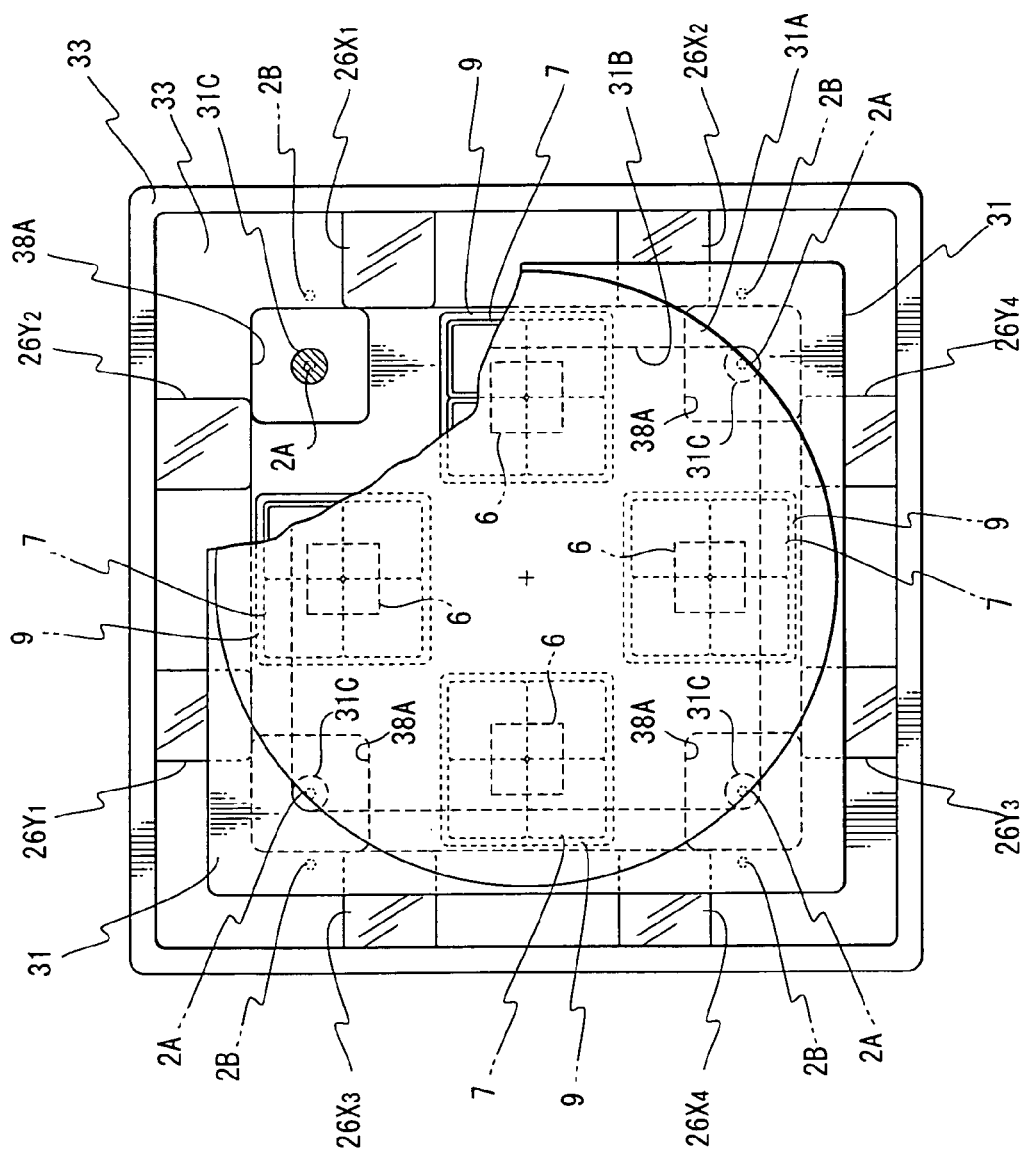
FIG. 20 is a fragmentary plan view of FIG. 19.

FIG. 19 and FIG. 20 show a second embodiment. The second embodiment shown in FIG. 19 and FIG. 20 is distinctive in respect that: a auxiliary table 5 which is mounted in the first embodiment is omitted; a movable table 31 is directly held by a table holding mechanism 2; and the movable table 31 is directly driven by the electromagnetic driving means 4.

In FIG. 19 and FIG. 21, numeral reference 31 is a square-shape movable table. The movable table 31 comprises a flat circular working plane 31A on its top face.

Numeral reference 2 is the same table holding mechanism as that of the table holding mechanism according to the first embodiment. The table holding mechanism 2 is disposed in the lower part of FIG. 19 in the same manner as that of the first embodiment. The table holding mechanism 2 is configured to allow the movable table 31 to move in an arbitrary direction on a same plane, while holding the movable table 31 in the state where original position returning force can be applied to the movable table 31.

That is, in the second embodiment, the movable table 31 is installed in a case main body 33 through the table holding mechanism 2 provided inside the case main body 33 as the main body part.

Further, a capacitive position detecting sensor for constantly detecting the moving position of the movable table 31 is mounted between the movable table 31 and a driving means holding section (protrusion on the main body side) 33A of the case main body 33, which will be described later, in the same manner as that of the first embodiment.

Specifically, in the periphery of the edge of the lower face (bottom face) of the movable table 31 shown in FIG. 19, a square-shape spacer 31B having a flat face with a prescribed width is mounted and, on the bottom face part, a common electrode 31Ba of the capacitive position detecting sensor is provided. Further, the same capacity detection electrode 26X1, 26X2, 26X3, 26X4, 26Y1, 26Y2, 26Y3, 26Y4 as those of the first embodiment are provided in the same manner as that of the first embodiment to be mounted onto the top face of the driving means holding section (the protrusion on the main body side) 33A which will be described later.

In the table holding mechanism 2, in the same manner as that of the first embodiment, four pairs of two piano wires 2A, 2B (may be any other member as long as it is a rod-type elastic wire material with a sufficient and appropriate rigidity for supporting the movable table 1), which are placed with a prescribed space in between, are prepared beforehand by corresponding to the peripheral edge portion of the movable table 31. The four pairs of piano wires 2A, 2B are respectively provided facing upward direction in each of the four-corner parts of an intermediate member 2G in a quadrangular shape.

It has a configuration in which the movable table 31 is held from the bottom side through the four piano wires 2A on the table side placed on the inner side and the intermediate member 2G is suspended to be swingable from the case main body 33 through the four piano wires 2B on the main body side placed on the outer side.

Thereby, as in the case of the first embodiment, the movable table 31 can be moved in any directions on the same plane without changing the height position and, at the same time, it can be rotated within an allowable range.

As shown in FIG. 19, the case main body (main body part) 33 according to the embodiment is formed in a box shape with the top and bottom being opened.

Numeral reference 34 is an electromagnetic driving means. The electromagnetic driving means 34 is formed to be the same as the electromagnetic driving means 4 of the first embodiment. It is disposed on the lower side of the movable table 31 as shown in FIG. 19 and held by the case main body 33 side, and has a function of supplying the moving force to the movable table 31.

The numeral reference 33A is a driving means holding section as the protrusion on the main body side formed in the inner wall periphery of the case main body 33. The electromagnetic driving means 34 is held by the case main body 33 through the driving means holding section 33A.

The top face of the driving means holding section 33A as shown in FIG. 19 is formed as a flat surface. On this flat surface, the capacity detection electrodes 26X1, 26X2, 26X3, 26X4, 26Y1, 26Y2, 26Y3, 26Y4 for externally outputting the poison information of the movable table 31 are mounted as in the same manner as that of the first embodiment thereby to function in the same manner.

The electromagnetic driving means 34, as in the case of the first embodiment, comprises: four driven magnets 6 fixed to be mounted at prescribed positions on the bottom face part of the movable table 31 as shown in FIG. 19; cross-in-square-shape driving coils 7 with a cross-shape coil side being disposed by facing each driven magnet 6 for supplying a prescribed driving force to each driven magnet 6 electromagnetically along the moving direction of the movable table 31; and a fixing plate 38 for holding the cross-in-square-shape driving coils 7 at prescribed positions.

The fixing plate 38 is set in parallel to the movable table 31 with a prescribed space in between and provided in the lower side of the movable table 31 as shown in FIG. 19. The periphery is supported by the driving means holding section 33A of the case main body 33.

Further, on the end face side of the cross-in-square-shape driving coil 7 on the driven magnet 6 side, as in the case of the first embodiment, braking plates 9 made of non-magnetic metal member are individually provided in adjacent to the pole face of the driven magnet 6.

The braking plate 9 according to the embodiment is fixed to the end face part of the cross-in-square-shape driving coil 7 and, through the cross-in-square-shape driving coil 7, it is fixed to the fixing plate 38 side.

As for the braking plate 9, it may be configured to be fixed to the fixing plate 38 through other spacer member (not shown), while maintaining the state of being in contact with the end face part of the cross-in-square-shape driving coil 7. It is the same as the first embodiment in this respect.

The movable table 31 is held by four table-side piano wires 2A positioned on the inner side. Numeral reference 31C shows four table-side leg parts protruded downwards from the bottom face of the movable table 31 as shown in FIG. 19 for being engaged with the four table-side piano wires 2A. Through the four table-side leg parts 31C, the movable table 31 is connected and held to the four table-side piano wires 2A.

The length of the four table-side leg parts 31C is set to be the length in such a manner that the effective length L of the four table-side piano wires 2A positioned on the inner side and that of the four piano wires 2B positioned on the outer side can become the same.

On the four-corner parts of the fixing plate 38, through-holes 38A in a prescribed size are formed, respectively. The through-holes 38A according to the embodiment is formed in quadrangular shape, however, the shape may be in other shapes such as circular shape or the like as long as it is in a size for allowing the action of the movable table 31.

Each of the four table-side leg parts 31C is individually inserted through the through-holes 38A. Thereby, the movable table 31 positioned on the upper part of FIG. 19 is held by the four table-side piano wires 2A of the table holding mechanism 2 positioned on the lower part of the same figure.

Other configurations and the functions are the same as the case of the first embodiment.

The second embodiment described above has substantially the same effect as that of the first embodiment. In addition, it is formed in such a manner that, especially, the auxiliary table 5 mounted in the first embodiment is omitted through directly holding the movable table 31 by the table holding mechanism 2 and, at the same time, the movable table 31 is directly driven by a table driving control means 21. Thus, the configuration is more simplified so that it enables to reduce the size and the weight. Thus, the weight of the movable table 1 side is reduced so that, not only improving the durability of the table holding mechanism 2 but also the portability of the entire apparatus can be improved. Moreover, the working process for connecting and installing the auxiliary table 5 in the movable table 31 becomes unnecessary, so that the productivity and the maintenance characteristic can be remarkably improved. Thereby, the cost of the entire apparatus can be reduced.

Third Embodiment

FIG. 21 shows the third embodiment. The third embodiment is distinctive in respect that a single plate member is commonly used as the braking plates 9 which, in the first embodiment, is individually mounted to the end part of a plurality of cross-in-square-shape driving coils 7 by facing each driven magnet.

FIG. 21 shows the case where a single braking plate 39 made of the same material is mounted instead of the four braking plates 9 which are mounted in the first embodiment.

In this case, formed in the center of the braking plate 39 is a through-hole 39 in a size which allows insertion of the connecting brace 10 shown in FIG. 1 and also allows the connecting brace 10 to move within the plane of orthogonal axes X-Y of FIG. 21 along with the auxiliary table 5 (and the movable table 1).

As for the braking plate 39, FIG. 21(A) shows the case where it is mounted to a fixing plate 8 through each cross-in-square-shape driving coil 7 while being in contact with each end part of a plurality of cross-in-square-shape driving coils 7. In the meantime, the braking plate 39 may be fixed to the fixing plate 8 through other spacer member (not shown) while maintaining the state to be in contact with the end face part of each cross-in-square-shape driving coil 7.

Other configurations are the same as those of the first embodiment.

The third embodiment as described above can achieve the same effect as that of the first embodiment. In addition, assembling work of the braking plate 39 is remarkably simplified compared to the case of the first embodiment, and the entire surface area of the braking plate 39 becomes large. Thus, it effectively functions as a radiation plate as well. Further, the configuration is simplified so that the productivity and the durability of the apparatus can be improved.

Although the third embodiment has been described by referring to the case where a single plate member made of the same material is mounted instead of a plurality of the braking plates 9 of the first embodiment, it is not limited to this. As in the second embodiment, a single plate member made of the same material may be mounted instead of a plurality of braking plates 9 as a single braking plate 39 in the configuration where the auxiliary table 5 is omitted.

The first to third embodiments have been described by referring to the case where permanent magnets are mounted as the driven magnets 6. However, electromagnets may be mounted instead of the permanent magnets. In this case, the table driving control means 21 controls driving of the electromagnets and carries out a prescribed energizing control (not shown) by selecting the normal direction, the reverse direction or a non-energized state in association with the action of each cross-in-square-shape driving coil 7.

Thus, in the case where the electromagnets are mounted as the driven magnets 6, it has substantially the same function as that of the first embodiment. In addition, various changes can be applied in the drive-control of the movable table.

For example, for acceleration/deceleration of the speed at the time of moving can be dealt with drive-control performed on both the driving coil and the electromagnet. Thus, it is possible to promptly correspond to the changes such as the moving direction and the like of the movable table. Further, it is possible to set the density of the magnetic flux of the driven magnet (magnet magnitude) at will as necessary. Therefore, it is advantageous in respect that the magnitude of the driven magnet can be changed according to the state when in use.

Fourth Embodiment

Figure 22:
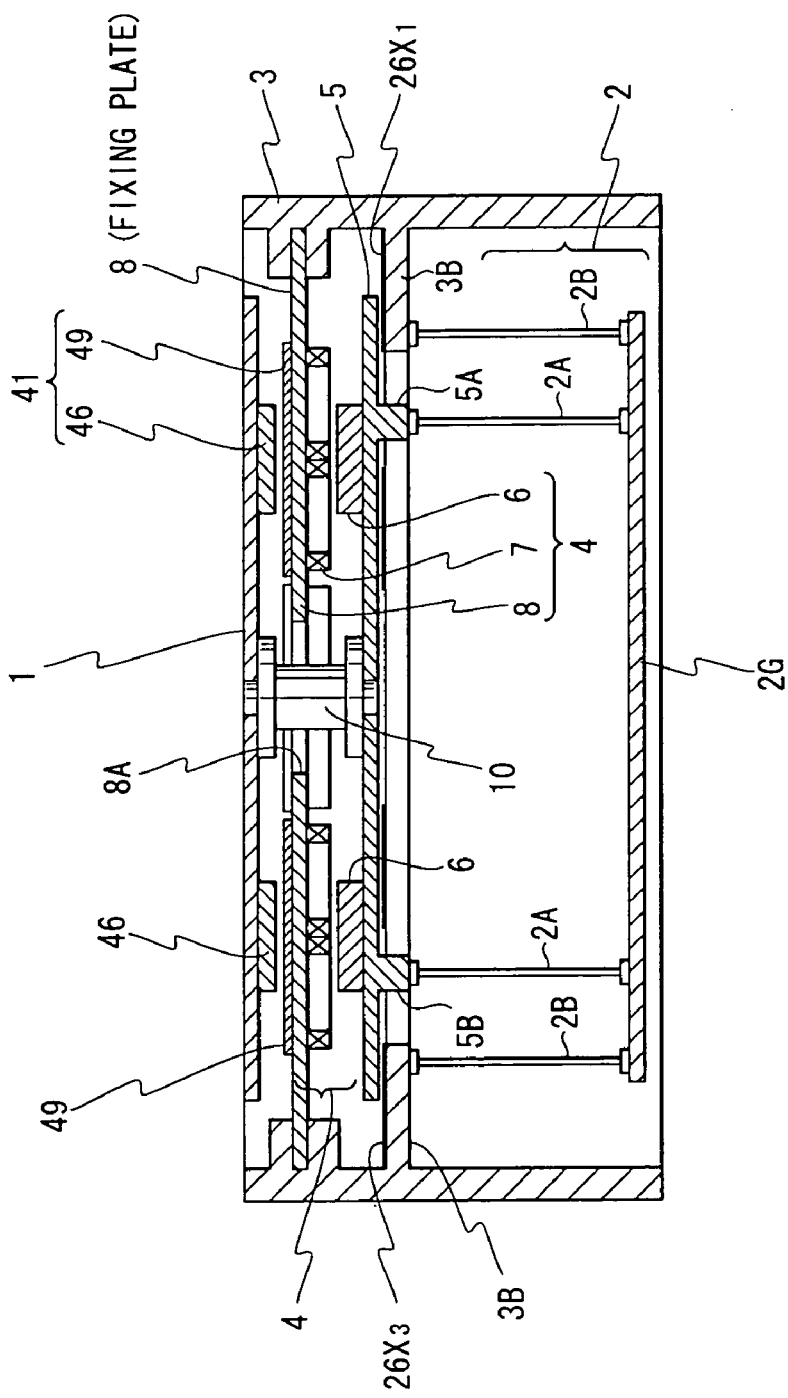
FIG. 22 is a schematic cross section showing a fourth embodiment of the present invention, in which a part is being omitted.

FIG. 22 shows a fourth embodiment. The electromagnetic braking mechanism of the first embodiment as shown in FIG. 1 is formed by combining the driven magnets 6 and the braking plates 9, in which the driven magnets 6 are used as the braking magnets. On the contrary, an electromagnetic braking mechanism 41 according to the fourth embodiment as shown in FIG. 22 uses another magnet as the braking magnet which is separate from the driven magnets to be combined with a braking plate 49 instead of the braking plate 9.

That is, in FIG. 22, the electromagnetic braking mechanism 41 comprises: four braking plates 49 being fixed to be mounted on the same circumference of the top face part of a fixing plate 8 at equal intervals; and four braking magnets 46 being fixed to be mounted to the bottom face part of the movable table 1 by adjacently facing each braking plate 49.

Each of the four braking plates 49 and each of the four braking magnets 46 are all mounted to the positions corresponding to each of the four cross-in-square-shape driving coils 7 and each of the driven magnets 6 of the electromagnetic driving means 4.

Each of the four braking plates 49 is formed with a conductive member (for example, a copper plate member) made of a non-magnetic member. Further, each of the four braking magnets 46 is disposed in such a manner that the polarities, the north and the south, of the magnetic poles become alternate (the polarities of the neighboring magnets are different). Thereby, a magnetic circuit is smoothly formed through the movable table 1 and a fixing plate 8.

Other configurations are substantially the same as those of the first embodiment as shown in FIG. 1.

In the fourth embodiment as described above, substantially the same effect as the case of the first embodiment as shown in FIG. 1 can be achieved. Especially, as for the electromagnetic braking mechanism 41, it is possible to obtain the same or better electromagnetic braking than the electromagnetic braking (eddy-current brake) which is generated due to the relation between the braking plate 9 and the driven magnet 6 as shown in FIG. 1 (first embodiment).

Further, in the embodiment, the braking plates 9 are omitted from the region where the electromagnetic driving means 4 is placed. Thus, it is possible to set the clearance (space) small (narrow) between each cross-in-square-shape driving coil 7 and each driven magnet 6. Therefore, it is advantageous in respect that the electromagnetic driving force can be set larger than that of the first embodiment.

The embodiment has been described by referring to the case where the braking plates 9 of the first embodiment (FIG. 1) are omitted. However, practically, the electromagnetic braking mechanism 41 may be additionally mounted to the state where the braking plates 9 are mounted as they are.

As for the electromagnetic braking mechanism 41, described is the case where the number of the braking magnets 46 and the number and the mounting area of the braking plates 49 are specified. However, the present invention is not necessarily limited to this. Any numbers of the braking magnets 46 above three may be mounted. Further, as for the braking plate 49, a single braking plate in a prescribed shape and in a size corresponding to each braking magnet 49 may be mounted.

Moreover, it is also possible to obtain the electromagnetic braking mechanism 41 which functions similarly even when the mounting positions of the braking magnet 6 and the braking plate 49 are switched.

Fifth Embodiment

Figure 23:
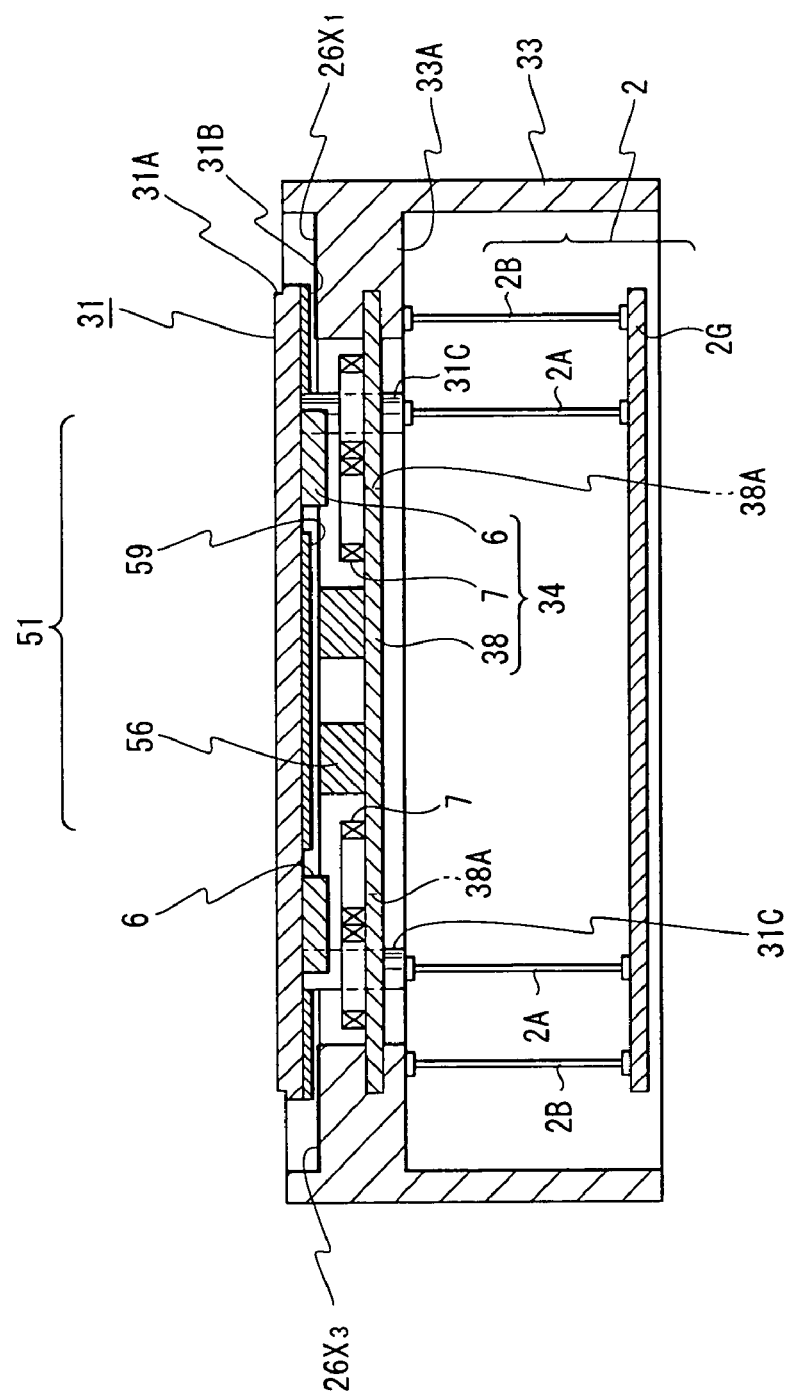
FIG. 23 is a schematic cross section showing a fifth embodiment of the present invention, in which a part is being omitted.

FIG. 23 shows a fifth embodiment. The fifth embodiment as shown in FIG. 23 is distinctive in respect that an electromagnetic braking mechanism 51 is additionally mounted to the second embodiment shown in FIG. 19, and the electromagnetic braking mechanism 51 is mounted separately (individually) from the electromagnetic driving means 34.

In this case, as shown in FIG. 23, the electromagnetic braking mechanism 51 comprises: two braking magnets 56 mounted to the center of the top face of a fixing plate 38; and a single braking plate 59 being fixed to be mounted to the bottom face part of the movable table 1 by adjacently facing the braking magnets 56.

The single braking plate 59 and the each of two braking magnets 56 are all mounted separately from each of the four cross-in-square-shape driving coils 7 and each of the driven magnets 6 of the electromagnetic driving means 4. The braking plate 59 is formed with a conductive member (for example, a copper plate member) made of a non-magnetic member. Further, each of the two braking magnets 56 is disposed in such a manner that the polarities, the north and the south, of the magnetic poles become alternate (the polarities of the neighboring magnets are different). Thereby, a magnetic circuit is smoothly formed through the movable table 1 and a fixing plate 38.

Other configurations are substantially the same as those of the second embodiment as shown in FIG. 19.

Not only enabling to obtain substantially the same effect as that of the second embodiment as shown in FIG. 19, but also the fifth embodiment enables to set the clearance (space) small (narrow) between each cross-in-square-shape driving coil 7 and each driven magnet 6, since the braking plates 9 are omitted from the region where the electromagnetic driving means 4 is placed. Therefore, it is advantageous in respect that the electromagnetic driving force can be set still larger than that of the second embodiment.

Although the fifth embodiment has been described by referring to the case where the braking plate 9 of the second embodiment (FIG. 19) is omitted, practically, it may be used with the braking plates 9 being mounted as they are.

Moreover, as for the electromagnetic braking mechanism 51, described is the case where the number of the braking magnets 56 and the number and the mounting area of the braking plates 59 are specified is described. However, the present invention is not necessarily limited to this. Any numbers of the braking magnets 56 above three may be mounted. Further, the braking plates 59 may be separately mounted by respectively corresponding to each braking magnet 56.

Sixth Embodiment

Figure 24:
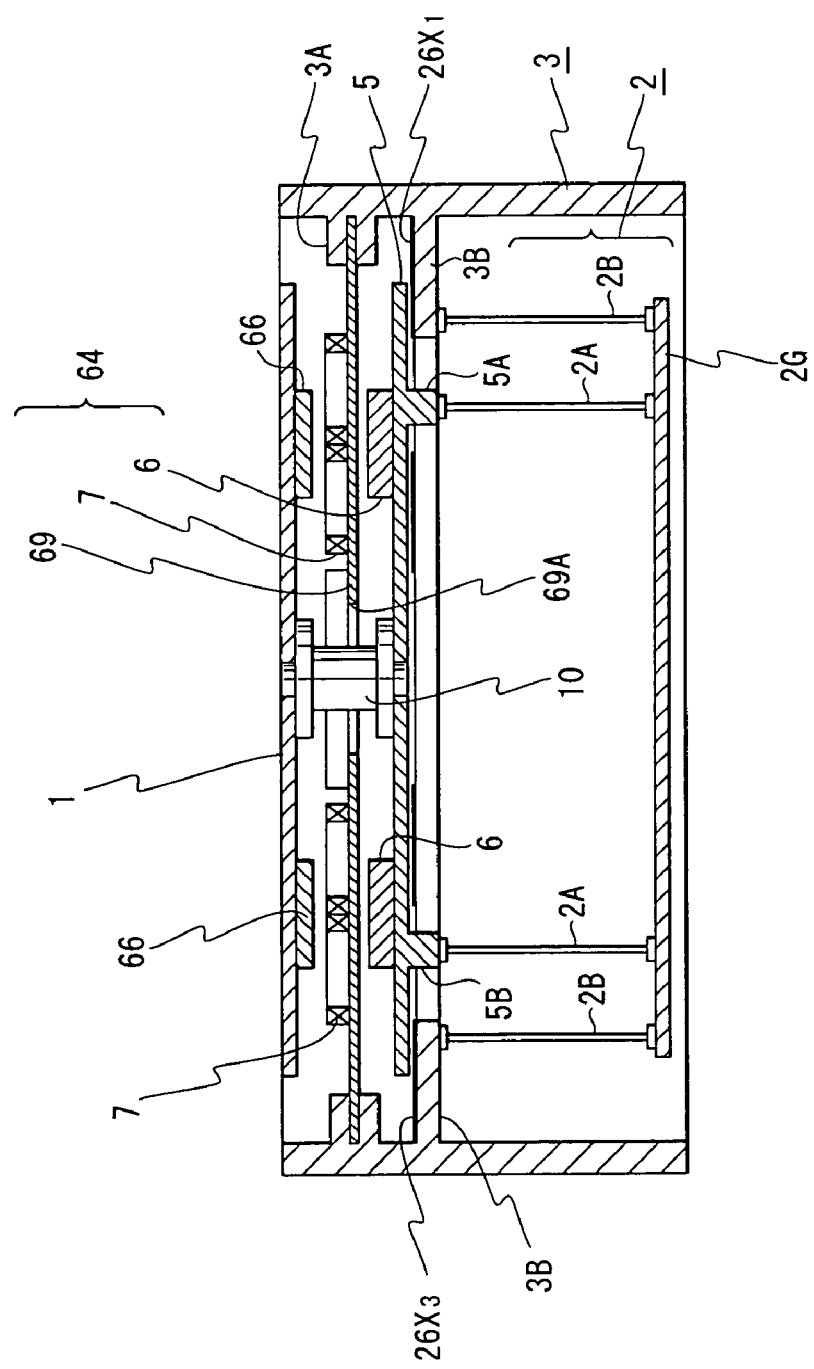
FIG. 24 is a schematic cross section showing a sixth embodiment of the present invention, in which a part is being omitted.

FIG. 24 shows an example of a sixth embodiment. An electromagnetic braking mechanism according to the sixth embodiment shown in FIG. 24 is distinctive in respect that another braking plate 69, which is formed by being fixed to a case main body 3 (see FIG. 1) through largely extending the braking plate 39, is mounted instead of the braking plate 39 of the third embodiment as shown in FIG. 21, and the fixing plate 8 is omitted. Numeral reference 69A is a through-hole formed in the center of the braking plate 69. The through-hole 69A is formed in a size which allows the moving action of the connecting brace 10.

The braking plate 69 is formed with a conductive member (for example, a copper plate member) made of a non-magnetic member.

In the sixth embodiment as shown in FIG. 24, by omitting the fixing plate 8, the bottom face side of each cross-in-square-shape driving coil 7 is to be held by the braking plate 69.

An electromagnetic braking mechanism 64 according to the sixth embodiment comprises: the braking plate 69; each cross-in-square-shape driving coil 7 fixed on the braking plate 69; and each driven magnet 6 mounted on an auxiliary table 5 with a prescribed space between with the braking plate 69 by corresponding to each cross-in-square-shape driving coil 7.

Further, the electromagnetic driving mechanism according to the sixth embodiment is formed by a combination of the braking plate 69 and the driven magnets 6.

Moreover, numeral reference 66 shows other four driven magnets. These other four driven magnets 66 are respectively fixed to be mounted to the movable table 1 by facing the top face (end face of the movable table 1 side) of each cross-in-square-shape driving coil 7 of FIG. 24. Thereby, the driving force of the electromagnetic driving means 64 is increased.

As for the magnetic poles of each added driven magnet 66, it is disposed in such a manner that the pole face which faces each driven magnet 6 becomes different from each other (the north pole and the south pole face each other). Other configuration are the same as the third embodiment as shown in FIG. 21.

With the configuration described above, the same effect as that of the third embodiment as shown in FIG. 21 can also be achieved. Especially the positional relation between the braking plate 69 and the driven magnet 6 is maintained in the same state as the case of the third embodiment (FIG. 21). Therefore, the braking function by the braking plate 69 also becomes completely the same as the case of the third embodiment (FIG. 21). As for other effect, the entire apparatus can be further reduced in size and weight since the fixing plate 8 is omitted.

The additionally provided driven magnet 66 may be formed with an ordinary magnetic member made of, for example, iron material. In this case, the magnetic material used for the driven magnet 66 effectively functions as the member for forming a magnetic circuit.

In the sixth embodiment, the additional driven magnet 66 may be omitted. Thereby, reduction of the size and weight of the entire apparatus can be further promoted so that the flexibility of the apparatus can be further increased to be convenient.

Seventh Embodiment

[Other Embodiments regarding Driving Coil]

Other embodiments regarding each driving coil 7 will be described and the relation between with the braking plate will be illustrated. In this case, the configurations other than the driving coils are formed similarly to those of each embodiment, respectively, and the description thereof will be omitted here.

(1) Embodiment regarding Cross-in-Square-Shape Driving Coil

In the above-described embodiments, the cross-in-square-shape driving coils 7 as the driving coils forming the main part of the electromagnetic driving means 4, 34, 64 are limitedly mounted on the X-Y axes. However, the cross-in-square-shape driving coils 7 may be mounted in the positions shifted from the X-Y axes as shown in FIG. 25.

In this case, the driven magnets 6 (or 66) are fixed to the cross-in-square-shape driving coil 7 side at the positions corresponding to the cross-in-square-shape driving coils 7.

Figure 25:
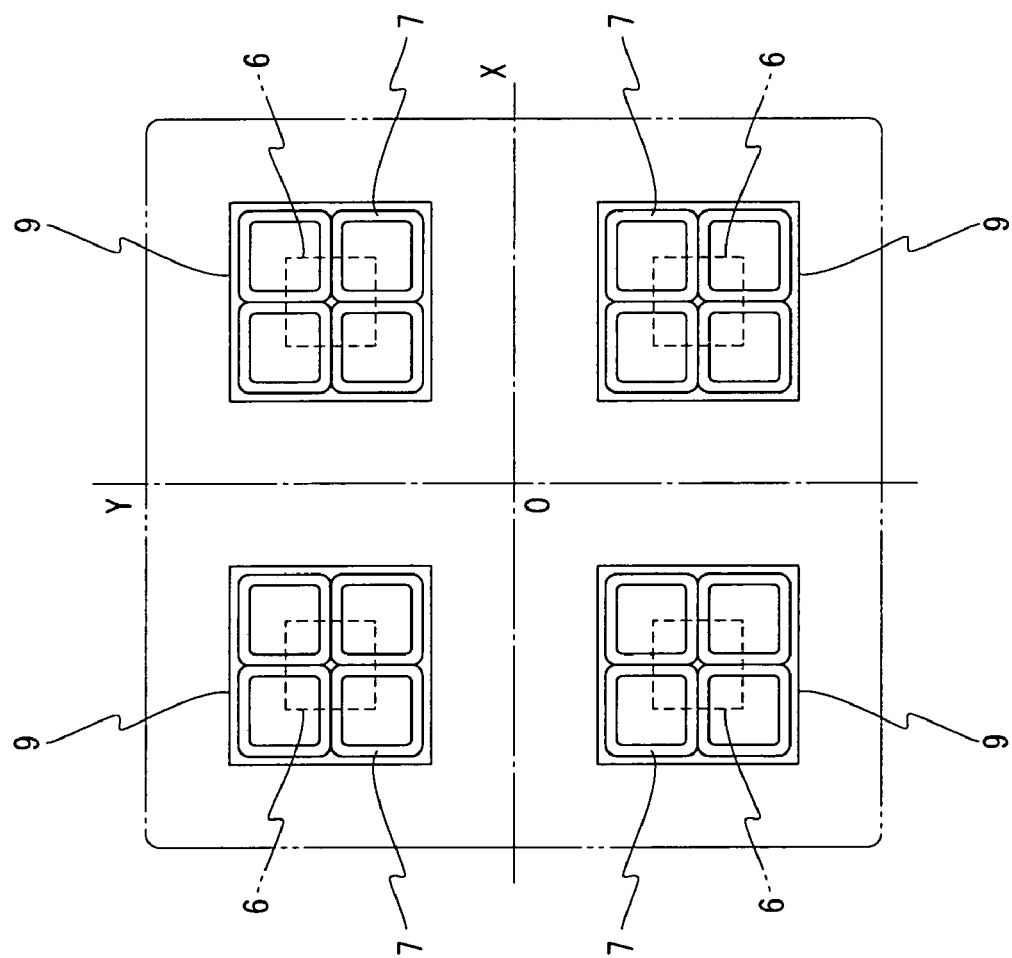
FIG. 25 is an illustration showing another positioning example of the four driving coils disclosed in each embodiment of the present invention on the fixing plate and the relation between with the driven magnets.

Including the case of FIG. 25, positioning of the cross-shape coil side on the inner side of the cross-in-square-shape driving coil 7 is described in each embodiment by referring to the case where the longitudinal or lateral coil side part is disposed along the X-Y axes. However, the present invention is not necessarily limited to this but may have a configuration in which the coils may be disposed with a prescribed inclination with respect to the X axis or Y axis.

In FIG. 25, four cross-in-square-shape driving coils are mounted. However, three, five or more of them may be mounted as long as they function similarly.

Further, as for the cross-in-square-shape driving coil 7, the external form may be in a shape other than the square shape.

(2) Driving Coil other than Cross-in-Square-Shape Driving Coil (a)

Each of the embodiments has been described by referring to the case where the cross-in-square-shape driving coils 7 are mounted as the driving coils which form the main part of the electromagnetic driving means. However, it is only illustrated by way of example and other driving coils may be mounted instead as long as they functions similarly.

FIG. 26(A) shows the case of forming an electromagnetic driving means 4 (or 34), comprising: a single quadrangular driving coil 71 with relatively a large inner-side area as the driving coil; total of four electromagnets 81, in which the north pole and south pole can be individually set (including the energization-stop control), being separately disposed by facing the four side part of the quadrangular driving coil 71.

In this case, by appropriately controlling the energizing direction and the prescribed current amount including non-supply to the quadrangular driving coil 71 and each electromagnet 81, it is possible to drive-control the movable table 1 (or 31) in all the directions except for rotary motion. The shape of the quadrangular driving coil 71 may be in rectangular shape or square shape.

(3) Driving Coil other than Cross-in-Square-Shape Driving Coil (b)

FIG. 26(B) shows the case of using four quadrangular driving coils 72 with relatively small inner-side area as the driving coil and eight electromagnets 82.

In the case of FIG. 26(B), each of the four quadrangular driving coils 72 is disposed at the laterally symmetrical positions, for example, in the area crossing with the X-Y axes. Further, total of eight electromagnets 82, in which the north pole and south pole can be individually set (including the energization-stop control) are separately disposed by facing the coil side part of the quadrangular driving coil 72 which is placed in the area where each quadrangular driving coil 72 crosses with the X axis and Y axis, respectively. Thereby, an electromagnetic driving means 4 (or 34) is formed.

In this case, as in the case of FIG. 26(A), by appropriately controlling the energizing direction and the prescribed current amount including non-supply to the quadrangular driving coil 72 and each electromagnet 82, it is also possible to drive-control the movable table 1 (or 31) in all the directions except for rotary motion.

In this case, the shape of the quadrangular driving coil 72 may also be in rectangular shape or square shape.

(4) Driving Coil other than Cross-in-Square-Shape Driving Coil (c)

FIG. 27(A) shows the case of using four quadrangular driving coils 73 with relatively small inner-side area as the driving coil and eight electromagnets 83.

In the case of FIG. 27(A), each of the four quadrangular driving coils 73 is disposed at the laterally symmetrical positions, for example, in the area crossing with the X-Y axes. Further, total of eight electromagnets 83, in which the north pole and south pole can be individually set (including the energization-stop control) are separately disposed by facing the coil side part of the quadrangular driving coil 73 which is placed in the area where each quadrangular driving coil 73 does not cross with the X axis and Y axis, respectively. Thereby, an electromagnetic driving means 4 or 34 is formed.

In this case, as in the case of each of the first to third embodiments, by appropriately controlling the energizing direction and the prescribed current amount including non-supply to the quadrangular driving coil 73 and the electromagnets 83, it is also possible to drive-control rotation and the movement in all the directions. In this case, the shape of the quadrangular driving coil 73 may also be in rectangular shape or square shape.

(5) Driving Coil other than Cross-in-Square-Shape Driving Coil (d)

FIG. 27(B) shows the case of using a single cross-shape-frame driving coil 74 formed in a cross-shape outline as the driving coil and eight electromagnets 84.

In the case of FIG. 27(B), the cross-shape driving coil 74 is disposed at the position to be in laterally symmetrical, for example, in the area where the center line parts in the longitudinal and lateral directions come to be on the X-Y axes. Further, total of eight electromagnets 84, in which the north pole and south pole can be individually set (including the energization-stop control), are separately disposed by facing the coil side part of the cross-shape-frame driving coil 74 which is placed in the area where the cross-shape-frame driving coil 74 does not cross with the X axis and Y axis, respectively. Thereby, an electromagnetic driving means 4 or 34 is formed.

In this case, as in the case of each of the first to third embodiments, by appropriately controlling the energizing direction and the prescribed current amount including non-supply to the cross-shape-frame driving coil 74 and the eight electromagnets 84, it is also possible to drive-control rotation and the movement in all the directions.

In each of the cases (2) to (5), each braking plate 9 is fixed to be mounted to the driving coil side by corresponding to each driven magnet by individually facing the respective driven magnet 6 while being in contact with the prescribed coil side part of each driving coil 71, 72, 73 or 74.

Also, in this case, as in the case of the third embodiment (see FIG. 21), a single plate member made of the same material may be mounted as the braking plate 39 (not shown) instead of mounting a plurality of braking plates 9.

In the embodiment described above, the movable table for supporting a work piece can be smoothly and precisely moved in a prescribed direction at will or returned to the original position on the same plane (without changing the height position). Further, as the table holding mechanism, mounted is the one which is capable of moving the movable table in the arbitrary directions on the same plane by utilizing an elastic member. Therefore, a sliding mechanism in double structure becomes unnecessary, which is required in the conventional case. Thus, a special precise processing and the like become unnecessary so that it enables to remarkably improve processing/assembling work and to reduce the size and weight of the entire apparatus.

Further, the conductive braking plates made of non-magnetic member are mounted by facing a plurality of magnets which form a part of the electromagnetic driving means for driving the table. Thus, even when there is small oscillation or the like being generated within the same plane due to the repeated reciprocal moving action or oscillation of the peripherals when being stopped, it is possible to effectively suppress the oscillation. Thereby, precise moving of the movable table can be smoothly performed.

As described above, provided are: the movable table arranged to be movable in arbitrary directions on the same plane; the table holding mechanism which allows the movable table to move in the arbitrary directions on the same plane; the main body part for supporting the table holding mechanism; and the electromagnetic driving means being mounted on the main body side for supplying the moving force to the movable table. As will be described later, the table holding mechanism may have a function of supplying the original position returning force to the movable table.

Further, the electromagnetic driving means at least comprises: a plurality of the driven magnets fixed to be mounted at the prescribed positions on the movable table side; and the driving coil having the coil sides being disposed by facing each of the driven magnets, which supplies the prescribed driving force electromagnetically to each driven magnet along the moving direction of the movable table. The driving coil may be installed in the main body part through a fixing plate or other member instead of the fixing plate.

Also, the braking plate made of non-magnetic metal member is provided adjacent to the pole face of the driven magnet. By the combination of the braking plate and the driven magnets, the electromagnetic braking mechanism is formed.

Thus, in the embodiment, when the electromagnetic driving means started, first, a magnetic force is generated between the driving coil and the driven magnet provided in the electromagnetic driving means, and the moving force is supplied to the movable table in the prescribed direction.

In this case, the movable table is held by the table holding mechanism in the state being allowed to move on the same plane in the arbitrary directions. Therefore, it smoothly moves in the prescribed direction without vertical movement and stops at the balanced position (that is, the prescribed stop position) between the original position returning force of the table holding mechanism and the magnetic force of the electromagnetic driving means.

In the meantime, when the speed of the movable table is suddenly accelerated or decelerated at the time of making a movement/stop, the movable table itself is suddenly started/stopped. Especially, at the time of the stop, it is likely to repeat reciprocal movements due to the mutual effect between with the original position returning force of the table holding mechanism.

In this case, due to the sudden change in the action of the movable table, electromagnetic braking (eddy current brake) works between the driven magnet and the braking plate. Thereby, the sudden action of the movable table is suppressed to be gradually and smoothly moved in the prescribed direction under the stable state.

Further, the electromagnetic braking mechanism has a simple configuration in which the braking plate and the driven magnet are combined, and the electromagnetic driving means has a simple configuration in which the driven magnet and the driving coil facing thereto are combined. Thus, compared to the conventional case which comprises a moving mechanism in double structure, the entire apparatus can be reduced in size and weight so that the portability becomes excellent. Moreover, there is no special skill required at the time of assembling work. Thereby, the workability becomes excellent and the productivity can be improved.

Furthermore, the metallic braking plate made of non-magnetic member mounted to the end face part of the driving coil on the driven magnet side, constitutes a circuit corresponding to a transformer secondary circuit in the relation between with the driving coil, while being in a form which is short-circuit through an electric resistance component (generates eddy current loss) of the braking plate.

Therefore, in the driving coil constituting the transformer primary circuit, a relatively large current can be flown compared to the case where the secondary circuit is in the open state. Thereby, it enables to output a relatively large electromagnetic force between with the driven magnet compared to the case without the braking plate.

The braking plate also functions as a radiation plate so that the secular change (dielectric breakdown by the heat) due to the continuous operation of the driving coil can be effectively suppressed. Thereby, the durability and the reliability of the entire apparatus can be improved.

Further, it is also possible to employ a configuration in which: the auxiliary table is integrally connected to be mounted to the movable table in parallel by facing it with a prescribed space in between; the table holding mechanism is mounted on the auxiliary table side; and the driven magnets are mounted to the auxiliary table.

By mounting the driven magnets on the auxiliary table, it enables to effectively avoid causing damaging accidents or the like of the movable table at the time of assembling work.

Further, it is also possible to employ a configuration in which: the driving coil may be constituted with a plurality of the cross-in-square-shape driving coils; and the driven magnets are individually provided by corresponding to the cross-shape part on the inner side of the cross-in-square-shape driving coils. Thereby, it enables to precisely move each driven magnet (further, the movable table) in the prescribed direction at will within an allowable moving range being set on the inner side of the cross-in-square-shape driving coil.

In this case, the cross-in-square-shape driving coil, actually, through a driving controller being mounted separately, generates the driving force between with each of the corresponding driven magnet in the X direction and Y direction, for example, and enables to move the movable table in the prescribed direction through the driven magnet by carrying out a collective control as a whole.

Further, it is also possible to employ a configuration in which a plurality of the driven magnets are formed by permanent magnets. By using the permanent magnets as the driven magnets, the energizing circuit such as the electromagnet becomes unnecessary. For this, complication of the work at the time of assembling and maintenance inspection can be avoided. Therefore, it is possible to improve the productivity and the maintenance characteristic, and the durability of the entire apparatus can be improved.

Moreover, it is also possible to have a configuration in which: a plurality of the driven magnets are formed with the electromagnets; and each driven magnet is associated with the driving coil to be selectively controlled to be energized in the normal direction or the reverse direction, or to be in the non-energized state.

Therefore, various changes can be applied in the driving control of the movable table. For example, it is possible to correspond to acceleration/deceleration of the speed at the time of moving by drive-control performed on both the driving coil and the electromagnet. Thus, it is possible to promptly correspond to the changes such as the moving direction and the like of the movable table. Further, it is possible to set the density of the magnetic flux of the driven magnet (magnet magnitude) at will as necessary. Therefore, it is possible to change the magnitude of the driven magnet according to the state when in use.

Further, the braking plate may be individually mounted by corresponding to a plurality of driven magnets. Moreover, the braking plate may be fixed to the end part of each driving coil side.

Furthermore, the braking plate may be formed by a single plate member to be used for the entire part of a plurality of the driven magnets, and the single plate member may be fixed to be mounted to the end part of the driving coil on each magnet side.

Moreover, by mounting the braking plates for each driving coil, there is a space provided in between the driving coils. Therefore, it enables to achieve smooth maintenance inspection work, that is, to improve the maintenance characteristic.

Also, by forming the braking plate using a single plate member for the entire part of a plurality of the driven magnets, assembling work is simplified, so that the productivity and the durability of the entire apparatus can be improved and the cost can be reduced.

Further, it is also possible to isolate the braking plate from the driving coil and combine it with another braking magnet for forming the electromagnetic braking mechanism. In this case, the braking plate and the driving coil can be mounted to the different areas.

Thereby, the electromagnetic braking mechanism can be mounted to the arbitrary area by being isolated form the electromagnetic driving means, so that the magnitude of the electromagnetic driving force can be set at will. In this case, it is possible on the electromagnetic driving means side to set the clearance between the driving coil and the driven magnet still smaller. Thus, the electromagnetic driving force between the driving coil and the driven magnet can be effectively generated.

Further, it may be in a configuration in which: the braking plate is a single braking plate corresponding to each driven magnet; the single braking plate is fixed to the main body part; and the driving coil is held by the single braking plate.

Therefore, not only enabling to omit the fixing plate, but also the driving coil can be held by the braking plate. Further, since the fixing plate can be omitted, reduction of the size and weight of the entire apparatus can be further promoted. Thereby, the portability and the flexibility can be further improved, and the cost can be reduced in accordance with a decrease of the structural elements.

Eighth Embodiment

Figure 28:
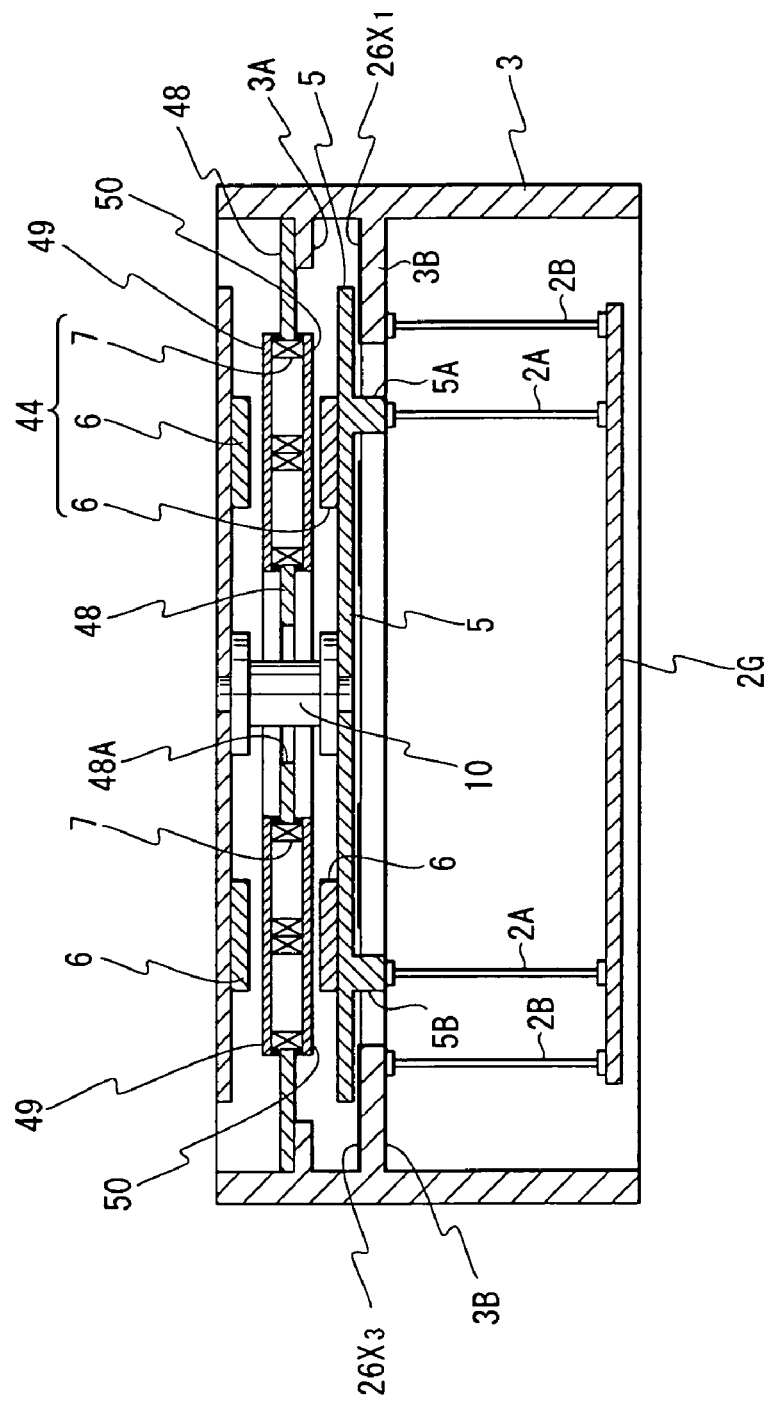
FIG. 28 is a schematic cross section showing an eighth embodiment of the present invention, in which a part is being omitted.

FIG. 28 shows an eighth embodiment. The eighth embodiment shown in FIG. 28 is distinctive in respect that: each of the four cross-in-square-shape driving coils 7 of the first embodiment is fixed to be mounted to a fixing plate 48 by being inserted through the holes of the fixing plate, respectively; and the driven magnets 6 are mounted to the auxiliary table 5 and the movable table 1, respectively, by individually corresponding to the end face of each cross-in-square-shape driving coil 7 so as to form an electromagnetic driving means 44.

Numeral reference 48A is a through-hole which allows the moving action of the connecting brace 10 like the through-hole 8A shown in FIG. 1. Further, numeral references 49, 50 are the braking plates which, while facing and being adjacent to each driven magnet 6, are respectively fixed and mounted to both faces of the fixing plate 8 by being in contact with each end face of the cross-in-square-shape driving coil 7. Other configurations are the same as those of the first embodiment.

This embodiment can achieve the similar effect as that of the first embodiment. Further, since the driven magnets 6 are respectively mounted vertically by sandwiching the cross-shape coil sides of the both end faces of the cross-in-square-shape driving coil 7, the electromagnetic driving force can be doubled. Therefore, it is possible to two-dimensionally drive the auxiliary table 5 and the movable table 1 more promptly and in more stable state, so that the performance and the reliability of the entire apparatus can be improved.

The braking plates 49, 50 according to the embodiment have been described by referring to the case where each plate is individually and separately mounted on the same plane by each end face of each cross-in-square-shape driving coil 7. However, as in the case of the braking plate 39 (see FIG. 21) according to the third embodiment, it may be in a configuration in which a single braking plate is commonly used by providing it commonly facing each driven magnet 6 on the auxiliary table 5 side (or the movable table 1 side).

In the eighth embodiment as shown in FIG. 28, the driven magnet 6 of the electromagnetic driving means is used as the braking magnet of the electromagnetic braking mechanism. However, the braking plates 49, 50 may be omitted by using a separate braking magnet instead of the driven magnet for forming the electromagnetic braking mechanism through combining the braking magnet and the braking plate, and disposing the braking mechanism by isolating from the electromagnetic driving means.

With this, the clearance between each driven magnet 6 and the corresponding cross-in-square-shape driving coil 7 can be made smaller so that the electromagnetic driving force working therebetween can be increased.

Ninth Embodiment

Next, examples of other configurations in regards to the cross-in-square-shape driving coil will be described. Although the first embodiment has been described by referring to the case where the quadrangular type is used as the cross-in-square-shape driving coil, the invention is not necessarily limited to this. The ones in the shape as described below can also function as the cross-in-square-shape driving coils.

(1) Cross-in-Square-Shape Driving Coil with Diamond External Shape

Figure 29:
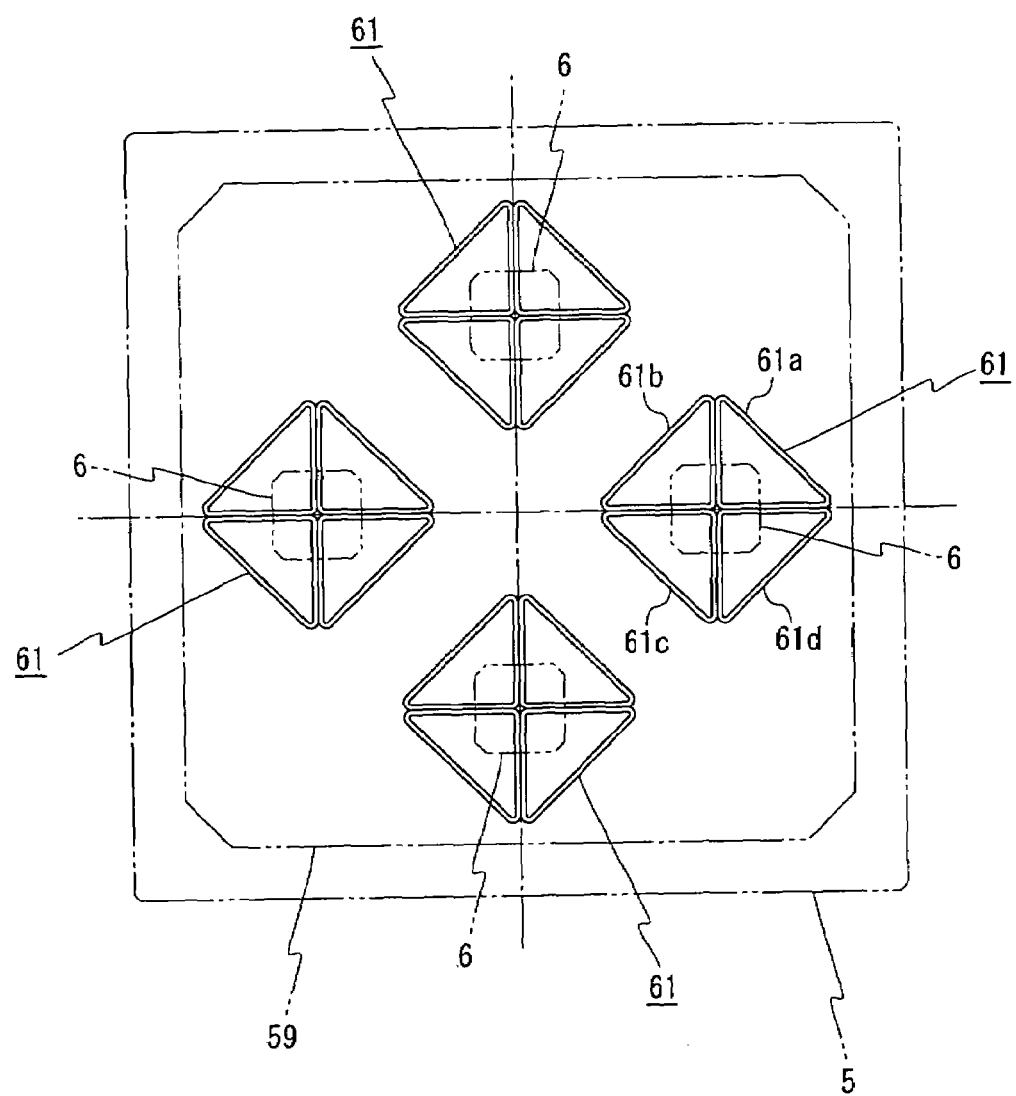
FIG. 29 is an illustration showing another example of the driving coils disclosed in each embodiment of the present invention, which is the case of using driving coils in a diamond shape.

A cross-in-square-shape driving coil 61 as shown in FIG. 29 is formed with four small angular coils 61a, 61b, 61c, 61d in triangle shapes, which can be individually energized, and the overall combination is formed in a diamond shape (in the state where a square-shape is rotated by 90°). There is a cross-shape coil side being formed on the inner side as shown in FIG. 29.

FIG. 29 shows the case where the four cross-in-square-shape driving coils 61 formed as described are disposed on each axis on the X-Y orthogonal coordinates to be fixed and mounted on the fixing table 8 (not shown) as in the case of the first embodiment.

Also in this case, the driven magnets 6 are mounted on the auxiliary table 5 by corresponding to the cross-shape coil sides of each cross-in-square-shape driving coil 61. Further, numeral reference 59 is a braking plate which functions similarly to the braking plate 39. Similarly, numeral reference 5 is an auxiliary table. Other configurations are the same as those of the first embodiment.

With this configuration, the cross-in-square-shape driving coils 61 also function as the cross-in-square-shape driving coils 7 of the first embodiment, and the precise processing stage apparatus comprising the coils can also achieve the same effect as that of the first embodiment.

(2) Cross-in-Square-Shape Driving Coil with Circular External Shape

Figure 30:
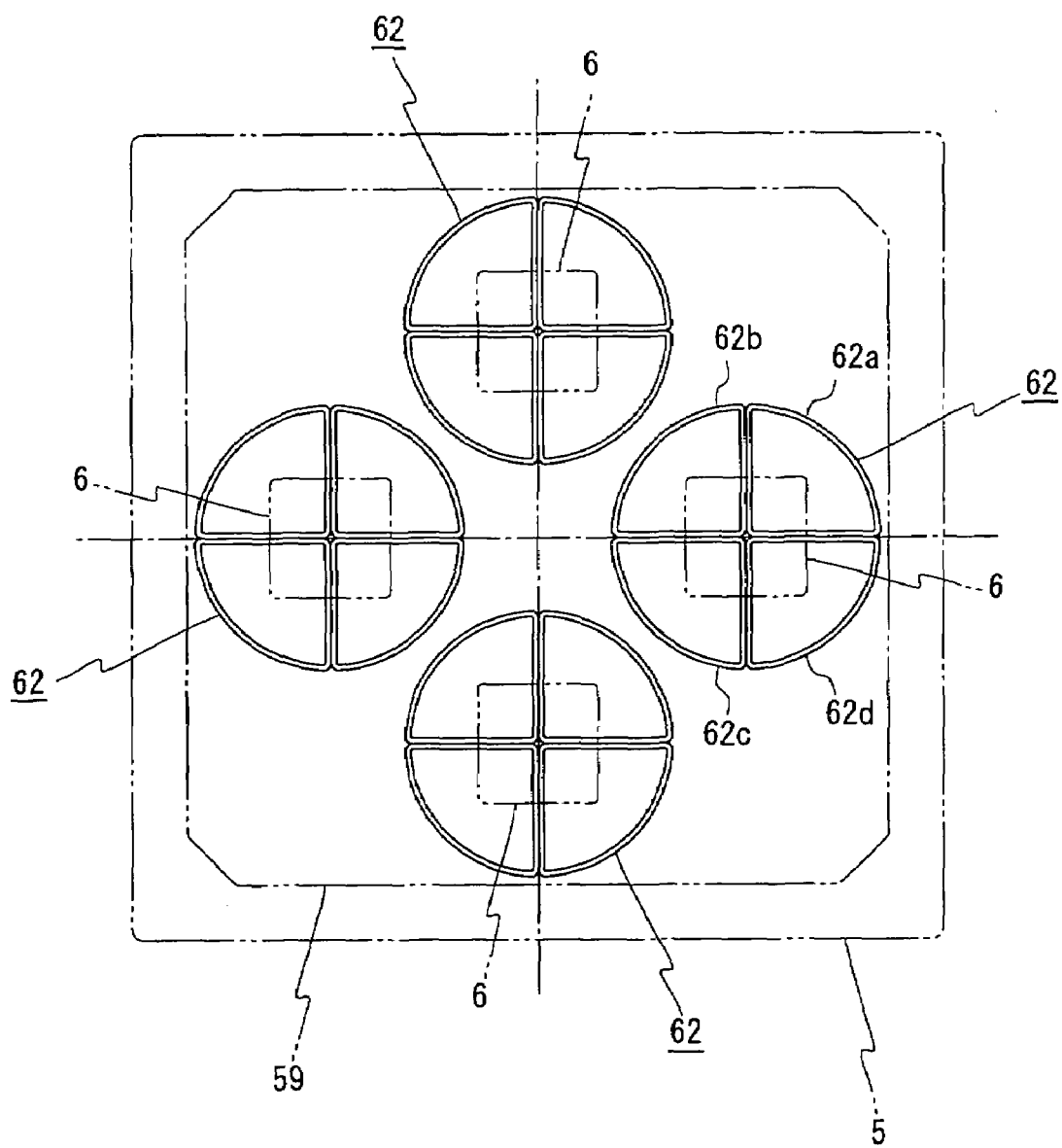
FIG. 30 is an illustration showing another example of the cross-in-square shape driving coils disclosed in each embodiment of the present invention, which is the case of using driving coils in a circular shape.

A cross-in-square-shape driving coil 62 as shown in FIG. 30 is formed with four small angular coils 62a, 62b, 62c, 62d in fan shapes, which can be individually energized, and the overall combination is formed in a circular shape. There is a cross-shape coil side being formed on the inner side as in the case of FIG. 29.

FIG. 30 shows the case where the four cross-in-circular-shape driving coils 62 formed as described are disposed on each axis on the X-Y orthogonal coordinates to be fixed and mounted on the fixing table 8 (not shown) as in the case of the first embodiment.

Also in this case, the driven magnets 6 are mounted on the auxiliary table 5 by corresponding to the cross-shape coil sides of each cross-in-circular-shape driving coil 62. Further, numeral reference 59 is a braking plate which functions similarly to the braking plate 39. Similarly, numeral reference 5 is an auxiliary table. Other configurations are the same as those of the first embodiment.

With this configuration, the cross-in-circular-shape driving coils 62 also function as the quadrangular cross-in-square-shape driving coils 7 of the first embodiment, and the precise processing stage apparatus comprising the coils can also achieve the same effect as that of the first embodiment.

(3) Cross-in-Square-Shape Driving Coil with Octagonal External Shape

Figure 31:
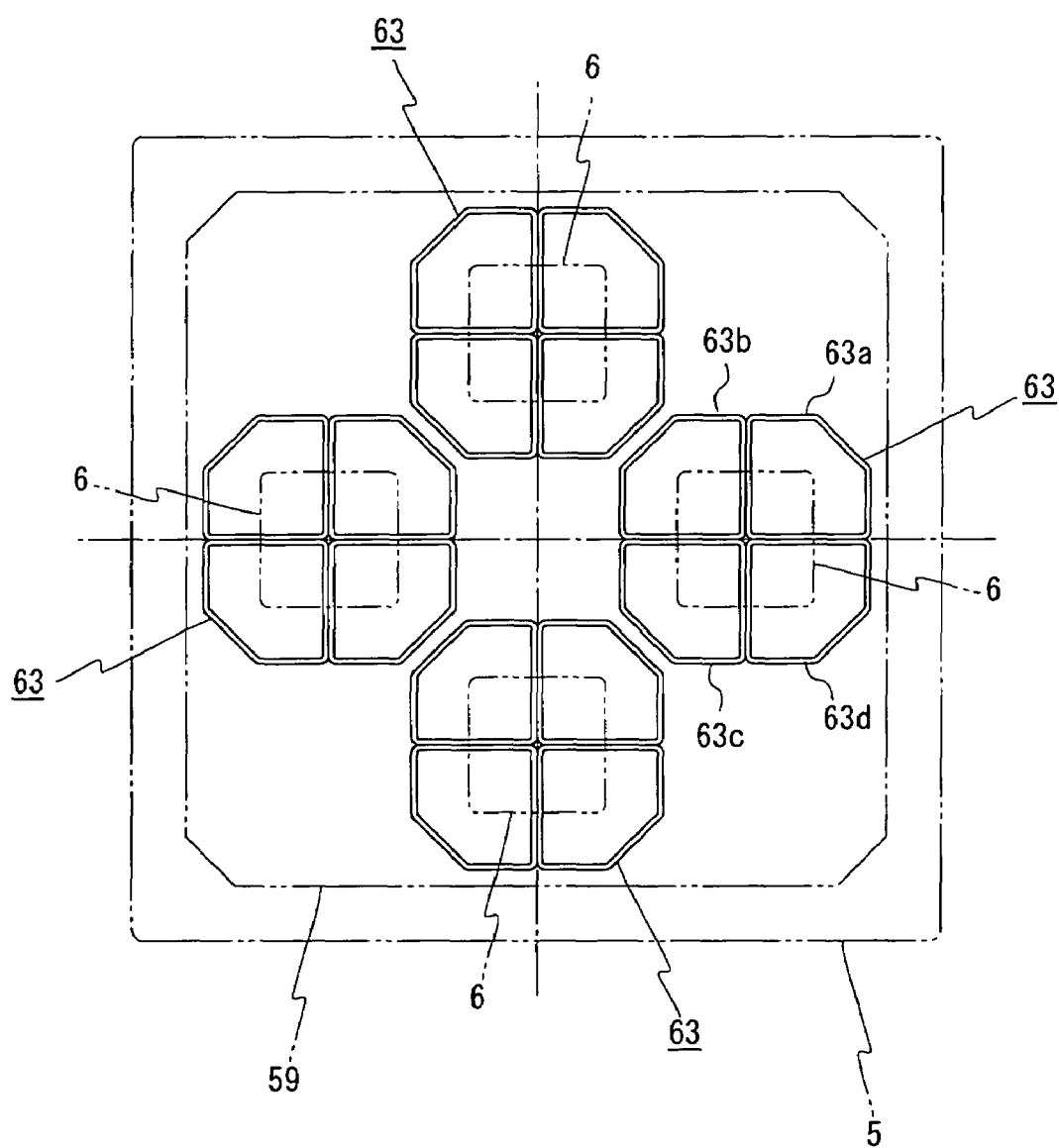
FIG. 31 is an illustration showing another example of the driving coils disclosed in each embodiment of the present invention, which is the case of using driving coils in an octagonal shape.

A cross-in-square-shape driving coil 63 as shown in FIG. 31 is formed with four small angular coils 63a, 63b, 63c, 63d in pentagonal shapes, which can be individually energized, and the overall combination is formed in an octagonal shape. There is a cross-shape coil side being formed on the inner side as in the case of FIG. 29.

FIG. 31 shows the case where the four cross-in-octagonal-shape driving coils 63 formed as described are disposed on each axis on the X-Y orthogonal coordinates to be fixed and mounted on the fixing table 8 (not shown) as in the case of the first embodiment.

Also in this case, the driven magnets 6 are mounted on the auxiliary table 5 by corresponding to the cross-shape coil sides of each cross-in-octagonal-shape driving coil 63. Further, numeral reference 59 is a braking plate which functions similarly to the braking plate 39. Similarly, numeral reference 5 is an auxiliary table. Other configurations are the same as those of the first embodiment.

With this configuration, the cross-in-octagonal-shape driving coils 63 also function as the quadrangular cross-in-square-shape driving coils 7 of the first embodiment, and the precise processing stage apparatus comprising the coils can also achieve the same effect as that of the first embodiment.

As described above, as for the cross-in-square-shape driving coil of the present invention, the external shape is not necessarily limited to the quadrangular shape as long as it has a cross-shape coil sides formed on the inner side, and the ones in any other shapes may be used as long as they function similarly.

Further, each of the embodiments has been described by referring to the case where spatial region of the inner side part (cross-shape coil side part) of each cross-in-square-shape driving coil is in a hollow state. However, a non-conductive magnetic material such as ferrite may be filled in this part.

Further, although the embodiments have been described by referring to the case where the permanent magnets are used as the driven magnets 6, the electromagnets may be used as the driven magnets 6 instead of the permanent magnet. In this case, the table driving control means 21 drive-controls the electromagnets and carries out a prescribed energizing control (not shown) by selecting the normal direction, the reverse direction or a non-energized state in association with the action of each cross-in-square-shape driving coil 7.

In the case where the electromagnets are used as the driven magnet 6, various changes can be applied to the driving control of the movable table 1. For example, it is possible to correspond to acceleration/deceleration of the speed at the time of moving by performing drive-control on both the driving coil and the electromagnet. Thus, it is possible to promptly correspond to the changes such as the moving direction and the like of the movable table.

That is, in the case where the electromagnets are used as the driven magnet 6, it is possible to set the density of the magnetic flux of the driven magnet (magnet magnitude) at will as necessary. Therefore, it is possible to change the magnitude of the driven magnets according to the state when in use.

Further, each of the embodiments have been described by referring to the case where the four driven magnets 6 and each of the corresponding cross-in-square-shape driving coils, 7, 61, 62, 63 are respectively disposed at the positions on the X axis and Y axis at an equal distance form the origin on the X-Y orthogonal coordinates on the top face of the auxiliary table 5 (or the movable table 1). However, the present invention is not necessarily limited to this. Each of the four driven magnets 6 may not be disposed at the positions at an equal distance from the center as the origin as long as it is the balanced position on the X-Y orthogonal coordinates.

As for the driven magnet 6, an even-number (not necessarily four) of the magnets may be prepared for being disposed on the auxiliary table 5 (or movable table 1) at equal intervals on the same circumference, and the cross-in-square-shape driving coils 7 may be respectively disposed on the fixing plate 8 by individually corresponding to each driven magnet 6 whose position has been specified thereby.

Further, as for the driven magnet 6, an even number of driven magnets 6 are prepared, and the even number of the driven magnets 6 may be disposed, for example, on the auxiliary table 5 (or the movable table 1) to be in lateral-symmetry (or vertical-symmetry) with respect to the X axis (or Y axis) on the X-Y orthogonal coordinates on the face, and the cross-in-square-shape driving coils 7 may be respectively disposed on the fixing plate 8 by individually corresponding to each driven magnet 6 whose position has been specified thereby.

With this configuration, it is possible to obtain a precise processing stage apparatus having substantially the same effect as that of the above-described embodiments.

Further, each embodiment has been described by referring to the case where the eight capacity detection electrodes 26X1, 26X2, 26X3, 26X4, 26Y1, 26Y2, 26Y3, 26Y4 of the capacity sensor group 26 are disposed by two each in each of the sides (for example, the region on both ends of each axis on the X-Y plane) with a prescribed space in between by corresponding to the quadrangular common electrode on the periphery of the bottom face of the auxiliary table 5 or the movable table 1. However, they may reduced by half to be disposed by two each with a prescribed space in between in only the region at the end of each axis in the positive direction on the X-Y plane.

With this, although the noise eliminating function of the arithmetic section is lost, the configuration becomes simplified and the amount of detected information is reduced by half. Thus, arithmetic processing of the positional information can be more promptly carried out, so that the correction of the position shift or the like of the moving movable table 1 can be more promptly achieved.

Further, each embodiment has been described by referring to the case as a specific example where: as the table holding mechanism 2, the four table-side rod-type elastic members (table-side piano wires) 2A and the corresponding four main-body-side rod-type elastic members (main-body-side piano wires) 2B on the main-body side are provided; and each of the corresponding rod-type elastic members 2A, 2B are disposed in the adjacent positions. However, the present invention is not necessarily limited to this. The number of each of the rod-type elastic members 2A, 2B may be three (total of six) provided that they are disposed in a well-balanced manner. Moreover, each of the rod-type elastic members 2A, 2B on the table side and the main-body side as a pair may not necessarily be mounted adjacently to each other.

With this configuration, when moving the movable table 1, each of the rod-type members 2A, 2B is elastically deformed substantially in the same manner for corresponding to the movement of the movable table 1. Thus, as a whole, it functions similar to the table holding mechanism 2 of each above-described embodiment and achieves the similar effect. Further, there may be five or more pairs of the rod-type elastic members 2A, 2B provided in the table holding mechanism 2.

As described above, the embodiment is distinctive in respect that the external shapes of the cross-in-square-shape driving coil in the precision processing stage apparatus are specified.

Specifically, each cross-in-square-shape driving coil is formed with the four small angular coils in quadrangular shapes which can be individually energized, and the overall shape of the combination is formed in a quadrangular shape. Each cross-in-square-shape driving coil is formed with the four small angular coils in triangle shape which can be individually energized, and the overall shape of the combination is formed in a diamond shape. Each cross-in-square-shape driving coil is formed with the four small angular coils in fan shape which can be individually energized, and the overall shape of the combination is formed in a circular shape. Each cross-in-square-shape driving coil is formed with the four small angular coils in pentagonal shape which can be individually energized, and the overall shape of the combination is formed in an octagonal shape. As described, the configuration of the cross-in-square-shape driving coil can be variously altered.

Thus, it is possible to provide the cross-in-square-shape driving coil corresponding to the shape and the configuration of the movable table and other environmental conditions, so that the flexibility of the apparatus can be improved.

Further, it is possible to dispose the braking plate made of a non-magnetic metal material in the end face part of the cross-in-square-shape driving coil on the driven magnet side adjacently to the pole face of the driven magnet, and to fix and mount the braking plate to the fixing plate side.

Therefore, when the auxiliary table to which the four driven magnets are mounted or the movable table rapidly makes a moving action, electromagnetic braking (eddy-current brake) works between each driven magnet and the braking plate. Thereby, the auxiliary table or the movable table is gradually moved by suppressing the sudden moving action.

Also, it is possible to have a configuration in which: an operation control system for restricting the movement of the movable table within the plane is provided along the electromagnetic driving means; and the operation control system comprises the coil driving controller which controls the movement of the movable table in a prescribed direction by selectively controlling energization at least in either the longitudinal direction or the lateral direction of the cross-shape coil sides of a plurality of the cross-in-square-shape driving coils in the electromagnetic driving means to be operable.

Thus, the operation control system effectively functions for driving a plurality of the cross-in-square-shape driving coils so that the movable table can be specifically moved in the prescribed direction.

Further, it is possible to provide an operation control system for restricting the movement of the rotation action of the movable table to the electromagnetic driving means. Thus, it enables to start the coil driving controller according to a command from the operation command input section of the operation control system for retrieving the information of the moving target position and retrieving the prescribed moving control mode from the program storage and the data storage. At the same time, based on this, it enables to drive-control each of a plurality of the cross-in-square-shape driving coils of the electromagnetic driving means for moving the movable table in the prescribed direction.

Moreover, it is also possible to employ a configuration in which: a plurality of moving information detecting sensors which detect and externally output the moving information of the movable table are separately and respectively mounted in a plurality of areas on the peripheral edge part of the movable table; and a positional information arithmetic circuit is provided, which performs arithmetic operation based on the information detected by a plurality of the moving information detecting sensors for specifying the moving directions of the movable table and the amount of change and the like, and outputs it outside as the positional information.

Therefore, the moving information of the movable table or the positional information after the movement can be externally outputted in real-time. Thus, operators can easily recognize the moving direction of the movable table and the positional shift and the like after the movement from the outside, so that necessity of rework or correction can be promptly detected. Thereby, it enables to achieve the moving work of the auxiliary table (that is, the movable table) highly precisely and promptly.

Also, it is also possible to separately and respectively mount a plurality of moving information detecting sensors which detect and externally output the moving information of the movable table in a plurality of areas on the auxiliary table, and to provide a positional information arithmetic circuit which performs arithmetic operation based on the information detected by a plurality of the moving information detecting sensors for specifying the moving direction of the movable table and the amount of change and the like, and outputs it outside as the positional information.

Therefore, the moving information of the movable table or the positional information after the movement can be externally outputted in real-time. Also, operators can easily recognize the moving direction of the movable table and the positional shift and the like after the movement from the outside, so that necessity of rework or correction can be promptly detected. Thereby, it enables to achieve the moving work of the auxiliary table (that is, the movable table) highly precisely and promptly.

Further, it becomes possible to form the driven magnet with the permanent magnet.

Therefore, the energizing circuit required for the electromagnet becomes unnecessary. For this, the configuration can be simplified so that it is possible to improve the productivity and the maintenance characteristic. Thereby, the failure rate of the entire apparatus can be decreased and, in this respect, the durability can be improved.

Tenth Embodiment

FIG. 32 to FIG. 43 show a tenth embodiment of the present invention. In FIG. 32 to FIG. 43, numeral reference 1 is a movable table for precise processing. Numeral reference 2 is a table holding mechanism. The table holding mechanism 2 is disposed in the lower part of the movable table 1 shown in FIG. 32 and configured to allow the movable table 1 to move in an arbitrary direction on a same plane while having the original position returning function for the movable table 1, and to hold the movable table 1 in the state where original position returning force can be applied to the movable table 1 at all times.

The table holding mechanism 2 is supported by the case main body 3 which is the main body part.

Figure 32:
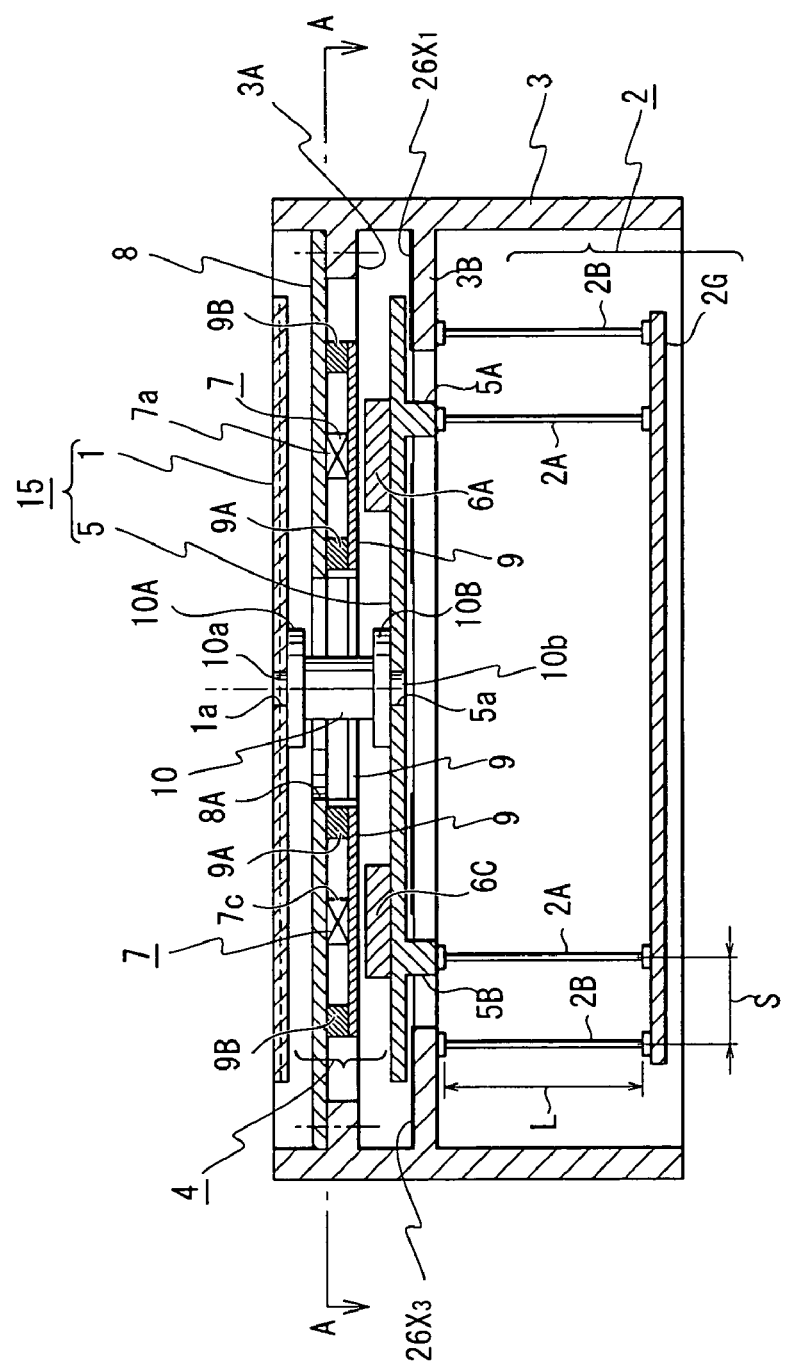
FIG. 32 is a longitudinal cross section showing a tenth embodiment of the present invention.

The case main body 3 according to the embodiment is formed in a box shape with the top and bottom being opened as shown in FIG. 32.

Numeral reference 4 is an electromagnetic driving means for driving the movable table 1. The electromagnetic driving means 4 has a function of applying a prescribed moving force to the movable table 1 according to a command from the outside, with the main part being held by the case main body 3 side. Numeral reference 3A is a driving means holding section which is protruded from the periphery of the inner wall of the case main body 3. The electromagnetic driving means 4 according to the embodiment is disposed between the movable table 1 and an auxiliary table 5 which will be described later.

The auxiliary table 5 is disposed under the movable table 1 as shown in FIG. 32. The auxiliary table 5 is disposed in parallel to the movable table 1 with a prescribed space in between by facing it to be connected to the movable table 1. A movable table unit 15 is formed with the auxiliary table 5 and the movable table 1.

The table holding mechanism 2 is mounted to the auxiliary table 5 side and is constituted to hold the movable table 1 through the auxiliary table 5.

The electromagnetic driving means 4, as will be described later, comprises: four square-shape driven magnets 6A, 6B, 6C, 6D being fixed to be mounted at prescribed positions of the auxiliary table 5; a relatively large single quadrangular ring-shape driving coil 7 as a driving coil by being disposed with each coil sides 7a, 7b, 7c, 7d being opposed to each of the driven magnets 6A–6D; and a fixing plate 8 for holding the ring-shape driving coil 7 at a fixed position.

As shown in FIG. 32, the fixing plate 8 is disposed on the auxiliary table 5 on the movable table 1 side and held by the case main body 3.

The ring-shape driving coil 7 and the fixing plate 8 form a stator part as the main part of the electromagnetic driving means 4.

When the ring-shape driving coil 7 is set in action, it generates the electromagnetic driving force between with each of the driven magnets 6A–6D for repulsively driving each of the driven magnets 6A–6D towards the direction orthogonal to the coil side. Thus, when moving the movable table unit 15 in the direction which does not cross with each of the coil sides 7a–7d (in the slantwise direction with respect to each of the coil sides 7a–7d), the movable table unit 15 is moved by the resultant force of the electromagnetic driving force for at least two or more of the driven magnets 6A–6D as will be described later.

Further, in the coil sides 7a–7d facing each of the driven magnets 6A–6D of the ring-shape driving coil 7, the braking plates 9 made of a non-magnetic metal material are separately provided adjacently to the pole face of each of the driven magnets 6A–6D. The braking plates 9 are fixed to the ring-shape driving coil 7 side (to the fixing plate 8 side in the embodiment) Numeral references 9A, 9B are spacer members for holding the braking plates 9.

In the followings, these will be described in detail.

[Movable Table Unit]

Figure 33:
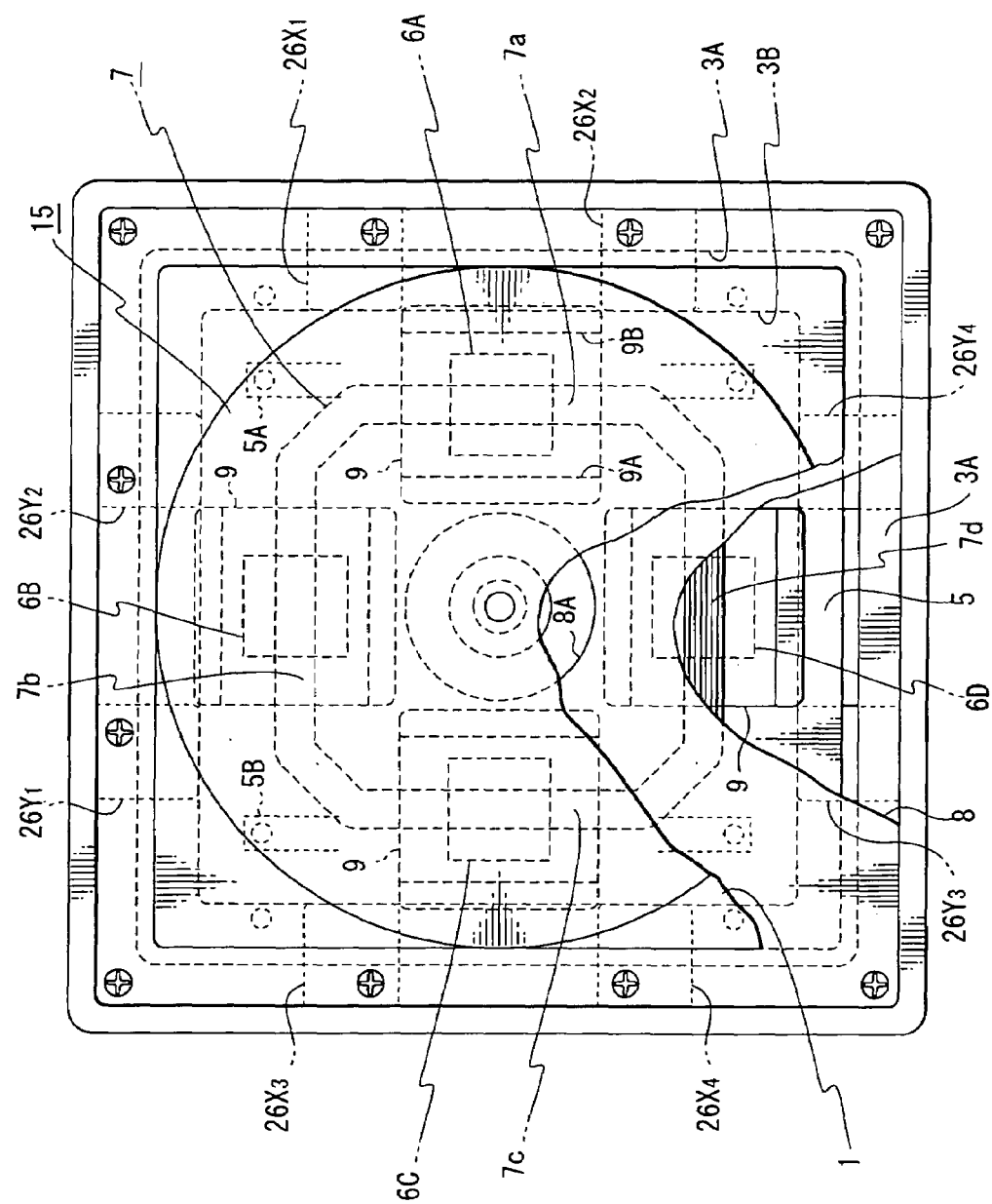
FIG. 33 is a fragmentary plan view of the tenth embodiment shown in FIG. 32.
Figure 34:
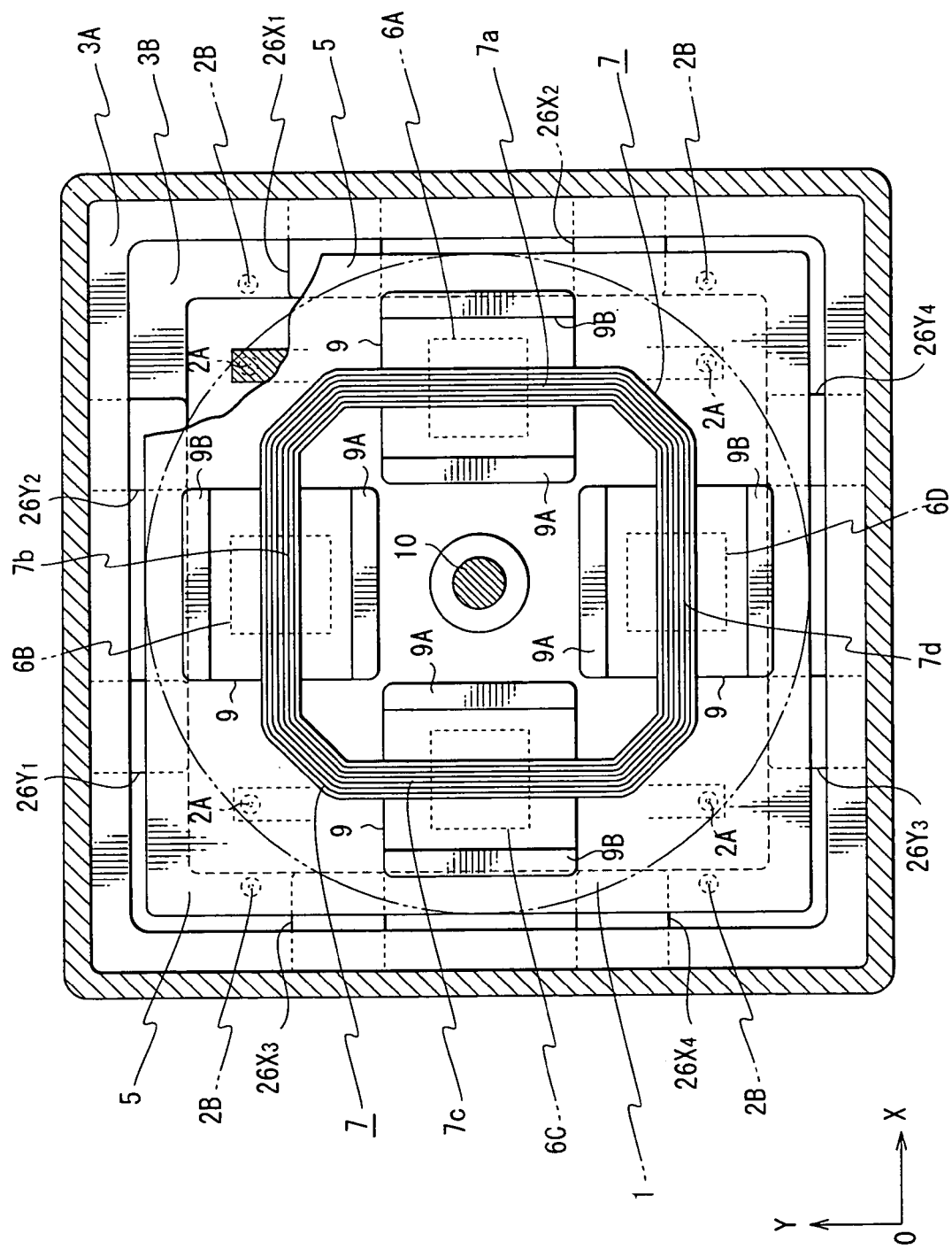
FIG. 34 is a schematic lateral cross section taken along the line A—A of FIG. 32.

First, in FIG. 32 to FIG. 34, the movable table according to the embodiment is formed in a circular shape and the auxiliary table 5 is formed in a quadrangular shape. The auxiliary table 5 is disposed in parallel to the movable table 1 by facing it with a prescribed space in between, while being integrally connected to the movable table 1 through a connecting brace 10 in the center. Thereby, the movable table unit 15 is formed.

Therefore, the movable table 1 can be moved integrally with the auxiliary table 5 while maintaining the parallel state and can be integrally rotated as well.

The connecting brace 10 is a connecting member for connecting the movable table 1 and the auxiliary table 5 as described above. It is formed to have an H-letter shape cross section comprising flange parts 10A, 10B on both end parts. In the center of both end parts on the outer side, provided are protrusions 10a, 10b, which are engaged with positioning holes 1a, 5a formed in each center of the movable table 1 and the auxiliary table 5.

The movable table 1 and the auxiliary table 5 are positioned through the protrusions 10a, 10b and the flange parts 10A, 10B for being fixed to be integrated. For this integration, adhesive is used in the embodiment. However, integration may be achieved by partially connecting them by welding, or the protrusions 10a, 10b may be press-fitted to the positioning holes 1a, 5a and other parts are integrated by adhesive, welding or the like.

Further, either the movable table 1 or the auxiliary table 5 may be screwed to be detachably fixed to the flange part 10A or 10B of the connecting brace 10. In this case, after being screwed, several numbers of knock pins may be driven in between the two parts to be engaged (not shown). Thereby, the movable table 1 and the auxiliary table 5 can be more effectively integrated.

[Table Holding Mechanism]

The table holding mechanism 2 according to the embodiment has a function of, while holding the movable table 1, moving it in any directions at will on the same plane without changing the height position and, at the same time, has an original position retuning function which returns the movable table 1 to the original position when the external force is released. These are carried out through the auxiliary table 5.

The table holding mechanism 2 as a whole is obtained by applying a link mechanism three-dimensionally. Four pairs of two piano wires (table-side piano wires) 2A and (main-body-side piano wires) 2B placed with a prescribed space in between are prepared beforehand as the rod-type elastic members by corresponding to the corner parts on the periphery of the edge portion of the auxiliary table 5. Each pair of the four pairs of piano wires 2A, 2B is provided facing upward direction in each of the four-corner parts of an intermediate plate 2G as the intermediate member formed in a quadrangular shape. As for each of the two piano wires 2A, 2B, used are the ones with the same rigidity.

The piano wires 2A, 2B may be any other members as long as they are rod-type elastic wire materials with a sufficient and appropriate rigidity for supporting the movable table 1 and the auxiliary table 5.

Among each of the piano wires 2A, 2B, the auxiliary table 5 is held from the bottom side through the four piano wires 2A placed on the inner side and the intermediate plate 2G as the intermediate member is suspended to be swingable from the main body part 3 through the four piano wires 2B placed on the outer side.

Thereby, the movable table 15 (that is, the movable table 1 and the auxiliary table 5) is held stably in the air by the intermediate plate 2G and each of the four piano wires (rod-type elastic members) 2A, 2B. Thus, it is movable in any directions at will in the horizontal plane while maintaining the same height position as will be described later. Rotary motion within the same plane can be achieved in substantially the same manner.

The upper end parts of the four table-side piano wires 2A shown in FIG. 32 are fixed to the auxiliary table 5, and the lower end parts are fixed to the intermediate plate 2G. Numeral references 5A, 5B are lower protrusions provided in two areas on the bottom face side of the auxiliary table 5. The fixing positions of the table-side piano wires 2A are set by the lower protrusions 5A, 5B.

Moreover, on the outer side of each of the four table-side piano wires 2A, the respective main-body-side piano wires 2B are provided individually and in parallel to each other with a prescribed space S in between. As for the main-body-side piano wire 2B, the lower end parts are fixed to the intermediate plate (intermediate member) 2G as in the same manner as that of the table-side piano wires 2A, and the upper end parts are fixed to main-body-side protrusions 3B provided in the inner wall of the case main body 3.

Each of these piano wires 2A, 2B is formed with an elastic wire material with a sufficient and appropriate rigidity for supporting the movable table 1 and the auxiliary table 5.

Thereby, first, the movable table 1, together with the auxiliary table 5, is supported by the four table-side piano wires 2A on the inner side over the intermediate plate 2G, and is allowed to move in parallel and to rotate on the plane within the limit of elasticity of the four table-side piano wires 2A according to a principle of the link mechanism.

In the meantime, the intermediate plate 2G is suspended from the main-body-side protrusions 3B by the four table-side piano wires 2B placed on the outer side on the intermediate plate 2G. Thus, it is also allowed to move in parallel with respect to the case main body 3 and to rotate on the plane in the same manner.

Figure 49:
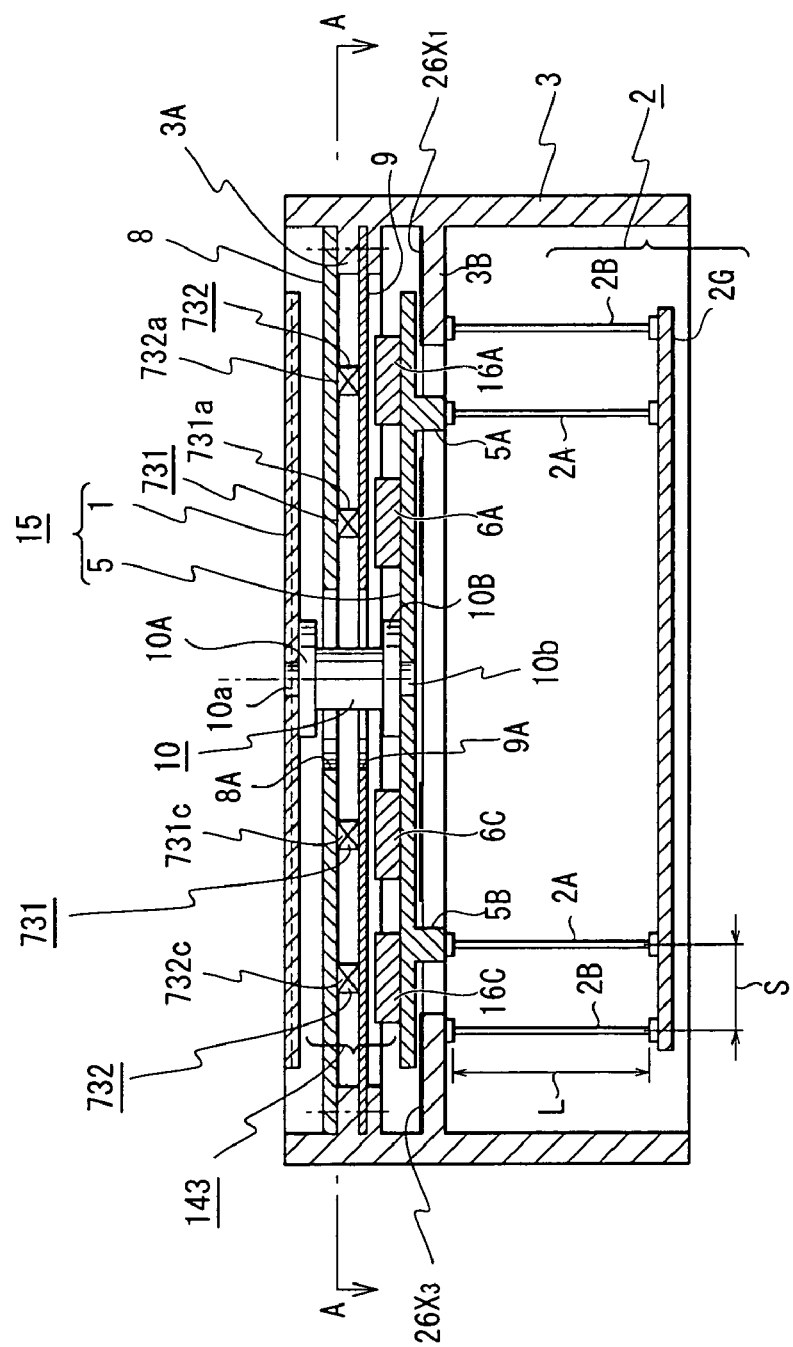
FIG. 49 is a longitudinal cross section showing an embodiment of the present invention.

Therefore, when the auxiliary table 5 (that is, the movable table 1) moves or rotates within the plane upon receiving the external force, each of the piano wires 2A, 2B on the table side and case main body side is elastically deformed simultaneously as shown in FIG. 49, which will be described later, and the intermediate plate 2G moves vertically while maintaining the parallel state. Specifically, when the auxiliary table 5 (that is, the movable table 1) moves or rotates within the plane upon receiving the external force, changes in the height position are absorbed by the intermediate plate 2G.

Thereby, the movable table 1 can move in any directions within the limit of elasticity of each piano wire 2A, 2B while maintaining the same height, when moved by receiving the external force.

In the embodiment, four pairs of the piano wires 2A, 2B on the table side and the case main body side are mounted at substantially the equal intervals, and the table-side piano wires 2A and the case-main-body-side piano wires 2B are adjacently mounted with a prescribed space in between. Therefore, they are well-balanced as a whole in terms of the strength so that the movable table 1 can be moved under the stable state.

Each of the piano wires 2A, 2B on the table side and the case main body side used herein has the same diameter and the same elasticity, and each length L of the exposed portion is set to be completely the same, respectively. Further, each of the piano wires 2A, 2B is disposed, for example, as shown in FIG. 32, FIG. 34, separately on the left and right sides with respect to the Y axis and on the top and bottom sides with respect to the X axis.

In this case, they may be provided in positions other than the positions shown in FIG. 33 as long as they are disposed in the positions to be in line-symmetrical to each other with respect to the X-axis and Y-axis (or each of the piano wires 2A, 2B are disposed substantially at equal intervals as a whole).

Further, by disposing each of the piano wires 2A, 2B, there is elastic stress being generated uniformly in each of the piano wires 2A, 2B for moving the movable table 1. Thus, it is advantageous in respect that the movable table 1 can be smoothly moved including the return of the movable table 1 to the original position.

As described above, in the table holding mechanism 2, all the piano wires 2A, 2B in each pair are identically deformed when, for example, the entire auxiliary table 5 is slide-moved in the same direction. In this case, the main-body-side piano wire 2B is elastically deformed while the end part is being held so that, by the deformation of the table-side piano wire 2A which is elastically deformed in the same manner, the height position of the auxiliary table 5 becomes unchanged. Instead, the height position of the intermediate plate 2G which is commonly supported by the both piano wires 2A, 2B changes.

In other words, the intermediate plate 2G absorbs the change in the height position caused by the deformation of the both piano wires 2A, 2B. Thereby, the auxiliary table 5 (that is, the movable table 1) is slide-moved within the same plane without changing the height as a whole. In this case, when the auxiliary table 5 is released from the driving force, the auxiliary table 5 is returned straight to the original position by the spring action of each piano wire 2A, 2B (actuation of the original position returning function).

Moreover, when the movable table unit 15 is rotationally driven within the same plane (within a prescribed angle range), the movable table unit 15 rotates within the same plane while maintaining substantially the same height as a whole due to the same reasons. In this case, when the auxiliary table 5 is released from the external force, it is also returned straight to the original position by the spring action of each piano wire 2A, 2B (actuation of the original position returning function).

The table holding mechanism 2 has been described by referring to the case where eight of both piano wires 2A, 2B in four pairs are mounted thereto. However, it may be formed with six wires in two pairs by disposing both piano wires 2A, 2B appropriately in a well-balanced manner (for example, at equal intervals). In this case, among the six piano wires 2A, 2B in three pairs, the piano wires 2A, 2B in a pair may be disposed adjacent to each other, while the three pairs of the piano wires 2A, 2B are being provided at substantially the equal intervals (disposed in three areas at equal intervals) as a whole. Further, five pairs or more of the piano wires 2A, 2B may be mounted.

[Electromagnetic Driving Means]

The electromagnetic driving means 4 according to the embodiment comprises: four driven magnets (electromagnets are used in this embodiment) 6A–6D mounted on the auxiliary table 5; a ring-shape driving coil 7 as a driving coil for generating a prescribed electromagnetic force to the movable table 1 towards a prescribed moving direction through each of the driven magnets 6A–6D; and a fixing plate 8 for holding the ring-shape driving coil 7.

As shown in FIG. 32, the fixing plate 8 is mounted to the auxiliary table 5 on the movable table 1 side (between the auxiliary table 5 and the movable table 1) and its periphery is fixed to the case main body 3 to be mounted thereto. As for the fixing plate 8, only the both end parts on the left and right sides in FIG. 32 may be held by the case main body 3.

In the center of the fixing plate 8, formed is a through-hole 8A for allowing the parallel movement of the connecting brace 10 within a prescribed range. Although the through-hole 8A according to the embodiment is formed in a circular shape, it may be formed in a quadrangular shape or other shapes.

As for the fixing plate 8, a part or the entire periphery is connected and held by the main-body-side protrusion 3. In this case, for achieving strong integration, the fixing plate 8 and a main-body-side protrusions 3A may be integrated by knock pins or the like after being screwed, or may be integrated by welding or the like.

With this, it is possible to smoothly correspond to the displacement or shift of the movable table 1 by micron (p) unit without generating a position shift of the fixing plate 8 with respect to the case main body 3.

The ring-shape driving coil 7 is disposed on the X-Y plane whose origin is the center of the coil holding surface of the fixing plate 8, in such a manner that its center coincides with the origin. Each of the driven magnets 6A–6D is individually disposed by corresponding to each of the coil sides 7a, 7b, 7c, 7d of the driving coil 7 crossing with the X axis and Y axis.

That is, as for the four driven magnets 6A to 6D according to the embodiment, as shown in FIG. 33 and FIG. 34, used are electromagnets with the quadrangular magnetic pole end surface (the surface opposing the each coil side of the ring-shape driving coil 7). They are respectively provided and fixed on the X-Y plane assumed on the top face of the auxiliary table 5 at the positions on the X axis and Y axis at an equal distance from the center.

Therefore, in the embodiment, for example, when energization of the ring-shape driving coil 7 is started after specifying the energizing direction, as will be described later, first, a prescribed operating current is energized to a part or all of the four driven magnets 6A–6D correspondingly. Thereby, the magnetic poles (the north pole, south pole or no magnetic pole) are set according to the moving direction of the movable table unit 15. At the same time, the magnitudes of the magnetic force of each driven magnets 6A–6D including the ring-shape driving coil 7 are adjusted by the enerigization control. Thereby, the movable table unit 15 is moved in a prescribed direction.

The moving direction of each of the driven magnets 6A–6D is a direction orthogonal to each of the coil sides 7a–7d (that is, the outward direction from the origin on the X-Y plane). Thus, there is no rotation-drive generated to the movable table unit 15 and the movement is restricted to be 360° directions on the same plane.

Figure 37:
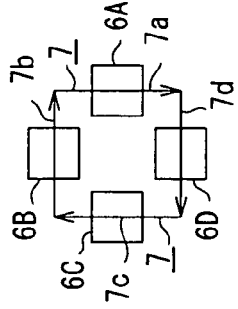
FIG. 37 is a diagram showing the control contents of a plurality of energizing control modes $A_1$–$A_4$ executed by the table driving control means of the tenth embodiment disclosed in FIG. 35 and the moving directions (transporting directions of the movable table) of the entire driven magnets.

The action of the electromagnetic driving means 4 (energize-drive to the ring-shape driving coil 7 and four driven magnets 6A–6D) in regards to the driving direction and driving moving force for the movable table unit 15 will be described in detail in FIG. 37 and FIG. 38. FIG. 37 and FIG. 38 are illustrated on assumption that there is no rotation-drive by energizaton of the driving coil.

[Ring-Shape Driving Coil]

The quadrangular ring-shape driving coil 7 constituting the main part of the electromagnetic driving means 4 is formed in an octagonal shape with the corner parts being cut off as shown in FIG. 33 and FIG. 34. As a whole, it is formed in an angular shape comprising the four coil sides 7a, 7b, 7c, 7d.

Therefore, it is possible to output the electromagnetic force (reaction force) to each of the driven magnets 6A–6D according to Fleming's left-hand rule for pressing each of the driven magnets 6A, 6B, 6C or 6D in a prescribed direction (the direction orthogonal to the coil sides 7a, 7b, 7c or 7d) through specifying the energizing direction of each of the coil sides 7a–7d by an operation control system 20 which will be described later and, accordingly, carrying out a variable-control (including energization-stop control) of the energizing direction and the magnitude of the current flown into the four driven magnets 6A to 6D.

Further, by selecting and combining the directions of the electromagnetic forces generated in the four driven magnets 6A–6D beforehand, it is possible to set the resultant force of the electromagnetic driving forces generated in the four driven magnets 6A–6D to be in the transporting direction of the movable table unit 15. Thereby, the moving force can be supplied to the movable table unit 15 to be moved in the arbitrary direction on the X-Y plane.

A series of energizing control methods for the four driven magnets 6A–6D will be described in detail in the description of a program storage 22 (FIG. 37–FIG. 38) which will be described later.

On the outer side and inner side of the ring-shape driving coil 7 on the same plane, a magnetic material such as ferrite may be filled at least up to the height same as the height (in the Y axis direction) of the ring-shape driving coil 7 and within a range covering the operation range of the driven magnets 6A–6D.

[Positional Information Detecting Means]

The moved position of the movable table unit 15 driven by the electromagnetic driving means 4 is detected by a positional information detecting means 25.

Figure 35:
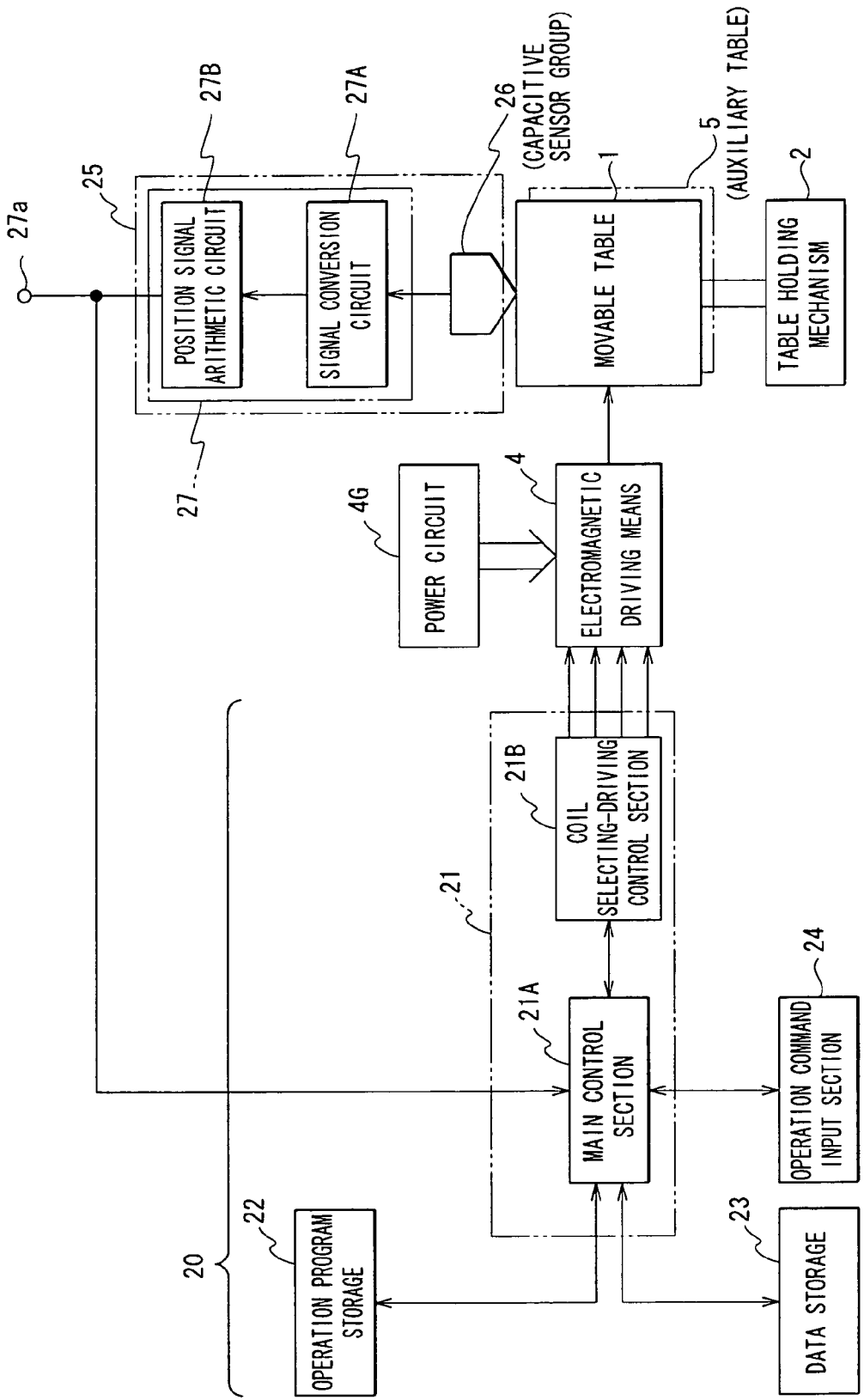
FIG. 35 is a block diagram showing the entire apparatus including the operation control system according to the tenth embodiment disclosed in FIG. 32.

As shown in FIG. 35, the positional information detecting means 25 according to the embodiment has a configuration comprising: a capacity sensor group 26 (refers to the entire capacitance detection electrodes 26X1–26X4 as a whole) having a plurality of capacitive detection electrodes; and a positional information arithmetic circuit (arithmetic operation unit) 27 which converts a plurality of capacity change components detected by the capacity sensor group 26 into voltage and transmits the voltage to a table driving control means 21 of the operation control system 20 (which will be described later) as a positional change information after carrying out a prescribed arithmetic operation.

The positional information arithmetic circuit 27 comprises: a signal conversion circuit 27A for individually converting a plurality of the capacity change components detected by the capacity sensor group 26 into the voltage; and a position signal arithmetic circuit 27B which converts the voltage signals of a plurality of the capacity change components converted by the signal conversion circuit 27 to a position signal VX in the X direction and a position signal VY in the Y direction for indicating the position on the X-Y coordinates by carrying out a prescribed arithmetic operation, and also outputs a rotation angle signal θ by carrying out the arithmetic operation.

As shown in FIG. 32 to FIG. 34, the capacity sensor group 26 comprising a plurality of capacity sensors comprises: eight angular capacity detection electrodes 26X1, 26X2, 26X3, 26X4, 26Y1, 26Y2, 26Y3, 26Y4 provided on the top face of the main-body-side protrusions 3B with a prescribed space in between by facing the bottom face part of the periphery of the auxiliary table 5; and a common electrode (not shown) with a relatively wide width being provided to the bottom face part of the periphery of the auxiliary table 5 by corresponding thereto.

The position detecting sensor is formed with a combination of a plurality of the capacity detection electrodes 26X1, 26X2, 26X3, 26X4, 26Y1, 26Y2, 26Y3, 26Y4 and the common electrode (not shown). However, for the conveniences' sake, the capacity detection electrodes 26X1, 26X2, 26X3, 26X4, 26Y1, 26Y2, 26Y3, 26Y4 are considered as the position detecting sensor herein.

Among each of the above-described capacity detection electrodes (position detecting sensors) 26X1, 26X2, 26X3, 26X4, 26Y1, 26Y2, 26Y3, 26Y4, a pair of the capacity detection electrodes (position detecting sensors) 26X1, 26X2 are mounted vertically in the right-end part in FIG. 33 and FIG. 34 with a prescribed space in between, while another pair of the capacity detection electrodes (position detecting sensors) 26X3, 26X4 are mounted vertically in the left-end part in FIG. 33 and FIG. 34 with a prescribed space in between.

Further, among each of the above-described capacity detection electrodes 26X1, 26X2, 26X3, 26X4, 26Y1, 26Y2, 26Y3, 26Y4, a pair of the capacity detection electrodes (position detecting sensors) 26Y1, 26Y2 are mounted laterally in the upper-end part in FIG. 33 and FIG. 34 with a prescribed space in between, while the capacity detection electrodes (position detecting sensors) 26Y3, 26Y4 are mounted laterally in the lower-end part in FIG. 33 and FIG. 34 with a prescribed space in between.

That is, each of the eight capacity detection electrodes (position detecting censors) 26X1–26X4, 26Y1–26Y4 according to the embodiment is respectively disposed on the positions line-symmetrically with respect to the X axis and Y axis as shown in FIG. 33 and FIG, 34.

Figure 36:
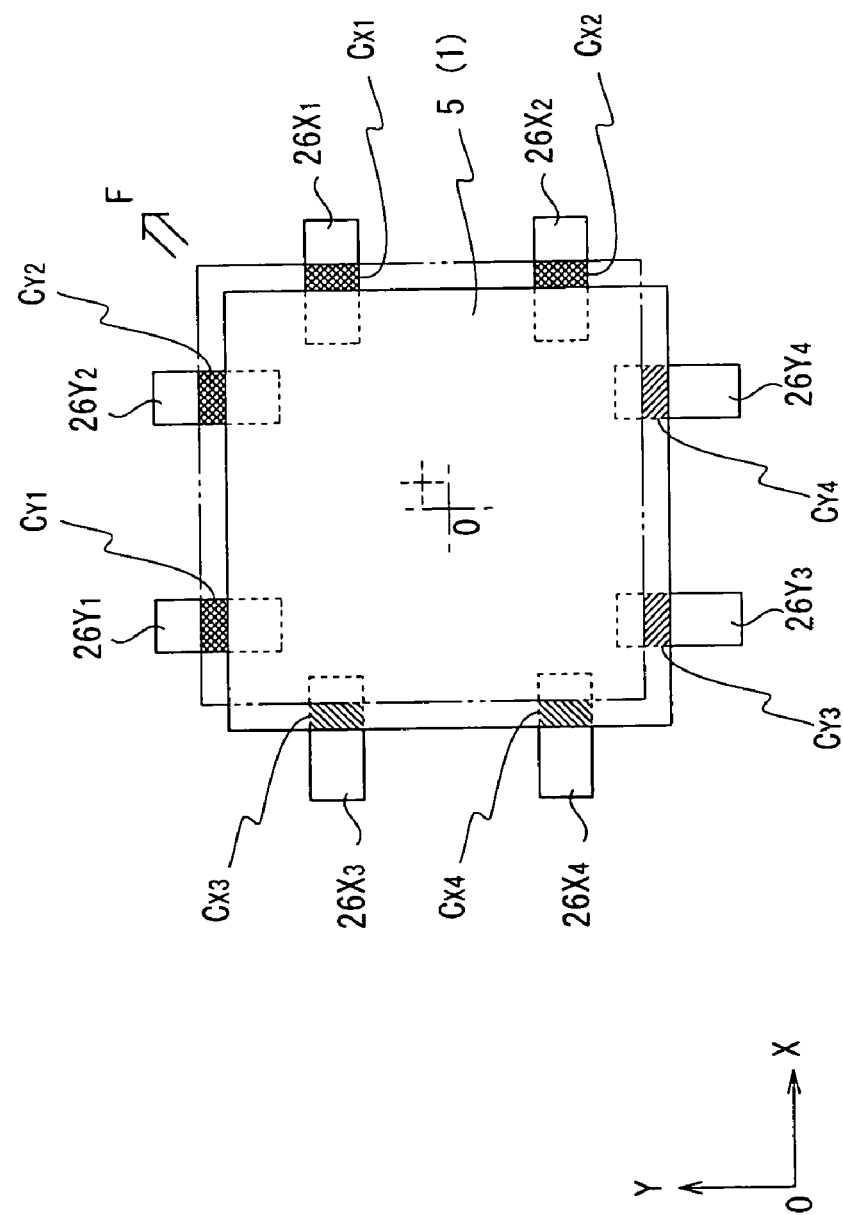
FIG. 36 is an explanatory illustration showing the relation between the operation of the auxiliary table disclosed in FIG. 32 and a capacity detection electrode for detecting positional information.

For example, when the movable table unit 15 is moved in a direction of arrow F (in the upper-right direction in the figure) as shown in FIG. 36 forced by the electromagnetic driving means 4, in the embodiment, the capacity change components detected by the capacity detection electrodes 26X1, 26X2 (26Y1, 26Y2) on one side and the capacity detection electrodes 26X3, 26X4 (26Y3, 26Y4) on the other side positioned on both sides (and in vertical direction) of the auxiliary table 5 are transmitted to the position signal arithmetic circuit 27B after being converted to voltage by the signal conversion circuit 27A. Then, each of the converted voltage is inputted in the position signal arithmetic circuit 27B for being differentially is outputted as the position signal VX in the X direction and the position signal VY in the Y direction.

When the movable table unit 15 is rotated on the same plane by an external force or a malfunction of the electromagnetic driving means 4, in the embodiment, each section operates and functions in the same manner as that of the above-described case for differentially outputting a prescribed rotation angle signal E by converting the change components into the voltage. In this case, actually, the malfunction of the movable table unit 15 is detected by the operation control system 20 which will be described later and the correcting operation is to be carried out.

At this time, each of the eight capacity detection electrodes (position detecting sensors), along with the movement of the movable table unit 15, detects the capacity change in real-time and output it to the positional information arithmetic circuit (arithmetic operation unit) 27. The positional information arithmetic circuit (arithmetic operation unit) 27 specifies the moving direction and the moving amount of the movable table unit 15 based on the information from the eight sensors.

In this case, for example, when there is no capacity change observed along the Y direction by two pairs (four) of each position detecting sensor mounted to cross at right angles with the Y axis, it means that the movable table has moved along the X direction (without rotary motion). At the same time, the moving amount can be specified by detecting increase/decrease of the capacity in two pairs of the position detecting sensor 26X1, 26X2, and 26X3, 26X4 in the X axis direction.

Moreover, when the both position detecting sensors in the X-axis direction and Y-axis direction detect the same capacity change, it means that, as shown in FIG. 36, the movable table 1 has moved in a direction at 45° (with no rotary motion) in the positive direction of the X axis within a first quadrant. The moving direction is judged by the pattern of increase/decrease in the capacity of each position detecting sensor, and the moving amount is specified by the amount of the change in the capacity of each position detecting sensor.

Specification of the moving direction by the pattern of the changes in the capacity of each position detecting sensor, and the relation between the amount of the change in the capacity of each position detecting sensor and the moving amount of the movable table 1, for example, may be experimentally specified beforehand and put into a map to be stored in a memory or the like, so that the position shift and the like can be judged based on this. Thereby, arithmetic processing can be promptly carried out.

Further, in the embodiment, the noise applied simultaneously to each capacity detection electrode on the left and right sides (and top and bottom) in FIG. 34 can be cancelled by the differential output (for example, obtaining the difference in the capacity change detected by the capacity detection electrodes disposed in one end and the other end in the X-axis direction: external noise eliminating function). At the same time, after converting the measured value to the voltage, the change amount is added as in, for example, [(+vX)−(−vX)=2vX] to be outputted. Therefore, it is advantageous in respect that the positional information of the auxiliary table 5 (movable table 1) can be outputted in highly sensitive manner.

[Operation Control System]

In the embodiment, provided to the electromagnetic driving means 4 is an operation control system 20 which restricts the movement or the rotation of the movable table unit 15 by individually drive-controlling the ring-shape driving coil 7 and each of the four driven magnets 6A–6D (see FIG. 35).

The operation control system 20 comprises: an energizing direction setting function for setting and maintaining the energizing direction for the ring-shape driving coil 7 in a prescribed direction (in one direction or other); a driving coil energizing control function for variably setting the magnitude of the current flown into the ring-shape driving coil 7; a magnetic pole individual setting function which operates according to the energizing direction of the ring-shape driving coil 7 for individually setting and maintaining the magnetic poles of the driven magnets 6A–6D; and a table action control function which individually and variably sets (sets by variably controlling the flown current) the magnitude of the magnetic force of each of the driven magnets 6A–6D according to a command from outside and, at the same time, adjusts the transporting direction and transporting force for the movable table unit 15 thereby.

For carrying out the functions described above, the operation control system 20 comprises: a table driving control means 21 which individually drives the ring-shape driving coil 7 and each of the driven magnets 6 of the electromagnetic driving means 4 according to a prescribed energizing control mode for controlling the movement of the movable table unit 15 in a prescribed direction; a program storage 22 being provided along with the table driving control means 21, to which a plurality of control programs for a plurality of control modes (eight energizing control modes A1–A8 in the embodiment) in which the moving direction, moving amount and the like of the movable table 1 are specified are provided; and a data storage 23 to which prescribed data and the like used at the time of executing each control program are stored (see FIG. 35).

Further, in the table driving control means 21, provided is an operation command input section 24 for giving a command of a prescribed control operation to the ring-shape driving coil 7 and each of the driven magnets 6A–6D. Moreover, the positional information of the movable table 1 during the movement and after the movement is detected by the positional information detecting means 25 and arithmetic-processed to be transmitted to the table driving control means 21.

The various control functions of the operation control system 20 are comprehensively contained in a plurality of the energizing control modes A1–A8 in the program storage 22. They are selected according to a selection command inputted through the operation command input section 24 from outside. Through the selected prescribed control modes A1–A8, the various control functions are started and carried out and, according to the command from outside, the movable table 1 is moved in a prescribed direction.

This will be described in more detail.

The table driving control means 21 according to the embodiment comprises: a main control section 21A which operates according to the command from the operation command input section 24 and has a function of selecting a prescribed control mode from the program storage 22 and of energize-controlling a prescribed direct current including zero to the ring-shape driving coil 7 and each of the four driven magnets 6A–6D; and a coil selection driving control section 21B which has a function of drive-controlling the ring-shape driving coil 7 and the four driven magnets 6A–6D simultaneously or separately according to the prescribed control mode (A1–A8) selected and set by the main control section 21A.

Moreover, the main control section 21A also has a function of calculating the position of the movable table 1 according to the input information from the positional information detecting means 25 for detecting the table position or carrying out other various arithmetic operations.

Numeral reference 4G is a power circuit for supplying a prescribed current to the ring-shape driving coil 7 and each of the four driven magnets 6A–6D of the electromagnetic driving means 4.

Further, the table driving control means 21 comprises: a position shift calculating function which is for carrying out a prescribed arithmetic operation through inputting the information from the positional information detecting means 25 and, based on this, calculating the difference between with the reference position information of the target position which is set beforehand by the operation command input section 24; and a table position correcting function which controls to transport the movable table unit 15 to the reference position of the target position which is set beforehand by driving the electromagnetic driving means 4 based on the calculated position shift information.

Thus, in the tenth embodiment, when the moving direction of the movable table unit 15 is shifted by disturbance or the like, the movable table unit 15 is controlled to be transported in a prescribed direction by correcting the position shift. Thereby, the movable table unit 15 is transported to the target position set beforehand promptly and in highly precise manner. In this case, correction of the position shift is carried out by adjusting the current flown into each of the driven magnets 6A–6D which is being energized to be driven.

[Program Storage]

The table driving control means 21 is configured to drive-control the ring-shape driving coil 7 and each of the four driven magnets 6A–6D of the electromagnetic driving means 4 separately with a prescribed relation therebetween according to a prescribed control program (a prescribed control mode) which is stored beforehand in the program storage 22.

Specifically, in the embodiment, stored in the program storage 22 are: a driving coil control program which specifies the energizing direction for the ring-shape driving coil 7 and variably sets the magnitude of the flown current; and a plurality of magnet control programs which function when the energizing direction for the ring-shape driving coil 7 is specified, for specifying, correspondingly, the energizing directions of each of the four driven magnets (electromagnets) individually as well as the north pole or the south pole of the magnetic pole, while variably setting the magnitude of the flown current including the non-energization. At the same time, the operation timing of each control program is arranged in a group of eight energizing control modes A1–A8 and stored (see FIG. 37, FIG. 38).

Now, the group of eight energizing control modes A1–A8 according to the tenth embodiment will be described by referring to FIG. 37 and FIG. 38.

FIG. 37 shows examples (in diagram) of each of the energizing control modes A1–A4 in the case where the movable table unit 15 is moved in the positive or negative direction of the X axis or the positive or negative direction of the Y axis, respectively.

In FIG. 37, in each of the energizing control modes A1–A4 of the embodiment, the energizing direction of the direct current for the ring-shape driving coil 7 is set in clockwise direction as indicated by an arrow A.

(Control Mode A1)

The control mode A1 according to the tenth embodiment is an example of the energizing control mode for transporting the movable table 1 in the positive direction of the X axis (see FIG. 37).

In the control mode A1, the driven magnets 6B, 6D on the Y axis are controlled to stop energization, and the end face part of the driven magnet 6A on the X axis facing the coil side 7a is set to be the north pole while the end face part of the driven magnet 6C on the X axis facing the coil side 7c is set to be the south pole.

Therefore, in the coil sides 7a, 7c of the ring-shape driving coil 7, the electromagnetic driving force is generated in the coil sides 7a, 7c in the directions indicated by dotted-line arrows. At the same time, by the reaction force (since the ring-shape driving coil 7 is fixed), the driven magnets 6A, 6C are repulsively driven in the direction indicated by a solid-line arrow (in the right direction in the figure). Thereby, the movable table unit 15 is transported in the positive direction on the X axis.

(Control Mode A2)

The control mode A2 according to the tenth embodiment is an example of the energizing control mode for transporting the movable table 1 in the negative direction of the X axis (see FIG. 37).

The control mode A2 differs from the control mode A1 in respect that the setting of the magnetic poles of the driven magnets 6A, 6C on the X axis are reversed. In other respects, it is the same as that of the control mode A1.

Therefore, in the coil sides 7a, 7c of the ring-shape driving coil 7, the electromagnetic driving force is generated in the coil sides 7a, 7c in the directions opposite to the case of the control mode A1 by the same principle. At the same time, by the reaction force, the driven magnets 6A, 6C are repulsively driven in the direction indicated by a solid-line arrow (in the left direction in the figure). Thereby, the movable table unit 15 is transported in the negative direction on the X axis.

(Control Mode A3)

The control mode A3 is an example of the energizing control mode for transporting the movable table 1 in the positive direction of the Y axis (see FIG. 37).

In the control mode A3, the driven magnets 6A, 6C on the X axis are controlled to stop energization, and the end face part of the driven magnet 6B on the Y axis facing the coil side 7b is set to be the north pole while the end face part of the driven magnet 6D on the Y axis facing the coil side 7d is set to be the south pole.

Therefore, in the coil sides 7b, 7d of the ring-shape driving coil 7, the electromagnetic driving force is generated in the coil sides 7b, 7d in the directions indicated by dotted-line arrows. At the same time, by the reaction force (since the ring-shape driving coil 7 is fixed), the driven magnets 6B, 6D are repulsively driven in the direction indicated by a solid-line arrow (in the upward direction in the figure) Thereby, the movable table unit 15 is transported in the positive direction on the Y axis.

(Control Mode A4)

The control mode A4 is an example of the energizing control mode for transporting the movable table 1 in the negative direction of the Y axis (see FIG. 37).

The control mode A4 differs from the control mode A3 in respect that the setting of the magnetic poles of the driven magnets 6B, 6D on the Y axis are reversed. In other respects, it is the same as that of the control mode A3.

Therefore, in the coil sides 7b, 7d of the ring-shape driving coil 7, the electromagnetic driving force is generated by the same principle as that of the control mode A3. By the reaction force, the driven magnets 6B, 6D are repulsively driven in the direction indicated by a solid-line arrow (in the downward direction in the figure). Thereby, the movable table unit 15 is transported in the negative direction on the Y axis.

Subsequently, described are examples (in a diagram) of each of the control modes A5–A8 in the case where the movable table unit 15 is transported in each of the four quadrant directions on the X-Y coordinates. FIG. 38 shows the diagram.

In FIG. 38, in each of the energizing control modes A5–A8 of the embodiment, the energizing direction of the direct current for the ring-shape driving coil 7 is set in clockwise direction as indicated by an arrow A.

(Control Mode A5)

The control mode A5 is an example of the energizing control mode for transporting the movable table 1 in the first quadrant direction on the X-Y plane coordinates (see FIG. 38).

In the control mode A5, each of the four driven magnets 6A–6D is set in the state to be simultaneously energize-controlled. As for the north pole and south pole, the magnetic pole on the end face part in the area facing the coil sides 7a, 7b of the ring-shape driving coil 7 is set to be the north pole while the magnetic pole on the end face part in the area facing the coil sides 7c, 7d of the ring-shape driving coil 7 is set to be the south pole, respectively.

Therefore, each of the coil sides 7a–7d of the ring-shape driving coil 7 is energized to be in the state similar to the case where the control modes A1 and A3 operate simultaneously. Thus, the resultant force is directed in the first quadrant direction as shown in the section of the control mode A5 in FIG. 38. Thereby, the movable table unit 15 is transported towards the first quadrant direction on the X-Y plane coordinates.

The transporting angle θ towards the first quadrant with respect to the X axis can be variably set at will by changing the electromagnetic driving force working on each of the driven magnets 6A–6D through variably controlling the magnitude of the current flown into each of the driven magnets 6A–6D. Thereby, the movable table unit 15 can be transported at will in an arbitrary direction of the first quadrant direction.

(Control Mode A6)

The control mode A6 is an example of the energizing control mode for transporting the movable table 1 in the third quadrant direction (the direction opposite to the first quadrant direction) on the X-Y plane coordinates (see FIG. 38).

In the control mode A6, each of the four driven magnets 6A–6D is set in the state to be simultaneously energize-controlled. The north pole and south pole are set completely reversed from the case of the control mode A5.

Therefore, each of the coil sides 7a–7d of the ring-shape driving coil 7 is energized to be in the state similar to the case where the control modes A2 and A4 operate simultaneously. Thus, the resultant force is directed in the third quadrant direction as shown in the section of the control mode A6 in FIG. 38. Thereby, the movable table unit 15 is transported towards the third quadrant direction on the X-Y plane coordinates.

The transporting angle θ towards the third quadrant with respect to the X axis can be variably set at will by changing the electromagnetic driving force working on each of the driven magnets 6A–6D through variably controlling the magnitude of the current flown into each of the driven magnets 6A–6D. Thereby, the movable table unit 15 can be transported at will in an arbitrary direction of the third quadrant direction.

(Control Mode A7)

The control mode A7 is an example of the energizing control mode for transporting the movable table 1 in the second quadrant direction of the X-Y plane coordinates (see FIG. 38).

In the control mode A7, each of the four driven magnets 6A–6D is set in the state to be simultaneously energize-controlled. As for the north pole and south pole, the magnetic pole on the end face part in the area facing the coil sides 7b, 7c of the ring-shape driving coil 7 is set to be the north pole while the magnetic pole on the end face part in the area facing the coil sides 7c, 7a of the ring-shape driving coil 7 is set to be the south pole, respectively.

Therefore, each of the coil sides 7a–7d of the ring-shape driving coil 7 is energized to be in the state similar to the case where the control modes A2 and A3 operate simultaneously. Thus, the resultant force is directed in the second quadrant direction as shown in the section of the control mode A7 in FIG. 38. Thereby, the movable table unit 15 is transported towards the second quadrant direction on the X-Y plane coordinates.

The transporting angle θ towards the second quadrant with respect to the X axis can be variably set at will by changing the electromagnetic driving force working on each of the driven magnets 6A–6D through variably controlling the magnitude of the current flown into each of the driven magnets 6A–6D. Thereby, the movable table unit 15 can be transported at will in an arbitrary direction of the second quadrant direction.

(Control Mode A8)

The control mode A8 is an example of the energizing control mode for transporting the movable table 1 in the fourth quadrant direction (the direction opposite to the first quadrant direction) on the X-Y plane coordinates (see FIG. 38).

In the control mode A8, each of the four driven magnets 6A–6D is set in the state to be simultaneously energize-controlled. The north pole and south pole are set completely reversed from the case of the control mode A7.

Therefore, each of the coil sides 7a–7d of the ring-shape driving coil 7 is energized to be in the state similar to the case where the control modes A1 and A4 operate simultaneously. Thus, the resultant force is directed in the fourth quadrant direction as shown in the section of the control mode A8 in FIG. 7. Thereby, the movable table unit 15 is transported towards the fourth quadrant direction on the X-Y plane coordinates.

The transporting angle θ towards the fourth quadrant with respect to the X axis can be variably set at will by changing the electromagnetic driving force working on each of the driven magnets 6A–6D through variably controlling the magnitude of the current flown into each of the driven magnets 6A–6D. Thereby, the movable table unit 15 can be transported at will in an arbitrary direction of the fourth quadrant direction.

[Braking Plate]

In the positions on each of the coil sides 7a–7d of the ring-shape driving coil 7, which oppose and are adjacent to the pole faces of each of the four driven magnets 6A–6D, as shown in FIG. 32 to FIG. 34, metallic braking plates 9 made of non-magnetic material are respectively fixed to be mounted to the ring-shape driving coil 7 side in the state being insulated from the peripherals.

The braking plate 9 comprises a function of slowly moving the movable table unit 15 by suppressing a sudden moving action of the movable table unit 15. FIG. 39 shows the operation principle.

FIG. 39(A) is a fragmentary sectional view of FIG. 32 showing the braking plate 9. Also, FIG. 39(B) is a plan view (illustration for describing the operation principle) taken along the arrow of A—A line in FIG. 39(A).

When the movable table unit 15 to which the four driven magnets 6A–6D are mounted rapidly makes a moving action, electromagnetic braking (eddy-current brake) in the magnitude proportional to the moving speed works between each of the driven magnets 6A–6D and each of the corresponding braking plates 9. Thereby, the movable table unit 15 is gradually moved by suppressing the sudden moving action.

Specifically, in FIG. 39, the braking plate 9 is fixed to the coil side 7a part of the ring-shape driving coil 7 by facing the north pole of the driven magnet 6A. Numeral references 9A, 9B are spacer members for fixing the braking plate 9. In the embodiment, the spacer members 9A, 9B are formed with non-conductive members.

When the auxiliary table 5 rapidly moves at a speed V1 in the right direction of the figure, relatively, the metallic braking plate 9 (since it is fixed) rapidly moves at the same speed V2 (=V1) in the left direction of the figure. Thereby, the electromotive force EV in the magnitude proportional to that of the speed V2 is generated inside the braking plate 9 in the direction (upward direction in the figure) shown in FIG. 39(B) according to Fleming's right-hand rule. Thereby, eddy current which is in bilateral symmetry flows in the directions of the same arrows. The magnitude of the eddy current is also proportional to the speed V2.

Next, since there is magnetic flux from the north pole present in the region where the electromotive force EV is generated, a prescribed moving force f1 is generated inside the braking plate 9 (towards the right direction in the figure) between the magnetic flux of the driven magnets 6A–6D and the eddy current (in the direction of the electromotive EV) inside the braking plate 9 according to Fleming's left-hand rule.

In the meantime, since the braking plate 9 is fixed on the fixing plate 8, the reaction force f2 of the moving force f1 is generated on the driven magnets 6A–6D as the braking force and the direction becomes reversed from that of the moving force f1. That is, the braking force f2 is in the reverse direction from that of the initial rapid-movement of the driven magnets 6A–6D (that is, the auxiliary table 5) and, in addition, the magnitude is proportional to the moving speed of the auxiliary table 5. Therefore, the rapid movement of the auxiliary table 5 is suppressed by an appropriate magnitude of braking force f2 to be smoothly moved under the stable state.

A prescribed braking force f2 is also generated in other braking plates 9 in completely the same manner.

Thus, in the auxiliary table 5 comprising the driven magnets 6A–6D, a reciprocal movement is likely to be generated at a stop position at the time of, for example, making a sudden stop. However, the movement is appropriately suppressed by the braking force f2 for achieving a smooth and slow movement. That is, overall, each braking plate 9 effectively functions so that it enables to achieve an apparatus comprising the movable table unit 15 which moves under the stable state. Also in the case where the movable table unit 15 is reciprocally and slightly oscillated by oscillation from the outside, it also functions in the same manner for effectively suppressing the reciprocal and slight oscillation.

Moreover, each braking plate 9 comprises a function of releasing the heat generated at the time of driving each ring-shape driving coil 7. In this respect, it is possible to set the supplied current in substantially the constant level for a long time through effectively suppressing an increase in the resistance and a decrease in the supplied current value (that is, a decrease in the electromagnetic driving force) at a high temperature caused by a continuous operation of the ring-shape driving coil. Thus, the current control from outside for the electromagnetic driving force outputted from the electromagnetic driving means can be continued under the stable state and the secular change (dielectric breakdown by the heat) can be effectively suppressed. Thereby, the durability of the entire apparatus and, moreover, the reliability of the entire apparatus can be improved.

[Overall Action]

Next, the overall action of the tenth embodiment will be described.

In FIG. 35, first, when an operation command for moving the movable table 1 to a prescribed position is inputted to the operation control system 20 from the operation command input section 24, the main control section 21A of the table driving control means 21 is immediately started and the reference positional information of the target position is selected from the data storage 23 according to the operation command. At the same time, the control program for a corresponding prescribed control mode (the control programs for one of A1–A8) is selected from the program storage 22. Subsequently, the coil selection driving control section 21B is started for drive-controlling a single ring-shape driving coil 7 and the four driven magnets 6A–6D of the electromagnetic driving means 4 according to a prescribed control mode.

Figure 40:
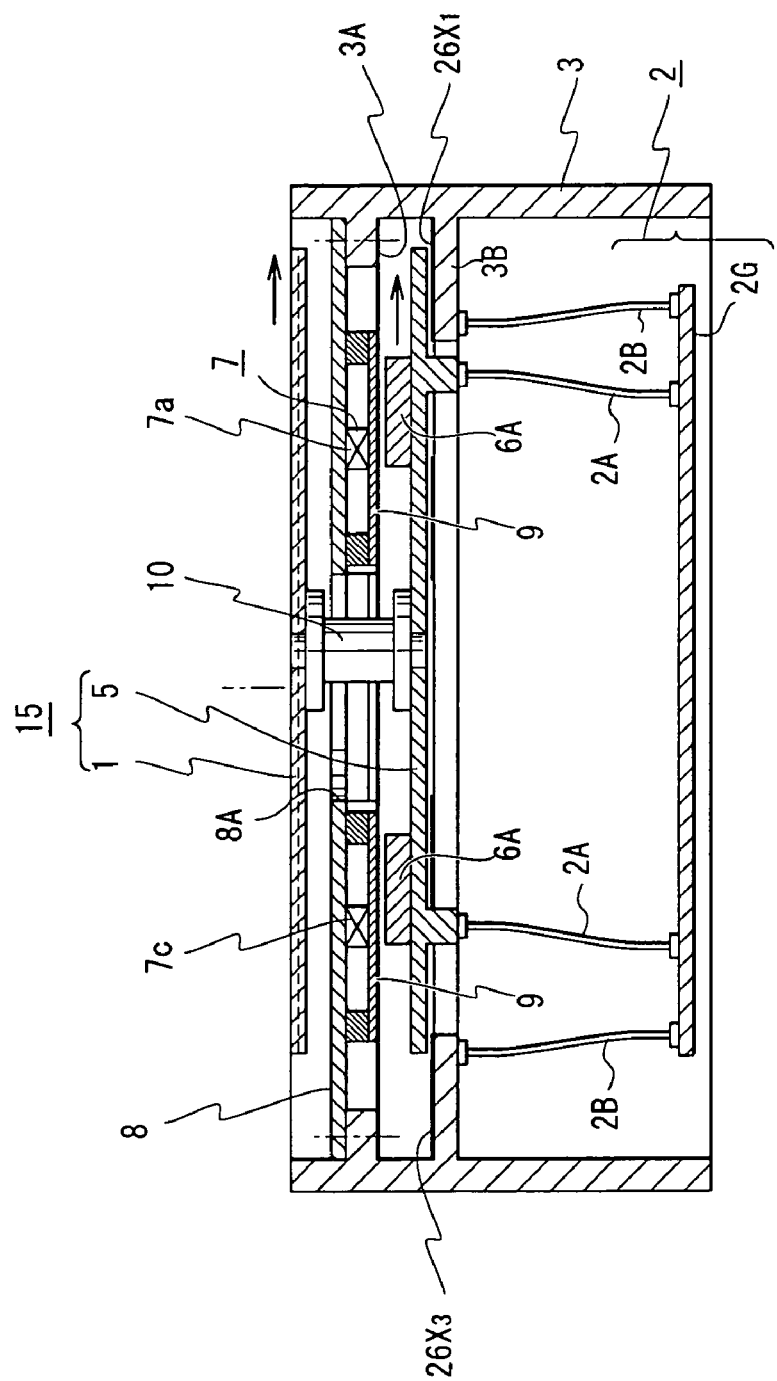
FIG. 40 is an explanatory illustration showing an example of the overall operation of the tenth embodiment disclosed in FIG. 32.
Figure 41:
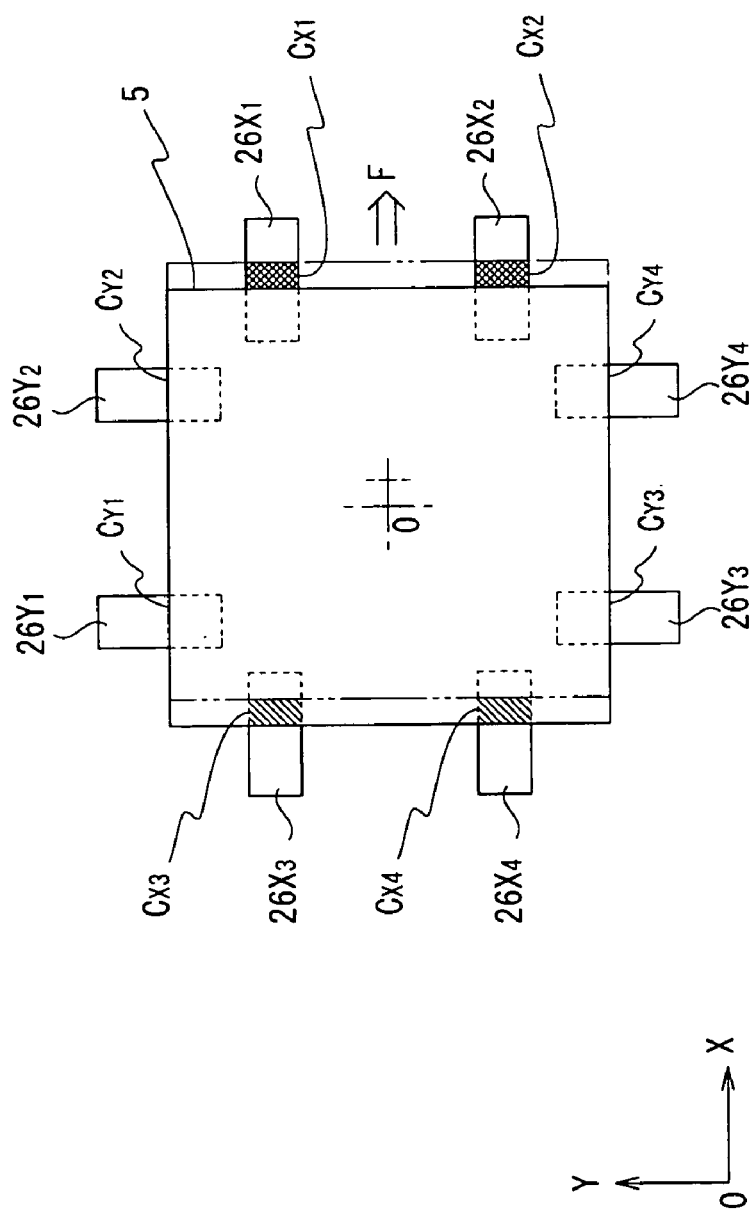
FIG. 41 is an explanatory illustration showing the state where the capacity detection electrode detects the change in the moving amount of the auxiliary table generated in the operation example of the embodiment shown in FIG. 40.

For example, when the operation command is inputted to the operation control system 20 from the operation command input section 24 for transporting the movable table 1 to a prescribed position in the positive direction of the X-axis, the entire apparatus is thereby actuated according to a prescribed energizing control mode. FIG. 40 and FIG. 41 show the state after carrying out the operation of this case.

In this example, the first control mode A1 shown in FIG. 37 is selected as the energizing control mode and, accordingly, the ring-shape driving coil 7 and each of the four driven coils 6A–6D are actuated by the control mode A1.

In this case, in the table holding mechanism 2, when the auxiliary table 5 is fed by the electromagnetic driving means 4 in the right direction of FIG. 32, the auxiliary table 5 is moved against the elastic force (original position returning force) of each of the piano wires 2A, 2B. Then, the auxiliary table 5 (that is, the movable table 1) makes a stop at a balanced point (target moving position) between the elastic returning force of each piano wire 2A, 2B and the electromagnetic driving force of the electromagnetic driving means 4 supplied to the auxiliary table 5 (see FIG. 40, FIG. 41).

In FIG. 40 and FIG. 41, numeral reference T shows the moved distance. Also, in FIG. 41, the portion with slashed lines shows the capacity detection electrodes 26X3, 26X4 on one side where the capacity component is reduced due to the movement of the auxiliary table 5, while the portion with cross-over slashed lines shows the capacity detection electrodes 26X1, 26X2 on the other side where the capacity component is increased due to the movement of the auxiliary table 5. In FIG. 41, shown is a case where there is no position shift in the Y direction.

During the operation, when the moved position of the auxiliary table 5 is shifted from the target position due to disturbance or the like, the actual position after being moved is detected as described above based on the information on increase/decrease of the capacity component of the capacity detection electrodes 26X1, 26X2, 26X3, 26X4, and the feedback control (not shown) for preventing the position shift is to be carried out.

In the meantime, when the electromagnetic driving force applied to the auxiliary table 5 is released from such a state, the auxiliary table 5 is returned to the original position by the elastic returning force of the piano wires 2A, 2B (actuation of the original position returning function).

In a series of the operations, in general, the moving action of the auxiliary table 5 is carried out suddenly in both cases of supply or release control of the electromagnetic driving force. In this case, in the auxiliary table 5 (or the movable table 1), when being stopped at the moved position and stopped when returned to the original position, repeating reciprocal action is caused by the inertia and spring force.

However, in the embodiment, this kind of repeating reciprocal action is suppressed by the electromagnetic braking (eddy current brake) generated between the braking plate and the driven magnet for achieving a smooth movement towards a prescribed position and achieving a stop-control under the stable state.

In the case where an operation command for moving the movable table 1 to another prescribed position is inputted from the operation command input section 24, the main control section 21A of the table driving control means 21 is immediately started as well and the reference positional information of the target position is selected from the data storage 23 according to the operation command. At the same time, the control program for a corresponding prescribed control mode is selected from the program storage 22. Subsequently, the coil selection driving control section 21B is started for drive-controlling the ring-shape driving coil 7 and four driven magnets 6A–6D of the electromagnetic driving means 4 according to a prescribed control mode.

Also in this case, the same control operation and the braking operation by the braking plate are executed so that the auxiliary table 5 (movable table 1) is smoothly moved towards a prescribed position and controlled to stop under the stable state.

As described, in the tenth embodiment, it is possible to smoothly move (or rotate) the movable table unit 15 in any directions on the X-Y plane from the center position (within a prescribed range) while maintaining the same height position without sliding motion by using the table holding mechanism 2 in which a link mechanism is applied.

Therefore, in the tenth embodiment, a holding mechanism for moving X-Y axes in heavy double structure which is essential in the case of the related art is unnecessary. Thus, it is possible to reduce the size and weight of the entire apparatus and, at the same time, the portability can be remarkably improved due to the weight reduction. The number of the parts can be also reduced compared to the case of the related art and the durability can be remarkably improved. Moreover, a skill is not required for adjustment at the time of assembling, thereby improving the productivity.

Even if action of the movable table unit 15 to which driven magnets 6A–6D are mounted rapidly changes, the electromagnetic braking (eddy current brake) force in the magnitude proportional to the rapid change works between the driven magnets 6A–6D and the braking plate 9 made of non-magnetic metal material, thereby suppressing the sudden action of the movable table to be smoothly moved in a prescribed direction under the stable state.

As for the braking plate 9, it is simply mounted to the each of the coil sides 7a, 7b, 7c, 7d parts of the ring-shape driving coil 7 by facing each of the driven magnets 6A–6D. At the same time, the electromagnetic driving means 4 for generating the electromagnetic driving force also has a simple structure comprising the driving magnets 6A–6D mounted to the auxiliary table 5, and a single ring-shape driving coil 7 mounted to the fixing table 8 correspondingly. Thus, it enables to reduce the size and weight of the entire apparatus, thereby achieving the excellent portability. Moreover, the workability becomes also excellent since there is no special skill required at the time of assembling.

Further, the metallic braking plate 9 made of non-magnetic member mounted to the end face part of the driving coil 7 on the driven magnet 6A–6D side, constitutes a circuit similar to a transformer secondary circuit in the relation between with the driving coil 7, while being in a form which is short-circuit through an electric resistance component (generates eddy current loss) of the braking plate 9.

In each of the coil sides 7a, 7b, 7c, 7d of the driving coil 7 forming the primary circuit in this case, a relatively larger current can be flown compared to the case where the secondary circuit is in the open state (with no braking plate). Thus, there is a relatively larger space between the driving coil 7 and the driven magnets 6A–6D because of the braking plate 9 and the flown current is increased. Therefore, the electromagnetic driving force generated thereby is not deteriorated so that it is possible to output a relatively larger electromagnetic force to the driven magnets 6A–6D.

Moreover, the braking plate 9 also functions as a radiation plate so that the secular change (dielectric breakdown by the heat) due to the continuous operation of the driving coil 7 can be effectively suppressed. Thereby, the durability of the entire apparatus and, moreover, the reliability of the entire apparatus can be improved as a result.

Further, in the embodiment, a single ring-shape driving coil 7 and each of the driven magnets 6A–6D are correspondingly mounted in the electromagnetic driving means 4. Thus, each of the four coil sides 7a, 7b, 7c, 7d of the ring-shape driving coil 7 always presses to actuate each of the corresponding driven magnets 6A–6D in the direction orthogonal to the X axis or Y axis on the X-Y plane. Therefore, the resultant force of the electromagnetic driving forces for the auxiliary table 5 (that is, the movable table 1) are generated always in the outward direction from the center point on the X-Y plane when moving the auxiliary table 5 in any directions.

Therefore, it is possible to smoothly move the movable table 1 two-dimensionally (within an allowable range) without rotary motion even if the transporting direction of the movable table unit 15 is changed.

As described above, in the embodiment, it is possible to output the continuous electromagnetic driving force in a prescribed direction by adjusting the current flown into a single ring-shape driving coil 7 and the four driven magnets 6A–6D. Thereby, the movable table 1 can be continuously transported in any directions so that, in this respect, precise movement by micron unit becomes possible.

Moreover, since the driving coil is formed with a single ring-shape driving coil 7, the configuration is simplified and the entire portion including the corresponding driven magnets 6A–6D is mounted between the movable table unit 15 and the fixing plate 8 by using the overall size of the movable table unit 15 in the spread-out state. Thus, the occupied region of the space can be reduced so that it is possible to reduce the size and weight of the entire apparatus in this respect, thereby improving the portability. Further, the number of components is reduced so that the productivity and the maintenance characteristic can be improved.

The tenth embodiment has been described by referring to the case where the driven magnets 6A–6D are mounted to the auxiliary table 5. However, the driven magnets 6A–6D may be mounted to the movable table 1 side and, by facing them, the ring-shape driving coil 7 may be provided to a prescribed position on the fixing plate 8.

Furthermore, although the movable table 1 has been described by referring to the case of the circular shape, it may be in a quadrangular shape or other shapes. The auxiliary table 5 has been described by referring to the case of the quadrangular shape. However, it may be in a circular shape or other shapes as long as it can achieve the various functions described above.

The table holding mechanism 2 has been described by referring to the one having the original position returning function for the movable table unit 15. However, the original position returning function may be omitted from the table holding mechanism 2 and separately mounting the original position returning function for the movable table unit 15. Specifically, in the embodiment, the original position returning force for the movable table is provided to the link mechanism by using the piano wire made of a spring member as the link mechanism. However, it is not limited to this. That is, the link mechanism and the original position returning mechanism for returning the movable table to the original position may be provided separately as the individual mechanisms.

In the case where the link mechanism and the original position returning mechanism of the table holding mechanism are formed as the separate mechanisms as described above, the original position returning mechanism accumulates the spring force as the original position returning force along with the movement of the movable table. Further, it is necessary to generate the reaction force against the spring force generated by the original position returning mechanism through providing a sensor for detecting the present position of the moved movable table so as to control the electric current value energized to the driving coil of the electromagnetic driving means according to the position signal detected by the sensor.

The braking plate 9 according to the embodiment has been described by referring to the case where it is mounted to each of the driving magnets 6A–6D. However, a single braking plate may be disposed by facing the two or all of the driven magnets 6A–6D.

Figure 42:
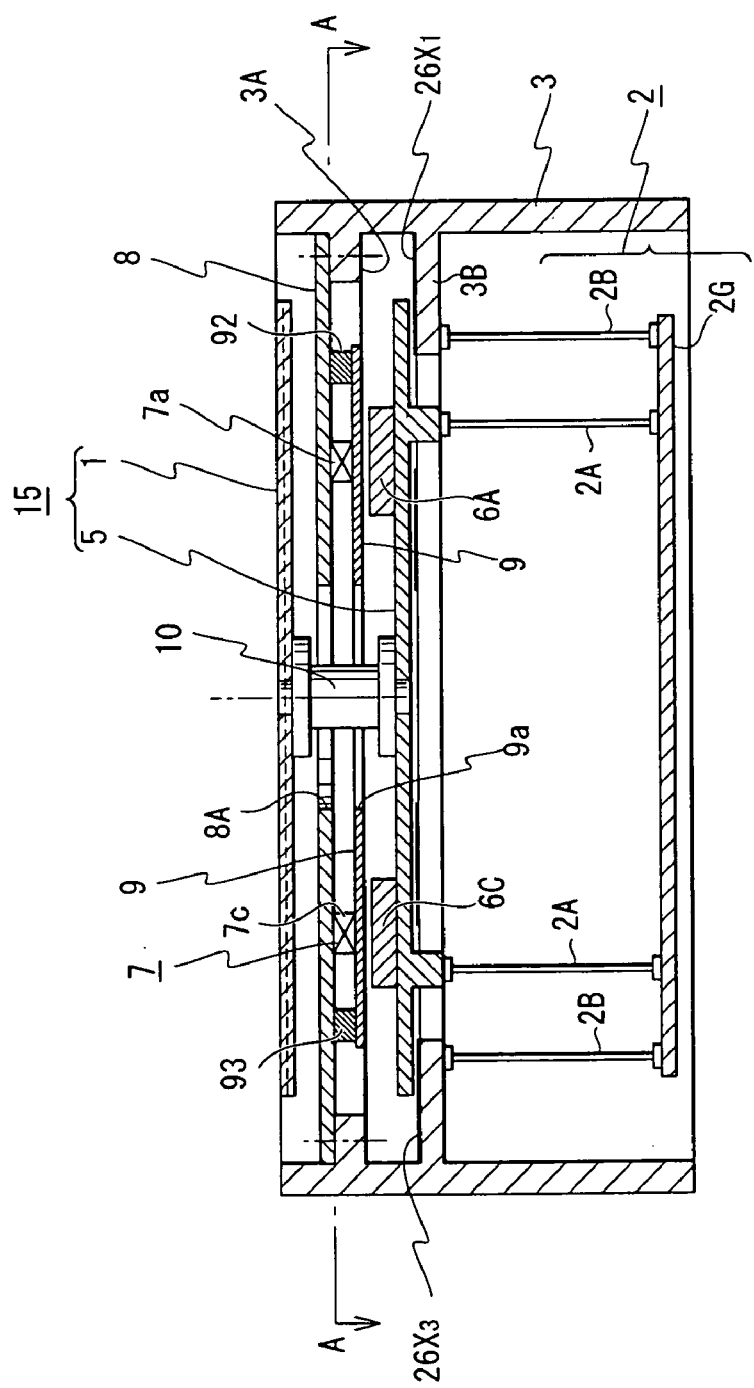
FIG. 42 is an explanatory illustration showing another example of the braking plate disclosed in FIG. 32.
Figure 43:
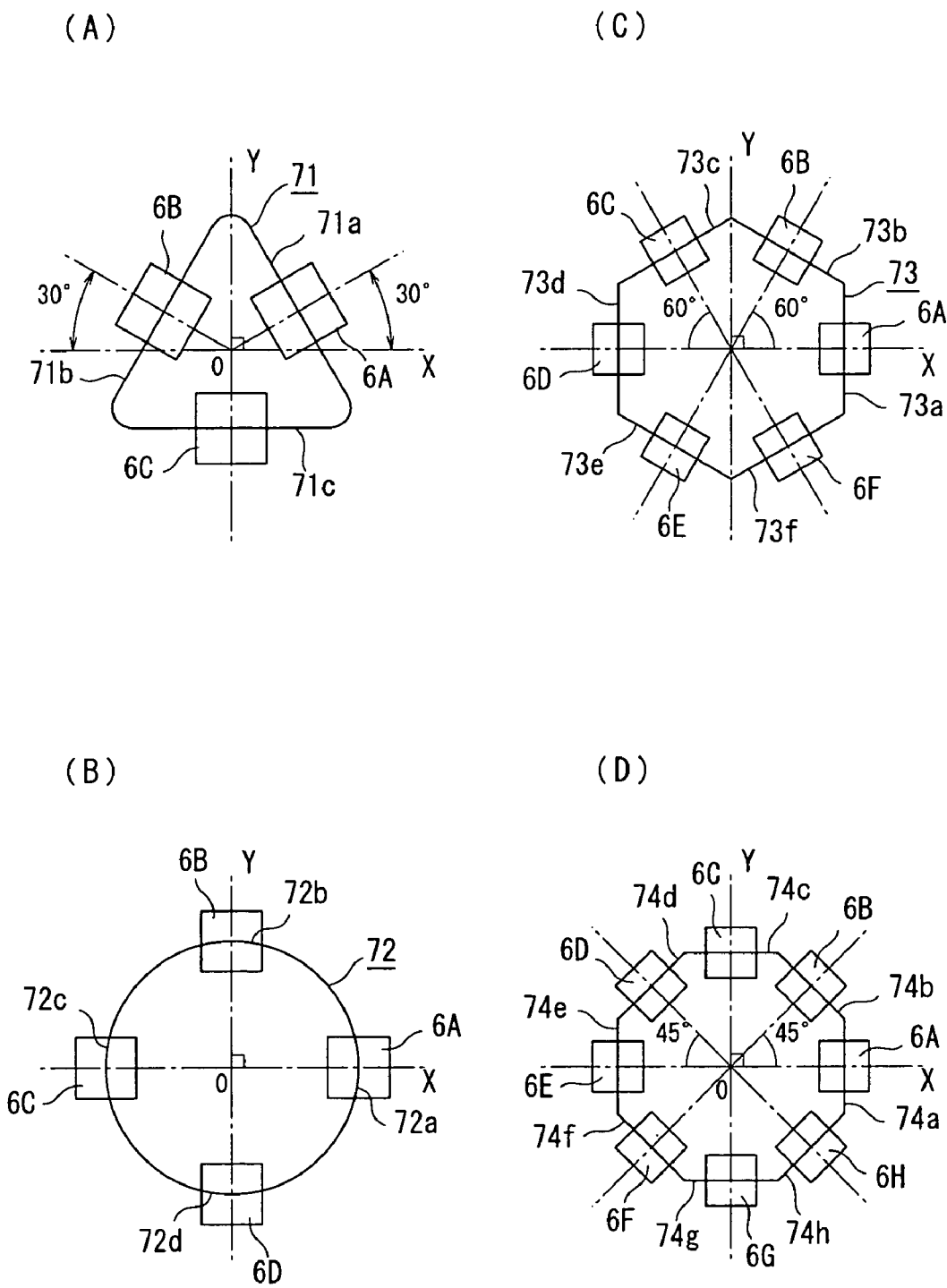

FIG. 42 shows the case where the single braking plate is disposed by facing all of the driven magnets 6A–6D.

In FIG. 42, numeral references 92, 93 are spacer members for holding the single braking plate 9. Numeral reference 9a is a through-hole for allowing the supporting brace 10 to reciprocally move along the fixing plate 8.

In this case, the space members 92, 93 may be omitted by extending the periphery of the braking plate 9 and holding a part or entire part of the periphery of the braking plate 9 using the case main body 3.

Moreover, each of the driven magnets 6A–6D and the ring-shape driving coil 7 may be switched for mounting the ring-shape driving coil 7 on the auxiliary table 5 side and mounting each of the driven magnets 6A–6D on the fixing plate 8 side. In this case, the braking plate 9 is also fixed and mounted to the ring-shape driving coil 7 side for achieving the efficacy of the function.

Further, the tenth embodiment has been described by referring to the case where the four driven magnets are mounted on the orthogonal coordinates (X-Y coordinates) at equal distance from the origin. However, they may not be mounted at equal distance from the origin and may be disposed in the positions shifted from the coordinate axes or the number may not be four as long as the moving direction (repulsive driving direction) of each of a plurality of the driven magnets is on the line passing through (not necessarily the orthogonal coordinates) the origin on the coordinates.

With this, it enables to surely eliminate the elements for generating the rotational force components beforehand when transporting the movable table unit 15 in a prescribed direction by one, two or more of the driven magnets. Further, it is possible to achieve simplification of the control operation by the operation control system 20 when, for example, the four driven magnets are mounted on the orthogonal coordinates (X-Y coordinates) at the equal distance from the origin. Therefore, it is possible to promptly and smoothly move the movable table unit 15 in a prescribed direction.

Moreover, the tenth embodiment has been described by referring to the case where the four driven magnets 6A–6D are mounted as the driven magnets. However, the number is not limited to four in the present invention but three driven magnets or five or more of them may be mounted. Also, the driven magnets may be in other shapes (for example, a columnar shape).

Furthermore, when a plurality of the driven magnets are mounted appropriately, a plurality of driven magnets which are appropriate for the moving direction (for example, the ones in the positions which can effectively function in the transporting direction) designated from outside may be selected to be energized by the operation control system 20 so as to transport the movable table unit 15 towards the moving direction designated from outside using the resultant force.

Moreover, the tenth embodiment has been described by referring to the case where the electromagnetic driving means 4 is drive-controlled by separate control modes of A1–A8 when setting the transporting directions of the movable table unit 15. However, other drive-control method may be employed as long as it functions similarly, e.g. in the control mode A2, each energizing direction of the driven magnets 6A–6D is set the same as that of the control mode A1 and only the energizing direction of the ring-shape driving coil 7 is set to be in the reverse direction.

[Other Examples of Ring-Shape Driving Coil]

FIG. 43(A)–(D) respectively shows examples of other configurations of a single ring-shape driving coil 7 provided on the X-Y plane.

[Triangular Ring-Shape Driving Coil]

First, FIG. 43(A) shows the case where the ring-shape driving coil is formed in an equilateral triangle shape. The equilateral triangular ring-shape driving coil 71 whose corners being formed in arc shapes is fixed to a fixing plate (not shown) on the stator side to be held thereby.

Further, driven magnets 6A–6C made of electromagnets are individually provided by corresponding to each coil sides 7Aa, 7Ab, 7Ac of the equilateral triangular ring-shape driving coil 71, respectively. Each of the driven magnets 6A–6C is fixed and mounted to the movable table unit side (not shown) as the needle side.

Each of the driven magnets 6A, 6B, 6C, when in operation, individually receives the electromagnetic force from each of the corresponding coil sides 71a, 71b, 71c of the ring-shape driving coil 71 to be repulsively driven towards the direction orthogonal to each of the coil sides 71a, 71b, 71c.

At this time, each of the driven magnets 6A, 6B, 6C is disposed by corresponding to each of the coil sides 71a, 71b, 71c in such a manner that the extended lines of the center lines in the driven direction pass through the origin of the ring-shape driving coil 71 on the X-Y plane.

When the entire apparatus is in operation, as in the case of the tenth embodiment, the operation system is started for selecting a prescribed energizing control mode from a plurality of the energizing control modes specified beforehand. According to this, the ring-shape driving coil 71 and each of the driving magnets 6A, 6B, 6C are individually energized. Other configurations are substantially the same as the case of the tenth embodiment shown in FIG. 32 to FIG. 41.

With this, by the energizing control (including zero) performed by the operation control system individually on the ring-shape driving coil 71 and each driven magnet 6A, 6B or 6C, it is possible to transport the movable table unit in an arbitrary direction on the X-Y plane and substantially the same effect as that of the tenth embodiment can be achieved.

(Circular Ring-Shape Driving Coil)

Next, FIG. 43(B) shows the case where the ring-shape driving coil is formed in a circular shape. A circular ring-shape driving coil 72 is fixed to a fixing plate (not shown) on the stator side to be held thereby.

Further, in the areas of the circular ring-shape driving coil 72 crossing with the X-axis and Y axis on the X-Y plane, driven magnets 6A, 6B, 6C, 6D made of electromagnets are individually disposed by corresponding to each of the coil sides 72a, 72b, 72c, 72d of the ring-shape driving coil 72.

Each of the driven magnets 6A–6D is fixed and mounted on the movable table unit (not shown) side as the needle side.

Each of the driven magnets 6A, 6B, 6C, 6D, when in operation, individually receives the electromagnetic force from each of the corresponding coil sides 72a, 72b, 72c or 72d to be repulsively driven towards the direction orthogonal to the tangent of each of the area of the ring-shape driving coil 72.

At this time, each driven magnet 6A, 6B, 6C or 6D is disposed by corresponding to the each of the coil sides 72a, 72b, 72c or 72d in such a manner that the extended lines of the center lines in the driven direction pass through the origin of the ring-shape driving coil 72 on the X-Y plane.

When the entire apparatus is in operation, as in the case of the tenth embodiment, the operation system is started for selecting a prescribed energizing control mode from a plurality of the energizing control modes specified beforehand. According to this, the ring-shape driving coil 72 and each of the driving magnets 6A, 6B, 6C or 6D are individually energized. Other configurations are substantially the same as the case of the tenth embodiment shown in FIG. 32 to FIG. 41.

With this, by the energizing control (including zero) performed by the operation control system individually on the ring-shape driving coil 72 and each driven magnet 6A, 6B, 6C or 6D, it is possible to transport the movable table unit in an arbitrary direction on the X-Y plane and substantially the same effect as that of the tenth embodiment can be achieved.

(Hexagonal Ring-Shape Driving Coil)

Next, FIG. 43(C) shows the case where the ring-shape driving coil is formed in a hexagonal shape. A hexagonal ring-shape driving coil 73 is fixed to a fixing plate (not shown) on the stator side to be held thereby.

Further, six driven magnets 6A, 6B, 6C, 6D, 6E, 6F made of electromagnets are individually disposed by corresponding to each of the six coil sides 73a, 73b, 73c, 73d, 73e, 73f of the hexagonal ring-shape driving coil 73. Each of the driven magnets 6A–6F is fixed and mounted on the movable table unit (not shown) side as the needle side.

Each of the driven magnets 6A–6F, when in operation, individually receives the electromagnetic force from each of the corresponding coil sides 73a–73f to be repulsively driven towards the direction orthogonal to the each of the coil sides 73a–73f.

At this time, each driven magnet 6A–6F is disposed by corresponding to the each of the coil sides 73a–73f in such a manner that the extended lines of the center lines in the driven direction pass through the origin of the ring-shape driving coil 73 on the X-Y plane.

When the entire apparatus is in operation, as in the case of the tenth embodiment, the operation system is started for selecting a prescribed energizing control mode from a plurality of the energizing control modes specified beforehand. According to this, the ring-shape driving coil 73 and each of the driving magnets 6A–6F are individually energized. Other configurations are substantially the same as the case of the tenth embodiment shown in FIG. 32 to FIG. 41.

With this, by the energizing control (including zero) performed by the operation control system individually on the hexagonal ring-shape driving coil 73 and each of the driven magnets 6A–6F, it is possible to transport the movable table unit in an arbitrary direction on the X-Y plane and substantially the same effect as that of the tenth embodiment can be achieved.

(Octagonal Ring-Shape Driving Coil)

Next, FIG. 43(D) shows the case where the ring-shape driving coil is formed in an octagonal shape. An octagonal ring-shape driving coil 74 is fixed to a fixing plate (not shown) on the stator side to be held thereby.

Further, eight driven magnets 6A, 6B, 6C, 6D, 6E, 6F, 6G, 6H made of electromagnets are individually disposed by corresponding to each of the eight coil sides 74a, 74b, 74c, 74d, 74e, 74f, 74g, 74h of the octagonal ring-shape driving coil 74. Each of the driven magnets 6A–6H is fixed and mounted on the movable table unit (not shown) side as the needle side.

Each of the driven magnets 6A–6H, when in operation, individually receives the electromagnetic force from each of the corresponding coil sides 74a–74h to be repulsively driven towards the direction orthogonal to the each of the coil sides 74a–74h.

At this time, each driven magnet 6A–6H is disposed by corresponding to the each of the coil sides 74a–74h in such a manner that the extended lines of the center lines in the driven direction passes through the origin of the ring-shape driving coil 74 on the X-Y plane.

When the entire apparatus is in operation, as in the case of the tenth embodiment, the operation system is started for selecting a prescribed energizing control mode from a plurality of the energizing control modes specified beforehand. According to this, the ring-shape driving coil 74 and each of the driving magnets 6A–6H are individually energized. Other configurations are substantially the same as the case of the tenth embodiment shown in FIG. 32 to FIG. 41.

With this, by the energizing control (including zero) performed by the operation control system individually on the hexagonal ring-shape driving coil 74 and each of the driven magnets 6A–6H, it is possible to transport the movable table unit in an arbitrary direction on the X-Y plane and substantially the same effect as that of the tenth embodiment can be achieved.

Eleventh Embodiment

Next, an eleventh embodiment will be described by referring to FIG. 44 to FIG. 48.

The eleventh embodiment is distinctive in respect that it comprises an electromagnetic driving means 142 to which four driving coils formed in a square θ-shape, whereas the single ring-shape driving coil 7 as the driving coil is mounted to the electromagnetic driving means 4 in the tenth embodiment. At the same time, it is distinctive in respect that an operation control system 202 for effectively driving the electromagnetic driving means 142 is mounted instead of the operation control system 20.

This will be described in detail hereinafter.

First, as in the case of the tenth embodiment, the eleventh embodiment comprises: a precise processing movable table unit 15 provided to be capable of moving in arbitrary directions on the same plane; a table holding mechanism 2 which allows the movement of the movable table unit 15 while holding the movable table unit 15 and also has an original position returning function for the movable table unit 15; a case main body 3 as a main body part for supporting the table holding mechanism 2; and the electromagnetic driving means 142 mounted on the case main body 3 side for supplying a moving force to the movable table unit 15 in a prescribed direction according to a command from outside.

Figure 44:
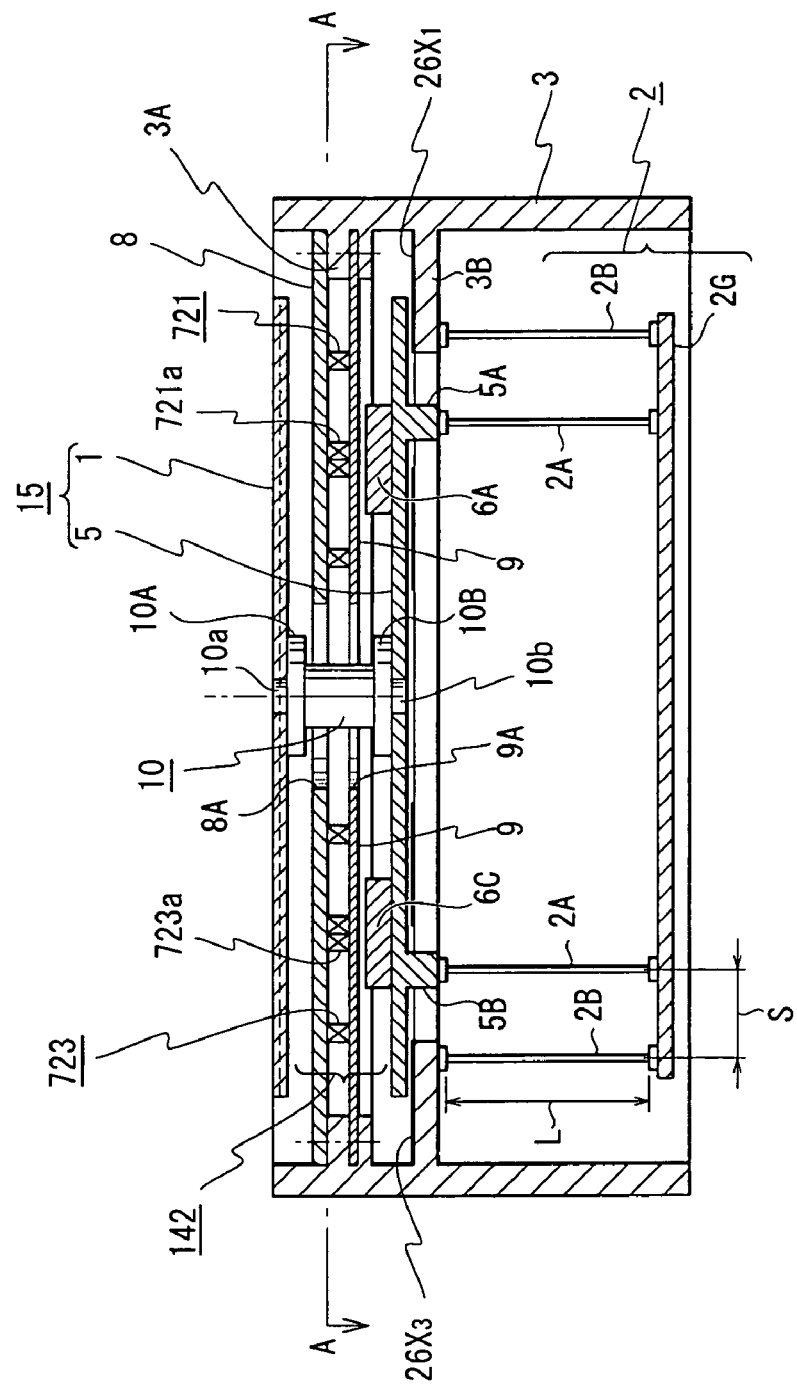
FIG. 44 is a longitudinal cross section showing an eleventh embodiment of the present invention.

The movable table unit 15 is formed with a precise processing movable table 1 and an auxiliary table 5 which is disposed integrally, coaxially, and in parallel with respect to the movable table 1 with a prescribed space in between. As shown in FIG. 44, the table holding mechanism 2 is mounted on the auxiliary table 5 side and is configured to hold the movable table 1 through the auxiliary table 5.

[About Electromagnetic Driving Means 142]

The electromagnetic driving means 142 is held on the case main body 3 side by its main part and has a function for supplying a prescribed moving force (driving force) to the movable table unit 15 along the transporting direction of the movable table unit 15 according to a command from outside. The electromagnetic driving means 142 is disposed between the movable table 1 and the auxiliary table 5.

Specifically, the electromagnetic driving means 142 comprises: four driving coils 721, 722, 723, 724; four driven magnets 6A, 6B, 6C, 6D mounted on the auxiliary table 5 by individually corresponding to inner coil sides 721*a*–724*a* positioned in the center of each of the driving coils 721–724; and a fixing plate 8 for holding the four driving coils 721–724 at prescribed positions. The four driving coils 721, 722, 723, 724 are formed by combining two square-shape coils and the inner coil sides 721*a*–724*a* are formed in the part where the coils face with each other.

Each of the square θ-shape driving coils 721–724 is individually provided on the X axis and Y axis in such a manner that the inner coil sides 721*a*–724*a* positioned on the center of the coils cross in its center the X axis or Y axis at right angles on the X-Y plane assumed with the center of the fixing plate 8 being the origin.

Further, each of the four driven magnets 6A–6D is formed with the electromagnets which can be energized form outside and is individually provided on the X axis and Y axis by corresponding to the inner coil sides 721*a*–724*a* of each square θ-shape driving coil.

The fixing plate 8 is provided to the auxiliary table 5 on the movable table 1 side as shown in FIG. 32 and held by the case main body 3. The stator part as the main part of the electromagnetic driving means 4 is formed with each of the square θ-shape driving coils 721–724 and the fixing plate 8.

When each of the driving coils 721–724 is set in action, it generates the electromagnetic driving force between with each of the driven magnets 6A–6D for repulsively driving each of the driven magnets 6A–6D towards the direction orthogonal to the inner coil sides 721*a*–724*a*. In this case, the center axis of each of the driven magnets 6A–6D in the moving direction is set to pass through the center point on the X-Y plane. Further, when moving the movable table unit 15 in the direction which does not cross with each of the inner coil sides 721*a*–724*a* (in the slantwise direction with respect to each of the coil sides 721*a*–724*a*), the movable table unit 15 is moved by the resultant force of the electromagnetic driving forces for at least two or more of the driven magnets 6A–6D as will be described later.

Further, in the inner coil sides 721*a* to 724*a* of the driving coils 721–724, which face each of the driven magnets 6A to 6D, the braking plate 9 made of a non-magnetic metal material is provided adjacent to (substantially in contact with) the pole face of each of the driven magnets 6A to 6D. In the embodiment, a single braking plate 9 is used and a part or entire part of the periphery is fixed to the case main body 3.

Figure 45:
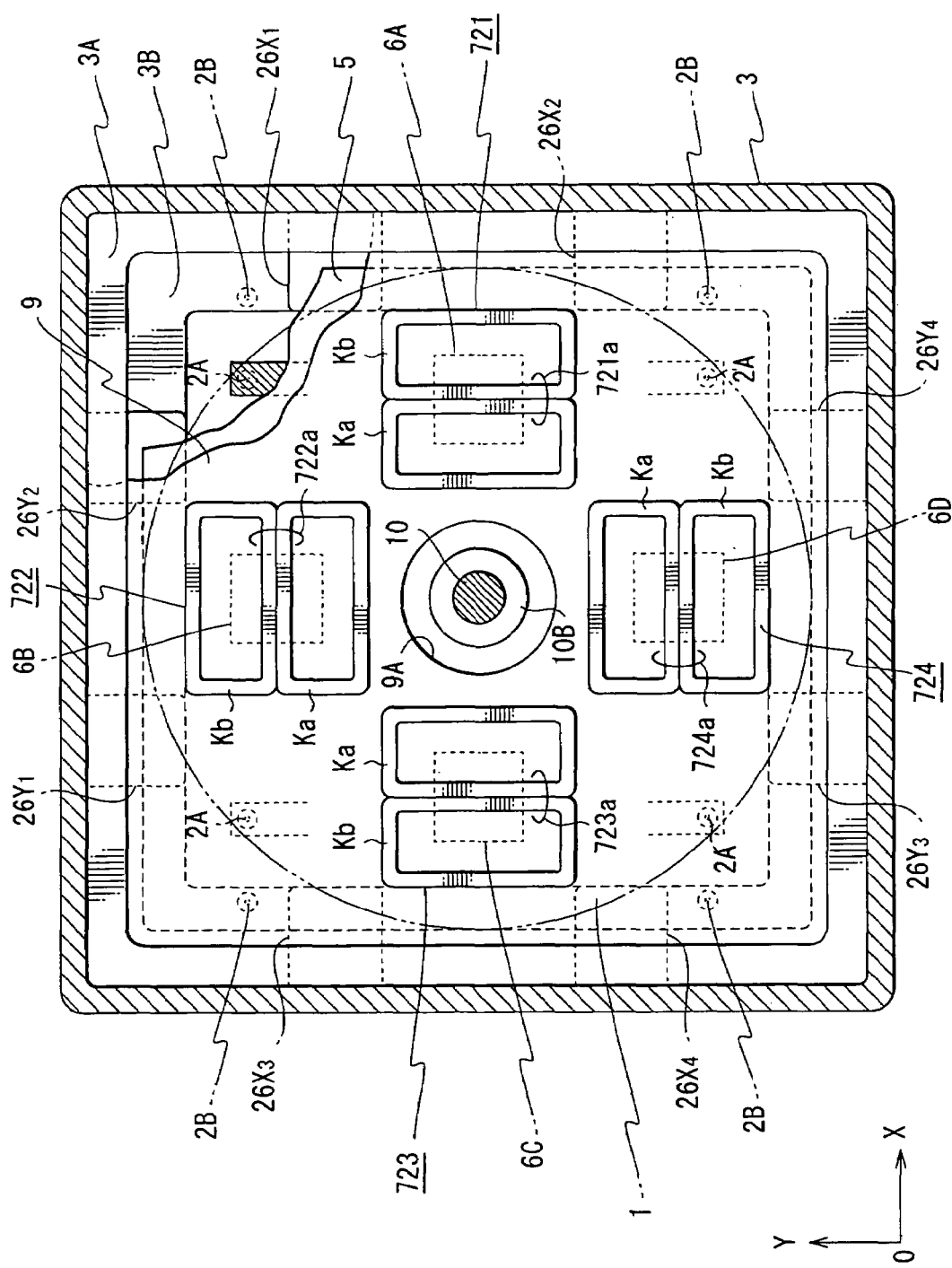
FIG. 45 is a schematic lateral cross section taken along the line A—A of FIG. 44.

As for the four driven magnets 6A–6D constituting a part of the electromagnetic driving means 142 according to the embodiment, as shown in FIG. 45, used are the electromagnets with the quadrangular magnetic pole end surface (the surface opposing the each of the inner coil sides 721*a* of each of the driving coils 721–724). They are respectively provided and fixed on the X-Y plane assumed on the top face of the auxiliary table 5 at the positions on the X axis and Y axis at the equal distance from the center.

Therefore, in the embodiment, for example, when a prescribed operating current is flown to a part or the entire part of the four driven magnets 6A–6D for setting each of the driven magnets 6A–6D in operation, each of the driving coils 721–724 is set in action to start the energization subsequently or simultaneously according to a prescribed control mode which will be described later. Thus, the magnitudes of the magnetic forces of each of the driven magnets 6A–6D including each of the driving coils 721–724 are adjusted by the energization control. Thereby, the movable table unit 15 is transported in a prescribed direction.

Figure 48:
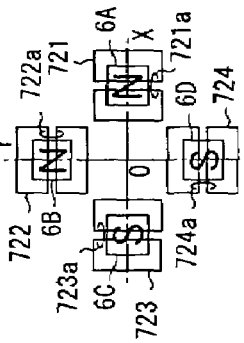
FIG. 48 is a diagram showing the control contents of a plurality of energizing control modes B5–B8 executed by the table driving control means of the embodiment disclosed in FIG. 46 and the moving directions (transporting directions of the movable table) of the entire driven magnets.

In this case, the action of the electromagnetic driving means 142 (energization drive for each of the driving coils 721–724 and the four driven magnets 6A–6D) in terms of the moving direction and transportation driving force for the movable table unit 15 will be described in FIG. 47 and FIG. 48. In FIG. 47 and FIG. 48, rotation-drive of the driving coil by energization is not illustrated.

As shown in FIG. 44 and FIG. 45, the four square θ-shape driving coils 721–724 forming the main part of the electromagnetic driving means 142 are formed with a combination of two small square-shape coil parts Ka, Kb. The coils sides (inner coil sides 721*a*–724*a* part) are formed in the area where the two small square-shape coil parts Ka, Kb abut with each other and an electric current is always flown to the coil sides (inner coil sides 721*a*–724*a* part) in the same direction (the electric current in the same direction is always flown into one of the coil side and the other coil side abutting with each other). Therefore, when changing the direction, the energizing directions in the two small square-shape coil parts Ka, Kb are to be changed simultaneously.

In this case, in the eleventh embodiment, the energizing direction of the four driven magnets 6A–6D made of the electromagnets is specified beforehand as will be described later. Thus, the energizing direction and the magnitude of the flown current (including the energization-stop control) of each of the inner coil sides 721*a*–724*a* of the four square θ-shape driving coils 721–724 are set and controlled by the operation control system 202 by corresponding to the transporting direction of the movable table 1. Thereby, the electromagnetic force (reaction force) is to be outputted to the driven magnets 6A–6D for pressing them in a prescribed direction (in the directions respectively orthogonal to the inner coil sides 721*a*–724*a* part) according to Fleming's left-hand rule.

Further, by selecting and combining the directions of the electromagnetic forces generated in the four driven magnets 6A–6D beforehand, it is possible to set the resultant force of the electromagnetic driving forces generated in the four driven magnets 6A–6D to be in the transporting direction of the movable table unit 15. Thereby, the moving force can be supplied to the movable table unit 15 to be moved in the arbitrary direction on the X-Y plane.

A series of energizing control methods for the four driven magnets 6A–6D will be described in detail in the description of a program storage 22 (FIG. 47–FIG. 48) which will be described later.

On the outer side and inner side of each of the driving coils 721–724 on the same plane, a magnetic material such as ferrite may be filled up to at least the same height as the height (in the Y axis direction) of each of the driving coils 721–724 and within a range covering the operation range of the driven magnets 6A–6D.

[About Operation Control System 202]

Next, the operation control system 202 of the eleventh embodiment will be described.

Figure 46:
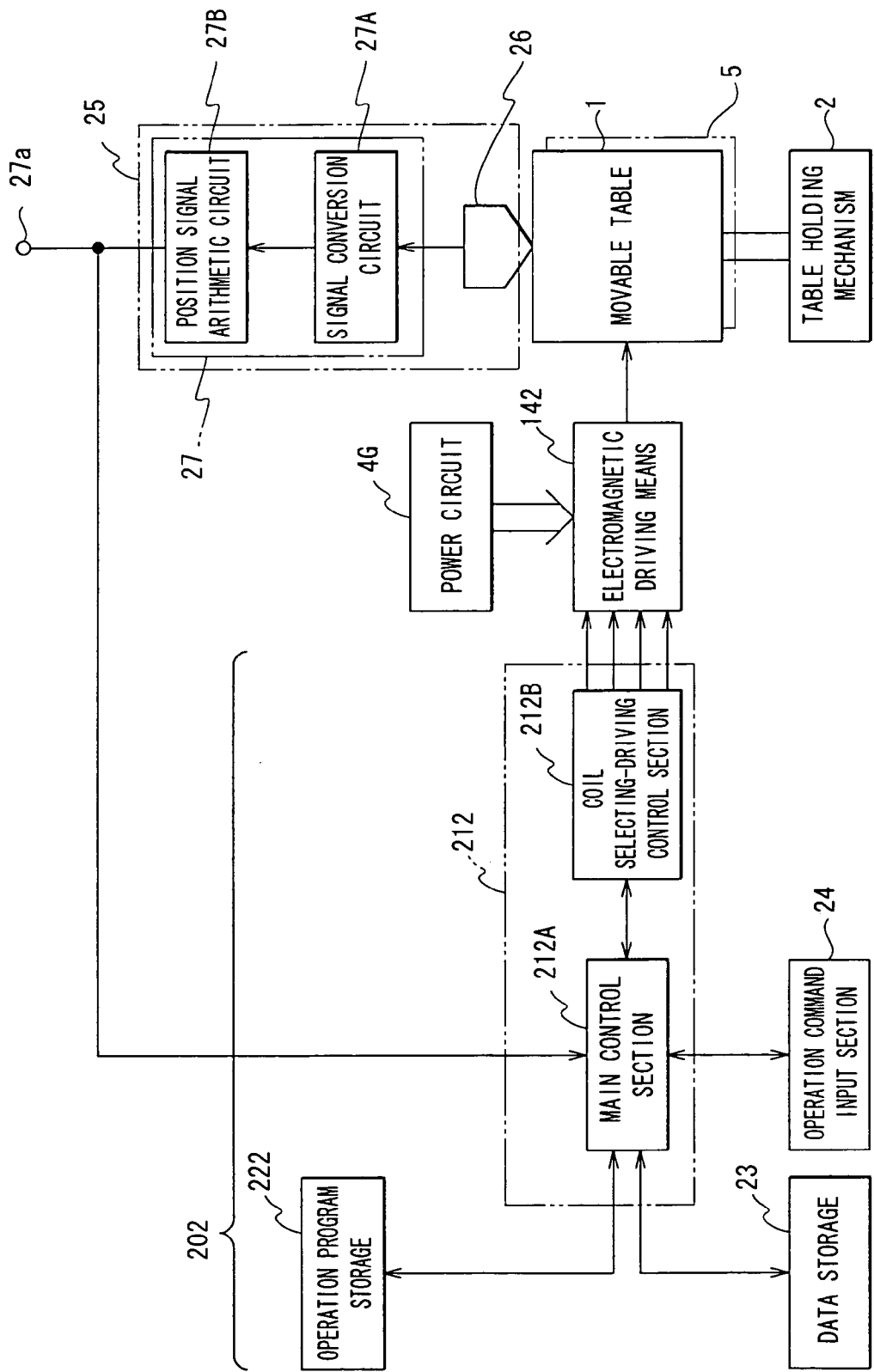
FIG. 46 is a block diagram showing the entire apparatus including the operation system according to the eleventh embodiment disclosed in FIG. 44.

In the eleventh embodiment, provided to the electromagnetic driving means 142 is the operation control system 202 which restricts the moving action of the movable table unit 15 by individually energize-controlling each of the square θ-shape driving coils 721–724 and each of the driven magnets 6A–6D (see FIG. 46).

The operation control system 202 comprises: a magnetic pole individual setting function for individually setting and maintaining the magnetic poles of each of the driven magnets 6A–6D which are mounted by corresponding to each of the square θ-shape driving coils 721–724; a magnetic force magnitude setting function for individually and variably setting (it is possible to set by varying the flown current) the magnitude of the magnetic force of each of the driven magnets 6A–6D; an energizing direction setting function for setting and maintaining the energizing direction of the inner coil sides 721a–724a part of each of the square θ-shape driving coils 721–724 to a prescribed direction (in one direction or other) according to a command from outside; a driving coil energizing control function for variably setting the magnitude of the current flown to each of the square θ-shape driving coils 721–724; and a table action control function for adjusting the transporting direction and transporting force for the movable table unit 15 by appropriately adjusting the output of the various functions.

For carrying out the functions described above, as shown in FIG. 46, the operation control system 202 comprises: a table driving control means 212 which individually drives each of the square θ-shape driving coils 721–724 and each of the driven magnets 6A–6D of the electromagnetic driving means 142 according to a prescribed energizing control mode for controlling the movement of the movable table unit 15 in a prescribed direction; a program storage 222 being provided along with the table driving control means 212, to which a plurality of control programs for a plurality of control modes (eight energizing control modes B1–B8 in the embodiment) in which the moving direction, moving amount and the like of the moving table 1 are specified are provided; and a data storage 23 to which prescribed data and the like are stored to be used at the time of executing each control program.

Further, in the table driving control means 212, provided is an operation command input section 24 for giving a command of a prescribed control operation to each of the square θ-shape driving coils 721–724 and each of the driven magnets 6A–6D. Moreover, the positional information of the movable table unit 15 during the movement and after the movement is detected by the positional information detecting means 25 and arithmetic-processed to be transmitted to the table driving control means 212.

The various control functions of the operation control system 202 are comprehensively contained in a plurality of the energizing control modes B1–B8 in the program storage 222. They are selected according to a selection command inputted through the operation input section 24 by an operator. Through one of the selected prescribed control modes B1–B8, the various control functions are started and carried out.

This will be described in detail.

The table driving control means 212 according to the embodiment comprises: a main control section 212A which operates according to the command from the operation command input section 24 and has a function of selecting a prescribed control mode from the program storage 222 and of energize-controlling a prescribed direct current including zero to each of the square θ-shape driving coils 721–724 and each of the four driven magnets 6A–6D; and a coil selecting-driving control section 212B which has a function of drive-controlling each of the square θ-shape driving coils 721–724 and the four driven magnets 6A–6D simultaneously or separately according to the prescribed energization-control mode (B1–B8) selected and set by the main control section 212A.

Moreover, the main control section 212A also has a function of calculating the position of the movable table unit 15 according to the input information from the positional information detecting means 25 for detecting the table position or of carrying out other various arithmetic operations. Numeral reference 4G is a power circuit for energizing a prescribed current to each of the square θ-shape driving coils 721–724 of the electromagnetic driving means 142 and each of the four driven magnets 6A–6D.

[About Program Storage 222]

The table driving control means 212 is configured to drive-control each of the square θ-shape driving coils 721–724 of the electromagnetic driving means 142 and each of the four driven magnets 6A–6D individually with a prescribed relation therebetween according to a prescribed energization-control program (a prescribed control mode) which is stored beforehand in the program storage 222.

Specifically, in the embodiment, stored in the program storage 222 are: a plurality of magnet control programs for individually specifying the energizing directions of each of the four driven magnets (electromagnets) 6A–6D and for specifying the north pole or the south pole of the magnetic pole, while variably setting the magnitude of the flown current including non-energization; and a driving coil control program, which functions correspondingly upon the time when the energizing direction of each of the four driven magnets (electromagnets) 6A–6D are specified and the north pole or south pole (or stopping of energization) is specified, for specifying the energizing direction for each of the four square θ-shape driving coils 721–724 and for variably setting the magnitude of the flown current. At the same time, the operation timing of each control program is arranged in a group of eight energizing control modes B1–B8 and stored (see FIG. 47, FIG. 48).

Now, the group of eight energizing control modes B1–B8 according to the eleventh embodiment will be described by referring to FIG. 47 and FIG. 48.

FIG. 47 shows examples (in diagram) of each of the energizing control modes B1–B4 in the case where the movable table unit 15 is moved in the positive or negative direction of the X axis or the positive or negative direction of the Y axis, respectively.

In FIG. 47, each of the energizing control modes B1–B4 is set to variably control the energizing direction of the direct current for each of the square θ-shape driving coils 721–724. Also, as for the energizing direction of each of the four driven magnets (electromagnets), the north pole or the south pole of each magnetic pole is controlled to be set unchanged at all times (fixed state) regardless of the control modes.

That is, in the eleventh embodiment, the magnetic poles of the end face part of the driven magnets 6A, 6B facing the square θ-shape driving coils 721, 722 are set to be the north pole while those of the driven magnets 6C, 6D are set to be the south pole, respectively. The magnetic poles of each of the driven magnets 6A–6D are controlled to be set in the fixed state even though the control modes are varied from B1–B4.

(Control Mode B1)

The control mode B1 is an example of the energizing control mode for transporting the movable table 1 in the positive direction of the X axis (see FIG. 47).

In the control mode B1, the driven magnets 6B, 6D on the Y axis are controlled to stop energization, and the end face part of the driven magnet 6A on the X axis facing the inner coil side 721*a* is controlled to be fixed as the north pole while the end face part of the driven magnet 6C on the X axis facing the coil side 723*a* is controlled to be fixed as the south pole.

Therefore, in the coil sides 721*a*, 723*a* of the driving coils 721, 723, the prescribed electromagnetic driving force is generated in the coil sides 721*a*, 723*a* in the directions indicated by dotted-line arrows. At the same time, by the reaction force (generated since the square θ-shape driving coils 721, 723 are fixed), the driven magnets 6A, 6C are repulsively driven in the direction indicated by solid-line arrows (in the right direction in the figure). Thereby, the movable table unit 15 is transported in the positive direction on the X axis. In this case, the driving coils 722, 724 are controlled to be under the state where the energization is stopped.

When there is a position shift in the movable table 1, the non-energized driving coils 722, 724 and the driven magnets 6B, 6D are individually energized so as to execute the position shift correcting action (this also applies to other embodiments including the tenth embodiment).

(Control Mode B2)

The control mode B2 is an example of the energizing control mode for transporting the movable table 1 in the negative direction of the X axis (see FIG. 47).

The control mode B2 differs from the control mode B1 in respect that the energizing direction of the coil sides 721*a*, 723*a* of the driving coils 721, 723 on the X axis is reversed. In other respects, it is the same as that of the control mode B1.

Therefore, in the coil sides 721*a*, 723*a* of the driving coils 721, 723, the electromagnetic driving force is generated in the same manner as the case of the control mode B1 by the same principle. By the reaction force, the driven magnets 6A, 6C are repulsively driven in the direction indicated by solid-line arrows (in the left direction in the figure). Thereby, the movable table unit 15 is transported in the negative direction on the X axis. For the position shift of the movable table 1, the same correcting action as the case of the control mode B1 is executed.

(Control Mode B3)

The control mode B3 is an example of the energizing control mode for transporting the movable table 1 in the positive direction of the Y axis (see FIG. 47).

In the control mode B3, the driven magnets 6A, 6C on the X axis are controlled to stop energization, and the end face part of the driven magnet 6B on the Y axis facing the inner coil side 722*a* is controlled to be fixed as the north pole while the end face part of the driven magnet 6D on the Y axis facing the coil side 724*a* is controlled to be fixed as the south pole.

Therefore, in the coil sides 722*a*, 724*a* of the driving coils 722, 724, a prescribed electromagnetic driving force is generated in each of the coil sides 722*a*, 724*a* in the directions indicated by dotted-line arrows. At the same time, by the reaction force (generated since the square θ-shape driving coil 722, 724 are fixed), the driven magnets 6A, 6C are repulsively driven in the direction indicated by solid-line arrows (in the upward direction in the figure). Thereby, the movable table unit 15 is transported in the positive direction on the Y axis. In this case, the driving coils 721, 723 are controlled to be under the state where the energization is stopped.

When there is a position shift in the movable table 1, the non-energized driving coils 721, 723 and the driven magnets 6A, 6C are individually energize-controlled so as to execute the position shift correcting action.

(Control Mode B4)

The control mode B4 is an example of the energizing control mode for transporting the movable table 1 in the negative direction of the Y axis (see FIG. 47).

The control mode B4 differs from the control mode B3 in respect that the energizing direction of the coil sides 722*a*, 724*a* of the driving coils 722, 724 on the Y axis is reversed. In other respects, it is the same as that of the control mode B3.

Therefore, in the coil sides 722*a*, 724*a* of the driving coils 722, 724, the electromagnetic driving force is generated in the same manner as the case of the control mode B3 by the same principle. By the reaction force, the driven magnets 6B, 6D are repulsively driven in the direction indicated by solid-line arrows (in the downward direction in the figure). Thereby, the movable table unit 15 is transported in the negative direction on the Y axis. For the position shift of the movable table 1, the same correcting action as the case of the control mode B3 is executed.

Subsequently, described are examples (in a diagram) of each of the control modes B5–B8 in the case where the movable table unit 15 is transported in each of the four quadrant directions on the X-Y coordinates.

In FIG. 48, in each of the energizing control modes B5–B8, the energizing direction of the direct current for each of the square θ-shape driving coils 721–724 is individually set to be variably controlled. As for the energizing direction of each of the four driven magnets (electromagnets), the north pole or the south pole is controlled to be set unchanged (fixed state) at all times even if the control modes are different.

(Control Mode B5)

The control mode B5 according to the eleventh embodiment is an example of the energizing control mode for transporting the movable table 1 in the first quadrant direction of the X-Y plane coordinates (see FIG. 48).

In the control mode B5, each of the four driven magnets 6A–6D is set in the state to be simultaneously energize-controlled, and the energizing directions (north pole, south pole) are fixed as in the case of each of the control modes B1–B4.

Specifically, as for the driven magnets 6A, 6B disposed on the X axis, Y axis in the positive direction, the magnetic pole on the end face part in the area facing each of the square θ-shape driving coils 721, 722 is set to be the north pole while as for the driven magnets 6C, 6D disposed on the X axis, Y axis in the negative direction, the magnetic pole on the end face part in the area facing each of the square θ-shape driving coils 723, 724 is set to be the S pole.

Therefore, each of the coil sides 721*a*–724*a* of each of the square θ-shape driving coils 721–724 is energized to be in the state similar to the case where the control modes B1 and B3 operate simultaneously. Thus, the electromagnetic driving forces in the same directions (in the right direction and upward direction in FIG. 48) as the case of the control modes B1, B3 are generated, and the resultant force is directed in the first quadrant direction as shown in the section of the control mode B5 in FIG. 48. Thereby, the movable table unit 15 is transported towards the first quadrant direction on the X-Y plane coordinates.

The transporting angle θ (angle θ with respect to the X axis) towards the first quadrant with respect to the X axis can be variably set at will in arbitrary direction by changing the electromagnetic driving force working on each of the driven magnets 6A–6D through variably controlling the magnitude of the current flown into each of the square θ-shape driving coils 721–724 and the driven magnets 6A–6D. (Control Mode B6).

The control mode B6 is an example of the energizing control mode for transporting the movable table 1 in the third quadrant direction (the direction opposite to the first quadrant direction) of the X-Y plane coordinates (see FIG. 48).

In the control mode B6, each of the four driven magnets 6A–6D is set in the state to be simultaneously energize-controlled. The north pole and south pole are set in the same manner as the case of the control mode B5.

That is, each of the coil sides 721a–724a of each of the square θ-shape driving coils 721–724 is energized to be in the state similar to the case where the control modes B2 and B4 operate simultaneously.

Thus, the electromagnetic driving forces are generated in the same directions (in the left direction and downward direction of FIG. 48) as the cases of the control modes B2, B4, and the resultant force is directed in the third quadrant direction as shown in the section of the control mode B6 in FIGS. 4–8. Thereby, the movable table unit 15 is transported towards the third quadrant direction on the X-Y plane coordinates.

The transporting angle θ towards the third quadrant with respect to the X axis can be variably set at will in arbitrary directions by changing the electromagnetic driving force working on each of the driven magnets 6A–6D through variably controlling the magnitude of the current flown into each of the square θ-shape driving coils 721–724 and each of the driven magnets 6A–6D.

(Control Mode B7)

The control mode B7 is an example of the energizing control mode for transporting the movable table 1 in the second quadrant direction of the X-Y plane coordinates (see FIG. 48).

In the control mode B7, each of the four driven magnets 6A–6D is set in the state to be simultaneously energize-controlled. The north pole and south pole are set in the same manner as the case of the control mode B6.

In the case of the control mode B7, each of the coil sides 721a–724a of each of the square θ-shape driving coils 721–724 is energized to be in the state similar to the case where the control modes B2 and B3 operate simultaneously.

Thus, the electromagnetic driving forces are simultaneously generated in the same directions (in the left direction and upward direction of FIG. 48) as the cases of the control modes B2, B4, and the resultant force is directed in the second quadrant direction as shown in the section of the control mode B7 in FIG. 48. Thereby, the movable table unit 15 is transported towards the second quadrant direction on the X-Y plane coordinates.

The transporting angle θ towards the second quadrant with respect to the X axis can be variably set at will in arbitrary directions by changing the electromagnetic driving force working on each of the driven magnets 6A–6D through variably controlling the magnitude of the current flown into each of the square θ-shape driving coils 721–724 and each of the driven magnets 6A–6D.

(Control Mode B8)

The control mode B8 is an example of the energizing control mode for transporting the movable table 1 in the fourth quadrant direction (the direction opposite to the first quadrant direction) of the X-Y plane coordinates (see FIG. 48).

In the control mode B8, each of the four driven magnets 6A–6D is set in the state to be simultaneously energize-controlled. The north pole and south pole are set in the same manner as the case of the control mode B7.

In the case of the control mode B8, each of the coil sides 721a–724a of each of the square θ-shape driving coils 721–724 is energized to be in the state similar to the case where the control modes B1 and B4 operate simultaneously. Thus, the electromagnetic driving forces are generated in the same directions (in the right direction and downward direction of FIG. 48) as the cases of the control modes B1, B4, and the resultant force is directed in the fourth quadrant direction as shown in the section of the control mode B8 in FIG. 48. Thereby, the movable table unit 15 is transported towards the fourth quadrant direction on the X-Y plane coordinates.

The transporting angle θ towards the fourth quadrant with respect to the X axis can be variably set at will in arbitrary directions by changing the electromagnetic driving force working on each of the driven magnets 6A–6D through variably controlling the magnitude of the current flown into each of the square θ-shape driving coils 721–724 and each of the driven magnets 6A–6D.

Other configurations, the operations, and the functions are substantially the same as the case of the tenth embodiment.

With this, the same effect as the case of the tenth embodiment can be achieved. Moreover, in the eleventh embodiment, the driving coils 721–724 are individually disposed by corresponding to each of the driven magnets 6A–6D, so that it is possible to stop the energizing operation in the areas corresponding to the driving coils 721, 722, 723, 724, or the driven magnets 6A, 6B, 6C, 6D, which do not require the output of the driving force. Therefore, it is advantageous in respect that the energy of the entire apparatus can be saved during operation.

Further, in the eleventh embodiment, it has been described by referring to the case where the electromagnetic driving means 142 is drive-controlled by the control modes B1–B8 for setting the transfer direction of the movable table unit 15. However, for example, in the control mode B2, it may be configured in such a manner that, as long as it functions similarly, the electromagnetic driving means 142 is drive-controlled by other controlling methods, e.g. each energizing direction of the driven magnets 6A–6D is set to be in the reversed direction from the case of the control mode B1 and the energizing direction of the driving coils 721, 723 is set to be the same as the case of the control mode B1.

Moreover, in the eleventh embodiment, the mounting area of the driven magnets 6A–6D and that of the square θ-shape driving coils 721–724 may be switched. In this case, the driven magnets 6A–6D are mounted on the stator side and the square θ-shape driving coils 721–724 are mounted on the needle side.

Furthermore, although the eleventh embodiment is described by referring to the case where the driven magnets 6A–6D are formed with the electromagnets, the driven magnets 6A–6D may be formed with the permanent magnets.

With this, the electric wiring in the peripherals of the driven magnets 6A–6D is simplified, and the productivity and the maintenance characteristic can be extremely improved. In accordance with the simplification of the electric wiring, the spatial region for mounting the driven magnets 6A–6D can be reduced. For this, the size and weight of the entire apparatus can be reduced and, since the energization becomes unnecessary, the overall electric power consumption and temperature increase can be largely decreased compared to the case where the electromagnets are used for the driven magnets 6A–6D. Accordingly, the running cost of the entire apparatus can be extremely reduced. When drive-controlling the electromagnetic driving means 142, the movable table 1 can be driven to be transported in an arbitrary direction only through switching control of the energizing direction of each of a plurality of the driving coils 721–724. Thereby, it becomes possible to promptly respond to the switching of the moving direction of the movable table 1 and no accidents of wire breakdown or the like is caused in the driven magnets 6A–6D. Thus, it is advantageous in respect that the durability of the entire apparatus can be remarkably improved.

Twelfth Embodiment

Next, a twelfth embodiment will be described by referring to FIG. 49 to FIG. 53.

The twelfth embodiment is distinctive in respect that it comprises an electromagnetic driving means 143 to which two ring-shape driving coils formed in large and small size and corresponding driven magnets are mounted, instead of the electromagnetic driving means 4 in the tenth embodiment.

At the same time, it is distinctive in respect that an operation control system 203 for effectively driving the electromagnetic driving means 143 is mounted instead of the operation control system 20.

This will be described in detail hereinafter.

First, as in the case of the tenth embodiment, the twelfth embodiment comprises: a precise processing movable table unit 15 provided to be capable of moving in arbitrary directions on the same plane; a table holding mechanism 2 which allows the movement of the movable table unit 15 while holding the movable table unit 15 and also has an original position returning function; a case main body 3 as a main body part for supporting the table holding mechanism 2; and the electromagnetic driving means 143 mounted on the case main body 3 side for supplying a moving force to the movable table unit 15 in a prescribed direction according to a command from outside.

The movable table unit 15 is formed with a precise processing movable table 1 and an auxiliary table 5 which is disposed integrally, coaxially, and in parallel with respect to the movable table 1 with a prescribed space in between. As shown in FIG. 49, the table holding mechanism 2 is mounted on the auxiliary table 5 side and is configured to hold the movable table 1 through the auxiliary table 5.

[About Electromagnetic Driving Means 143]

The electromagnetic driving means 143 comprises the two small and large ring-shape driving coils 731, 732 on the same plane instead of the ring-shape driving coil 7 which is mounted in the tenth embodiment as described above. The ring-shape driving coils 731, 732 are held by the fixing plate 8.

Further, in the electromagnetic driving means 143, the four driven magnets 6A–6D and four driven magnets 16A–16D each are respectively provided by corresponding to each of the coil sides 731a–731d, 732a–732d of each of the ring-shape driving coils 731, 732 as in the case of the first embodiment.

Each of the driven magnets 6A–6D, 16A–16D is mounted to the auxiliary table 5.

In the twelfth embodiment, each of the two large and small ring-shape driving coils 731, 732 are coaxially provided on the same X-Y plane assumed with the origin being the center of the coil holding face on the fixing plate 8.

The inner ring-shape driving coil 731 positioned on the inner side is formed in substantially the quadrangular shape as the ring-shape driving coil 7 of the tenth embodiment, and it is mounted on the fixing plate 8 in such a manner that each center of each of the coil sides 731a, 731b, 731c, 731d crosses with the X axis, Y axis.

Each of the driven magnets 6A–6D is individually provided by adjacently facing the center of each of the coil sides 731a, 731b, 731c, 731d of the inner ring-shape driving coil 731 to be mounted and held by the auxiliary table 5.

Figure 50:
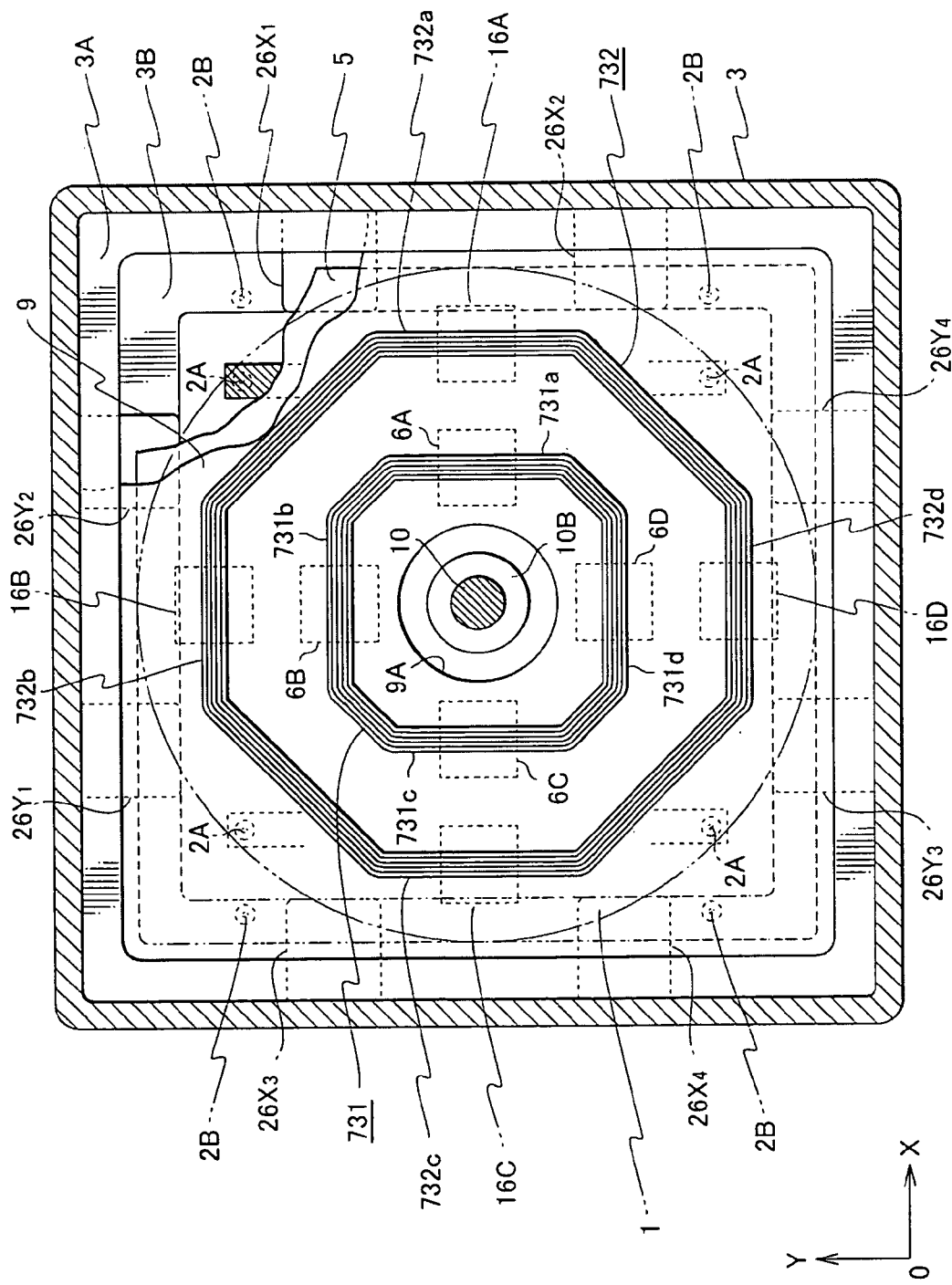
FIG. 50 is a schematic lateral cross section taken along the line A—A of FIG. 49.

Further, the outer ring-shape driving coil 732 provided on the outer side of the inner ring-shape driving coil 731 is formed in an octagonal shape as shown in FIG. 50. The outer ring-shape driving coil 732 is mounted on the fixing plate 8 in such a manner that each center of the four coil sides 732a–732d adjacent to each of the coil sides 731a–731d of the inner ring-shape driving coil 731 crosses with the X axis and Y axis, respectively.

Moreover, each of the driven magnets 16A–16D is individually provided by adjacently facing the center of each of the coil sides 732a, 732b, 732c, 732d of the outer ring-shape driving coil 732. Each of the driven magnets 16A–16D are mounted and held by the auxiliary table 5 while being provided along with each of the driven magnets 6A–6D.

In the embodiment, each of the driven magnets 6A–6D, 16A–16D is formed with the electromagnets which can be energize-controlled from outside.

A for the four driven magnets 6A to 6D according to the embodiment, as shown in FIG. 50, used are the electromagnets with the quadrangular magnetic pole end surface (the surface opposing the each coil side of the ring-shape driving coil 731). They are respectively provided and fixed on the X-Y plane assumed on the top face of the auxiliary table 5 at the positions on the X axis and Y axis at the equal distance from the center.

Also, the same electromagnets are used for other four driven magnets 16A–16D. They are also respectively provided and fixed on the X-Y plane assumed on the top face of the auxiliary table 5 at the positions on the X axis and Y axis at the equal distance from the center.

The fixing plate 8 is provided between the auxiliary table 5 and the movable table 1 as shown in FIG. 49 and held by the case main body 3. The stator part as the main part of the electromagnetic driving means 4 is formed with each of the ring-shape driving coils 731, 732 and the fixing plate 8.

When the ring-shape driving coils 731, 732 are set in action, the electromagnetic driving force is generated between with each of the driven magnets 6A–6D, 16A–16D for repulsively driving each of the driven magnets 6A–6D, 16A–16D towards the direction orthogonal to each coil side.

Thus, when moving the movable table unit 15 in the direction which is not orthogonal to each of the coil sides 731a–731d, 732a–732d (in the slantwise direction with respect to each of the coil sides 731a–731d, 732a–732d), the movable table unit 15 is moved by the resultant force of the electromagnetic driving forces for at least two or more of the driven magnets 6A to 6D as will be described later.

Further, in the coil sides 731a–731d, 732a–732d of the ring-shape driving coils 731, 732, which face each of the driven magnets 6A–6D, 16A–16D, the braking plate 9 made of non-magnetic metal material is provided adjacent to (substantially in contact with) the pole face of each of the driven magnets 6A–6D, 16A–16D. The braking plate 9 is fixed to the ring-shape driving coils 731, 732 side (the case main body 3 in the embodiment).

In the twelfth embodiment, when the entire apparatus is set in action, energization is started for the ring-shape driving coils 731, 732 in the energizing direction which is set beforehand. Further, correspondingly, as will be described later, a prescribed working current is flown into a part or entire part of the driven magnets 6A–6D, 16A–16D and the magnetic poles (north pole, south pole, or no magnetic pole) is set according to the transporting direction of the movable table unit 15. At the same time, the magnitude of the magnetic force of each of the driven magnets 6A–6D, 16A–16D including the ring-shape driving coils 731, 732 is adjusted by energization control. Thereby, the movable table unit 15 is transported in a prescribed direction.

In this case, the energizing directions of the ring-shape driving coils 731, 732 are specified beforehand by an operation control system 203 which will be described later. Correspondingly, the energizing direction of each of the driven magnets 6A–6D, 16A–16D is specified according to the transporting direction of the movable table unit 15. When the entire apparatus is in action, as described above, the magnitude of the flown current is variably controlled (including energization-stop control) by the operation control system 203.

In the coil sides 731a–731d of the inner ring-shape driving coil 731, the electromagnetic force (reaction force) is outputted to the driven magnets 6A–6D, for example, for pressing each of the driven magnets 6A, 6B, 6C, 6D in a prescribed direction (in the directions orthogonal to the coil sides 723a, 731b, 731c, 731d) according to Fleming's left-hand rule.

Between the outer ring-shape driving coil 732 and the driven magnets 16A, 16B, 16C or 16D, a prescribed electromagnetic force (reaction force) is also outputted along with each of the driven magnets 6A, 6B, 6C or 6D.

In this case, the direction of the electromagnetic force outputted to each of the corresponding driven magnets 6A–6D from the inner ring-shape driving coil 731 and that of the electromagnetic force outputted to each of the corresponding driven magnets 16A–16D from the inner ring-shape driving coil 732 are set before hand to face in the same direction at all times.

Further, by selecting and combining the directions of the electromagnetic forces generated in each of the four driven magnets 6A–6D, 16A–16D of each of the ring-shape driving coils 731, 732 beforehand, it is possible to set the resultant force of the electromagnetic driving forces generated in the four driven magnets 6A–6D, 16A–16D to be in the transporting direction of the movable table unit 15. Thereby, the moving force can be supplied to the movable table unit 15 to be moved in the arbitrary direction on the X-Y plane.

Figure 52:
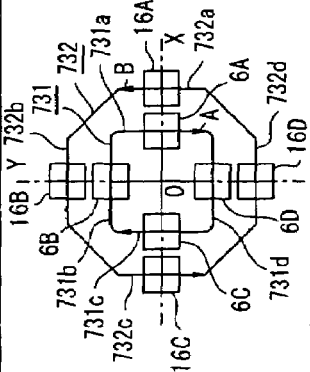
FIG. 52 is a diagram showing the control contents of a plurality of energizing control modes C1–C4 executed by the table driving control means of the embodiment disclosed in FIG. 49 and the moving directions (transporting directions of the movable table) of the entire driven magnets.
Figure 53:
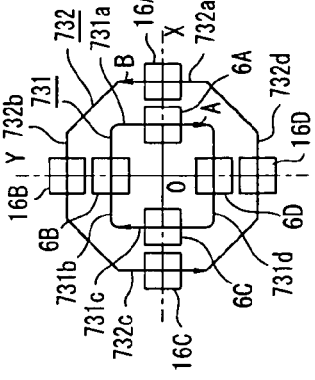
FIG. 53 is a diagram showing the control contents of a plurality of energizing control modes C5–C8 executed by the table driving control means of the embodiment disclosed in FIG. 49 and the moving directions (transporting directions of the movable table) of the entire driven magnets.

In this case, the action of the electromagnetic driving means 143 (energization drive for the ring-shape driving coils 731, 732 and each of the driven magnets 6A–6D, 16A–16D) in terms of the moving direction and transportation driving force for the movable table unit 15 will be described in FIG. 52 and FIG. 53. In FIG. 52 and FIG. 53, rotation-drive of the driving coil by energization is not illustrated.

On the outer side and inner side of the ring-shape driving coils 731, 732 on the same plane, a magnetic material such as ferrite may be filled at least up to the same height as the height (in the Y axis direction) of the ring-shape driving coils 731, 732 and within a range covering the operation range of the driven magnets 6A–6D.

[About Operation Control System 203]

Figure 51:
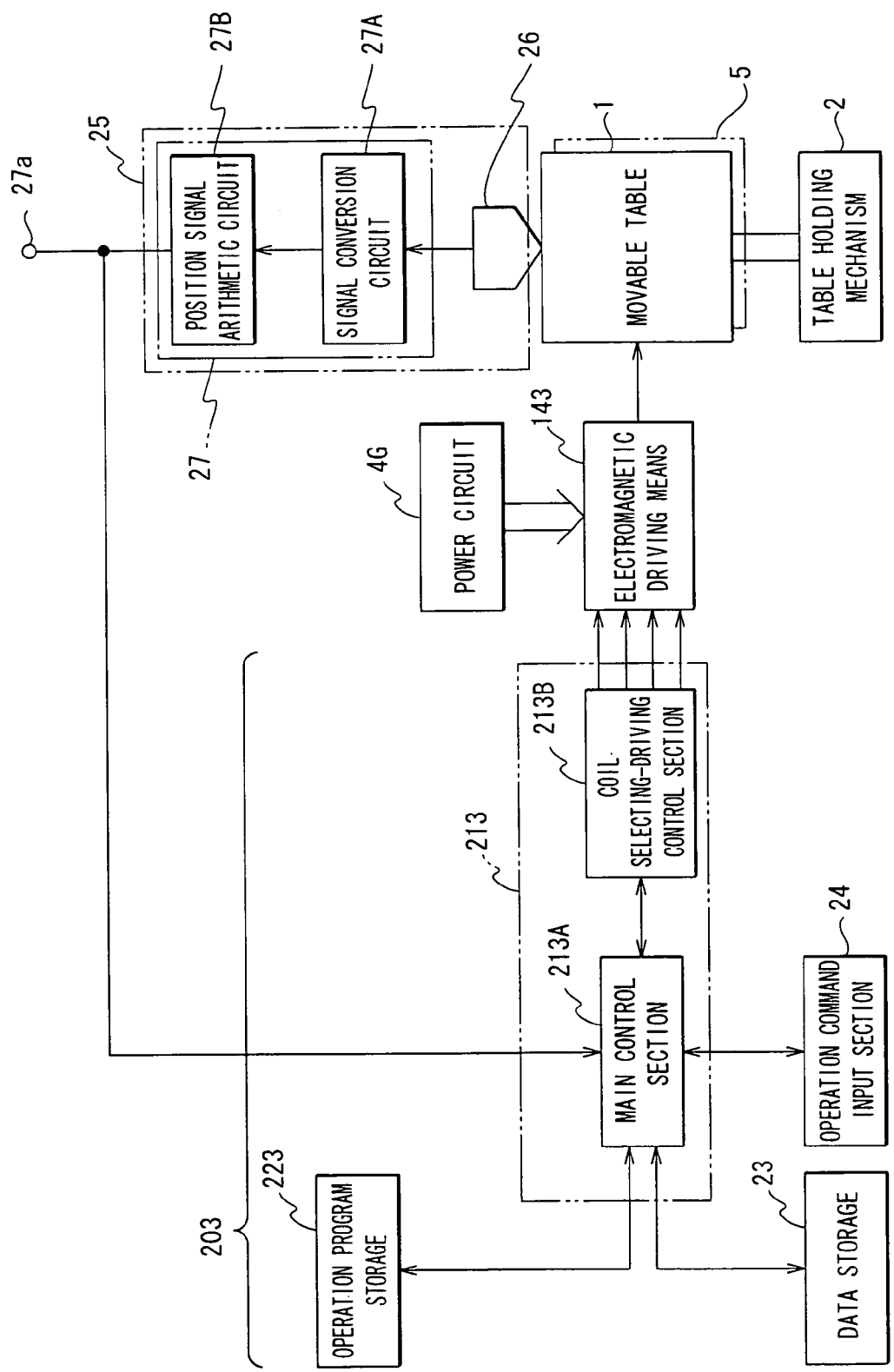
FIG. 51 is a block diagram showing the entire apparatus including the operation system according to the embodiment disclosed in FIG. 44.

In the embodiment, provided to the electromagnetic driving means 143 is an operation control system 203 which restricts the moving action of the movable table unit 15 by individually drive-controlling the two ring-shape driving coils 731, 732 on the inner and outer sides and each of the four driven magnets 6A–6D, 16A–16D (see FIG. 51).

The operation control system 203 comprises: an energizing direction setting function for setting and maintaining the energizing direction for each of the ring-shape driving coils 731, 732 to a prescribed direction (in one direction or other); a driving coil energizing control function for variably setting the magnitude of the current flown into each of the ring-shape driving coils 731, 732; a magnetic pole individual setting function which operates according to the energizing direction of each of the ring-shape driving coils 731, 732 for individually setting and maintaining the magnetic poles of the driven magnets 6A–6D, 16A–16D; magnetic force magnitude setting function for individually and variably setting (can be set by varying the flown current) the magnitudes of the magnetic force of each of the driven magnets 6A–6D, 16A–16D according to a command from outside; and a table action control function for adjusting the transporting direction and transporting force for the movable table unit 15 by appropriately adjusting the operations performed by the various functions.

For carrying out the various functions described above, the operation control system 203 comprises, as shown in FIG. 51: a table driving control means 213 which individually drives the two ring-shape driving coils 731, 732 and each of the corresponding driven magnets 6A–6D, 16A–16D of the electromagnetic driving means 143 according to a prescribed energizing control mode for controlling the movement of the movable table unit 15 in a prescribed direction; a program storage 223 being provided along with the table driving control means 213, to which a plurality of control programs for a plurality of control modes (eight energizing control modes C1–C8 in the embodiment) in which the moving direction, moving amount and the like of the movable table 1 are specified are provided; and a data storage 23 to which prescribed data and the like are stored to be used at the time of executing each control program.

Further, in the table driving control means 213, provided is an operation command input section 24 for giving a command of a prescribed control operation to the ring-shape driving coils 731, 732 and each of the driven magnets 6A–6D, 16A–16D. Moreover, the positional information of the movable table unit 15 during the movement and after the movement is detected by the positional information detecting means 25 and arithmetic-processed to be transmitted to the table driving control means 213.

The various control functions of the operation control system 203 are comprehensively contained in a plurality of the energizing control modes C1–C8 in the program storage 223. They are selected according to a selection command inputted through the operation input section 24 by an operator. Through one of the selected prescribed control modes C1–C8, the various control functions are started and carried out.

This will be described in detail.

Specifically, the table driving control means 213 comprises: a main control section 213A which operates according to the command from the operation command input section 24 and has a function of selecting a prescribed control mode from the program storage 223 and of energize-controlling a prescribed direct current including zero to each of the ring-shape driving coils 731, 732 and each of the four driven magnets 6A–6D, 16A–16D; and a coil selecting-driving control section 213B which has a function of drive-controlling the ring-shape driving coils 731, 732 and each of the four driven magnets 6A–6D, 16A–16D simultaneously or separately according to a prescribed control modes (C1–C8) selected and set by the main control section 213A.

Moreover, the main control section 213A also has a function of calculating the position of the movable table 1 according to the input information from the positional information detecting means 25 for detecting the table position or carrying out other various arithmetic operations.

Numeral reference 4G is a power circuit for supplying a prescribed current to the ring-shape driving coils 731, 732 of the electromagnetic driving means 143 and the each of the four driven magnets 6A–6D, 16A–16D.

Further, the table driving control means 213 comprises: a position shift calculating function which is for carrying out a prescribed arithmetic operation through inputting the information from the positional information detecting means 25 and, based on this, calculating the difference between with the reference position information of the target position set beforehand by the operation command input section 24; and a table position correcting function which controls to transport the movable table unit 15 to the reference position of the target position which is set beforehand by driving the electromagnetic driving means 143 based on the calculated position shift information.

Thus, in the tenth embodiment, when the moving direction of the movable table unit 15 is shifted by disturbance or the like, the movable table unit 15 is controlled to be transported in a prescribed direction by correcting the position shift. Thereby, the movable table unit 15 is transported to the target position which is set beforehand promptly and in highly precise manner. In this case, correction of the position shift is carried out by adjusting the current flown into each of the driven magnets 6A–6D or 16A–16D being energized to be driven.

[Program Storage]

The table driving control means 213 is configured to drive-control each of the ring-shape driving coils 731, 732 and each of the four driven magnets 6A–6D, 16A–16D of the electromagnetic driving means 143 individually with a prescribed relation therebetween according to a prescribed control program (a prescribed energizing control mode) which is stored beforehand in the program storage 223.

Specifically, in the embodiment, stored in the program storage 223 are: a driving coil control program which specifies the energizing direction for each of the ring-shape driving coils 731, 732 and variably sets the magnitude of the flown current; and a plurality of magnet control programs, which function upon the time when the energizing direction for each of the ring-shape driving coils 731, 732 is specified, for specifying the driving directions of each of the four driven magnets (electromagnets) 6A–6D, 6A–16D individually as well as the north pole or the south pole of the magnetic pole, while variably setting the magnitude of the flown current including the non-energization. At the same time, the operation timing of each control program is arranged in a group of eight energizing control modes C1–C8 and stored in the program storage 223 (see FIG. 51, FIG. 52).

Now, a group of eight energizing control modes C1–C8 according to the twelfth embodiment will be described by referring to FIG. 52 and FIG. 53.

FIG. 52 shows examples (in diagram) of each of the energizing control modes C1–C4 in the case where the movable table unit 15 is moved in the positive or negative direction of the X axis or the positive or negative direction of the Y axis, respectively.

In FIG. 52, in each of the energizing control modes C1–C4 of the embodiment, the energizing direction of the direct current for the inner ring-shape driving coil 731 is set in clockwise direction as indicated by an arrow A. Further, the energizing direction of the direct current for the outer ring-shape driving coil 732 in the embodiment is set in counterclockwise direction as indicated by an arrow B.

(Control Mode C1)

The control mode C1 is an example of the energizing control mode for transporting the movable table 1 in the positive direction of the X axis (see FIG. 52).

In the control mode C1, the driven magnets 6B, 6D, 16B, 16D on the Y axis are controlled to stop energization.

As for the inner ring-shape driving coil 731, the end face part of the driven magnet 6A on the X axis facing the coil side 731a is set to be the north pole while the end face part of the driven magnet 6C on the X axis facing the coil side 731c is set to be the south pole.

Similarly, as for the outer ring-shape driving coil 732, the end face part of the driven magnet 16A on the X axis facing the coil side 732a is set to be the south pole while the end face part of the driven magnet 16C on the X axis facing the coil side 732c is set to be the north pole.

Therefore, in each of the coil sides 731a, 731c and 732a, 732c of the ring-shape driving coils 731, 732, the electromagnetic driving force is generated in the coil sides 731a, 731c and 732a, 732c in the directions indicated by dotted-line arrows. At the same time, by the reaction force (since the ring-shape driving coils 731, 732 are fixed), the driven magnets 6A, 6C and 16A, 16C are repulsively driven in the direction indicated by a solid-line arrow (in the right direction in the figure). Thereby, the movable table unit 15 is transported in the positive direction on the X axis.

(Control Mode C2)

The control mode C2 is an example of the energizing control mode for transporting the movable table 1 in the negative direction of the X axis (see FIG. 52).

The control mode C2 differs from the control mode C1 in respect that the setting of the magnetic poles of the driven magnets 6A, 6C and 16A, 16C on the X axis are reversed. In other respects, it is the same as that of the control mode C1.

Therefore, in each of the coil sides 731a, 731c and 732a, 732c of each of the ring-shape driving coils 731, 732, the electromagnetic driving force is generated in the directions opposite to the case of the control mode C1 by the same principle. By the reaction force, the driven magnets 6A, 6C and 16A, 16C are repulsively driven in the direction indicated by solid-line arrows (in the left direction in the figure). Thereby, the movable table unit 15 is transported in the negative direction on the X axis.

(Control Mode C3)

The control mode C3 is an example of the energizing control mode for transporting the movable table 1 in the positive direction of the Y axis (see FIG. 52).

In the control mode C3, the driven magnets 6A, 6C, 16A, 16C on the X axis are controlled to stop energization.

As for the inner ring-shape driving coil 731, the end face part of the driven magnet 6B on the Y axis facing the coil side 731b is set to be the north pole while the end face part of the driven magnet 6D on the Y axis facing the coil side 731d is set to be the south pole.

Similarly, as for the outer ring-shape driving coil 732, the end face part of the driven magnet 16B on the Y axis facing the coil side 732b is set to be the south pole while the end face part of the driven magnet 16D on the Y axis facing the coil side 732d is set to be the north pole.

Therefore, in each of the coil sides 731b, 731d and 732b, 732d of each of the ring-shape driving coils 731, 732, the electromagnetic driving force is generated in 731b, 731d and 732b, 732d in the directions shown by dotted-line arrows. At the same time, by the reaction force (the ring-shape driving coils 731, 732 are fixed), the driven magnets 6B, 6D and 16B, 16D are repulsively driven in the direction indicated by solid-line arrows (in the upward direction in the figure). Thereby, the movable table unit 15 is transported in the positive direction on the Y axis.

(Control Mode C4)

The control mode C4 is an example of the energizing control mode for transporting the movable table 1 in the negative direction of the Y axis (see FIG. 52).

The control mode C4 differs from the control mode C3 in respect that the setting of the magnetic poles of the driven magnets 6B, 6D and 16B, 16D on the Y axis are reversed. In other respects, it is the same as that of the control mode C3.

Therefore, in each of the coil sides 731b, 731d and 732b, 732d of each of the ring-shape driving coils 731, 732, the electromagnetic driving force is generated by the same principle as the case of the control mode C3. By the reaction force, the driven magnets 6B, 6D and 16B, 16D are repulsively driven in the direction indicated by a solid-line arrow (in the downward direction in the figure). Thereby, the movable table unit 15 is transported in the negative direction on the Y axis.

Subsequently, examples of the control modes C5 to C8 will be described.

FIG. 53 shows examples (in a diagram) of each of the control modes C5–C8 in the case where the movable table unit 15 is transported in each of the four quadrant directions on the X-Y coordinates.

(Control Mode C5)

The control mode C5 according to the twelfth embodiment is an example of the energizing control mode for transporting the movable table 1 in the first quadrant direction of the X-Y plane coordinates (see FIG. 53).

In the control mode C5, each of the four driven magnets 6A–6D and 16A–16D is set in the state to be simultaneously energize-controlled. As for the magnetic poles, the end face part facing the coil sides 731a, 731b of the inner ring-shape driving coil 731 is set to be the north pole while the end face part o facing the coil side 731c, 731d of the inner ring-shape driving coil 731 is set to be the south pole, respectively.

Similarly, the end face part facing the coil sides 732a, 732b of the outer ring-shape driving coil 732 is set to be the south pole while the end face part facing the coil side 732c, 732d of the outer ring-shape driving coil 732 is set to be the north pole, respectively.

Therefore, each of the coil sides 731a–731d, 732a–732d of each of the ring-shape driving coils 731, 732 is energized to be in the state similar to the case where the control modes C1 and C3 operate simultaneously. Thus, the resultant force is directed in the first quadrant direction as shown in the section of the control mode C5 in FIG. 53. Thereby, the movable table unit 15 is transported towards the first quadrant direction on the X-Y plane coordinates.

The transporting angle θ towards the first quadrant with respect to the X axis can be variably set at will in arbitrary directions by changing the electromagnetic driving force working on each of the driven magnets 6A–6D, 16A–16D through variably controlling the magnitude of the current flown into each the driven magnets 6A–6D, 16A–16D.

(Control Mode C6)

The control mode C6 is an example of the energizing control mode for transporting the movable table 1 in the third quadrant direction (the direction opposite to the first quadrant direction) of the X-Y plane coordinates (see FIG. 53).

In the control mode C6, each of the four driven magnets 6A–6D, 16A–16D is set in the state to be simultaneously energize-controlled. The north pole and south pole are set inversely with respect to the case of the control mode C5.

Therefore, each of the coil sides 731a–731d, 732a–732d of each of the ring-shape driving coils 731, 732 is energized to be in the state similar to the case where the control modes C2 and C4 operate simultaneously. Thus, the resultant force is directed in the third quadrant direction as shown in the section of the control mode C6 in FIG. 53. Thereby, the movable table unit 15 is transported towards the third quadrant direction on the X-Y plane coordinates.

The transporting angle θ towards the third quadrant with respect to the X axis can be variably set at will in arbitrary directions by, for example, changing the magnitude of the flown current into each of the driven magnets 6A–6D, 16A–16D.

(Control Mode C7)

The control mode C7 is an example of the energizing control mode for transporting the movable table 1 in the second quadrant direction of the X-Y plane coordinates (see FIG. 53).

In the control mode C7, each of the four driven magnets 6A–6D and 16A–16D is set in the state to be simultaneously energize-controlled. As for the magnetic poles, the end face part facing the coil sides 731b, 731c of the inner ring-shape driving coil 731 is set to be the north pole while the end face part facing the coil side 731d, 731a of the inner ring-shape driving coil 731 is set to be the south pole, respectively.

Similarly, the end face part facing the coil sides 732b, 732c of the outer ring-shape driving coil 732 is set to be the south pole while the end face part facing the coil side 732d, 732a of the outer ring-shape driving coil 732 is set to be the north pole, respectively.

Therefore, each of the coil sides 731a–731d, 732a–732d of each of the ring-shape driving coils 731, 732 is energized to be in the state similar to the case where the control modes C2 and C3 operate simultaneously. Thus, the resultant force is directed in the second quadrant direction as shown in the section of the control mode C7 in FIG. 53. Thereby, the movable table unit 15 is transported towards the second quadrant direction on the X-Y plane coordinates.

The transporting angle θ towards the second quadrant with respect to the X axis can be variably set at will in arbitrary directions by changing the electromagnetic driving force working on each of the driven magnets 6A–6D, 16A–16D through variably controlling the magnitude of the current flown into each of the driven magnets 6A–6D, 16A–16D.

(Control Mode C8)

The control mode C8 is an example of the energizing control mode for transporting the movable table unit 15 in the fourth quadrant direction (the direction opposite to the second quadrant direction) of the X-Y plane coordinates (see FIG. 53).

In the control mode C8, each of the four driven magnets 6A–6D, 16A–16D is set in the state to be simultaneously energize-controlled. The north pole and south pole are set inversely with respect to the case of the control mode C7.

Therefore, each of the coil sides 731a–731d, 732a–732d of each of the ring-shape driving coils 731, 732 is energized to be in the state similar to the case where the control modes C1 and the control mode C4 operate simultaneously. Thus, the resultant force is directed in the fourth quadrant direction as shown in the section of the control mode C8 in FIG. 53. Thereby, the movable table unit 15 is transported towards the fourth quadrant direction on the X-Y plane coordinates.

The transporting angle θ towards the fourth quadrant with respect to the X axis can be variably set at will in arbitrary directions by, for example, changing the magnitude of the flown current into each of the driven magnets 6A–6D, 16A–16D.

[Other Examples of Ring-Shape Driving Coils 731, 732]

In the twelfth embodiment, technically the same two ring-shape driving coils as the ring-shape driving coils 71–74 of the tenth embodiment disclosed in FIGS. 43(A)–(D) in large and small size are provided double on the same plane, respectively, according to the configuration of the embodiment shown in FIG. 50. A plurality of corresponding driven magnets are mounted respectively and, accordingly, each of the structural elements is built. Thereby, it is possible to obtain an electromagnetic driving means comprising the ring-shape driving coils which function similarly as the ones of the twelfth embodiment.

The twelfth embodiment is configured as described above. Thus, it has the same functions and the same effects as those of the tenth embodiment. Moreover, the output of the electromagnetic driving means can be increased since the ring-shape driving coils and the driven magnet, respectively, are mounted twice as many compared to the case of the tenth embodiment. Also, there are many driven magnets so that, when transporting the movable table, it is possible to execute the moving operation of the movable table unit more promptly and precisely compared to the case of the tenth embodiment.

Further, in the twelfth embodiment, a plurality of the driven magnets are disposed on the areas in each of the driving coils that cross with the X axis and Y axis. Therefore, in practice, it becomes easy to specify the transporting direction so that the drive-control of the driven magnets can be simplified as a whole. Accordingly, it is possible to promptly correspond to the change in the transporting direction of the movable table unit. At the same time, it is also possible to correspond to the transportation control and the like (for example, switching control of the direction, or the correction when there is a position shift or the like generated) of the movable table unit.

Thirteenth Embodiment

Next, a thirteenth embodiment will be described by referring to FIG. 54 to FIG. 58.

The thirteenth embodiment is distinctive in respect that it comprises another electromagnetic driving means 144 to which four rectangular driving coils are mounted instead of the electromagnetic driving means 142 of the eleventh embodiment. At the same time, it is distinctive in respect that an operation control system 204 for effectively driving the electromagnetic driving means 144 is mounted instead of the operation control system 202.

This will be described in detail hereinafter.

First, as in the case of the tenth embodiment, the thirteenth embodiment comprises: a precise processing movable table unit 15 provided to be capable of moving in arbitrary directions on the same plane; a table holding mechanism 2 which allows the movement of the movable table unit 15 while holding the movable table unit 15 and also has an original position returning function for the movable table unit 15; a case main body 3 as a main body part for supporting the table holding mechanism 2; and the electromagnetic driving means 144 mounted on the case main body 3 side for supplying a moving force to the movable table unit 15 in a prescribed direction according to a command from outside.

Figure 54:
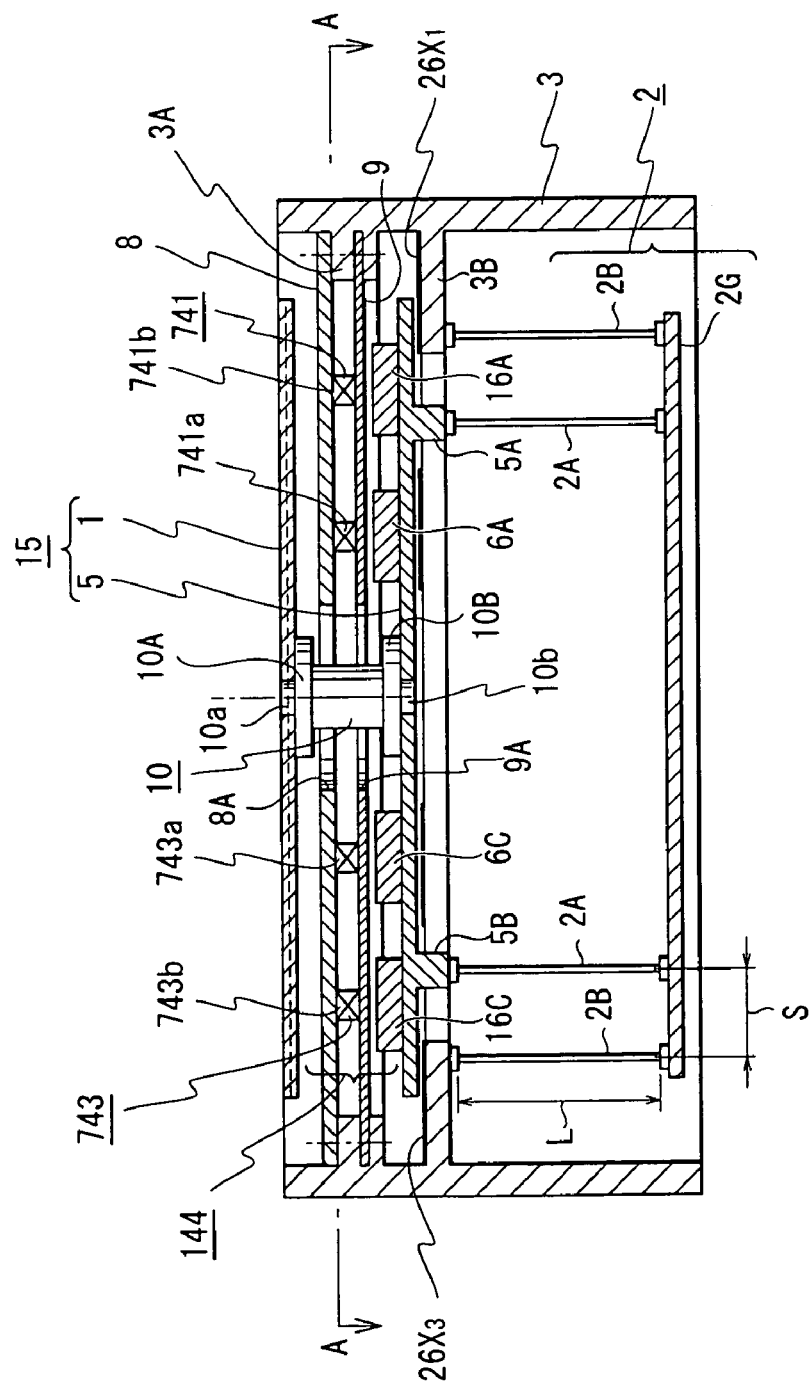
FIG. 54 is a longitudinal cross section showing a thirteenth embodiment of the present invention.

The movable table unit 15 is formed with a precise processing movable table 1 and an auxiliary table 5 which is disposed integrally, coaxially, and in parallel with respect to the movable table 1 with a prescribed space in between. As shown in FIG. 54, the table holding mechanism 2 is mounted on the auxiliary table 5 side for holding the movable table 1 through the auxiliary table 5.

[About Electromagnetic Driving Means 144]

The electromagnetic driving means 144 is held on the case main body 3 side by its main part and has a function of supplying a prescribed moving force (driving force) to the movable table unit 15 along the transporting direction of the movable table unit 15 according to a command from outside. The electromagnetic driving means 144 is disposed between the movable table 1 and the auxiliary table 5.

Specifically, the electromagnetic driving means 144 comprises: four rectangular driving coils 741, 742, 743, 744 formed in a quadrangular shape; each of the four driven magnets 6A, 6B, 6C, 6D and 16A, 16B, 16C, 16D mounted on the auxiliary table 5 by individually corresponding to inner coil sides 741a–744a and outer coil sides 741b–744b positioned in the area of each of the rectangular driving coils 721–724 that cross with the X axis and Y axis; and a fixing plate 8 for holding each of the four rectangular driving coils 741–744 at prescribed positions.

Each of the rectangular driving coils 741–744 is respectively and individually disposed on the X axis and Y axis in such a manner that the two opposing sides cross at right angles with the X axis or the Y axis on the X-Y plane assumed with the origin being the center of the fixing plate 8.

Further, each of the four driven magnets 6A–6D, 16A–16D is formed with the electromagnets which can be energized form outside and is individually provided in the X axis and Y axis by corresponding to the inner coil sides 741a–744a and outer coil sides 741b–744b of each rectangular driving coil.

The fixing plate 8 is provided to the auxiliary table 5 on the movable table 1 side as shown in FIG. 54 and held by the case main body 3. The stator part as the main part of the electromagnetic driving means 144 is formed with each of the rectangular driving coils 741–744 and the fixing plate 8.

When each of the driving coils 741–744 is set in action, it generates the electromagnetic driving force between with each of the driven magnets 6A–6D, 16A–16D for repulsively driving each of the driven magnets 6A–6D, 16A–16D towards the direction orthogonal to each of the coil sides 741a–744a, 741b–744b. In this case, the center axis of each of the driven magnets 6A–6D, 16A–16D in the moving direction is set to pass through the center point on the X-Y plane.

Further, when moving the movable table unit 15 in the direction which does not cross with each of the coil sides 741a–744a, 741b–744b (in the slantwise direction with respect to each of the coil sides 741a–744a, 741b–744b), the movable table unit 15 is moved by the resultant force of the electromagnetic driving forces of the rectangular driving coils 741, 742, 743, 744 for at least two or more of the driven magnets 6A–6D as will be described later.

Further, in the coil sides 741a–744a, 741b–744b of the driving coils 741–744, which face each of the driven magnets 6A–6D, 16A–16D, the braking plate 9 made of non-magnetic metal material is provided adjacent to (substantially in contact with) the pole face of each of the driven magnets 6A–6D, 16A–16D. In the embodiment, a single braking plate 9 is used and a part or entire part of the periphery is fixed to the case main body 3.

Figure 55:
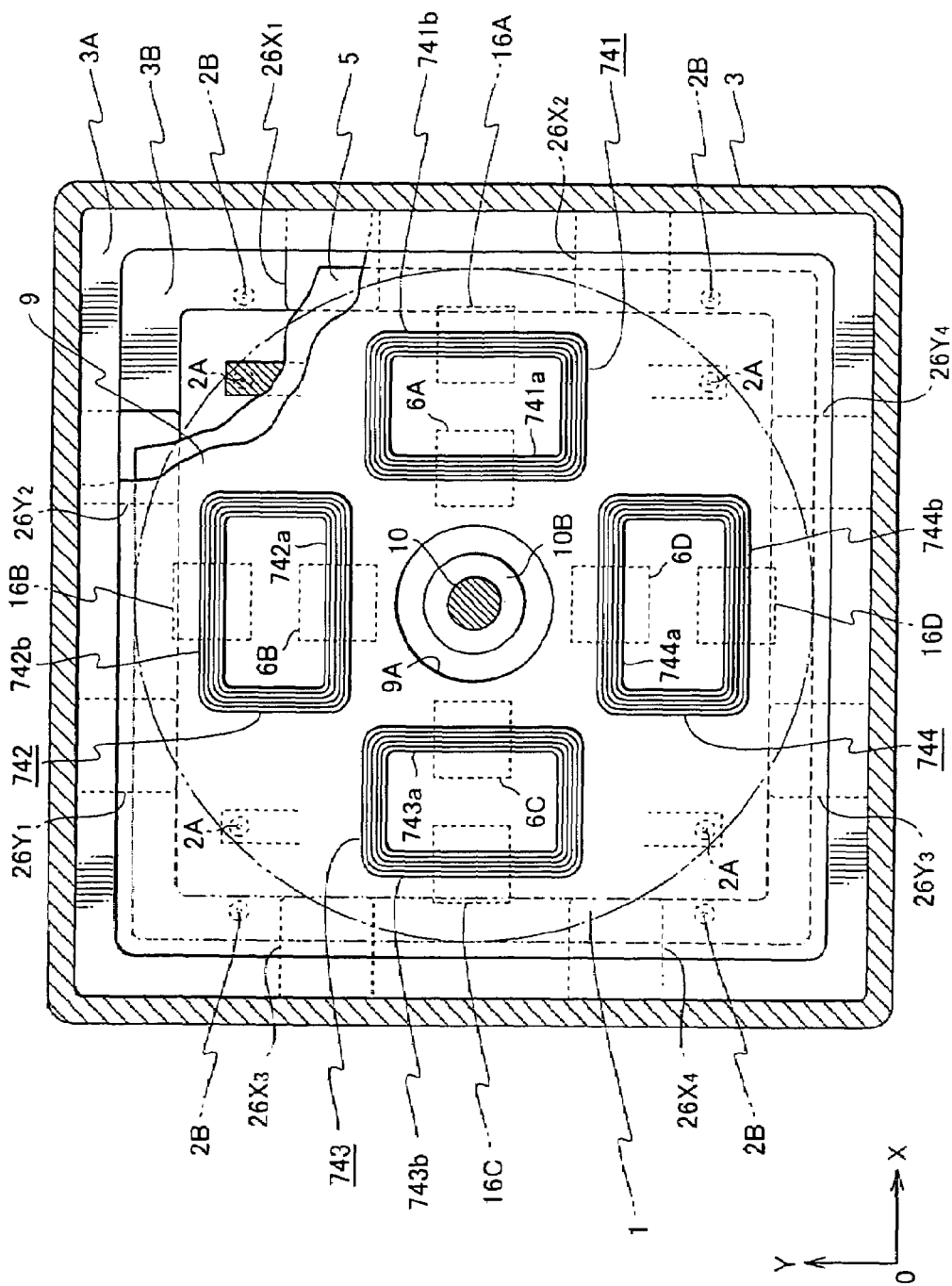
FIG. 55 is a schematic lateral cross section taken along the line A—A of FIG. 54.

As for the four driven magnets 6A–6D, 16A–16D constituting a part of the electromagnetic driving means 144 according to the embodiment, as shown in FIG. 55, used are the electromagnets with the quadrangular magnetic pole end surface (the surface opposing the each of the coil sides 721a–724a, 721b–724b of each of the driving coils 741–744). They are respectively provided and fixed on the X-Y plane assumed on the top face of the auxiliary table 5 at the positions on the X axis and Y axis at the equal distance from the center.

In the embodiment, for example, when a prescribed operating current is flown into a part or the entire part of the eight driven magnets 6A–6D, 16A–16D for setting each of the driven magnets 6A–6D, 16A–16D in operation, each of the driving coils 741–744 is set in action to start the energization subsequently or simultaneously according to a prescribed control mode which will be described later. Then, the magnitudes of the magnetic force of each driven magnets 6A–6D, 16A–16D including each of the driving coils 741–744 are adjusted by the energization control. Thereby, the movable table unit 15 is transported in a prescribed direction.

Figure 57:
FIG. 57 is a diagram showing the control contents of a plurality of energizing control modes D1–D4 executed by the table driving control means of the embodiment disclosed in FIG. 54 and the moving directions (transporting directions of the movable table) of the entire driven magnets.
Figure 58:
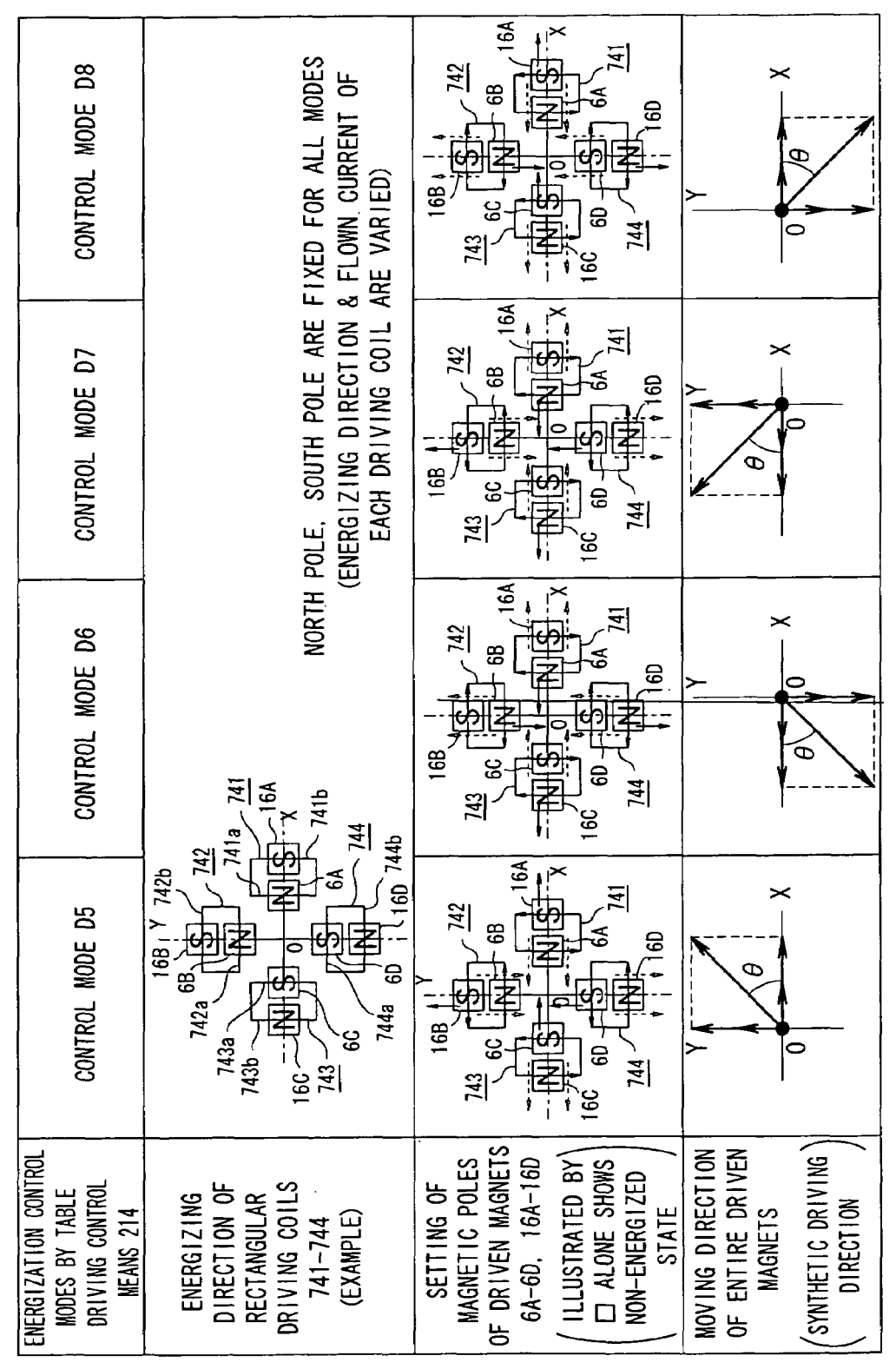

In this case, the action of the electromagnetic driving means 144 (energization drive for each of the driving coils 741–744 and the four driven magnets 6A–6D, 16A–16D) in terms of the moving direction and transportation driving force for the movable table unit 15 will be described in FIG. 57 and FIG. 58. In FIG. 57 and FIG. 58, rotation-drive of the driving coil by energization is not shown.

In this case, in the thirteenth embodiment, the energizing direction of the eight driven magnets 6A–6D, 16A–16D made of the electromagnets is specified beforehand. Thus, the energizing direction and the magnitude of the flown current (including the energization-stop control) of each of the inner coil sides 741a–744a and each outer coil sides 741b–744b of the eight rectangular driving coils 741–744 are set and controlled by the operation control system 204 which will be described later by corresponding to the transporting direction of the movable table 1. Thereby, the electromagnetic force (reaction force) is to be outputted to the driven magnets 6A–6D, 16A–16D for pressing them in a prescribed direction (in the directions respectively orthogonal to the coil sides 741a–744a, 741b–744b part) according to Fleming's left-hand rule.

Further, by selecting and combining the directions of the electromagnetic forces generated in the eight driven magnets 6A–6D, 16A–16D beforehand, it is possible to set the resultant force of the electromagnetic driven forces generated in each of the driven magnets 6A–6D, 16A–16D to be in the transporting direction of the movable table unit 15. Thereby, the moving force can be supplied to the movable table unit 15 to be moved in the arbitrary direction on the X-Y plane.

A series of energizing control method for the eight driven magnets 6A–6D, 16A–16D will be described in detail in the description of a program storage 22 (FIG. 57–FIG. 58) which will be described later.

On the outer side and inner side of each of the driving coils 741–744 on the same plane, a magnetic material such as ferrite may be filled at least up to the same height as the height (in the Y axis direction) of each of the driving coils 741–744 and within a range covering the operation range of the driven magnets 6A–6D, 16A–16D.

[About Operation Control System 204]

Next, the operation control system 204 of the thirteenth embodiment will be described in detail.

Figure 56:
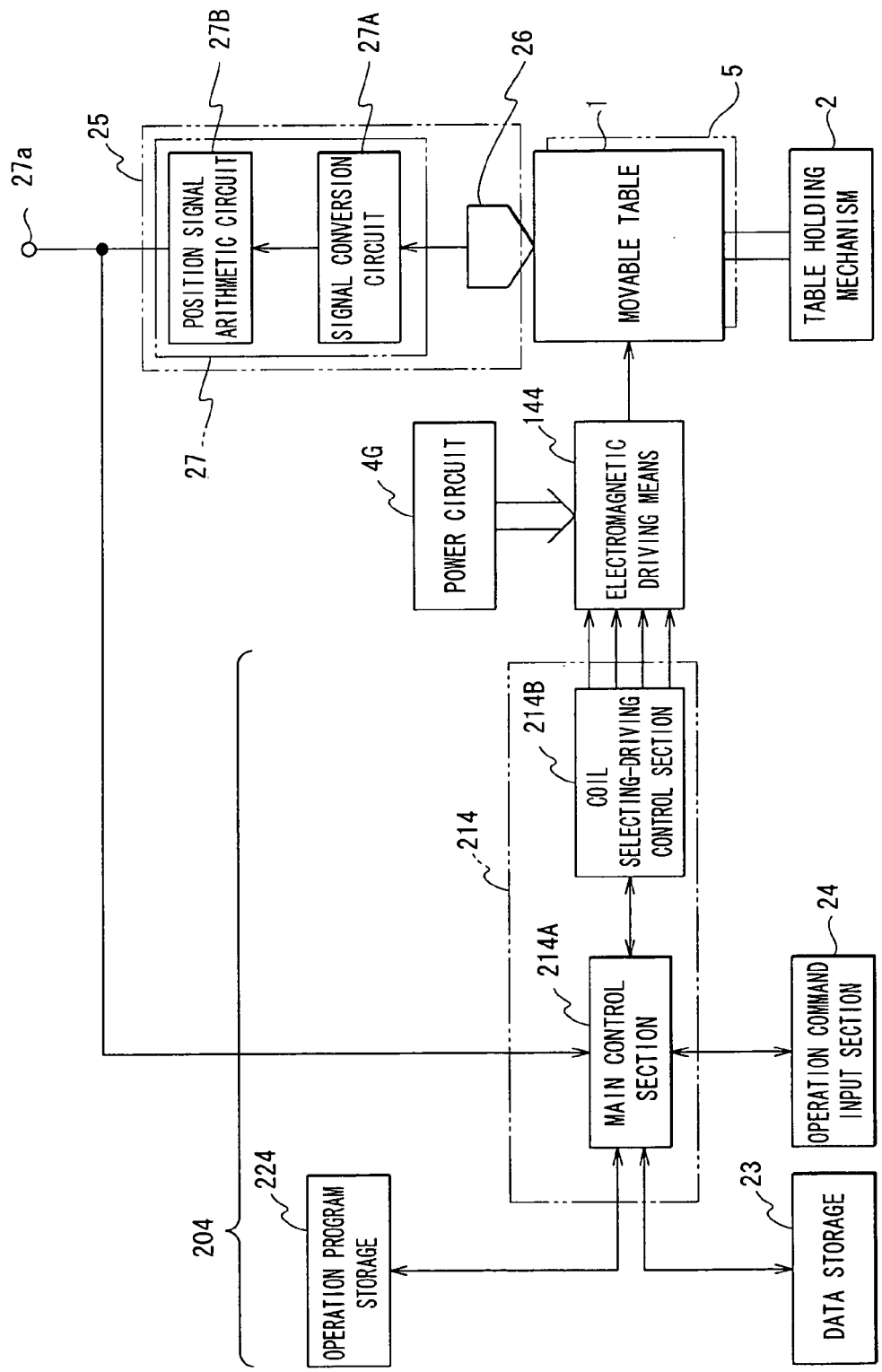
FIG. 56 is a block diagram showing the entire apparatus including the operation system according to the embodiment disclosed in FIG. 54.

In the thirteenth embodiment, provided to the electromagnetic driving means 144 is an operation control system 204 which restricts the moving action of the movable table unit 15 by individually energize-controlling each of the rectangular driving coils 741–744 and each of the four driven magnets 6A–6D, 16A–16D (see FIG. 56).

The operation control system 204 comprises: a magnetic pole individual setting function for individually setting and maintaining the magnetic poles of each of the eight driven magnets 6A–6D, 16A–16D which are mounted by corresponding to each of the rectangular driving coils 741–744; a magnetic force magnitude setting function for individually and variably setting (it is possible to set by changing the flown current) the magnitude of the magnetic force of each of the driven magnets 6A–6D, 16A–16D; an energizing direction setting function for setting and maintaining the energizing direction of the coil sides 741a, 742a, 743a, 744a, 741b, 742b, 743b, 744b part of each of the rectangular driving coils 741–744 that cross with the X axis or Y axis to a prescribed direction (in one direction or other) according to a command from outside; a driving coil energizing control function for variably setting the magnitude of the current flown into each of the square θ-shape driving coils 741–744; and a table action control function for adjusting the transporting direction and transporting force for the movable table unit 15 by appropriately adjusting the output of the various functions.

For carrying out the functions described above, as shown in FIG. 56, the operation control system 204 comprises: a table driving control means 214 which individually drives each of the rectangular driving coils 741–744 and each of the driven magnets 6A–6D, 16A–16D of the electromagnetic driving means 144 according to a prescribed energizing control mode for controlling the movement of the movable table unit 15 in a prescribed direction; a program storage 222 being provided along with the table driving control means 214, to which a plurality of control programs for a plurality of control modes (eight energizing control modes D1–D8 in the embodiment) in which the moving direction, moving amount and the like are specified are provided; and a data storage 23 to which prescribed data and the like are stored to be used at the time of executing each control program.

Further, in the table driving control means 214, provided is an operation command input section 24 for giving a command of a prescribed control operation to each of the rectangular driving coils 741–744 and each of the eight driven magnets 6A–6D, 16A–16D. Moreover, the positional information of the movable table 1 during the movement and after the movement is detected by the positional information detecting means 25 and arithmetic-processed to be transmitted to the table driving control means 214.

The various control functions of the operation control system 204 are comprehensively contained in a plurality of the energizing control modes D1–D8 in the program storage 224. They are selected according to a selection command inputted through the operation input section 24 by an operator. Through one of the selected prescribed control modes D1–D8, the various control functions are started and carried out.

This will be described in detail.

The table driving control means 214 according to the embodiment comprises: a main control section 214A which operates according to the command from the operation command input section 24 and has a function of selecting a prescribed control mode from the program storage 224 and of energize-controlling a prescribed direct current including zero to each of the rectangular driving coils 741–744 and each of the eight driven magnets 6A–6D, 16A–16D; and a coil selecting-driving control section 214B which has a function of drive-controlling each of the rectangular driving coils 741–744 and each of the eight driven magnets 6A–6D, 16A–16D simultaneously and individually according to the control mode selected and set by the main control section 214A.

Moreover, the main control section 214A also has a function of calculating the position of the movable table 1 according to the input information from the positional information detecting means 25 for detecting the table position or carrying out other various arithmetic operations. Numeral reference 4G is a power circuit for energizing a prescribed current to each of the rectangular driving coils 741–744 and the each of the four driven magnets 6A–6D of the electromagnetic driving means 144.

[About Program Storage 224]

The table driving control means 214 is configured to individually drive-control each of the rectangular driving coils 741–744 and each of the eight driven magnets 6A–6D, 16A–16D of the electromagnet driving means 144 with a prescribed relation therebetween according to a prescribed energization-control program (a prescribed control mode) which is stored in the program storage 224 beforehand.

Specifically, in the embodiment, stored in the program storage 224 are: a plurality of magnet control programs for individually specifying the energizing directions of each of the eight driven magnets (electromagnets) 6A–6D, 16A–16D individually for specifying the north pole or the south pole of the magnetic pole, while variably setting the magnitude of the flown current including the non-energization; and a driving coil control program, which functions correspondingly when the energizing direction of each of the eight driven magnets 6A–6D, 16A–16D are specified and the north pole or south pole (or stopping of energization) is specified, for variably setting the energizing direction and the magnitude of the flown current for each of the four rectangular driving coils 741–744. At the same time, the operation timing of each control program is arranged and stored in a group of eight energizing control modes D1–D8 (see FIG. 57, FIG. 58).

Now, the group of eight energizing control modes D1–D8 according to the thirteenth embodiment will be described by referring to FIG. 57 and FIG. 58.

FIG. 57 shows examples (in diagram) of each of the energizing control modes D1–D4 in the case where the movable table unit 15 is moved in the positive or negative direction of the X axis or the positive or negative direction of the Y axis, respectively.

In FIG. 57, each of the energizing control modes D1–D4 is set to variably control the energizing direction of the direct current for each of the rectangular driving coils 741–744. Also, as for the energizing direction of each of the eight driven magnets (electromagnets), the north pole or the south pole of each magnetic pole is controlled to be set unchanged at all times (fixed state) regardless of the control modes.

That is, in the thirteenth embodiment, the magnetic poles of the end face part of the driven magnets 6A, 6B facing the rectangular driving coils 741, 742 are set to be the north pole while those of the driven magnets 6C, 6D are set to be the south pole, respectively. Similarly, those of the driven magnets 16A, 16B are set to be the south pole and those of the driven magnets 16C, 16D are set to be the north pole, respectively. In the thirteenth embodiment, the north pole or the south pole of each magnetic pole is controlled to be set unchanged at all times (fixed state) regardless of the control modes.

(Control Mode D1)

The control mode D1 is an example of the energizing control mode for transporting the movable table 1 in the positive direction of the X axis (see FIG. 57).

In the control mode D1, the driven magnets 6B, 6D and 16B, 16D on the Y axis are controlled to stop energization. At the same time, the rectangular driving coils 742, 744 are also controlled to stop energization.

The end face part of the driven magnet 6A on the X axis facing the inner coil side 741a is fixed to be the north pole while the end face part of the driven magnet 6C on the X axis facing the inner coil side 743a is fixed to be the south pole.

Further, the end face part of the driven magnet 16A on the X axis facing the outer coil side 741b is fixed to be the south pole while the end face part of the driven magnet 16C on the X axis facing the outer coil side 743b is fixed to be the north pole.

The driving coils 741, 743 are all energized and driven in the counterclockwise direction (left turn).

Therefore, for the actual energization, the electromagnetic force is generated in the coil sides 741a, 741b and 743a, 743b of the driving coils 741, 743 in the directions indicated by dotted-line arrows. At the same time, by the reaction force (generated since the rectangular driving coils 741, 743 are fixed), the driven magnets 6A, 6C and 16A, 16C are repulsively driven in the direction indicated by solid-line arrows (in the right direction in the figure). Thereby, the movable table unit 15 is transported in the positive direction on the X axis.

When there is a position shift in the movable table 1, the non-energized driving coils 722, 724 and the driven magnets 6B, 16B and 6D, 16D are individually energize-controlled so as to execute the position shift correcting action.

(Control Mode D2)

The control mode D2 is an example of the energizing control mode for transporting the movable table 1 in the negative direction of the X axis (see FIG. 57).

The control mode D2 differs from the control mode D1 in respect that the energizing direction of each of the coil sides 741a, 741b, 743a, 743b of the rectangular driving coils 741, 743 on the X axis is reversed (clockwise direction). In other respects, it is the same as that of the control mode D1.

Therefore, in each of the coil sides 741a, 741b and 743a, 743b of the driving coils 741, 743, the electromagnetic driving force (dotted-line arrow) is generated in the directions opposite to the case of the control mode D1 by the same principle. By the reaction force, each of the driven magnets 6A, 16A and 6C, 16C is repulsively driven in the direction indicated by solid-line arrows (in the left direction in the figure). Thereby, the movable table unit 15 is transported in the negative direction on the X axis. For the position shift of the movable table 1, the same correcting action as the case of the control mode D1 is executed.

(Control Mode D3)

The control mode D3 is an example of the energizing control mode for transporting the movable table 1 in the positive direction of the Y axis (see FIG. 57).

In the control mode D3, the driven magnets 6A, 6C, 16A, 16C on the X axis are controlled to stop energization. At the same time, the rectangular driving coils 741, 743 are also controlled to stop energization.

The end face part of the driven magnet 6B on the Y axis facing the coil side 742a is fixed to be the north pole while the end face part of the driven magnet 6D on the Y axis facing the coil side 744a is fixed to be the south pole.

Similarly, the end face part of the driven magnet 16B on the Y axis facing the coil side 742b is fixed to be the south pole while the end face part of the driven magnet 16D on the Y axis facing the coil side 744b is fixed to be the north pole.

In the meantime, the driving coils 742, 744 are all energized and driven in the counterclockwise direction (left turn).

Therefore, for the actual energization, the electromagnetic driving force is generated in each of the coil sides 742a, 742b and 744a, 744b of the driving coils 742, 744 in the directions indicated by dotted lines. At the same time, by the reaction force (generated since the rectangular driving coils 742, 744 are fixed), the driven magnets 6B, 16B and 6D, 16D are repulsively driven in the direction indicated by solid-line arrows (in the upward direction in the figure). Thereby, the movable table unit 15 is transported in the positive direction on the Y axis.

When there is a position shift in the movable table 1, the non-energized driving coils 741, 743 and the driven magnets 6A, 16A and 6C, 16C are individually energize-controlled so as to execute the position shift correcting action.

(Control Mode D4)

The control mode D4 is an example of the energizing control mode for transporting the movable table 1 in the negative direction of the Y axis (see FIG. 57).

The control mode D4 differs from the control mode D3 in respect that the energizing direction of each of the coil sides 742a, 742b, 744a, 744b of each of the rectangular driving coils 742, 744 on the X axis is reversed (clockwise direction) with respect to the case of the control mode D3. In other respects, it is the same as that of the control mode D3.

Therefore, in each of the coil sides 742a, 742b and 744a, 744b of the rectangular driving coils 742, 744, the electromagnetic driving force is generated in the directions of the dotted-line arrow (opposite to the case of the control mode D3) by the same principle. By the reaction force, each of the driven magnets 6B, 16B and 6D, 16D is repulsively driven in the direction indicated by solid-line arrows (in the downward direction in the figure). Thereby, the movable table unit 15 is transported in the negative direction on the Y axis. For the position shift of the movable table 1, the same correcting action as the case of the control mode D3 is executed.

FIG. 58 shows examples (in a diagram) of each of the control modes D5–D8 in the case where the movable table unit 15 is transported in each of the four quadrant direction on the X-Y coordinates.

In FIG. 58, in each of the energizing control modes D1–D4, as in each of the control modes D5–D8, the energizing direction of the direct current for each of the rectangular driving coils 741–744 is individually set to be variably controlled. As for the energizing direction of each of the eight driven magnets (electromagnets), the north pole or the south pole is controlled to be set unchanged (fixed state) at all times regardless of the control modes.

(Control Mode D5)

The control mode D5 is an example of the energizing control mode for transporting the movable table 1 in the first quadrant direction of the X-Y plane coordinates (see FIG. 58).

In the control mode D5, each of the eight driven magnets 6A–6D, 16A–16D is set in the state to be simultaneously energize-controlled, and the energizing direction (setting of the north pole, south pole) are fixed as in the case of each of the control modes D1–D4.

As for the driven magnets 6A, 6B disposed on the X axis, Y axis in the positive direction, the magnetic pole on the end face part facing each of the coils sides 741a, 742a of each rectangular driving coil is set to be the north pole. Further, as for the driven magnets 6C, 6D disposed on the X axis, Y axis in the negative direction, the magnetic pole on the end face part in the area facing each of the coils sides 743a, 744a of each rectangular driving coil is set to be the south pole.

Similarly, as for the driven magnets 16A, 16B disposed on the X axis, Y axis in the positive direction, the magnetic pole on the end face part facing each of the coils sides 741b, 742b of each rectangular driving coil is set to be the south pole. Further, as for the driven magnets 16C, 16D disposed on the X axis, Y axis in the negative direction, the magnetic pole on the end face part facing each of the coils 743b, 744b is set to be the north pole.

Thus, each of the coil sides 741a, 741b, 742a, 742b, 743a, 743b, 744a, 744b of each of the rectangular driving coils 741–744 is energized to be in the state similar to the case where the control modes D1 and D3 operate simultaneously (energized in the counterclockwise direction). Thus, the electromagnetic driving forces in the same directions (in the positive direction on the X axis and the positive direction on the Y axis) as the case of the control modes D1, D3 are simultaneously generated, and the resultant force is directed in the first quadrant direction as shown in the section of the control mode D5 in FIG. 58.

Thereby, the movable table unit 15 is transported towards the first quadrant direction on the X-Y plane coordinates.

The transporting angle θ (transporting direction) towards the first quadrant with respect to the X axis can be variably set at will in arbitrary direction by changing the electromagnetic driving force working on each of the driven magnets 6A–6D through variably controlling the magnitude of the current flown into each of the rectangular driving coils 741–744 and the driven magnets 6A–6D, 16A–16D.

(Control Mode D6)

The control mode D6 is an example of the energizing control mode for transporting the movable table 1 in the third quadrant direction (the direction opposite to the first quadrant direction) of the X-Y plane coordinates (see FIG. 58).

In the control mode D6, each of the eight driven magnets 6A–6D, 16A–16D is set in the state to be simultaneously energize-controlled. The north pole and south pole are set in the same manner as the case of each of the control modes DL-D5.

Further, each of the coil sides 741a, 741b, 742a, 742b, 743a, 743b, 744a, 744b of each of the rectangular driving coils 741–744 is energized to be in the state similar to the case where the control modes D2 and D4 operate simultaneously. Thus, the reaction forces (electromagnetic driving forces) are simultaneously generated in the same directions (in the left direction and downward direction of FIG. 58) as the cases of the control modes D2, D4, and the resultant force is directed in the third quadrant direction as shown in the section of the control mode D6 in FIG. 58. Thereby, the movable table unit 15 is transported towards the third quadrant direction on the X-Y plane coordinates.

The transporting angle θ (transporting direction) towards the third quadrant with respect to the X axis can be variably set at will in arbitrary directions by changing the electromagnetic driving force working on each of the driven magnets 6A–6D, 16A–16D through variably controlling the magnitude of the current flown into each of the rectangular driving coils 741–744 and each of the driven magnets 6A–6D, 16A–16D.

(Control Mode D7)

The control mode D7 is an example of the energizing control mode for transporting the movable table 1 in the second quadrant direction of the X-Y plane coordinates (see FIG. 58).

In the control mode D7, each of the eight driven magnets 6A–6D, 16A–16D is set in the state to be simultaneously energize-controlled. The north pole and south pole are set in the same manner as the case of each of the control modes D1–D6.

In the meantime, as for each of the rectangular driving coils 741–744, the rectangular driving coils 741, 743 on the X axis are energized and driven in the clockwise direction (right turn in FIG. 58) as the case of the control mode D2, while the rectangular driving coils 742, 744 on the Y axis are energized and driven in the counterclockwise direction (left turn in FIG. 58) as the case of the control mode D3.

Therefore, in the case of the control mode D7, each of the coil sides 741a, 741b, 742a, 742b, 743a, 743b, 744a, 744b of each of the rectangular driving coils 741–744 is energized to be in the state similar to the case where the control modes D2 and D3 operate simultaneously. Thus, the electromagnetic driving forces are simultaneously generated in the same directions (in the left direction and upward direction of FIG. 58) as the cases of the control modes D2, D3, and the resultant force is directed in the second quadrant direction as shown in the section of the control mode D7 in FIG. 57. Thereby, the movable table unit 15 is transported towards the second quadrant direction on the X-Y plane coordinates.

The transporting angle θ (transporting direction) towards the second quadrant with respect to the X axis can be variably set at will an arbitrary directions by changing the electromagnetic driving force working on each of the driven magnets 6A–6D, 16A–16D through variably controlling the magnitude of the current flown into each of the rectangular driving coils 741–744 and each of the driven magnets 6A–6D, 16A–16D.

(Control Mode D8)

The control mode D8 is an example of the energizing control mode for transporting the movable table 1 in the fourth quadrant direction (the direction opposite to the first quadrant direction) of the X-Y plane coordinates (see FIG. 58).

In the control mode D8, each of the eight driven magnets 6A–6D, 16A–16D is set in the state to be simultaneously energize-controlled. The north pole and south pole are set in the same manner as the case of each of the control modes D1–D7.

In the meantime, as for each of the rectangular driving coils 741–744, all the energize-driving directions are reversed with respect to the case of the control mode D8. That is, the rectangular driving coils 741, 743 on the X axis are energized and driven in the counterclockwise direction (left turn in FIG. 58) as the case of the control mode D1, while the rectangular driving coils 742, 744 on the Y axis are energized and driven in the clockwise direction (right turn in FIG. 58) as the case of the control mode D4.

Therefore, in the case of the control mode D8, each of the coil sides 741a, 741b, 742a, 742b, 743a, 743b, 744a, 744b of each of the rectangular driving coils 741–744 is energized to be in the state similar to the case where the control modes D1 and D4 operate simultaneously. Thus, the electromagnetic driving forces are simultaneously generated in the same directions (in the right direction and downward direction of FIG. 58) as the cases of the control modes D1, D4, and the resultant force is directed in the fourth quadrant direction as shown in the section of the control mode D8 in FIG. 58. Thereby, the movable table unit 15 is transported towards the fourth quadrant direction on the X-Y plane coordinates.

The transporting angle θ (transporting direction) towards the fourth quadrant with respect to the X axis can be variably set at will in arbitrary directions by changing the electromagnetic driving force working on each of the driven magnets 6A–6D, 16A–16D through variably controlling the magnitude of the current flown into each of the rectangular driving coils 741–744 and each of the driven magnets 6A–6D, 16A–16D.

Other configurations, the operations, the functions and the like are substantially the same as the case of the eleventh embodiment.

With this, the same effect as the case of the eleventh embodiment can be achieved. Moreover, the configurations of the rectangular driving coils 741–744 are extremely simplified compared to the square θ-shape driving coils 721–724 of the eleventh embodiment, so that the wiring of the driving coils 741–744 can be also simplified. Thus, it is possible to improve the productivity and the durability compared to the case of the eleventh embodiment. Further, since the energizing control of the driving coils 741–744 is simplified, the responsiveness can be also improved.

Further, the number of each driven magnets 6A–6D, 16A–16D doubles the number in the case of the eleventh embodiment. Thus, the output of the electromagnetic driving force is reinforced so that it enables to move the movable table 1 promptly.

Further, in the thirteenth embodiment, it has been described by referring to the case where the electromagnetic driving means 144 is drive-controlled by the separate control modes D1–D8 for setting the transporting direction of the movable table unit 15. However, for example, in the control mode D2, it may be configured in such a manner that, as long as it functions similarly, the electromagnetic driving means 144 is drive-controlled by other controlling methods, e.g.

energizing direction of the driven magnets 6A–6D, 16A–16D is set in the reversed direction from the case of the control mode D1 and the energizing direction of the driving coils 741, 743 is set to be the same as the case of the control mode D1.

Moreover, in the thirteenth embodiment, the mounting area of the driven magnets 6A–6D, 16A–16D and that of the rectangular driving coils 741–744 may be switched. In this case, the driven magnets 6A–6D, 16A–16D are mounted on the stator side and the rectangular driving coils 741–744 are mounted on the needle side.

Furthermore, although the thirteenth embodiment has been described by referring to the case where the driven magnets 6A–6D, 16A–16D are formed with the electromagnets, they may be formed with the permanent magnets.

With this, the electric wiring in the periphery of the driven magnets 6A–6D, 16A–16D becomes completely unnecessary, so that the spatial region for mounting the driven magnets 6A–6D, 16A–16D can be reduced. For this, the size and weight of the entire apparatus can be reduced and the productivity and maintenance characteristic can be improved. Therefore, since the energization becomes unnecessary, the overall electric power consumption and temperature increase can be largely decreased compared to the case where the electromagnets are used for the driven magnets 6A–6D, 16A–16D. Accordingly, the running cost of the entire apparatus can be extremely reduced and the movable table 1 can be driven to be transported in an arbitrary direction only through switching the energizing direction of each of a plurality of the driving coils 741–744 for drive-controlling the electromagnetic driving means 144. Thereby, it becomes possible to promptly respond to the switching of the moving direction of the movable table 1 and no accidents of wire breakdown or the like is caused in the driven magnets 6A–6D. Thus, it is advantageous in respect that the durability of the entire apparatus can be remarkably improved.

Fourteenth Embodiment

Next, the fourteenth embodiment will be described by referring to FIG. 59 to FIG. 64.

The fourteenth embodiment is distinctive in respect that it comprises another electromagnetic driving means 145 instead of the electromagnetic driving means 142 of the eleventh embodiment. At the same time, it is distinctive in respect that an operation control system 205 for effectively driving the electromagnetic driving means 145 is mounted instead of the operation control system 202.

Specifically, the electromagnetic driving means 145 of the embodiment is distinctive in respect that the four square θ-shape driving coils 721, 722, 723, 724 mounted to the electromagnetic driving means 142 of the eleventh embodiment are rotated by 90°, respectively, to be mounted to the fixing plate 8 to be used as square θ-shape driving coils 751, 752, 753, 754. At the same time, it is distinctive in respect that a rotation control function (control modes 9, 10) is added to the control contents performed by the operation control system 205 correspondingly.

Thereby, the fourteenth embodiment enables the rotation-drive of the movable table 1 within a limited range without mounting another driving means, which, logically, cannot be achieved in the eleventh embodiment.

This will be described hereinafter.

First, as in the case of the eleventh embodiment, the fourteenth embodiment comprises: a precise processing movable table unit 15 provided to be capable of moving in arbitrary directions on the same plane; a table holding mechanism 2 which allows the movement of the movable table unit 15 while holding the movable table unit 15 and also has an original position returning function for the movable table unit 15; a case main body 3 as a main body part for supporting the table holding mechanism 2; and the electromagnetic driving means 145 mounted on the case main body 3 side for supplying a moving force to the movable table unit 15 in a prescribed direction according to a command from outside.

Figure 59:
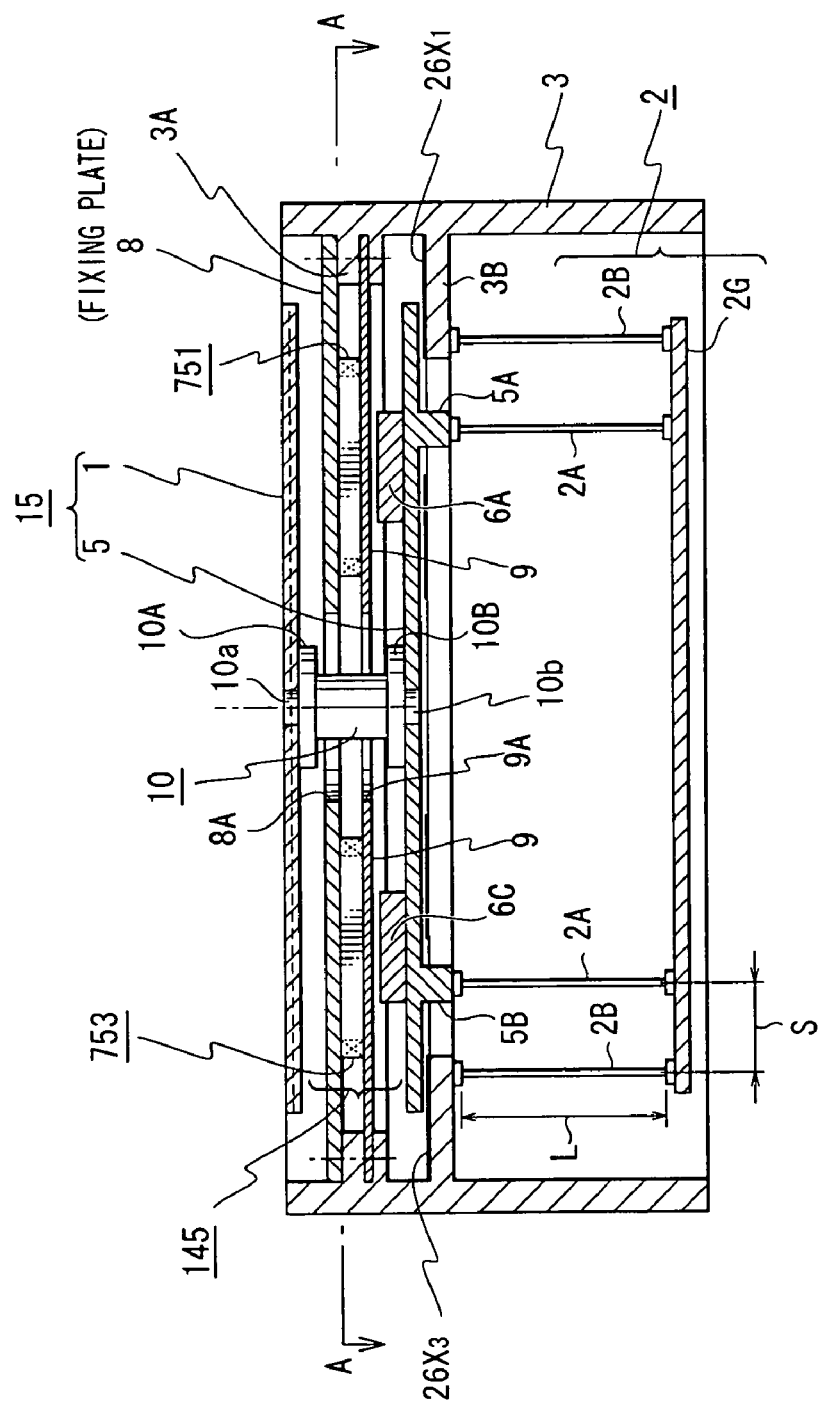
FIG. 59 is a longitudinal cross section showing a fourteenth embodiment of the present invention.

As in each of the above-described embodiments, the movable table unit 15 is formed with a precise processing movable table 1 and an auxiliary table 5 which is disposed integrally, coaxially, and in parallel with respect to the movable table 1 with a prescribed space in between. As shown in FIG. 59, the table holding mechanism 2 is mounted on the auxiliary table 5 side for holding the movable table 1 through the auxiliary table 5.

[About Electromagnetic Driving Means 145]

The electromagnetic driving means 145 is held on the case main body 3 side by its main part and has a function of supplying a prescribed moving force (driving force) to the movable table unit 15 along the transporting direction of the movable table unit 15 according to a command from outside. The electromagnetic driving means 145 is disposed between the movable table 1 and the auxiliary table 5.

Specifically, the electromagnetic driving means 145 comprises: four driving coils 751, 752, 753, 754 formed in square θ-shape; four driven magnets 6A, 6B, 6C, 6D mounted on the auxiliary table 5 by individually corresponding to inner coil sides 751a–754a positioned in the center of each of the driving coils 751–754; and the fixing plate 8 for holding the four driving coils 751–754 at prescribed positions.

Each of the square θ-shape driving coils 751–754 are respectively and individually provided on the X axis and Y axis in such a manner that the inner coil sides 751a–754a positioned in the centers overlap with each other along each axis on the X-Y plane which is assumed with the origin being the center on the fixing plate 8.

Therefore, in each of the four driven magnets 6A–6D positioned by respectively and individually opposing the inner coils sides 751a–754a, the electromagnetic driving force is outputted in the directions orthogonal to each of the inner coil sides 751a–754a (that is, to the X axis or Y axis) as will be described later.

In the embodiment, by variably controlling the directions of the current flown into each of the inner coils sides 751a–754a according to the objective, the movable table 1 can be driven to be rotated within a prescribed range.

Further, each of the four driven magnets 6A–6D is formed with the electromagnets which can be energized from outside and is individually provided on the X axis and Y axis by corresponding to the inner coil sides 751a–754a of each square θ-shape driving coil.

The fixing plate 8 is provided to the auxiliary table 5 on the movable table 1 side as shown in FIG. 59 and held by the case main body 3. The stator part as the main part of the electromagnetic driving means 145 is formed with each of the square θ-shape driving coils 751–754 and the fixing plate 8.

When each of the square θ-shape driving coils 751–754 is set in action, it generates the electromagnetic driving force between with each of the driven magnets 6A–6D for repulsively driving each of the driven magnets 6A–6D towards the direction orthogonal to the inner coil sides 751a–754a (that is, in the direction orthogonal to the corresponding X axis or Y axis).

Further, when moving the movable table unit 15 in the direction which does not cross with each of the inner coil sides 751a–754a (in the slantwise direction with respect to each of the coil sides 751a–754a), the movable table unit 15 is moved by the resultant force of the electromagnetic driving forces for at least two or more of the driven magnets 6A–6D as will be described later.

Further, in the inner coil sides 751a–754a of each of the square θ-shape driving coils 751–754, which face each of the driven magnets 6A–6D, the braking plate 9 made of non-magnetic metal material is provided adjacent to (substantially in contact with) the pole face of each of the driven magnets 6A–6D. In the embodiment, a single braking plate 9 is used and a part or entire part of the periphery is fixed to the case main body 3.

Figure 60:
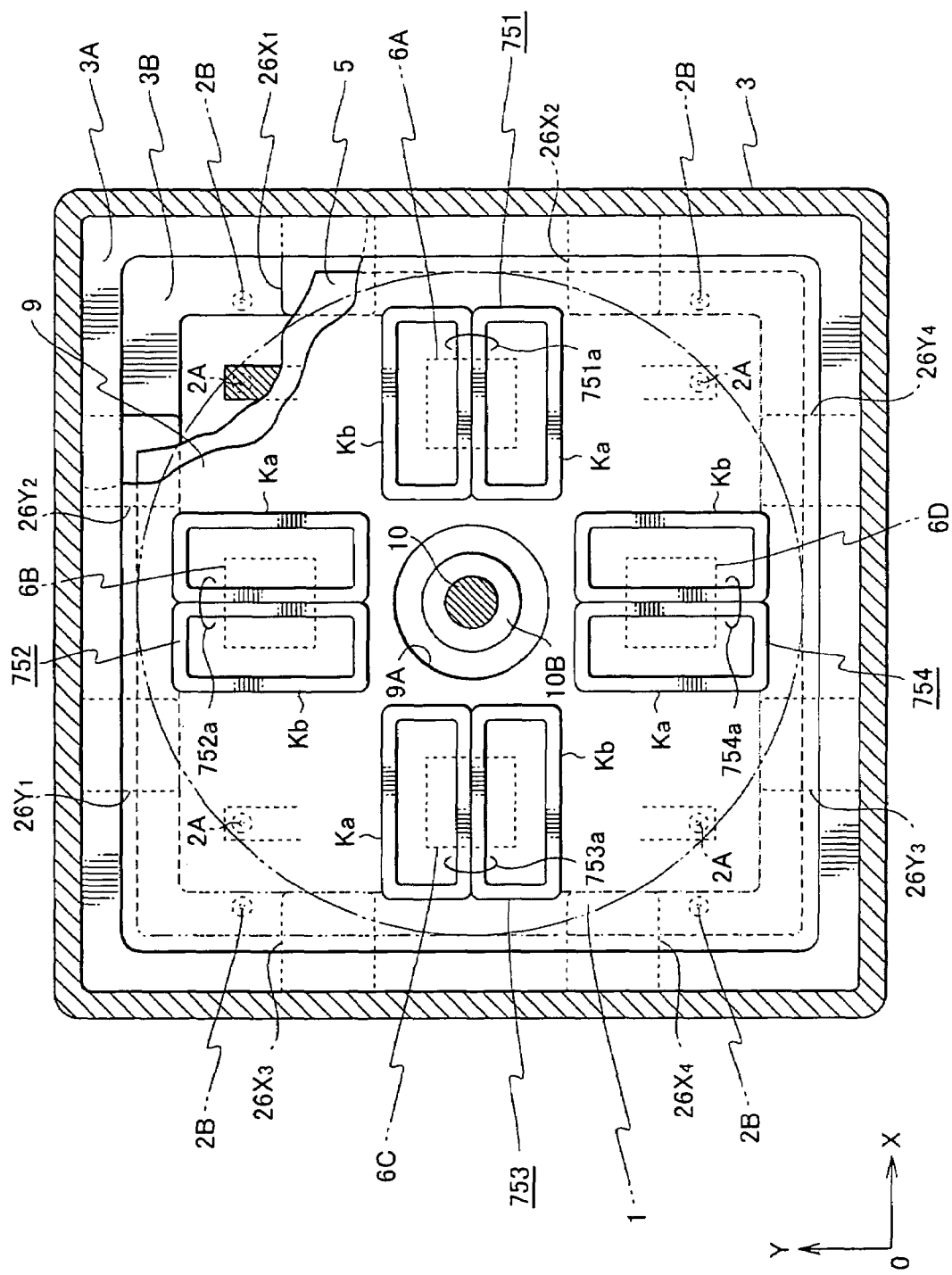
FIG. 60 is a schematic lateral cross section taken along the line A—A of FIG. 59.

As for the four driven magnets 6A–6D constituting a part of the electromagnetic driving means 145 according to the embodiment, as shown in FIG. 60, used are the electromagnets with the quadrangular magnetic pole end surface (the surface opposing the each of the inner coil sides 751a–754a of each of the driving coils 751–754). They are respectively provided and fixed on the X-Y plane assumed on the top face of the auxiliary table 5 at the positions on the X axis and Y axis at the equal distance from the center.

Therefore, in the embodiment, for example, when a prescribed operating current is flown into a part or the entire part of the four driven magnets 6A–6D for setting each of the driven magnets 6A–6D in operation, each of the driving coils 751–754 is set in action to start the energization subsequently or simultaneously according to a prescribed control mode. Then, the magnitudes of the magnetic force of each driven magnets 6A–6D including each of the driving coils 751–754 are adjusted by the energization control. Thereby, the movable table unit 15 is transported in a prescribed direction.

In this case, the action of the electromagnetic driving means 145 (energization drive for each of the driving coils 751–754 and the four driven magnets 6A–6D) in terms of the moving direction and transportation driving force for the movable table unit 15 will be described in detail in FIGS. 6-2 and FIG. 64.

As shown in FIG. 59 and FIG. 60, the four square θ-shape driving coils 751–754 forming the main part of the electromagnetic driving means 145 are formed in square θ-shape as a whole with a combination of two small angular coil parts Ka, Kb. The coils sides (inner coil sides 751a–754a part) are formed in the part where the two small quadrangular coil parts Ka, Kb abut with each other, and an electric current is controlled to flow into the coil sides in the same direction at all times (the direction of the electric current flown into the part where one of the coil side and the other coil side abut each other). Therefore, when changing the direction, the energizing directions in the two small angular coil parts Ka, Kb are to be changed simultaneously.

In this case, in the fourteenth embodiment, the energizing direction of the four driven magnets 6A–6D made of the electromagnets is specified beforehand as will be described later. Thus, the energizing direction and the magnitude of the flown current (including the energization-stop control) of each of the inner coil sides 751a–754a of the four square θ-shape driving coils 751–754 is set and controlled by the operation control system 205 by corresponding to the transporting direction of the movable table unit 15.

Thereby, the electromagnetic force (reaction force) is to be outputted to the driven magnets 6A–6D for pressing them in a prescribed direction (in the directions respectively orthogonal to the inner coil sides 751a–754a part) according to Fleming's left-hand rule.

Further, by selecting and combining the directions of the electromagnetic forces generated in the four driven magnets 6A–6D beforehand, it is possible to set the resultant force of the electromagnetic driving forces generated in the four driven magnets 6A–6D to be in the transporting direction of the movable table unit 15. Thereby, the moving force can be supplied to the movable table unit 15 to be moved in the arbitrary direction on the X-Y plane.

A series of energizing control methods for the four driven magnets 6A–6D will be described in detail in the description of a program storage 225 (FIG. 62–FIG. 64) which will be described later.

On the outer side and inner side of each of the driving coils 751–754 on the same plane, a magnetic material such as ferrite may be filled at least up to the same height as the height (in the Y axis direction) of each of the driving coils 751–754 and within a range covering the operation range of the driven magnets 6A–6D.

[About Operation Control System 205]

Next, the operation control system 205 of the fourteenth embodiment will be described.

Figure 61:
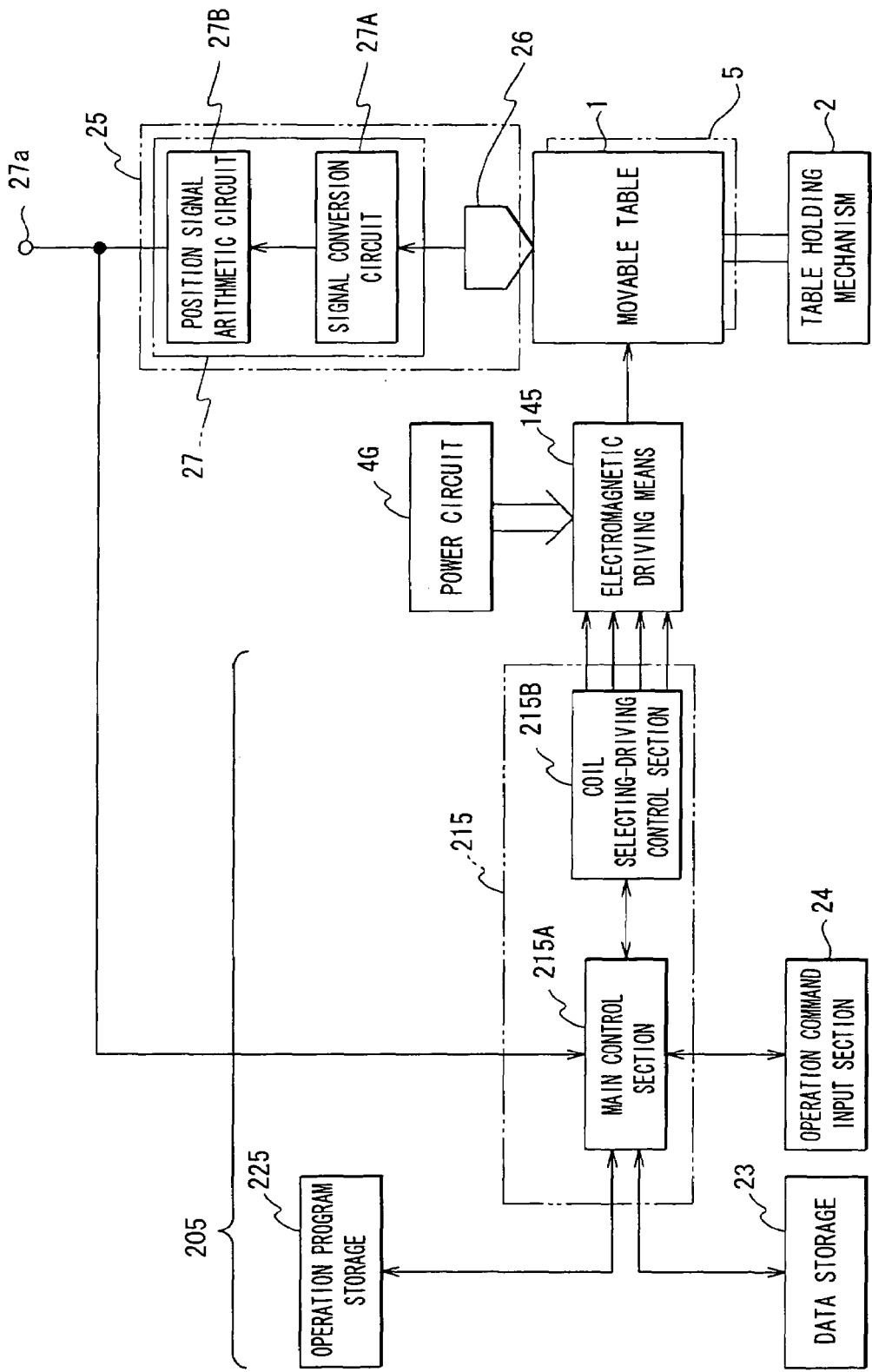
FIG. 61 is a block diagram showing the entire apparatus including the operation system according to the embodiment disclosed in FIG. 59.

In the fourteenth embodiment, provided to the electromagnetic driving means 145 is the operation control system 205 which restricts the moving action of the movable table unit 15 by individually energize-controlling each of the square θ-shape driving coils 751–754 and each of the driven magnets 6A–6D (see FIG. 61).

The operation control system 205 comprises: a magnetic pole individual setting function for individually setting and maintaining the magnetic poles of each of the driven magnets 6A–6D which are mounted by corresponding to each of the square θ-shape driving coils 751–754; a magnetic force magnitude setting function for individually and variably setting (it is possible to set by carrying the flown current) the magnitude of the magnetic force of each of the driven magnets 6A–6D; an energizing direction setting function for setting and maintaining the energizing direction of the inner coil sides 751a–754a part of each of the square θ-shape driving coils 751–754 to a prescribed direction (in one direction or other) according to a command from outside; a driving coil energizing control function for variably setting the magnitude of the current flown into each of the square θ-shape driving coils 751–754; and a table action control function for adjusting the transporting direction and transporting force for the movable table unit 15 by appropriately adjusting the output of the various functions.

For carrying out the functions described above, as shown in FIG. 61, the operation control system 205 comprises: a table driving control means 215 which individually drives the each of the square θ-shape driving coils 751–754 and each of the four driven magnets 6A–6D of the electromagnetic driving means 145 according to a prescribed energizing control mode for controlling the movement of the movable table unit 15 in a prescribed direction; a program storage 225 being provided along with the table driving control means 215, to which a plurality of control programs for a plurality of control modes (ten energizing control modes E1–E10 in the embodiment) in which the moving direction, rotating direction, moving amount and the like of the movable table 1 are specified are provided; and a data storage 23 to which prescribed data and the like are stored to be used at the time of executing each control program.

Further, in the table driving control means 215, provided is an operation command input section 24 for giving a command of a prescribed control operation to each of the square θ-shape driving coils 751–754 and each of the driven magnets 6A–6D. Moreover, the positional information of the movable table 1 during the movement and after the movement is detected by the positional information detecting means 25 and arithmetic-processed to be transmitted to the table driving control means 215.

The various control functions of the operation control system 205 are comprehensively contained in a plurality of the energizing control modes E1–E10 in the program storage 225. They are selected according to a selection command inputted through the operation input section 24 by an operator. Through the selected prescribed control modes E1–E10, the various control functions are started and carried out.

This will be described in detail.

The table driving control means 215 according to the embodiment comprises: a main control section 215A which operates according to the command from the operation command input section 24 and has a function of selecting a prescribed control mode from the program storage 225 and of energize-controlling a prescribed direct current including zero to each of the square θ-shape driving coils 751–754 and each of the four driven magnets 6A–6D; and a coil selecting driving control section 215B which has a function of drive-controlling each of the square θ-shape driving coils 751–754 and each of the four driven magnets 6A–6D simultaneously and individually according to the prescribed control mode (E1–E10) selected and set by the main control section 215A.

Moreover, the main control section 215A also has a function of calculating the position of the movable table 1 according to the input information from the positional information detecting means 25 for detecting the table position or carrying out other various arithmetic operations. Numeral reference 4G is a power circuit for energizing a prescribed current to each of the square θ-shape driving coils 751–754 and the each of the four driven magnets 6A–6D of the electromagnetic driving means 145.

[About Program Storage 225]

The table driving control means 215 is configured to individually drive-control each of the square θ-shape driving coils 751–754 and each of the four driven magnets 6A–6D of the electromagnetic driving means 145 with a prescribed relation therebetween according to a prescribed energization-control program (a prescribed control mode) which is stored in the program storage 225 beforehand.

Specifically, in the embodiment, stored in the program storage 225 are: a plurality of magnet control programs for specifying the energizing directions of each of the four driven magnets (electromagnets) 6A–6D individually for specifying the north pole or the south pole of the magnetic pole, while variably setting the magnitude of the flown current including the non-energization; and a driving coil control program for a driving coil, which functions correspondingly when the energizing direction of each of the four driven magnets 6A–6D are specified and the north pole or south pole (or stopping of energization) is specified, for variably setting the energizing direction and the magnitude of the flown current for each of the four square θ-shape driving coils 751–754. At the same time, the operation timing of each control program is arranged in a group of ten energizing control modes E1–E10 and stored (see FIG. 62–FIG. 64).

Next, the group of ten energizing control modes E1–E10 will be described by referring to FIG. 62–FIG. 64

Figure 62:
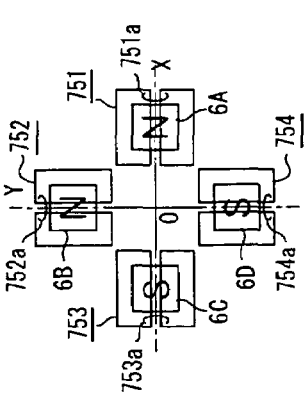
FIG. 62 is a diagram showing the control contents of a plurality of energizing control modes E1–E4 executed by the table driving control means of the embodiment disclosed in FIG. 59 and the moving directions (transporting directions of the movable table) of the entire driven magnets.

FIG. 62 shows examples (in diagram) of each of the energizing control modes E1–E4 in the case where the movable table unit 15 is moved in the positive or negative direction of the X axis or the positive or negative direction of the Y axis, respectively.

In FIG. 62, each of the energizing control modes E1–E4 is set to variably control the energizing direction of the direct current for each of the square θ-shape driving coils 751–754. Also, as for the energizing direction of each of the four driven magnets (electromagnets), the north pole or the south pole of each magnetic pole is controlled to be set unchanged at all times (fixed state) regardless of the control modes.

That is, in the fourteenth embodiment, the magnetic pole of the end face part of the driven magnets 6A, 6B facing the square θ-shape driving coils 751, 752 are set to be the north pole while those of the driven magnets 6C, 6D are set to be the south pole, respectively. The magnetic poles of each of the driven magnets 6A–6D are controlled to be set in the fixed state even though the control modes are varied from E1–E4.

(Control Mode E1)

The control mode E1 according to the fourteenth embodiment is an example of the energizing control mode for transporting the movable table 1 in the positive direction of the X axis (see FIG. 62).

In the control mode E1, the square θ-shape driving coils 752, 754 on the Y axis and the driven magnets 6B, 6D being mounted by corresponding thereto are energized while the square θ-shape driving coils 751, 753 on the X axis and the driven magnets 6A, 6C being mounted corresponding thereto are controlled to stop energization.

As for the square θ-shape driving coils 752, 754 on the Y axis, the energizing direction in the inner coil sides 752a of the square θ-shape driving coil 752 is controlled to be set towards the origin 0 from the positive direction of the Y axis along the Y axis. Similarly, in the inner coil sides 754a of the square θ-shape driving coil 754, it is controlled to be set towards the origin from the negative direction of the Y axis along the Y axis.

Further, as for the driven magnets 6B, 6D, the end face part of the driven magnet 6B on the Y axis facing the inner coil side 752a is fixed to be the north pole while the end face part of the driven magnet 6D on the Y axis facing the inner coil side 754a is fixed to be the south pole.

Therefore, in the coil sides 752a, 754a of the driving coils 752, 754, a prescribed electromagnetic force is generated in the coil sides 752a, 754a (in the left direction in the figure: indicated by dotted-line arrow). At the same time, by the reaction force (generated since the square θ-shape driving coils 752, 754 are fixed), the two driven magnets 6B, 6D are repulsively driven in the direction indicated by solid-line arrows (in the right direction in the figure). Thereby, the movable table unit 15 is transported in the positive direction on the X axis being balanced between with the electromagnetic driving forces generated in the two driven magnets 6B, 6D.

When there is a position shift in the transporting direction, the magnitudes of the current flown into the two driven magnets 6B, 6D or the driving coils 752, 754 are adjusted. Thereby, the electromagnetic driving forces generated in the two driven magnets 6B, 6D are balanced so that the shift in the transporting direction can be corrected.

(Control Mode E2)

The control mode E2 is an example of the energizing control mode for transporting the movable table 1 in the negative direction of the X axis (see FIG. 62).

The control mode E2 differs from the control mode E1 in respect that the energizing direction of the coil sides 752a, 754a of the driving coils 752, 754 on the X axis is reversed. In other respects, it is the same as that of the control mode E1.

Therefore, in the coil sides 752a, 754a of the driving coils 752, 754, the electromagnetic force is generated in the same manner as the case of the control mode E1 by the same principle. By the reaction force, the driven magnets 6A, 6C are repulsively driven in the direction indicated by solid-line arrows (in the left direction in the figure). Thereby, the movable table unit 15 is transported in the negative direction on the X axis being balanced between with the electromagnetic driving forces generated in the two driven magnets 6B, 6D.

(Control Mode E3)

The control mode E3 is an example of the energizing control mode for transporting the movable table 1 in the positive direction of the Y axis (see FIG. 62).

In the control mode E3, the square θ-shape driving coils 751, 753 on the X axis and the driven magnets 6A, 6C being mounted by corresponding thereto are energized while the square θ-shape driving coils 752, 754 on the Y axis and the driven magnets 6B, 6D being mounted corresponding thereto are controlled to stop energization.

As for the square θ-shape driving coils 751, 753 on the X axis, the energizing direction in the inner coil side 751a of the square θ-shape driving coil 751 is controlled to be set towards the origin 0 from the positive direction of the X axis along the X axis. Similarly, in the inner coil side 753a of the square θ-shape driving coil 753, it is controlled to be set towards the origin 0 from the negative direction of the X axis along the X axis.

Further, as for the driven magnets 6A, 6C, the end face part of the driven magnet 6A on the X axis facing the inner coil side 751a is fixed to be the north pole while the end face part of the driven magnet 6C on the X axis facing the coil side 753a is fixed to be the south pole.

Therefore, in the coil sides 751a, 753a of the driving coils 751, 753, a prescribed electromagnetic force is generated in the coil sides 751a, 753a. At the same time, by the reaction force (generated since the square θ-shape driving coils 751, 753 are fixed), the driven magnets 6A, 6C are repulsively driven in the direction indicated by solid-line arrows (in the upward direction in the figure). Thereby, the movable table unit 15 is transported in the positive direction on the Y axis being balanced between with the electromagnetic driving forces generated in the two driven magnets 6A, 6C.

When there is a position shift in the movable table unit 15, the same correcting action is carried out as the case of the control mode E1.

(Control Mode E4)

The control mode E4 is an example of the energizing control mode for transporting the movable table 1 in the negative direction of the Y axis (see FIG. 62).

The control mode E4 differs from the control mode E3 in respect that the energizing direction of the coil sides 751a, 753a of the driving coils 751, 753 on the X axis is reversed. In other respects, it is the same as that of the control mode E3.

Therefore, in the coil sides 751a, 753a of the driving coils 751, 753, the electromagnetic force is generated in the reversed direction from the case of the control mode E3 by the same principle. By the reaction force, the driven magnets 6A, 6C are repulsively driven in the direction indicated by solid-line arrows (in the downward direction in the figure). Thereby, the movable table unit 15 is transported in the negative direction on the Y axis being balanced between with the electromagnetic driving forces generated in the two driven magnets 6A, 6C. When there is a position shift in the movable table unit 15, the same correcting action is carried out as the case of the control mode E3.

Figure 63:
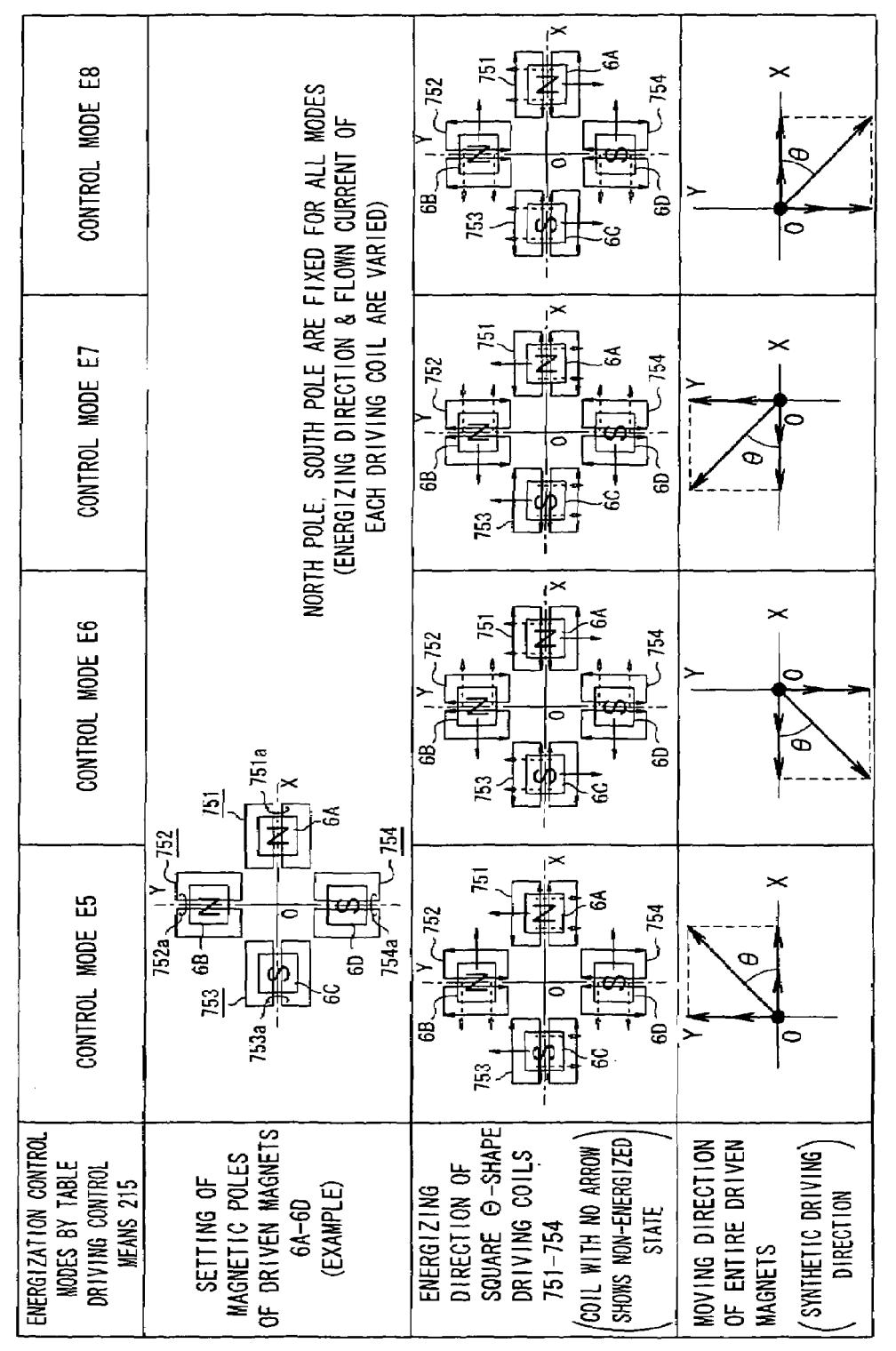

Subsequently, illustrated in FIG. 63 are examples (in a diagram) of each of the control modes E5–E8 in the case where the movable table unit 15 is transported in each of the four quadrant directions on the X-Y coordinates.

In FIG. 63, in each of the energizing control modes E5–E8, the energizing direction of the direct current for each of the square θ-shape driving coils 751–754 is individually set to be variably controlled. As for the energizing direction of each of the four driven magnets (electromagnets), the north pole or the south pole is controlled to be set unchanged (fixed state) at all times regardless of the control modes.

(Control Mode E5)

The control mode E5 according to the fourteenth embodiment is an example of the energizing control mode for transporting the movable table 1 in the first quadrant direction of the X-Y plane coordinates (see FIG. 63).

In the control mode E5, each of the four driven magnets 6A–6D is set in the state to be simultaneously energize-controlled, and the energizing direction (north pole, south pole) are fixed as in the case of each of the control modes E1–E4. That is, as for the driven magnets 6A, 6B disposed on the X axis, Y axis in the positive direction, the magnetic pole on the end face part facing each of the square θ-shape driving coils 751, 752 is set to be the north pole. Further, as for the driven magnets 6C, 6D disposed on the X axis, Y axis in the negative direction, the magnetic pole on the end face part facing each of the square θ-shape driving coils 753, 754 is set to be the south pole.

Moreover, in the control mode E5, each of the four square θ-shape driving coils 751–754 is also simultaneously energized. Specifically, each of the inner coil sides 751a–754a of each of the square θ-shape driving coils 751–754 is energized to be in the state similar to the case where the control modes E1 and E3 operate simultaneously. Thus, the electromagnetic driving forces are simultaneously generated in the same directions (in the right direction and upward direction in FIG. 63) as the case of the control modes E1, E3, and the resultant force is directed in the first quadrant direction as shown in the section of the control mode E5 in FIG. 63. Thereby, the movable table unit 15 is transported towards the first quadrant direction on the X-Y plane coordinates.

The transporting angle θ (angle θ with respect to the X axis) towards the first quadrant with respect to the X axis can be variably set at will in arbitrary direction by changing the electromagnetic driving force working on each of the driven magnets 6A–6D through variably controlling the magnitude of the current flown into each of the square θ-shape driving coils 751–754 and each of the driven magnets 6A–6D.

(Control Mode E6)

The control mode E6 is an example of the energizing control mode for transporting the movable table 1 in the third quadrant direction (the direction opposite to the first quadrant direction) of the X-Y plane coordinates (see FIG. 63).

In the control mode E6, each of the four driven magnets 6A–6D is set in the state to be simultaneously energize-controlled. The north pole and south pole are set in the same manner as the case of the control modes E1–E5.

Therefore, each of the square θ-shape driving coils 751–754 is energized to be in the state similar to the case where the control modes E2 and E4 operate simultaneously. Thus, in the inner coil sides 751a–754a, the electromagnetic driving forces are simultaneously generated in the same directions (in the left direction and downward direction of FIG. 63) as the cases of the control modes E2, E4, and the resultant force is directed in the third quadrant direction as shown in the section of the control mode E6 in FIG. 63. Thereby, the movable table unit 15 is transported towards the third quadrant direction on the X-Y plane coordinates.

The transporting angle θ towards the third quadrant with respect to the X axis can be variably set at will in arbitrary directions by changing the electromagnetic driving force working on each of the driven magnets 6A–6D through variably controlling the magnitude of the current flown into each of the square θ-shape driving coils 751–754 and each of the driven magnets 6A–6D.

(Control Mode E7)

The control mode E7 is an example of the energizing control mode for transporting the movable table 1 in the second quadrant direction of the X-Y plane coordinates (see FIG. 63).

In the control mode E7, each of the four driven magnets 6A–6D is set in the state to be simultaneously energize-controlled. The north pole and south pole are set in the same manner as the case of the control mode E1–E6.

In the case of the control mode E7, each of the four square θ-shape driving coils 751–754 is also simultaneously energized. Specifically, each of the coil sides 751a–754a of each of the square θ-shape driving coils 751–754 is energized to be in the state similar to the case where the control modes E2 and E3 operate simultaneously.

Thus, the electromagnetic driving forces are simultaneously generated in the same directions (in the left direction and upward direction of FIG. 63) as the cases of the control modes E2, E3, and the resultant force is directed in the second quadrant direction as shown in the section of the control mode E7 in FIG. 63. Thereby, the movable table unit 15 is transported towards the second quadrant direction on the X-Y plane coordinates.

The transporting angle θ towards the second quadrant with respect to the X axis can be variably set at will in arbitrary directions by changing the electromagnetic driving force working on each of the driven magnets 6A–6D through variably controlling the magnitude of the current flown into each of the square θ-shape driving coils 751–754 and each of the driven magnets 6A–6D.

(Control Mode E8)

The control mode E8 is an example of the energizing control mode for transporting the movable table 1 in the fourth quadrant direction (the direction opposite to the first quadrant direction) of the X-Y plane coordinates (see FIG. 63).

In the control mode E8, each of the four driven magnets 6A–6D is set in the state to be simultaneously energize-controlled. The north pole and south pole are set in the same manner as the case of the control mode E1–E7.

In the case of the control mode E8, each of the coil sides 751a–754a of each of the square θ-shape driving coils 751–754 is energized to be in the state similar to the case where the control modes E1 and E4 operate simultaneously. Thus, the electromagnetic driving forces are simultaneously generated in the same directions (in the right direction and downward direction of FIG. 63) as the cases of the control modes E1, E4, and the resultant force is directed in the fourth quadrant direction as shown in the section of the control mode E8 in FIG. 63. Thereby, the movable table unit 15 is transported towards the fourth quadrant direction on the X-Y plane coordinates.

The transporting angle θ towards the fourth quadrant with respect to the X axis can be variably set at will in arbitrary directions by changing the electromagnetic driven force working on each of the driven magnets 6A–6D through variably controlling the magnitude of the current flown into each of the square θ-shape driving coils 751–754 and each of the driven magnets 6A–6D.

(Control Mode E9)

The control mode E9 enables the rotation-drive of the movable table θ on the X-Y plane in the counterclockwise direction (left turn) at a prescribed angle. Shown is an example of the energization control mode used therein (see FIG. 64).

In the control mode E9, the square θ-shape driving coils 751–754 and each of the four driven magnets 6A–6D are simultaneously energized. In this case, the north pole and south pole of the driven magnets are set in the same manner as the cases of the control modes E1–E8.

Further, the square θ-shape driving coils 751–754 energize the each of the corresponding four driven magnets 6A–6D so as to generate a same-level prescribed moment (rotational driving force in the direction orthogonal to the X axis or Y axis) to each in the counterclockwise direction with the origin (zero-point) on the X-Y plane being the center (see FIG. 64).

Specifically, the energizing direction of the inner coil sides 751a of the driving coil 751 on the X axis is set to be directed towards the positive direction from the origin zero-point on the X axis, while the energizing direction of the inner coil sides 753a of the driving coil 753 on the X axis is set to be directed towards the origin zero-point from the negative direction on the X axis. Further, the energizing direction of the inner coil sides 752a of the driving coil 752 on the Y axis is set to be directed towards the positive direction from the origin zero-point on the Y axis, while the energizing direction of the inner coil sides 754a of the driving coil 754 on the Y axis is set to be directed towards the origin zero-point from the negative direction on the Y axis.

As for each of the inner coil sides 751a–754a, the magnitudes of the flown current are set to be the same so that the same electromagnetic forces can be outputted to each of the driven magnets 6A–6D.

In FIG. 64, the same-level prescribed rotation moment is indicated by a solid line. With this, the movable table unit 15 holding the driven magnets 6A–6D is rotationally driven in the counterclockwise direction within a prescribed range through the driven magnets 6A–6D.

That is, in the coil sides 751a–754a of the driving coils 751–754, a prescribed electromagnetic driving force is generated in each of the coil sides 751a–754a in the directions indicated by dotted-line arrows. At the same time, by the reaction force (generated since the square θ-shape driving coil 751–754 are fixed to the fixing plate 8), the driven magnets 6A–6D are repulsively driven in the direction indicated by solid-line arrows (in the counterclockwise direction in the figure). The movable table unit 15 is rotationally driven in the counterclockwise direction (within a prescribed range) on the X-Y plane being balanced between with each electromagnetic driving force (same-level prescribed rotation moment) generated in each of the four driven magnets 6A–6D.

(Control Mode E10)

The control mode E10 enables the rotation-drive of the movable table unit 15 on the X-Y plane in the clockwise direction (right turn) at a prescribed angle. Shown is an example of the energization control mode used therein (see FIG. 64).

In the control mode E10, the square θ-shape driving coils 751–754 and each of the four driven magnets 6A–6D are simultaneously energized.

In this case, the north pole and south pole of the driven magnets 6A–6D are set in the same manner as the cases of the control modes E1–E9. Further, the square θ-shape driving coils 751–754 are energized in the reversed direction from the case of the control mode E9 so that a same-level prescribed moment (rotational driving force in the direction orthogonal to the X axis or Y axis) is respectively generated to each of the corresponding four driven magnets 6A–6D in the clockwise direction (right turn) with the origin (zero-point) on the X-Y plane being the center.

FIG. 64 shows the same-level prescribed rotation moment by a solid line. With this, the movable table unit 15 holding the driven magnets 6A–6D is rotationally driven in the counterclockwise direction within a prescribed range through the driven magnets 6A–6D.

That is, in the coil sides 751a–754a of the driving coils 751–754, a prescribed electromagnetic driving force is generated in each of the coil sides 751a–754a in the directions indicated by dotted-line arrows. At the same time, by the reaction force (generated since the square θ-shape driving coil 751–754 are fixed to the fixing plate 8), the driven magnets 6A–6D are repulsively driven in the direction indicated by solid-line arrows (in the clockwise direction in the figure). The movable table unit 15 is rotationally driven in the clockwise direction (within a prescribed range) on the X-Y plane being balanced between with each electromagnetic driving force (same-level prescribed rotation moment) generated in each of the four driven magnets 6A–6D.

Other configurations, the operations, functions and the like are substantially the same as the case of the eleventh embodiment.

With this, the same effect as the case of the eleventh embodiment can be achieved. Moreover, in the fourteenth embodiment, each of the electromagnetic driving forces outputted from the electromagnetic driving means can be outputted in the direction orthogonal to the X axis or Y axis and also in the rotating direction. Thus, it enables to rotationally drive the movable table unit within prescribed angles without mounting another additional rotation-driving means so that it enables to further improve the applicability.

Further, in the fourteenth embodiment, it has been described by referring to the case where the electromagnetic driving means 145 is drive-controlled by the separate control modes E1–E10 for setting the transporting direction of the movable table unit 15. However, for example, in the control mode E2, as long as it functions similarly, it may be configured in such a manner that, as long as it functions similarly, the electromagnetic driving means 145 is drive-controlled by other controlling methods, e.g. each energizing direction of the driven magnets 6A–6D is set in the reverse direction from the case of the control mode E1 and the energizing direction of the driving coils 751, 753 is set to be the same as the case of the control mode E1.

Moreover, in the fourteenth embodiment, the mounting area of the driven magnets 6A–6D and that of the square θ-shape driving coils 751–754 may be switched. In this case, the driven magnets 6A–6D are mounted on the stator side and the square θ-shape driving coils 751–754 are mounted on the needle side.

Furthermore, although the embodiment has been described by referring to the case where the driven magnets 6A–6D are formed with the electromagnets, the driven magnets 6A–6D may be formed with the permanent magnets.

By forming each of the driven magnets 6A–6D using the permanent magnets, the electric wiring in the periphery of the driven magnets 6A–6D becomes completely unnecessary, so that the spatial region for mounting the driven magnets 6A–6D can be reduced. For this, the size and weight of the entire apparatus can be reduced and the productivity and maintenance characteristic can be improved. Therefore, since the energization becomes unnecessary, the overall electric power consumption can be largely decreased as a whole compared to the case where the electromagnets are used for the driven magnets 6A–6D. Accordingly, the running cost of the entire apparatus can be extremely reduced and the movable table 1 can be driven to be transported in an arbitrary direction only through switching the energizing direction of each of a plurality of the driving coils 751–754 for drive-controlling the electromagnetic driving means 4. Thereby, it becomes possible to promptly respond to the switching of the moving direction of the movable table 1 and no accidents of wire breakdown or the like is caused in the driven magnets 6A–6D. Thus, it is advantageous in respect that the durability of the entire apparatus can be remarkably improved.

Fifteenth Embodiment

Next, the fifteenth embodiment will be described by referring to FIG. 65 to FIG. 70.

The fifteenth embodiment is distinctive in respect that it comprises another electromagnetic driving means 146 (see FIG. 35) instead of the electromagnetic driving means 144 (see FIG. 24) of the thirteenth embodiment.

Specifically, the configuration of the electromagnetic driving means 146 according to the embodiment is distinctive in respect that the four rectangular driving coils and each corresponding driven magnets of the electromagnetic driving means 144 in the thirteenth embodiment are mounted in such a manner that each rectangular driving coil is respectively rotated by 90°. Thereby, it is distinctive in terms of the operation that the rotation-drive on the same plane can be achieved along with the moving action of the movable table unit 15 in an arbitrary direction without mounting another additional rotation-driving means.

Further, it is distinctive in respect that an operation control system 206 for effectively driving the electromagnetic driving means 146 is mounted instead of the operation control system 204 of the thirteenth embodiment.

This will be described in detail hereinafter.

First, as in the case of the thirteenth embodiment, the fifteenth embodiment comprises: a precise processing movable table unit 15 provided to be capable of moving in arbitrary directions on the same plane; a table holding mechanism 2 which allows the movement of the movable table unit 15 while holding the movable table unit 15 and also has an original position returning function for the movable table unit 15; a case main body 3 as a main body part for supporting the table holding mechanism 2; and the electromagnetic driving means 146 mounted on the case main body 3 side for supplying a moving force to the movable table unit 15 in a prescribed direction according to a command from outside.

Figure 65:
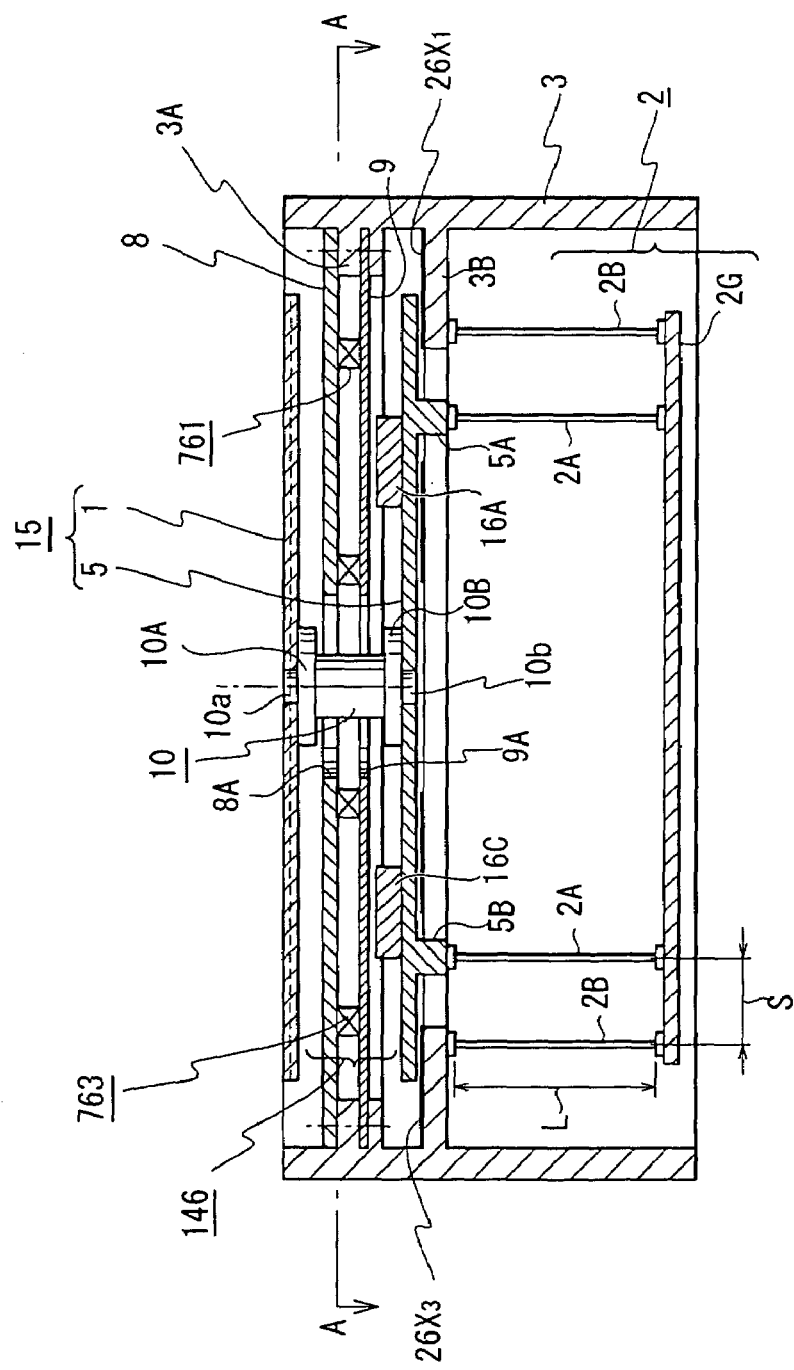
FIG. 65 is a longitudinal cross section showing a fifteenth embodiment of the present invention.

The movable table unit 15 is formed with a precise processing movable table 1 and an auxiliary table 5 which is disposed integrally, coaxially, and in parallel with respect to the movable table 1 with a prescribed space in between. As shown in FIG. 65, the table holding mechanism 2 is mounted on the auxiliary table 5 side for holding the movable table 1 through the auxiliary table 5.

[About Electromagnetic Driving Means 146]

The electromagnetic driving means 146 is held on the case main body 3 side by its main part and has a function for supplying a prescribed moving force (driving force) to the movable table unit 15 along the transporting direction of the movable table unit 15 according to a command from outside. The electromagnetic driving means 146 is disposed between the movable table 1 and the auxiliary table 5.

Specifically, the electromagnetic driving means 146 comprises: four rectangular driving coils 761, 762, 763, 764 formed in a quadrangular shape; eight driven magnets 6A, 16A, 6B, 16B, 6C, 16C, 6D, 16D mounted on the auxiliary table 5 by individually corresponding to parallel coil sides 761a, 761b, 762a, 762b, 763a, 763b, 764a, 764b (numeral references are applied in order in the counterclockwise direction in FIG. 65) positioned in the area of each of the rectangular driving coils 761–764 that are in parallel with the X axis and Y axis; and a fixing plate 8 for holding each of the four rectangular driving coils 761–764 at prescribed positions.

Each of the rectangular driving coils 761–764 is respectively and individually disposed on the X axis or Y axis in such a manner that the two opposing sides are in parallel, with the X axis or the Y axis being interposed therebetween, on the X-Y plane assumed with the origin being the center of the fixing plate 8.

Further, each of the eight driven magnets 6A–6D, 16A–16D is formed with the electromagnets which can be energized from outside and is individually provided on the X axis and Y axis by corresponding to the coil sides 761a–764a which is in parallel to the X axis and Y axis of each rectangular driving coil and corresponding to the center regions of the outer coil sides 761b–764b.

The fixing plate 8 is provided to the auxiliary table 5 on the movable table 1 side as shown in FIG. 65 and held by the case main body 3. The stator part as the main part of the electromagnetic driving means 146 is formed with each of the rectangular driving coils 761–764 and the fixing plate 8.

When each of the rectangular driving coils 761–764 is set in action, it generates the electromagnetic driving force between with each of the driven magnets 6A–6D, 16A–16D for repulsively driving each of the driven magnets 6A–6D, 16A–16D towards the direction orthogonal to each of the coil sides 761a–764a, 761b–764b. In this case, the center axis of each of the driven magnets 6A–6D, 16A–16D in the moving direction is set to be orthogonal to the X axis or Y axis.

Further, when moving the movable table unit 15 in the direction which does not cross with each of the coil sides 761a–764a, 761b–764b (in the slantwise direction with respect to each of the coil sides 761a–764a, 761b–764b), the movable table unit 15 is moved by the resultant force of the electromagnetic driving forces of the rectangular driving coils 761, 762, 763, 764 for at least two or more of the driven magnets 6A–6D as will be described later.

Figure 66:
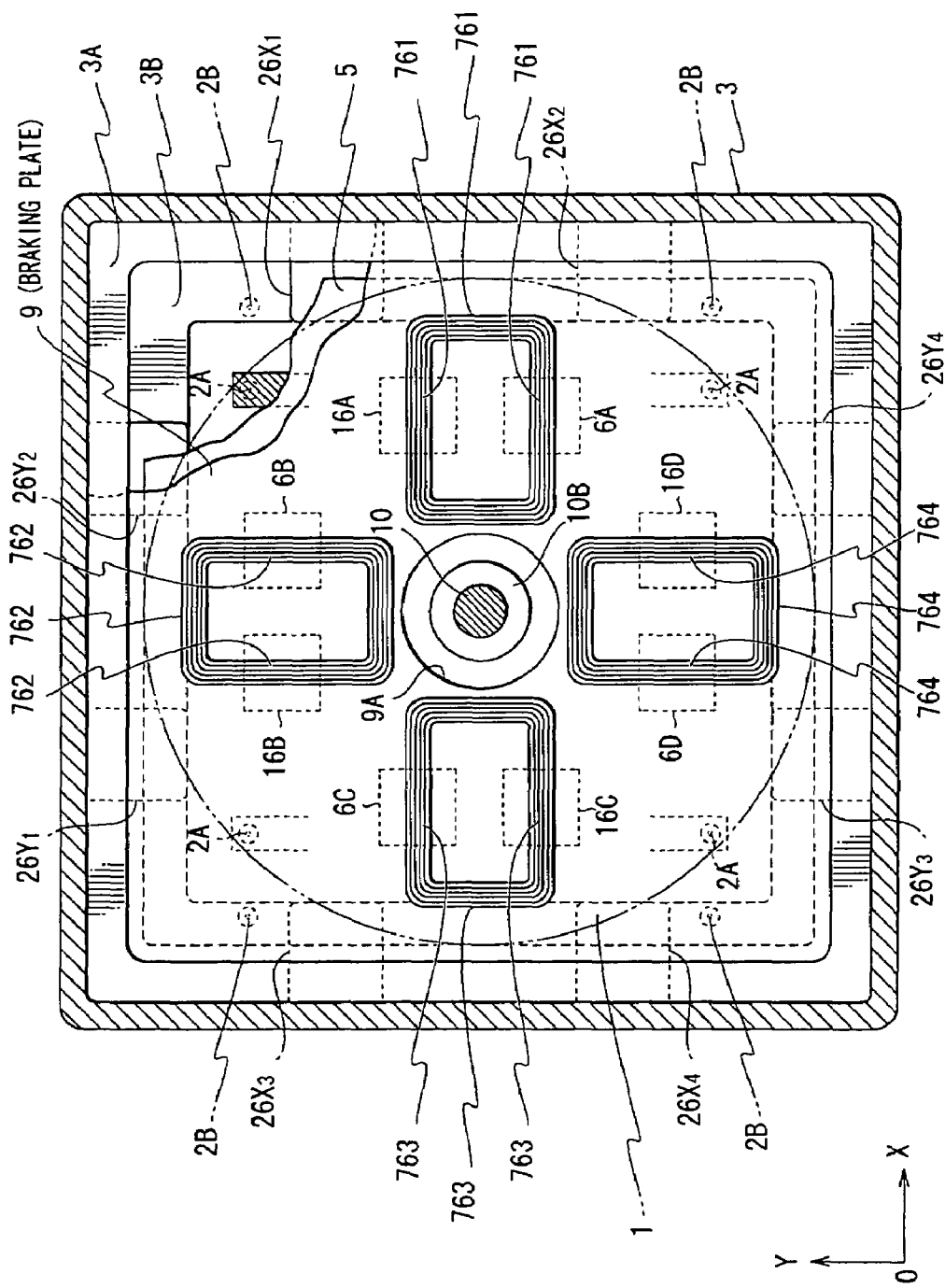
FIG. 66 is a schematic lateral cross section taken along the line A—A of FIG. 65.

As for each of the four driven magnets 6A–6D, 16A–16D constituting a part of the electromagnetic driving means 146 according to the embodiment, as shown in FIG. 66, used are the electromagnets with the quadrangular magnetic pole end surface (the surface opposing the each of the coil sides 761a–764a, 761b–764b of each of the driving coils 761–764). They are respectively provided and fixed on the X-Y plane assumed on the top face of the auxiliary table 5 at the positions on the X axis and Y axis at the equal distance from the center.

In the embodiment, for example, when a prescribed operating current is flown into a part or the entire part of the eight driven magnets 6A–6D, 16A–16D for setting each of the driven magnets 6A–6D, 16A–16D in operation, each of the rectangular driving coils 761–764 is set in action to start the energization subsequently or simultaneously according to a prescribed control mode which will be described later. Then, the magnitudes of the magnetic force of each driven magnets 6A to 6D, 16A–16D including each of the driving coils 761–764 are adjusted by the energization control. Thereby, the movable table unit 15 is transported in a prescribed direction.

In this case, the action of the electromagnetic driving means 146 (energization drive for each of the driving coils 761–764 and the four driven magnets 6A–6D, 16A–16D) in terms of the moving direction and transportation driving force for the movable table unit 15 will be described in FIG. 67 to FIG. 69.

In this case, in the fifteenth embodiment, the energizing direction of the eight driven magnets 6A–6D, 16A–16D made of the electromagnets is specified beforehand. Thus, the energizing direction and the magnitude of the flown current (including the energization-stop control) of each of the eight inner coil sides 761a–764a and outer coil sides 761b–764b of the rectangular driving coils 741–744 is set and controlled by the operation control system 206 by corresponding to the transporting direction of the movable table 1. Thereby, the electromagnetic force (reaction force) is to be outputted to the driven magnets 6A–6D, 16A–16D for pressing them in a prescribed direction (in the directions respectively orthogonal to the coil sides 761a–764a, 761b–764b part) according to Fleming's left-hand rule.

Further, by selecting and combining the directions of the electromagnetic forces generated in the eight driven magnets 6A–6D, 16A–16D beforehand, it is possible to set the resultant force of the electromagnetic forces generated in the eight driven magnets 6A–6D, 16A–16D to be in the transporting direction of the movable table unit 15. Thereby, the moving force can be supplied to the movable table unit 15 to be moved in the arbitrary direction on the X-Y plane.

A series of energizing control method for the eight driven magnets 6A–6D, 16A–16D will be described in detail in the description of a program storage 22 (FIG. 68–FIG. 70) which will be described later.

On the outer side and inner side of each of the driving coils 761–764 on the same plane, a magnetic material such as ferrite may be filled at least up to the same height as the height (in the Y axis direction) of each of the driving coils 761–764 and within a range covering the operation range of the driven magnets 6A–6D, 16A–16D.

[About Operation Control System 206]

Next, the operation control system 206 of the fifteenth embodiment will be described in detail.

Figure 67:
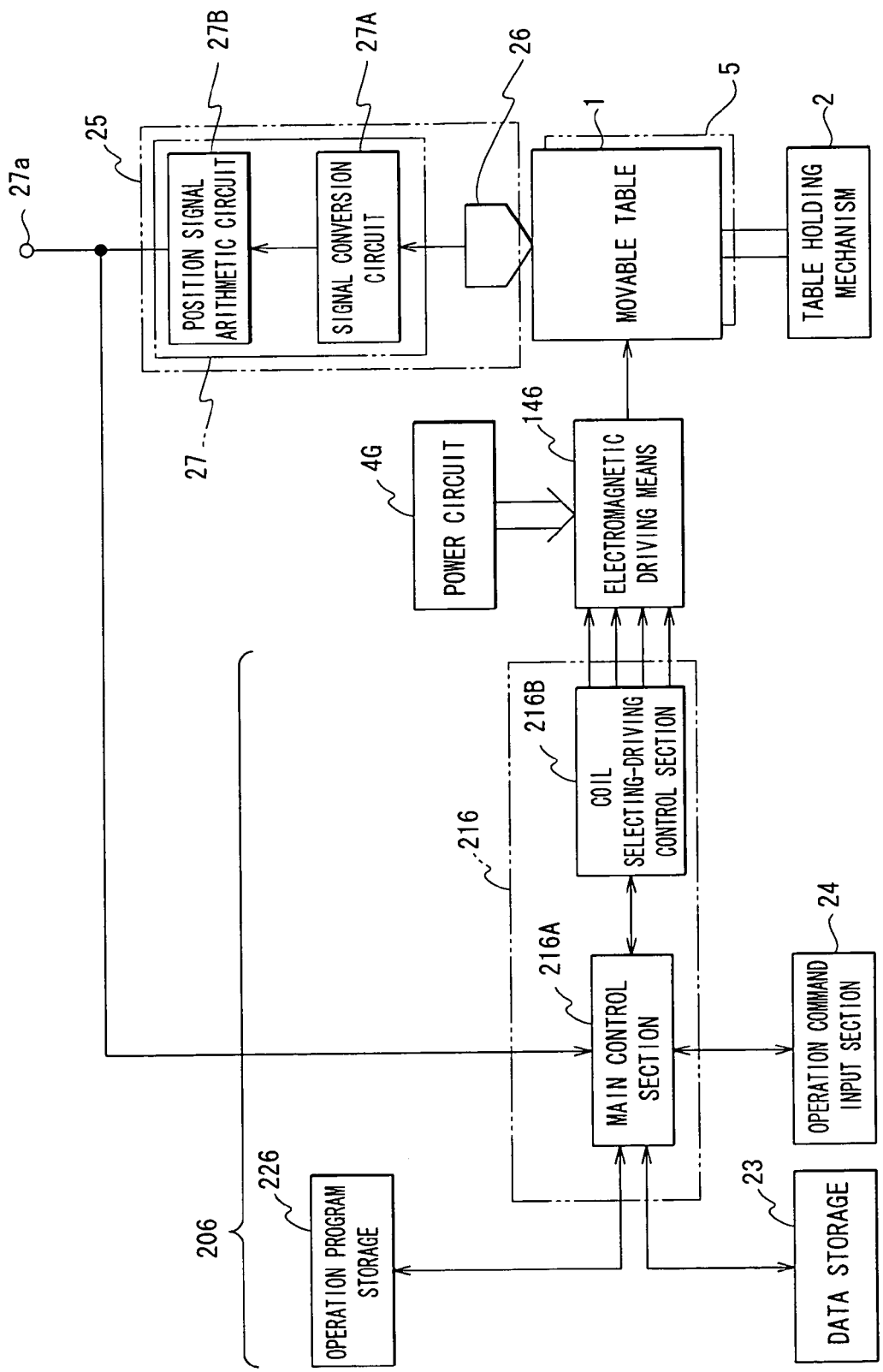
FIG. 67 is a block diagram showing the entire apparatus including the operation system according to the embodiment disclosed in FIG. 65.

In the fifteenth embodiment, provided to the electromagnetic driving means 164 is an operation control system 206 which restricts the moving action of the movable table unit 15 by individually energize-controlling each of the rectangular driving coils 761–764 and each of the eight driven magnets 6A–6D, 16A–16D (see FIG. 67).

The operation control system 206 comprises: a magnetic pole individual setting function for individually setting and maintaining the north pole or south pole of each of the eight driven magnets 6A–6D, 16A–16D which are mounted by corresponding to each of the rectangular driving coils 761–764; a magnetic force magnitude setting function for individually and variably setting (it is possible to set by changing the flown current) the magnitude of the magnetic force of each of the driven magnets 6A–6D; an energizing direction setting function for setting and maintaining the energizing direction of the coil sides 761a, 761, 762a, 762b, 763a, 763b, 764a, 764b part of each of the rectangular driving coils 761–764 that are in parallel to the X axis or Y axis to a prescribed direction (in one direction or other) according to a command from outside; a driving coil energizing control function for variably setting the magnitude of the current flown into each of the rectangular driving coils 761–764; and a table action control function for adjusting the transporting direction and transporting force for the movable table unit 15 by appropriately adjusting the output of the various functions.

For carrying out the functions described above, as shown in FIG. 66, the operation control system 206 comprises: a table driving control means 216 which individually drives each of the rectangular driving coils 761–764 and each of the eight driven magnets 6A–6D, 16A–16D of the electromagnetic driving means 146 according to a prescribed energizing control mode for controlling the movement of the movable table unit 15 in a prescribed direction; a program storage 226 being provided along with the table driving control means 216, to which a plurality of control programs for a plurality of control modes (ten energizing control modes F1–F10 in the embodiment) in which the moving direction, rotation direction, moving amount and the like are specified are provided; and a data storage 23 to which prescribed data and the like are stored to be used at the time of executing each control program.

Further, in the table driving control means 216, provided is an operation command input section 24 for giving a command of a prescribed control operation to each of the rectangular driving coils 761–764 and each of the eight driven magnets 6A–6D, 16A–16D. Moreover, the positional information of the movable table 1 during the movement and after the movement is detected by the positional information detecting means 25 and arithmetic-processed to be transmitted to the table driving control means 216.

The various control functions of the operation control system 206 are comprehensively contained in a plurality of the energizing control modes F1–F10 in the program storage 226. They are selected according to a selection command inputted through the operation input section 24 by an operator. Through one of the selected prescribed control modes F1–F10, the various control functions are started and carried out.

This will be described in detail.

The table driving control means 216 according to the embodiment comprises: a main control section 216A which operates according to the command from the operation command input section 24 and has a function of selecting a prescribed control mode from the program storage 226 and of energize-controlling a prescribed direct current including zero to each of the rectangular driving coils 761–764 and each of the eight driven magnets 6A–6D, 16A–16D; and a coil selecting-driving control section 216B which has a function of drive-controlling each of the rectangular driving coils 761–764 and each of the eight driven magnets 6A–6D, 16A–16D simultaneously and individually according to the control mode (F1–F10) selected and set by the main control section 216A.

Moreover, the main control section 216A also has a function of calculating the position of the movable table 1 according to the input information from the positional information detecting means 25 for detecting the table position, or carrying out other various arithmetic operations. Numeral reference 4G is a power circuit for energizing a prescribed current to each of the rectangular driving coils 761–764 and each of the eight driven magnets 6A–6D, 16A–16D of the electromagnetic driving means 146.

[About Program Storage 226]

The table driving control means 216 is configured to individually drive-control each of the rectangular driving coils 761–764 and each of the eight driven magnets 6A–6D, 16A–16D of the electromagnet driving means 146 with a prescribed relation therebetween according to a prescribed energization-control program (a program for carrying out the prescribed energization control mode) which is stored beforehand in the program storage 226.

Specifically, in the embodiment, stored in the program storage 226 are: a plurality of magnet control programs for individually specifying the energizing directions of each of the eight driven magnets (electromagnets) 6A–6D, 16A–16D and for specifying the north pole or the south pole of the magnetic pole, while variably setting the magnitude of the flown current including the non-energization; and a driving coil control program, which functions correspondingly when the energizing direction of each of the eight driven magnets 6A–6D, 16A–16D are specified and the north pole or south pole (or stopping energization) is specified, for variably setting the energizing direction and the magnitude of the flown current for each of the four rectangular driving coils 761–764.

Figure 68:
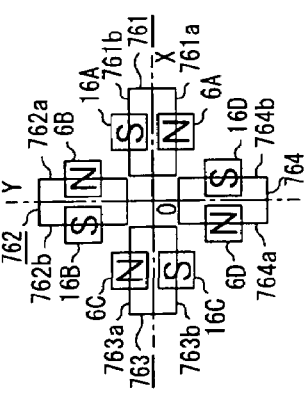
FIG. 68 is a diagram showing the control contents of a plurality of energizing control modes F1–F4 executed by the table driving control means of the embodiment disclosed in FIG. 65 and the moving directions (transporting directions of the movable table) of the entire driven magnets.
Figure 69:
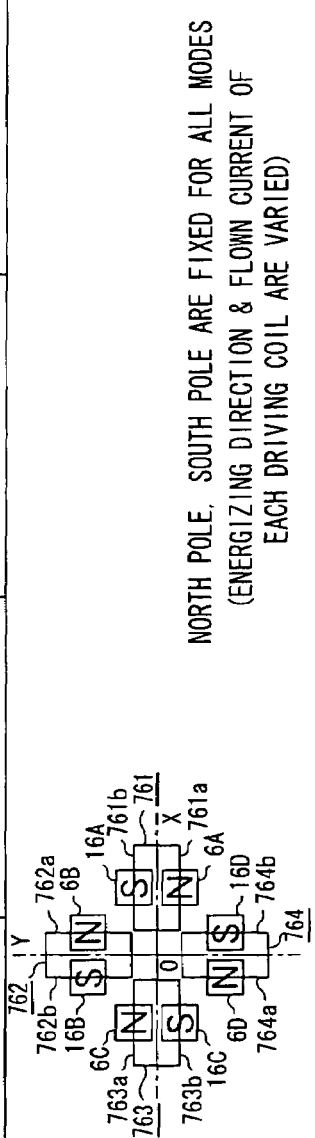
FIG. 69 is a diagram showing the control contents of a plurality of energizing control modes F5–F8 executed by the table driving control means of the embodiment disclosed in FIG. 65 and the moving directions (transporting directions of the movable table) of the entire driven magnets.
Figure 70:
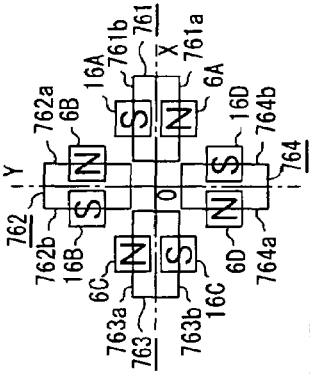
FIG. 70 is a diagram showing the control contents of a plurality of energizing control modes F9–F10 (rotating action) executed by the table driving control means of the embodiment disclosed in FIG. 65 and the moving directions (transporting directions of the movable table) of the entire driven magnets.

At the same time, the operation timing of each control program is arranged in a group of ten energizing control modes F1–F10 and stored (see FIG. 68–FIG. 70).

Now, the group of ten energizing control modes F1–F10 according to the fifteenth embodiment will be described by referring to FIG. 68 to FIG. 70.

FIG. 68 shows examples (in diagram) of each of the energizing control modes F1–F4 in the case where the movable table unit 15 is moved in the positive or negative direction of the X axis or the positive or negative direction of the Y axis, respectively.

In FIG. 68, each of the energizing control modes F1–F4 is set to variably control the energizing direction of the direct current for each of the rectangular driving coils 761–764. Also, as for the energizing direction of each of the eight driven magnets (electromagnets), the north pole or the south pole of each magnetic pole is controlled to be set unchanged at all times (fixed state) regardless of the control modes.

That is, in the fifteenth embodiment, the magnetic poles of the end face part of the driven magnets 6A–6D facing the rectangular driving coils 761, 762 are set to be the north pole, while those of the driven magnets 16A–16D are set to be the south pole, respectively. In the fifteenth embodiment, the north pole or the south pole of each magnetic pole is controlled to be set unchanged at all times (fixed state) regardless of the control modes F1–F4.

(Control Mode F1)

The control mode F1 is an example of the energizing control mode for transporting the movable table 1 in the positive direction of the X axis (see FIG. 68).

In the control mode F1, the rectangular driving coils 762, 764 on the Y axis and each of the corresponding driven magnets 6B, 16B and 6D, 16D are energized, while the rectangular driving coils 761, 763 on the X axis and each of the corresponding driven magnets 6A, 16A and 6C, 16C are controlled to stop energization.

Further, as for the driven magnets 6B, 6D corresponding to the rectangular driving coils 762, 764 on the Y axis, the end face part of the driven magnet 6B, 6D facing each of the coil sides 762a, 764a is fixed to be the north pole, while the end face part of the driven magnet 16B, 16D facing the coil sides 762b, 764b is fixed to be the south pole.

Further, as for the energizing directions of each of the rectangular driving coils 762, 764 on the Y axis, it is set in the clockwise direction (right turn) for the rectangular driving coil 762 and in the counterclockwise direction (left turn) for the rectangular driving coil 764, respectively.

Therefore, in each of the rectangular coil sides 762a, 762b, 764a, 764b of each of the driving coils 762, 764, a prescribed electromagnetic driving force is generated in the direction indicated by dotted-line arrows. At the same time, by the reaction force (generated since the rectangular driving coils 762, 764 are fixed), the driven magnets 6B, 16B, 6D, 16D are repulsively driven in the direction indicated by solid-line arrows (in the right direction in the figure).

Thereby, the movable table unit 15 is transported in the positive direction on the X axis being balanced between with the electromagnetic driving forces generated in the four driven magnets 6B, 16B, 6D, 16D.

(Control Mode F2)

The control mode F2 is an example of the energizing control mode for transporting the movable table 1 in the negative direction of the X axis (see FIG. 68).

The control mode F2 differs from the control mode F1 in respect that the energizing direction of each of the coil sides 762a, 762b, 764a, 764b of the rectangular driving coils 762, 764 on the Y axis is reversed. In other respects, it is the same as that of the control mode F1.

Therefore, in each of the coil sides 762a, 762b and 764a, 764b of the driving coils 762, 764, the electromagnetic driving force (dotted-line arrow) is generated in the directions opposite to the case of the control mode F1 by the same principle. By the reaction force, each of the driven magnets 6B, 16B and 6D, 16D is repulsively driven in the direction indicated by solid-line arrows (in the left direction in the figure). Thereby, the movable table unit 15 is transported in the negative direction on the X axis.

(Control Mode F3)

The control mode F3 is an example of the energizing control mode for transporting the movable table 1 in the positive direction of the Y axis (see FIG. 68).

In the control mode F3, each of the rectangular driving coils 761, 763 and the corresponding driven magnets 6A, 16A and 6C, 16C on the X axis are energized. At the same time, each of the rectangular driving coils 762, 764 and each of the corresponding driven magnets 6B, 16B and 6D, 16D on the Y axis are controlled to stop energization.

Among the driven magnets 6A, 16A corresponded to the rectangular driving coil 761 on the X axis, the end face part of the driven magnet 6A facing the coil side 761a is fixed to be the north pole, while the end face part of the driven magnet 16A facing the coil side 761b is fixed to be the south pole.

Similarly, among the driven magnets 6C, 16C corresponded to the rectangular driving coil 763 on the X axis, the end face part of the driven magnet 6C facing the coil side 763a is fixed to be the north pole, while the end face part of the driven magnet 16C facing the coil side 763b is fixed to be the south pole.

Further, as for the energizing directions of each of the rectangular driving coils 761, 763 on the X axis, it is set in the counterclockwise direction (left turn) for the rectangular driving coil 761 and in the clockwise direction (right turn) for the rectangular driving coil 763, respectively.

Therefore, in each of the coil sides 761a, 761b, 763a, 763b of each of the rectangular driving coils 761, 763, a prescribed electromagnetic driving force is generated in the direction indicated by dotted-line arrows. At the same time, by the reaction force (generated since the rectangular driving coils 761, 763 are fixed), the driven magnets 6A, 16A, 6C, 16C are repulsively driven in the direction indicated by solid-line arrows (in the upward direction in the figure). Thereby, the movable table unit 15 is transported in the positive direction on the Y axis being balanced between with the electromagnetic driving forces generated in the four driven magnets 6A, 16A, 6C, 16C.

(Control Mode F4)

The control mode F4 is an example of the energizing control mode for transporting the movable table 1 in the negative direction of the Y axis (see FIG. 68).

The control mode F4 differs from the control mode F3 in respect that the energizing direction of each of the coil sides 761a, 761b, 763a, 763b of the rectangular driving coils 761, 763 on the X axis is reversed. In other respects, it is the same as the case of the control mode F3.

Therefore, in each of the coil sides 761a, 761b and 763a, 763b of the driving coils 761, 763, the electromagnetic driving force (dotted-line arrow) is generated in the reversed direction (opposite direction) with respect to the case of the control mode F3 by the same principle. By the reaction force, each of the driven magnets 6A, 16A and 6C, 16C is repulsively driven in the direction indicated by solid-line arrows (in the left direction in the figure). Thereby, the movable table unit 15 is transported in the negative direction on the X axis.

Subsequently, illustrated in FIG. 68 are examples (in a diagram) of each of the control modes F5–F8 in the case where the movable table unit 15 is transported in each of the four quadrant directions on the X-Y coordinates.

In FIG. 68, in each of the energizing control modes F5–F8, the energizing direction of the direct current for each of the rectangular driving coils 761–764 is individually set to be variably controlled as in the case of each of the control modes F1–F4. As for the energizing direction of each of the eight driven magnets (electromagnets), the north pole or the south pole is controlled to be set unchanged (fixed state) at all times regardless of the control modes as in the case of each of the control modes F1–F4.

(Control Mode F5)

The control mode F5 is an example of the energizing control mode for transporting the movable table 1 in the first quadrant direction of the X-Y plane coordinates (see FIG. 69).

In the control mode F5, each of the eight driven magnets 6A–6D, 16A–16D is set in the state to be simultaneously energize-controlled, and the energizing direction (north pole, south pole) are fixed as in the case of each of the control modes F1–F4.

That is, as for each of the driven magnets 6A–6D being disposed by corresponding to each of the coil sides 761a–764a of each of the rectangular driving coils 761–764 on the X axis, Y axis, the end face part facing each of the coil sides 761a–764a are set to be the north pole, respectively. Further, as for the driven magnets 16A–16D being disposed by corresponding to the coils sides 761b–762b of each of the rectangular coils 761–764 on the X axis, Y axis, the end face part facing each of the coil sides 761b–764b are set to be the south pole, respectively.

Thus, each of the coil sides 761a, 761b, 762a, 762b, 763a, 763b, 764a, 764b of the rectangular driving coils 761–764 is energized to be in the state similar to the case where the control modes F1 and F3 operate simultaneously. Thus, the electromagnetic driving forces in the same directions (in the positive direction of X axis and positive direction of Y axis) as the case of the control modes F1, F3 are generated, and the resultant force is directed in the first quadrant direction as shown in the section of the control mode F5 in FIG. 68. Thereby, the movable table unit 15 is transported towards the first quadrant direction on the X-Y plane coordinates.

The transporting angle θ (angle θ with respect to the X axis) towards the first quadrant with respect to the X axis can be variably set at will in arbitrary direction by changing the electromagnetic driving force working on each of the driven magnets 6A–6D through variably controlling the magnitude of the current flown into each of the rectangular driving coils 761–764 and each of the driven magnets 6A–6D, 16A–16D.

(Control Mode F6)

The control mode F6 is an example of the energizing control mode for transporting the movable table 1 in the third quadrant direction (the direction opposite to the first quadrant direction) of the X-Y plane coordinates (see FIG. 69).

In the control mode F6, each of the eight driven magnets 6A–6D, 16A–16D is set in the state to be simultaneously energize-controlled. The north pole and south pole are set in the same manner as the case of the control modes F1–F5.

Therefore, each of the coil sides 761a, 761b, 762a, 762b, 763a, 763b, 764a, 764b of each of the rectangular driving coils 761–764 is energized to be in the state similar to the case where the control modes F2 and F4 operate simultaneously. Thus, the electromagnetic driving forces are simultaneously generated in the same directions (in the left direction and downward direction of FIG. 68) as the cases of the control modes F2, F4, and the resultant force is directed in the third quadrant direction as shown in the section of the control mode F6 in FIG. 68. Thereby, the movable table unit 15 is transported towards the third quadrant direction on the X-Y plane coordinates.

The transporting angle θ towards the third quadrant with respect to the X axis can be variably set at will in arbitrary directions by changing the electromagnetic driving force working on each of the driven magnets 6A–6D, 16A–16D through variably controlling the magnitude of the current flown into each of the rectangular driving coils 761–764 and each of the driven magnets 6A–6D, 16A–16D.

(Control Mode F7)

The control mode F7 is an example of the energizing control mode for transporting the movable table 1 in the second quadrant direction of the X-Y plane coordinates (see FIG. 69).

In the control mode F7, each of the eight driven magnets 6A–6D, 16A–16D is set in the state to be simultaneously energize-controlled. The north pole and south pole are set in the same manner as the case of the control modes F1–F6.

In the case of the control mode F7, each of the coil sides 761a, 761b, 762a, 762b, 763a, 763b, 764a, 764b of each of the rectangular driving coils 761–764 is energized to be in the state similar to the case where the control modes F2 and F3 operate simultaneously. Thus, the electromagnetic driving forces are simultaneously generated in the same directions (in the left direction and upward direction of FIG. 68) as the cases of the control modes F2, F3, and the resultant force is directed in the second quadrant direction as shown in the section of the control mode F7 in FIG. 68. Thereby, the movable table unit 15 is transported towards the second quadrant direction on the X-Y plane coordinates.

The transporting angle θ towards the second quadrant with respect to the X axis can be variably set at will in arbitrary directions by changing the electromagnetic driving force working on each of the driven magnets 6A–6D, 16A–16D through variably controlling the magnitude of the current flown into each of the rectangular driving coils 761–764 and each of the driven magnets 6A–6D, 16A–16D.

(Control Mode F8)

The control mode F8 is an example of the energizing control mode for transporting the movable table 1 in the fourth quadrant direction (the direction opposite to the second quadrant direction) of the X-Y plane coordinates (see FIG. 69).

In the control mode F8, each of the eight driven magnets 6A–6D, 16A–16D is set in the state to be simultaneously energize-controlled. The north pole and south pole are set in the same manner as the case of the control modes F1–F7.

In the case of the control mode F8, each of the coil sides 761a, 761b, 762a, 762b, 763a, 763b, 764a, 764b of each of the rectangular driving coils 761–764 is energized to be in the state similar to the case where the control modes F1 and F4 operate simultaneously. Thus, the electromagnetic driving forces are simultaneously generated in the same directions (in the right direction and downward direction of FIG. 68) as the cases of the control modes F1, F4, and the resultant force is directed in the fourth quadrant direction as shown in the section of the control mode F8 in FIG. 68. Thereby, the movable table unit 15 is transported towards the fourth quadrant direction on the X-Y plane coordinates.

The transporting angle θ towards the fourth quadrant with respect to the X axis can be variably set at will in arbitrary directions by changing the electromagnetic driving force working on each of the driven magnets 6A–6D through variably controlling the magnitude of the current flown into each of the rectangular driving coils 761–764 and each of the driven magnets 6A–6D, 16A–16D.

(Control Mode F9)

The control mode F9 enables the rotation-drive of the movable table unit 15 on the X-Y plane at a prescribed angle in the counterclockwise direction. Shown is an example of the energization control mode used therein (see FIG. 70).

In the control mode F9, each of the rectangular driving coils 761–764 and each of the eight driven magnets 6A–6D, 16A–16D are simultaneously energized.

In this case, the north pole and south pole of the driven magnets 6A–6D are set in the same manner as the cases of the control modes F1–F8.

Further, the rectangular driving coils 761–764 are controlled to output a prescribed electromagnetic driving force so that a same-level prescribed moment is respectively generated to each of the corresponding eight driven magnets 6A–6D, 16A–16D in the counterclockwise direction with the origin (zero-point) on the X-Y plane being the center.

In this case, in the control mode F9, the energizing directions of each of the rectangular driving coils 761–764 are all controlled to be set in the counterclockwise direction (left turn).

In FIG. 70, the same-level prescribed rotation moments of each of the driven magnets 6A–6D, 16A–16D respectively generated on the X axis and Y axis are illustrated by solid lines. Accordingly, the movable table unit 15 holding the driven magnets 6A–6D, 16A–16D is to be rotationally driven in the counterclockwise direction within a prescribed angle through the driven magnets 6A–6D, 16A–16D.

That is, in each of the coil sides 761*a*, 761*b*, 762*a*, 762*b*, 763*a*, 763*b*, 764*a*, 764*b* of each of the rectangular driving coils 761–764, a prescribed electromagnetic force is generated in the directions indicated by dotted-line arrows. At the same time, by the reaction force (generated since the driving coils 761–764 are fixed to the fixing plate 8), each of the driven magnets 6A–6D, 16A–16D is repulsively driven in the direction indicated by solid-line arrows (in the counterclockwise direction in the figure). The movable table unit 15 is rotationally driven in the counterclockwise direction (within a prescribed range) on the X-Y plane being balanced between with each electromagnetic driving force (same-level prescribed rotation moment) generated in each of the eight driven magnets 6A–6D, 16A–16D.

(Control Mode F10)

The control mode F10 enables the rotation-drive of the movable table unit 15 on the X-Y plane at a prescribed angle in the clockwise direction. Shown is an example of the energization control mode used therein (see FIG. 70).

In the control mode F10, each of the rectangular driving coils 761–764 and each of the eight driven magnets 6A–6D, 16A–16D are simultaneously energized. In this case, in each of the rectangular driving coils 761–764, the control current is energized in the reversed direction with respect to the case of the control mode F9 (see the section of the control mode F10 in FIG. 70).

In this case, the north pole and south pole of the driven magnets 6A–6D are set in the same manner as the cases of the control modes F1–F9. Further, the rectangular driving coils 761–764 are energized in the reverse direction from the case of the control mode 9 so that a same-level prescribed moment (rotational driving force) is respectively generated to each of the corresponding eight driven magnets 6A–6D, 16A–16D in the clockwise direction with the origin (zero-point) on the X-Y plane being the center. Thereby, the prescribed electromagnetic driving force can be outputted.

It is shown in FIG. 70. In the figure, the same-level prescribed rotation moments are indicated by solid lines. With this, the movable table unit 15 holding the driven magnets 6A–6D, 16A–16D is rotationally driven in the clockwise direction (right turn) within a prescribed range through the driven magnets 6A–6D, 16A–16D.

Other configurations, the operations, functions and the like are substantially the same as the case of the thirteenth embodiment.

With this, the same effect as the case of the thirteenth embodiment can be achieved. Moreover, in the fifteenth embodiment, each of the electromagnetic driving forces outputted from the electromagnetic driving means can be outputted in the direction orthogonal to the X axis or Y axis and also in the rotating direction. Thus, it enables to rotationally drive the movable table unit 15 within prescribed angles without mounting another additional rotation driving means, so that it enables to further improve the applicability.

Further, in the fifteenth embodiment, it has been described by referring to the case where the electromagnetic driving means 146 is drive-controlled by the separate control modes F1–F10 for setting the transporting direction of the movable table unit 15. However, for example, in the control mode F2, it may be configured in such a manner that, as long as it functions similarly, the electromagnetic driving means 146 is drive-controlled by other controlling methods, e.g. each energizing direction of the driven magnets 6A–6D, 16A–16D is set in the reversed direction from the case of the control mode F1 and the energizing direction of the driving coils 761, 763 is set to be the same as the case of the control mode F1.

Moreover, in the fifteenth embodiment, the mounting area of the driven magnets 6A–6D, 16A–16D and that of the rectangular driving coils 761–764 may be switched. In this case, the driven magnets 6A–6D, 16A–16D are mounted on the stator side and the rectangular driving coils 761–764 are mounted on the needle side.

Furthermore, although the fifteenth embodiment has been described by referring to the case where the driven magnets 6A–6D, 16A–16D are formed with the electromagnets, they may be formed with the permanent magnets.

By forming each of the driven magnets 6A–6D, 16A–16D using the permanent magnets, the electric wiring in the periphery of the driven magnets 6A–6D, 16A–16D becomes completely unnecessary, so that the spatial region for mounting the driven magnets 6A–6D, 16A–16D can be reduced. For this, the size and weight of the entire apparatus can be reduced and the productivity and maintenance characteristic can be improved. Therefore, since the energization becomes unnecessary, the overall electric power consumption can be largely decreased compared to the case where the electromagnets are used for the driven magnets 6A–6D. Accordingly, the running cost of the entire apparatus can be extremely reduced and the movable table 1 can be driven to be transported in an arbitrary direction only through switching the energizing direction of each of a plurality of the rectangular driving coils 761–764 for drive-controlling the electromagnetic driving means 146. Thereby, it becomes possible to promptly respond to the switching of the moving direction of the movable table 1 and no accidents of wire breakdown or the like is caused in the driven magnets 6A–6D, 16A–16D. Thus, it is advantageous in respect that the durability of the entire apparatus can be remarkably improved.

Sixteenth Embodiment

Next, a sixteenth embodiment will be described by referring to FIG. 71 to FIG. 76.

The sixteenth embodiment is distinctive in respect that it comprises another electromagnetic driving means 147 (see FIG. 71, FIG. 72) instead of the electromagnetic driving means 146 (see FIG. 66) of the fifteenth embodiment.

Specifically, the configuration of the electromagnetic driving means 147 according to the sixteenth embodiment is structurally distinctive in respect that a cross-shape driving coil 771 formed in cross-frame shape is mounted instead of the four rectangular driving coils of the electromagnetic driving means 146 in the fifteenth embodiment. Thus, it is distinctive in terms of the operation that the rotation-drive on the same plane can be achieved along with the moving action of the movable table unit 15 in arbitrary directions.

Further, it is distinctive in respect that an operation control system 207 for effectively driving the electromagnetic driving means 147 is mounted instead of the operation control system 206 of the fifteenth embodiment.

This will be described in detail hereinafter.

First, as in the case of the fifteenth embodiment, the sixteenth embodiment comprises: a precise processing movable table unit 15 provided to be capable of moving in arbitrary directions on the same plane; a table holding mechanism 2 which allows the movement of the movable table unit 15 while holding the movable table unit 15 and also has an original position returning function for the movable table unit 15; a case main body 3 as a main body part for supporting the table holding mechanism 2; and the electromagnetic driving means 147 mounted on the case main body 3 side for supplying a moving force to the movable table unit 15 in a prescribed direction according to a command from outside.

Figure 4:
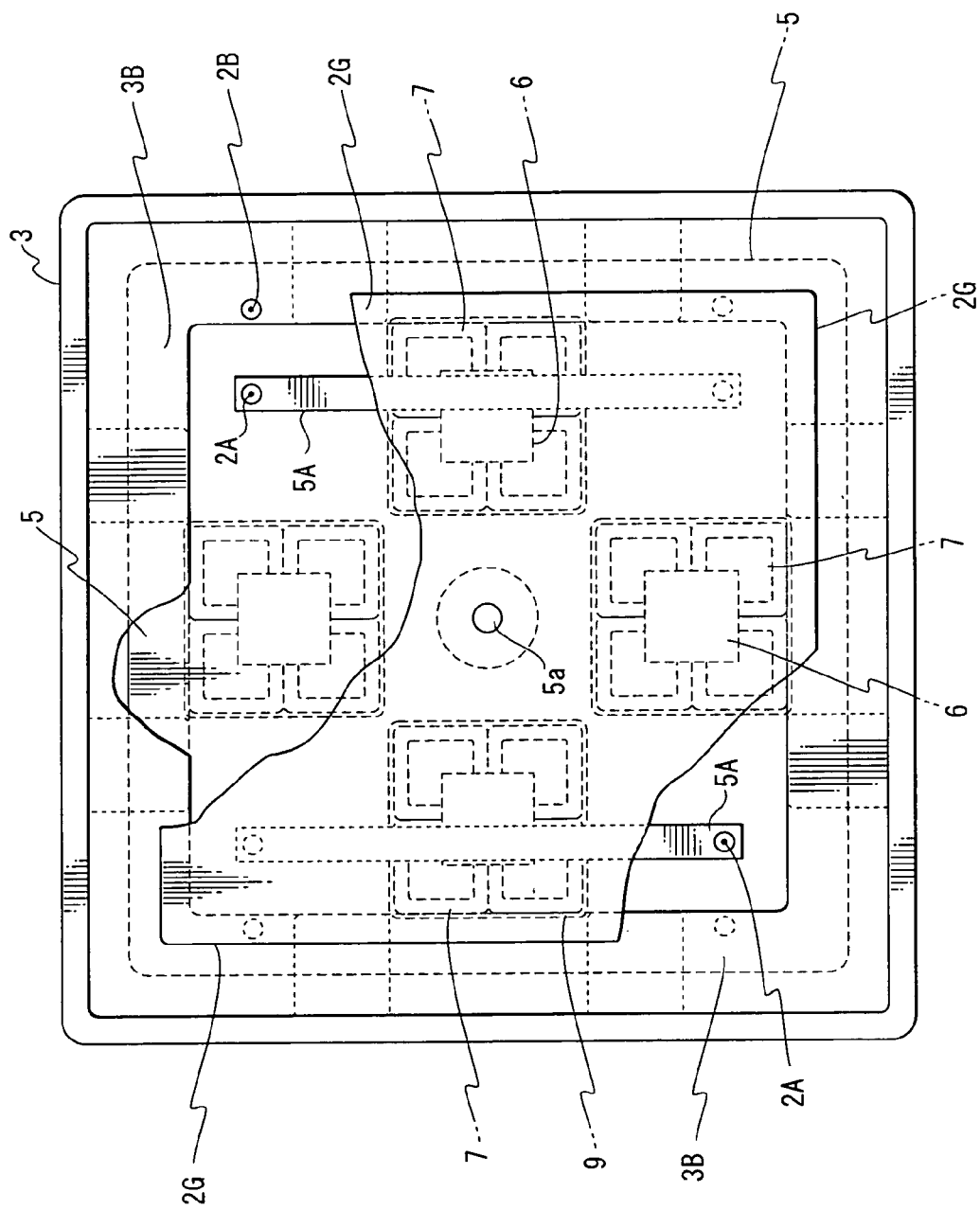
FIG. 4 is a fragmentary sectional bottom view viewed from the bottom side of FIG. 1.

The movable table unit 15 is formed with a precise processing movable table 1 and an auxiliary table 5 which is disposed integrally, coaxially, and in parallel with respect to the movable table 1 with a prescribed space in between. As shown in FIGS. 3-4, the table holding mechanism 2 is mounted on the auxiliary table 5 side for holding the movable table 1 through the auxiliary table 5.

[About Electromagnetic Driving Means 147]

The electromagnetic driving means 147 is held on the case main body 3 side by its main part and has a function of supplying a prescribed moving force (driving force) to the movable table unit 15 along the transporting direction of the movable table unit 15 according to a command from outside. The electromagnetic driving means 147 is disposed between the movable table 1 and the auxiliary table 5.

Figure 72:
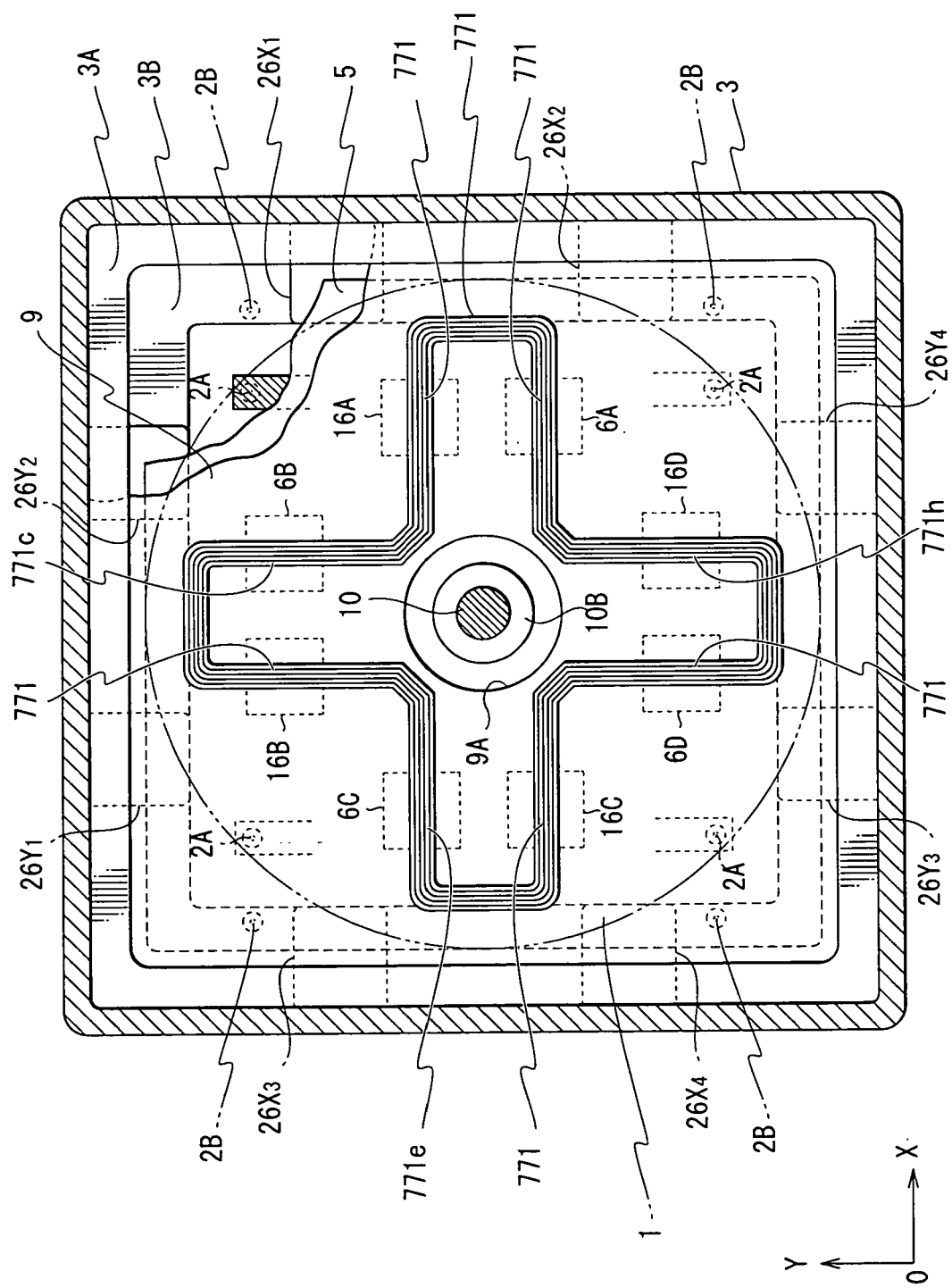
FIG. 72 is a schematic lateral cross section taken along the line A—A of FIG. 71.

Specifically, the electromagnetic driving means 147 comprises: a cross-shape driving coil 771 formed in cross-frame shape; each of eight driven magnets 6A, 16A, 6B, 16B, 6C, 16C, 6D, 16D mounted on the auxiliary table 5 by individually corresponding to parallel coil sides 771a, 771b, 771c, 771d, 771e, 771f, 771g, 771h (numeral references are applied in order in the counterclockwise direction in FIG. 72) positioned in the area of the cross-shape driving coil 771 that is in parallel to the X axis and Y axis; and a fixing plate 8 for holding the cross-shape driving coil 771 at a prescribed position.

The cross-shape driving coil 771 is disposed in such a manner that the center point is positioned on the origin on the X-Y plane assumed on the fixing plate 8 with the center being the origin, and that the two opposing sides extending in all directions come to be in parallel to the X axis or the Y axis with respect to each axis on the X-Y plane.

Figure 71:
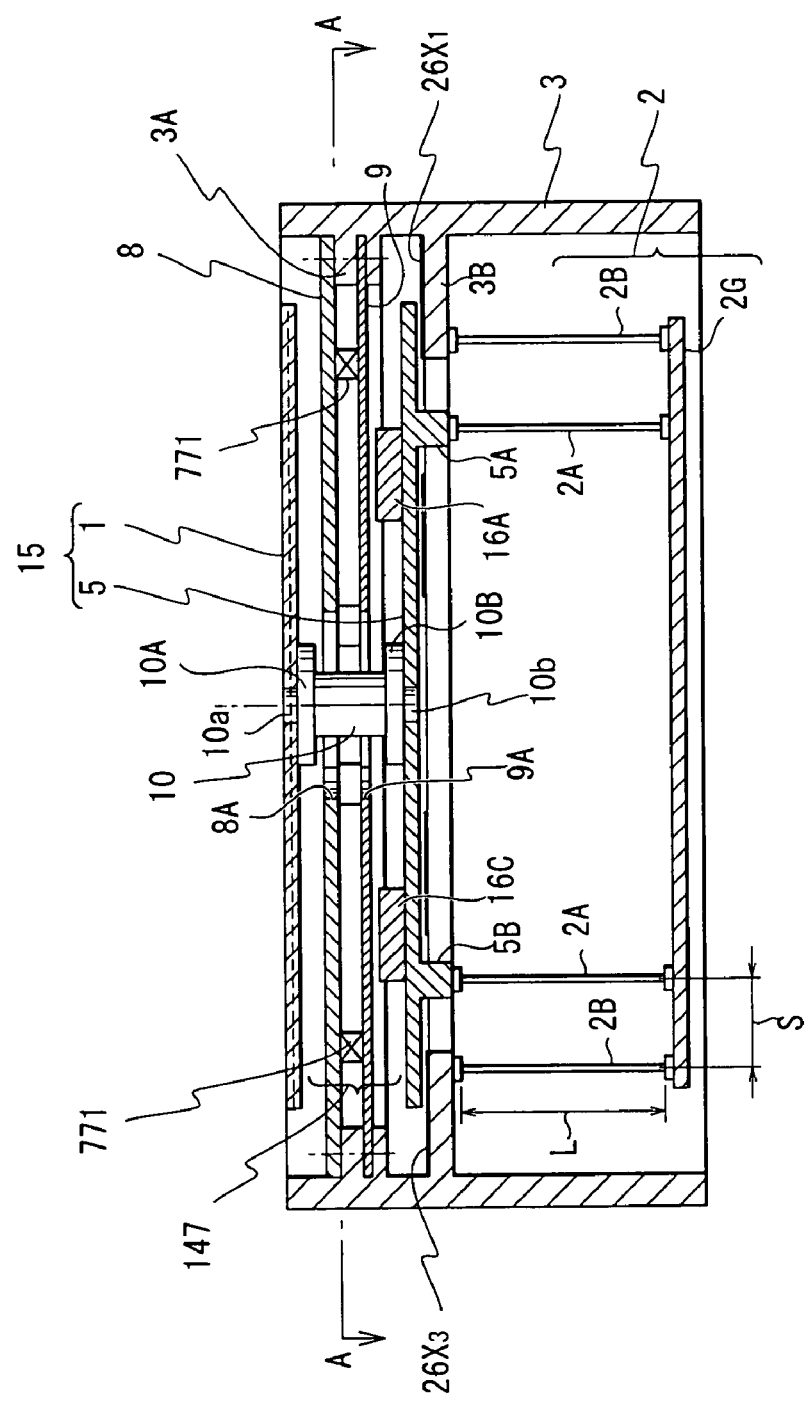
FIG. 71 is a longitudinal cross section showing a sixteenth embodiment of the present invention.

Further, a total of eight driven magnets 6A–6D, 16A–16D are formed with the electromagnets which can be energized form outside and is individually provided by corresponding to the coil sides 771a–771h of the cross-shape driving coil 771 (see FIG. 71–FIG. 72).

The fixing plate 8 is provided to the auxiliary table 5 on the movable table 1 side as shown in FIG. 71 and held by the case main body 3. The stator part as the main part of the electromagnetic driving means 147 is formed with the cross-shape driving coil 771 and the fixing plate 8.

When the cross-shape driving coil 771 is set in action, it generates the electromagnetic driving force between with each of the driven magnets 6A–6D, 16A–16D for repulsively driving each of the driven magnets 6A–6D, 16A–16D towards the direction orthogonal to each of the coil sides 771a–771h. In this case, the center axis of each of the driven magnets 6A–6D, 16A–16D in the moving direction is set to be orthogonal to the X axis or Y axis.

Further, when moving the movable table unit 15 in the direction which does not cross with each of the coil sides 771a–771h (in the slantwise direction with respect to each of the coil sides 771a–771h), the movable table unit 15 is moved by the resultant force of the electromagnetic driving forces for at least two or more of the driven magnets 6A to 6D disposed in the different areas along the X axis and Y axis as will be described later.

As for each of the four driven magnets 6A–6D, 16A–16D constituting a part of the electromagnetic driving means 147 according to the embodiment, as shown in FIG. 72, used are the electromagnets with the quadrangular magnetic pole end surface (the surface opposing the each of the coil sides 771a–771h). They are respectively provided and fixed on the X-Y plane assumed on the top face of the auxiliary table 5 at the positions on the each of the coil sides 771a–771h at the equal distance from the center.

In the embodiment, for example, when a prescribed operating current is flown to a part or the entire part of the eight driven magnets 6A–6D, 16A–16D for setting each of the driven magnets 6A–6D, 16A–16D in operation, each of the cross-shape driving coil 771 is set in action to start the energization subsequently or simultaneously according to a prescribed control mode which will be described later. Then, the current flown into the cross-shape driving coil 771 and the magnitudes of the magnetic force of each driven magnets 6A to 6D, 16A–16D are adjusted by the energization control. Thereby, the movable table unit 15 is transported in a prescribed direction.

In this case, the action of the electromagnetic driving means 147 (energization drive for the cross-shape driving coil 771 and each of the four driven magnets 6A–6D, 16A–16D) in terms of the moving direction and transportation driving force for the movable table unit 15 will be described in detail in FIG. 74 to FIG. 76.

Further, in the sixteenth embodiment, the energizing direction of the eight driven magnets 6A–6D, 16A–16D made of the electromagnets is variably controlled as in the case of the first embodiment. Thus, the energizing direction and the magnitude of the flown current of the cross-shape driving coil 771 (in each of the coil sides 771a–771h part) are set and controlled by the operation control system 207 by corresponding to the transporting direction of the movable table unit 15 according to the contents of each control mode.

Thereby, the electromagnetic force (reaction force) is to be outputted to the driven magnets 6A–6D, 16A–16D for pressing them in a prescribed direction (in the directions respectively orthogonal to the coil sides 771a–771h) according to Fleming's left-hand rule.

Further, by selecting and combining the directions of the electromagnetic forces generated in the eight driven magnets 6A–6D, 16A–16D beforehand, it is possible to set the resultant force of the electromagnetic forces generated in each of the driven magnets 6A–6D, 16A–16D to be in the transporting direction (including rotation) of the movable table unit 15. Thereby, the moving force can be supplied to the movable table unit 15 to be moved in the arbitrary direction on the X-Y plane.

A series of energizing control methods for the eight driven magnets 6A–6D, 16A–16D will be described in detail in the description of a program storage 22 (FIG. 74–FIG. 76) which will be described later.

On the outer side and inner side of the coil part of cross-shape driving coil 771 on the same plane, a magnetic material such as ferrite may be filled at least up to the same height as the height (height on the fixing plate 8 plane) of the cross-shape driving coil 771 and within a range covering the operation range of the driven magnets 6A–6D, 16A–16D.

[About Operation Control System 207]

Next, the operation control system 207 of the sixteenth embodiment will be described in detail.

Figure 73:
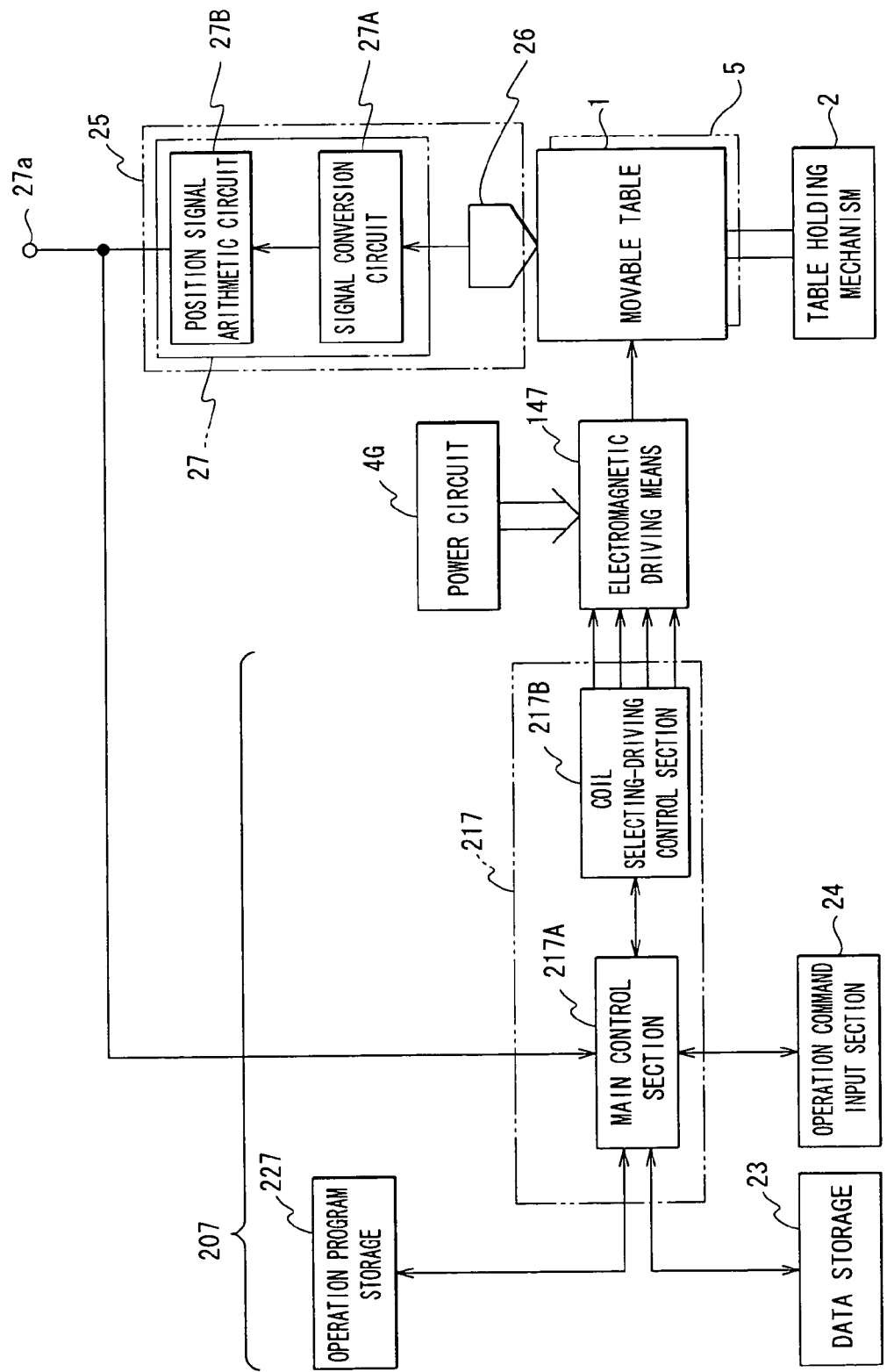
FIG. 73 is a block diagram showing the entire apparatus including the operation system according to the embodiment disclosed in FIG. 71.

In the sixteenth embodiment, provided along with the electromagnetic driving means 147 is an operation control system 207 which restricts the moving action of the movable table unit 15 by individually energize-controlling each of the cross-shape driving coil 771 and each of the eight driven magnets 6A–6D, 16A–16D (see FIG. 73).

The operation control system 207 comprises: an energizing direction setting function for setting and maintaining the energizing direction of the cross-shape driving coil 771 in a prescribed direction (in one direction or other direction); a driving coil energizing control function for variably setting the magnitude of the current flown into the cross-shape driving coil 771; a magnetic pole individual setting function for individually setting and maintaining the north pole or south pole of each of the eight driven magnets 6A–6D, 16A–16D, which operates according to the energizing direction of the cross-shape driving coil 771; a magnetic force magnitude setting function for individually and variably setting (it is possible to set by changing the flown current) the magnitude of the magnetic force of each of the driven magnets 6A–6D, 16A–16D according to a command from outside; and a table action control function for adjusting the transporting direction and transporting force for the movable table unit 15 by appropriately adjusting the output of the various functions.

For carrying out the various functions described above, as shown in FIG. 73, the operation control system 207 comprises: a table driving control means 217 which individually drives the cross-shape driving coil 771 and each of the driven magnets 6A–6D, 16A–16D of the electromagnetic driving means 147 according to a prescribed energizing control mode for controlling the movement of the movable table unit 15 in a prescribed direction; a program storage 227 being provided along with the table driving control means 217, to which a plurality of control programs for a plurality of control modes (ten energizing control modes K1–K10 in the embodiment) in which the moving direction, moving amount and the like of the movable table 1 are specified are provided; and a data storage 23 to which prescribed data and the like are stored to be used at the time of executing each control program.

Further, in the table driving control means 217, provided is an operation command input section 24 for giving a command of a prescribed control operation to the cross-shape driving coil 771 and each of the eight driven magnets 6A–6D, 16A–16D. Moreover, the positional information of the movable table 1 during the shift and after the shift is detected by the positional information detecting means 25 and arithmetic-processed to be transmitted to the table driving control means 217.

The various control functions of the operation control system 207 are comprehensively contained in a plurality of the energizing control modes K1–K10 in the program storage 227. They are selected according to a selection command inputted through the operation input section 24 by an operator. Through one of the selected control modes K1–K10, the various control functions are started and carried out.

This will be described in detail.

The table driving control means 217 according to the embodiment comprises: a main control section 217A which operates according to the command from the operation command input section 24 and has a function of selecting a prescribed control mode from the program storage 227 and of energize-controlling a prescribed direct current including zero to the cross-shape driving coil 771 and each of the eight driven magnets 6A–6D, 16A–16D; and a coil selecting-driving control section 217B which has a function of drive-controlling the cross-shape driving coil 771 and each of the eight driven magnets 6A–6D, 16A–16D simultaneously or individually according to the prescribed control mode (one of K1–K10) selected and set by the main control section 217A.

Moreover, the main control section 217A also has a function of calculating the position of the movable table 1 according to the input information from the positional information detecting means 25 for detecting the table position, or carrying out other various arithmetic operations. Numeral reference 4G is a power circuit for energizing a prescribed current to the cross-shape driving coil 771 and the each of the four driven magnets 6A–6D, 16A–16D of the electromagnetic driving means 147.

[About Program Storage 227]

The table driving control means 217 is configured to individually drive-control the cross-shape driving coil 771 and each of the eight driven magnets 6A–6D, 16A–16D of the electromagnet driving means 147 with a prescribed relation therebetween according to a prescribed energization control program (a program for carrying out the prescribed energization control mode) which is stored beforehand in the program storage 227.

Specifically, in the embodiment, stored in the program storage 227 are: a plurality of magnet driving control programs for individually specifying the energizing directions of each of the eight driven magnets (electromagnets) 6A–6D, 16A–16D and for specifying the north pole or the south pole of the magnetic pole, while variably setting the magnitude of the flown current including the non-energization; and a driving coil control program, which functions correspondingly when the energizing direction of each of the eight driven magnets 6A–6D, 16A–16D are specified and the north pole or south pole (or stopping energization) is specified, for variably setting the energizing direction and the magnitude of the flown current for the cross-shape driving coil 771. At the same time, the operation timing of each control program is arranged in a group of ten energizing control modes K1–K10 and stored (see FIG. 74–FIG. 76).

Now, the group of ten energizing control modes K1–K10 will be described by referring to FIG. 73 to FIG. 75.

Figure 74:
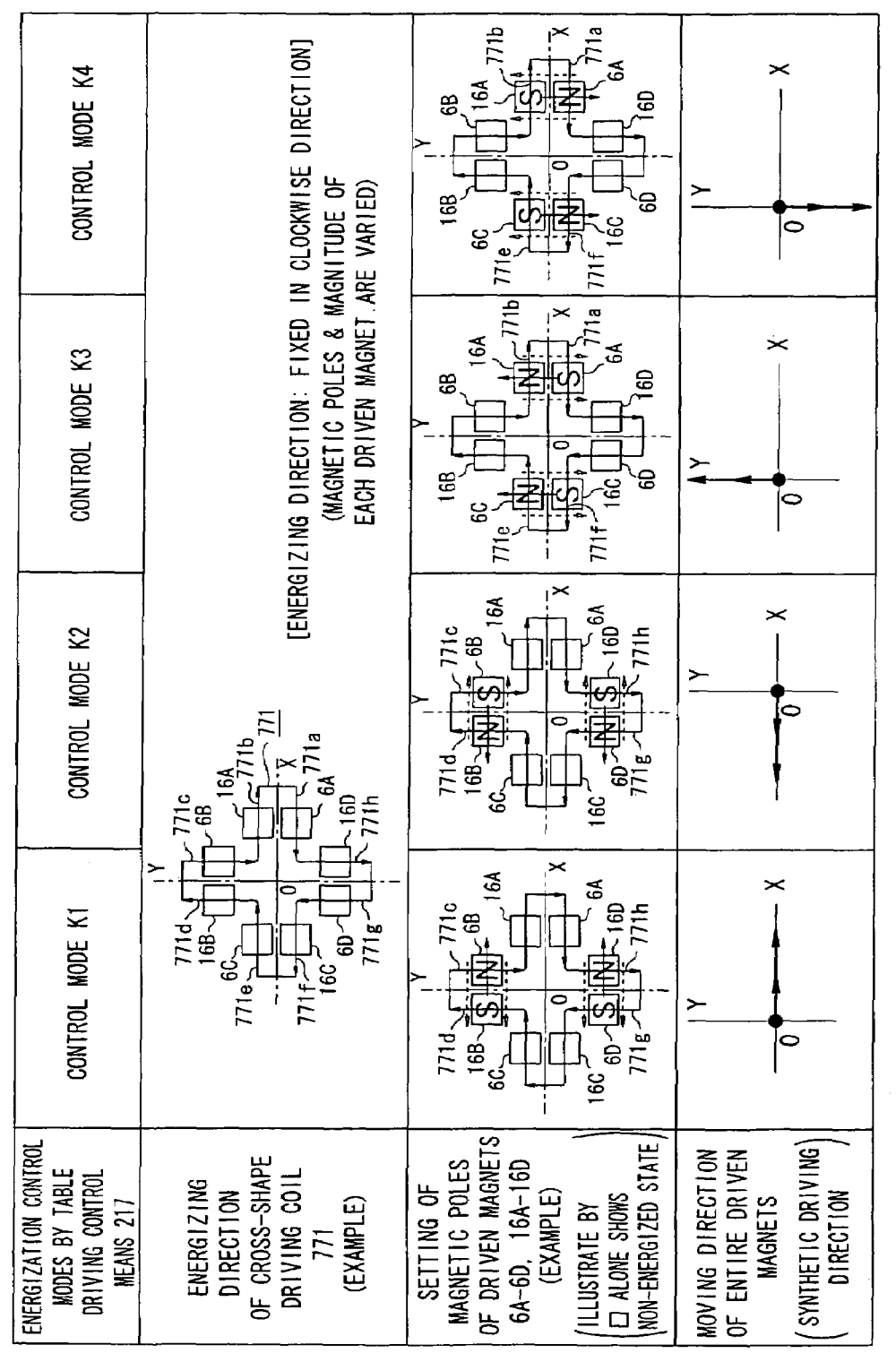

FIG. 74 shows examples (in diagram) of each of the energizing control modes K1–K4 in the case where the movable table unit 15 is moved in the positive or negative direction of the X axis or the positive or negative direction of the Y axis, respectively.

In FIG. 74, in each of the energizing control modes K1–K4 of the embodiment, the energizing direction of the direct current for the cross-shape driving coil 771 is fixed in the clockwise direction (right turn). Also, as for the energizing direction of each of the eight driven magnets (electromagnets), the north pole or the south pole of each magnetic pole is individually and variably controlled according to the control mode.

(Control Mode K1)

The control mode K1 is an example of the energizing control mode for transporting the movable table 1 in the positive direction of the X axis (see FIG. 74).

In the control mode K1 according to the sixteenth embodiment, the driven magnets 6B, 16B and 6D, 16D corresponding to each of the coil sides 771c, 771d, 771g, 771h positioned along the Y axis are energized, while the driven magnets 6A, 16A and 6C, 16C corresponding to each of the coil sides 771a, 771b, 771e, 771f positioned along the X axis are controlled to stop energization.

Further, as for the driven magnets 6B, 6D disposed along the Y axis, the end face parts facing each of the coil sides 771c, 771d are fixed to be the north pole, south pole, respectively. Further, as for other driven magnets 6D, 16D, the end face parts facing the coil sides 771g, 771h are fixed to be the south pole, north pole, respectively.

Therefore, in each of the coil sides 771c, 771d, 771g, 771h of the cross-shape driving coil 771, a prescribed electromagnetic driving force is generated in the direction indicated by dotted-line arrows. At the same time, by the reaction force (generated since the cross-shape driving coil 771 fixed), the driven magnets 6B, 16B, 6D, 16D are repulsively driven in the direction indicated by solid-line arrows (in the right direction in the figure). Thereby, the movable table unit 15 is transported in the positive direction on the X axis being balanced between with the electromagnetic driving forces generated in the four driven magnets 6B, 16B, 6D, 16D.

(Control Mode K2)

The control mode K2 is an example of the energizing control mode for transporting the movable table 1 in the negative direction of the X axis (see FIG. 74).

The control mode K2 differs from the control mode K1 in respect that the setting of the magnetic poles of the drive magnets 6B, 16B, 6D, 16D positioned in the direction along the Y axis is reversed with respect to the case of the control mode K1. In other respects, it is the same as that of the control mode K1.

Therefore, in each of the coil sides 771c, 771d, 771g, 771h of the cross-shape driving coil 771, the electromagnetic driving force (dotted-line arrow) is generated in the directions opposite to the case of the control mode K1 by the same principle. By the reaction force, each of the driven magnets 6B, 16B and 6D, 16D is repulsively driven in the direction indicated by solid-line arrows (in the left direction in the figure). Thereby, the movable table unit 15 is transported in the negative direction on the X axis.

(Control Mode K3)

The control mode K3 is an example of the energizing control mode for transporting the movable table 1 in the positive direction of the Y axis (see FIG. 74).

In the control mode K3, the driven magnets 6A, 16A, 6C, 16C facing each of the coil sides 771a, 771b, 771e, 771f positioned in the direction along the X axis are energized, while the driven magnets 6B, 16B and 6D, 16D facing each of the coil sides 771c, 771d, 771g, 771h positioned in the direction along the Y axis are controlled to stop energization.

Further, as for the driven magnets 6A, 16A disposed along the X axis, the end face parts facing each of the coil sides 771a, 771b are fixed to be the south pole, north pole, respectively. Further, as for the driven magnets 6C, 16C, the end face parts facing the coil sides 771e, 771f are fixed to be the north pole, south pole, respectively.

Therefore, in each of the coil sides 771a, 771b, 771e, 771f of the cross-shape driving coil 771, a prescribed electromagnetic driving force is generated in the direction indicated by dotted-line arrows. At the same time, by the reaction force (generated since the cross-shape driving coil 771 fixed), the driven magnets 6A, 16A, 6C, 16C are repulsively driven in the direction indicated by solid-line arrows (in the upward direction in the figure). Thereby, the movable table unit 15 is transported in the positive direction on the Y axis being balanced between with the electromagnetic driving forces generated in the four driven magnets 6A, 16A, 6C, 16C.

(Control Mode K4)

The control mode K4 is an example of the energizing control mode for transporting the movable table 1 in the negative direction of the Y axis (see FIG. 74).

The control mode K4 differs from the control mode K3 in respect that the setting of the magnetic poles of the drive magnets 6A, 16A, 6C, 16C positioned in the direction along the X axis is reversed with respect to the case of the control mode K3. In other respects, it is the same as that of the control mode K3.

Therefore, in each of the coil sides 771a, 771b, 771e, 771f of the cross-shape driving coil 771, the electromagnetic driving force (dotted-line arrow) is generated in the reversed direction with respect to the control mode K3 by the same principle. By the reaction force, the driven magnets 6A, 16A, 6C, 16C are repulsively driven in the direction indicated by solid-line arrows (in the downward direction in the figure). Thereby, the movable table unit 15 is transported in the negative direction on the Y axis.

(Control Mode K5)

Figure 75:
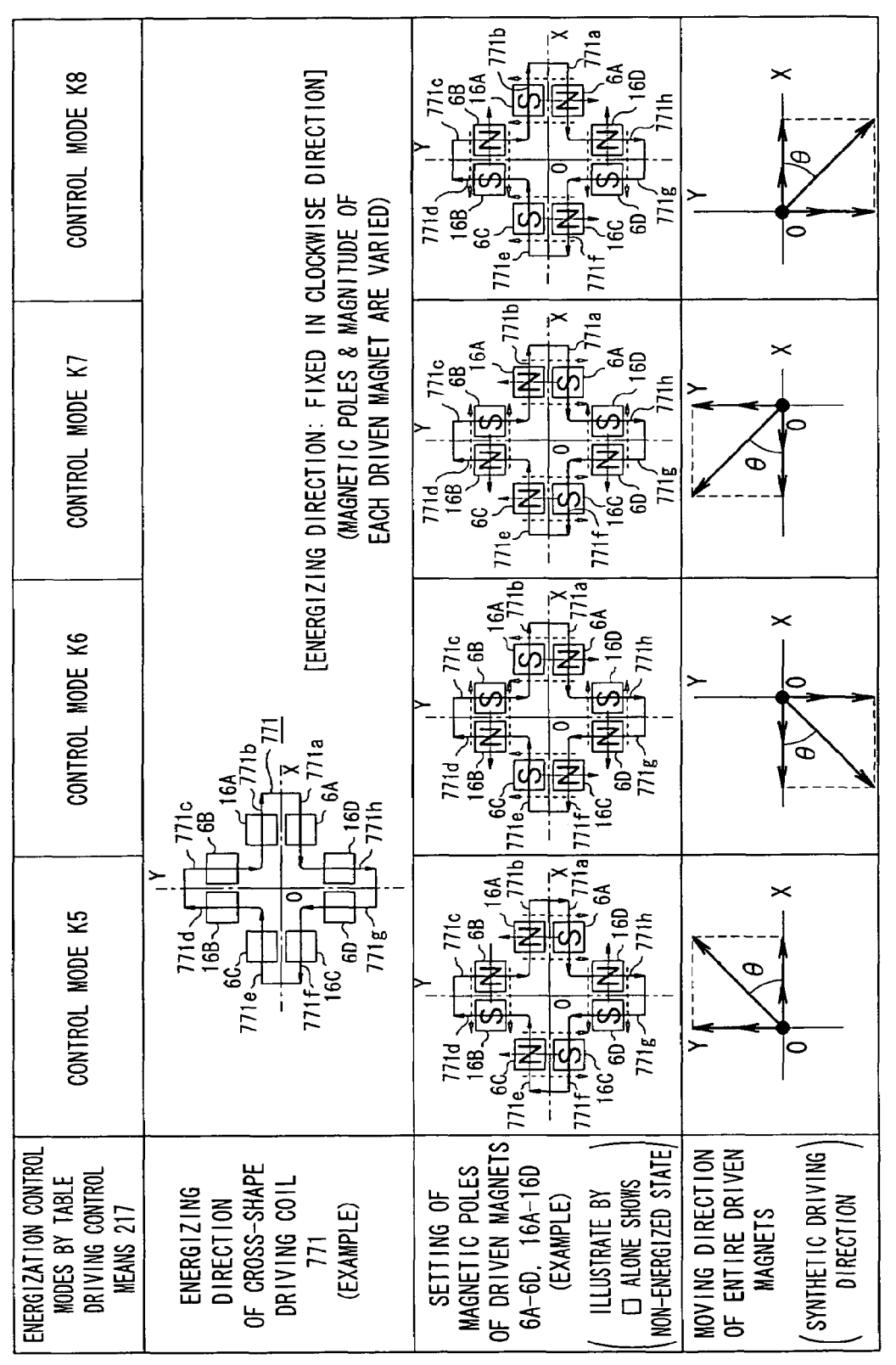

The control mode K5 according to the sixteenth embodiment is an example of the energizing control mode for transporting the movable table unit 15 in the first quadrant direction of the X-Y plane coordinates (see FIG. 75).

In the control mode K5, each of the eight driven magnets 6A–6D, 16A–16D is set in the state to be simultaneously energize-controlled, and the energizing directions (setting of the north pole, south pole) for all of the driven magnets 6A–6D, 16A–16D are individually set beforehand.

That is, as for each of the driven magnets 6A, 16A, 6B, 16B, 6C, 16C, 6D, 16D being disposed by corresponding to each of the coil sides 771A–771h of the cross-shape driving coil 771, the end face parts facing each of the coil sides corresponding to the each of the driven magnets 6A–6D are set to be the south pole, north pole, south pole and north pole in this order, respectively. Further, the end face parts facing each of the driven magnets 16A–16D are set to be the north pole, south pole, north pole and south pole in this order, respectively.

Thus, each of the coil sides 771a–771h of the cross-shape driving coil 771 is energized to be in the similar state where the control modes K1 and K3 operate simultaneously. Thus, the electromagnetic driving forces in the same directions (in the positive direction of X axis and positive direction of Y axis) as the case of the control modes K1, K3 are generated simultaneously, and the resultant force is directed in the first quadrant direction as shown in the section of the control mode K5 in FIG. 75. Thereby, the movable table unit 15 is transported towards the first quadrant direction on the X-Y plane coordinates.

The transporting angle θ (angle θ with respect to the X axis) towards the first quadrant with respect to the X axis can be variably set at will in arbitrary direction by changing the electromagnetic driving force working on each of the driven magnets 6A–6D, 16A–16D through variably controlling the magnitude of the current flown into each of the cross-shape driving coil 771 and each of the driven magnets 6A–6D, 16A–16D.

(Control Mode K6)

The control mode K6 is an example of the energizing control mode for transporting the movable table 1 in the third quadrant direction (the direction opposite to the first quadrant direction) of the X-Y plane coordinates (see FIG. 75).

In the control mode K6, each of the eight driven magnets 6A–6D, 16A–16D is set in the state to be simultaneously energize-controlled. The north pole and south pole are set in the reversed manner as the case of the control mode K5.

Thus, each of the coil sides 771a–771h of the cross-shape driving coil 771 is energized to be in the state similar to the case where the control modes K2 and K4 operate simultaneously. Thus, the electromagnetic driving forces in the same directions (in the left direction and downward direction in FIG. 75) as the case of the control modes K2, K4 are generated simultaneously, and the resultant force is directed in the third quadrant direction as shown in the section of the control mode K6 in FIG. 75. Thereby, the movable table unit 15 is transported towards the third quadrant direction on the X-Y plane coordinates.

The transporting angle θ towards the third quadrant with respect to the X axis can be variably set at will in arbitrary direction by changing the electromagnetic driving force working on each of the driven magnets 6A–6D, 16A–16d through variably controlling the magnitude of the current flown into each of the cross-shape driving coil 771 and each of the driven magnets 6A–6D, 16A–16D.

(Control Mode K7)

The control mode K7 according to the sixteenth embodiment is an example of the energizing control mode for transporting the movable table 1 in the second quadrant direction of the X-Y plane coordinates (see FIG. 75).

In the control mode K7, each of the eight driven magnets 6A–6D, 16A–16D is set in the state to be simultaneously energize-controlled, and the energizing directions (setting of the north pole, south pole) for all of the driven magnets 6A–6D, 16A–16D are individually set beforehand.

That is, as shown in FIG. 75, as for each of the driven magnets 6A, 16A, 6B, 16B, 6C, 16C, 6D, 16D being disposed by corresponding to each of the coil sides 771A–771h positioned in the positive direction along the X axis, the end face parts facing each of the coil sides corresponding to the each of the driven magnets 6A–6D are set to be the south pole, south pole, north pole and north pole in this order, respectively. Further, the end face parts facing each of the driven magnets 16A–16D are set to be the north pole, north pole, south pole and south pole in this order, respectively.

Thus, each of the coil sides 771a–771h of the cross-shape driving coil 771 is energized to be in the state similar to the case where the control modes K2 and K3 operate simultaneously. Thus, the electromagnetic driving forces in the same directions (in the negative direction of X axis and positive direction of Y axis) as the case of the control modes K2, K3 are generated simultaneously, and the resultant force is directed in the second quadrant direction as shown in the section of the control mode K7 in FIG. 75. Thereby, the movable table unit 15 is transported towards the second quadrant direction on the X-Y plane coordinates.

The transporting angle θ towards the second quadrant with respect to the X axis can be variably set at will in arbitrary direction by changing the electromagnetic driving force working on each of the driven magnets 6A–6D, 16A–16D through variably controlling the magnitude of the current flown into each of the cross-shape driving coil 771 and each of the driven magnets 6A–6D, 16A–16D.

(Control Mode K8)

The control mode K8 is an example of the energizing control mode for transporting the movable table 1 in the fourth quadrant direction (the direction opposite to the second quadrant direction) of the X-Y plane coordinates (see FIG. 75).

In the control mode K8, each of the eight driven magnets 6A–6D, 16A–16D is set in the state to be simultaneously energize-controlled. The north pole and south pole are set in the reversed manner from the case of the control mode K7.

Thus, each of the coil sides 771a–771h of the cross-shape driving coil 771 is energized to be in the state similar to the case where the control modes K1 and K4 operate simultaneously. Thus, the electromagnetic driving forces in the same directions (in the right direction and downward direction in FIG. 75) as the case of the control modes K1, K4 are generated simultaneously, and the resultant force is directed in the fourth quadrant direction as shown in the section of the control mode K8 in FIG. 75. Thereby, the movable table unit 15 is transported towards the fourth quadrant direction on the X-Y plane coordinates.

The transporting angle θ towards the fourth quadrant with respect to the X axis can be variably set at will in arbitrary direction by changing the electromagnetic driving force working on each of the driven magnets 6A–6D, 16A–16d through variably controlling the magnitude of the current flown into each of the cross-shape driving coil 771 and each of the driven magnets 6A–6D, 16A–16D.

(Control Mode K9)

The control mode F9 according to the sixteenth embodiment enables the rotation-drive of the movable table unit 15 on the X-Y plane at a prescribed angle in the counterclockwise direction. Shown is an example of the energization control mode used therein (see FIG. 76).

In the control mode F9, the cross-shape driving coil 771 and each of the eight driven magnets 6A–6D, 16A–16D are simultaneously energized.

In this case, as shown in FIG. 76, the energizing direction of the cross-shape driving coil 771 is set to be fixed in the clockwise direction as the case of the control modes K1–K8. Further, as for the north pole and south pole of the driven magnets 6A–6D, 16A–16D, the parts in the driven magnets 6A–6D facing each of the coil sides of the cross-shape driving coil 771 are set to be the south pole, respectively, and those of the driven magnets 16A–16D are set to be the north pole, respectively.

Thereby, the cross-shape driving coil 771 and each of the driven magnets 6A–6D, 16A–16D are energized to be in the above-described state, and a same-level prescribed moment (prescribed electromagnetic driving force) is generated to each of the driven magnets 6A–6D, 16A–16D in the counterclockwise direction with the origin (zero-point) on the X-Y plane being the center.

In FIG. 76, the same-level prescribed rotation moments are indicated by solid lines. Accordingly, the movable table unit 15 holding the driven magnets 6A–6D, 16A–16D is to be rotationally driven in the counterclockwise direction within a prescribed range through the driven magnets 6A–6D, 16A–16D.

That is, in each of the coil sides 771a-771h of the cross-shape driving coil 771, a prescribed electromagnetic driving force is generated in the directions indicated by a dotted-line arrow. At the same time, by the reaction force (generated since the cross-shape driving coil 771 is fixed to the fixing plate 8), each of the driven magnets 6A–6D, 16A–16D is repulsively driven in the direction indicated by solid-line arrows (in the counterclockwise direction in the figure). The movable table unit 15 is rotationally driven in the counterclockwise direction (within a prescribed range) on the X-Y plane being balanced between with each electromagnetic driving force (same-level prescribed rotation moment) generated in each of the eight driven magnets 6A–6D, 16A–16D.

(Control Mode K10)

The control mode K10 according to the sixteenth embodiment enables the rotation-drive of the movable table unit 15 on the X-Y plane at a prescribed angle in the clockwise direction. Shown is an example of the energization control mode used therein (see FIG. 76).

In the control mode K10, the cross-shape driving coil 771 and each of the eight driven magnets 6A–6D, 16A–16D are simultaneously energized. In this case, in the cross-shape driving coil 771, the control current is energized in the same direction (right turn) as the case of the control mode K9 (see the section of the control mode K10 in FIG. 76). Further, the north pole and south pole of the driving magnets 6A–6D, 16A–16D are set in the reversed manner from the case of K9.

Thereby, the cross-shape driving coil 771 and each of the driven magnets 6A–6D, 16A–16D are energized to be in the above-described state, and a same-level prescribed moment (prescribed electromagnetic driving force) is generated to each of the driven magnets 6A–6D, 16A–16D in the clockwise direction (right turn) with the origin (zero-point) on the X-Y plane being the center.

In FIG. 76, the same-level prescribed rotation moments are illustrated by solid lines. Accordingly, the movable table unit 15 holding the driven magnets 6A–6D, 16A–16D is to be rotationally driven in the clockwise direction (right turn) within a prescribed range through the driven magnets 6A–6D, 16A–16D.

Other configurations, the operations, functions and the like are substantially the same as the case of the fifteenth embodiment.

With this, the same effect as the case of the fifteenth embodiment can be achieved. Moreover, since the driving coil is formed with a single cross-shape driving coil 771, it takes less time for assembling and generation of a breakdown or the like can be reduced. Therefore, it is advantageous in this respect that the manufacturing process can be simplified and the maintenance characteristic can be improved.

Further, in the sixteenth embodiment, it has been described by referring to the case where the electromagnetic driving means 147 is drive-controlled by the separate control modes K1–K10 for setting the transporting direction of the movable table unit 15. However, for example, in the control mode K2, K10, it may be configured in such a manner that, as long as it functions similarly, the electromagnetic driving means 147 is drive-controlled by other controlling methods, e.g. the energizing direction of the cross-shape driving coil 771 is set in the reversed manner from the case of the control mode K1, K9 and each energizing direction of the driven magnets 6A–6D, 16A–16D is set to be the same as the case of the control mode K1, K9.

Moreover, in the sixteenth embodiment, the mounting area of the driven magnets 6A–6D, 16A–16D and that of the cross-shape driving coil 771 may be switched. In this case, the driven magnets 6A–6D, 16A–16D are mounted on the stator side and the cross-shape driving coil 771 and the braking plate 9 are mounted on the needle side.

In each of the above-described embodiments, although the movable table 1 has been described by referring to the one in circular shape, it may be in quadrangular shape or other shapes. The auxiliary table 5 has been described by referring to the one in quadrangular shape, however, it may be in circular shape or other shapes as long as it enables to achieve the various functions described above. Further, as for the driven magnets 6A–6D, the pole faces may not be in the quadrangular shape but may be, for example, in circular shape as long as they are in the same shape.

Further, each of the above-described embodiments has been described by referring to the case where the braking plate 9 is mounted. However, the braking plate 9 may not be mounted when there is no specific swiftness required for transporting.

Furthermore, the table holding mechanism 2 has been described by referring to the one comprising the original position returning function for the movable table unit 15. However, the table holding mechanism 2 may be configured without the original position returning function by separately providing the original position returning means for the movable table unit 15.

As for the braking plate 9 mounted in each of the above-described embodiments, it may be mounted corresponding to every driven magnets 6A–6D, 16A–16D, or a single braking plate 9 may be mounted commonly to each of a plurality of the driven magnets.

In this case, the fixing plate 8 may be omitted by holding the periphery of the braking plate 9 by the case main body 3 and mounting the driving coil according to each embodiment to the braking plate 9. For mounting the driving coil to the braking plate 9, it is preferable to form the braking plate 9 by a conductive and nonmagnetic material, since it can effectively maintain the driving coil while maintaining the original functions of the braking plate 9.

With this, the configuration is further simplified so that the size and weight of the entire apparatus can be further reduced.

Further, each of the above-described embodiments has been described by referring to the case where four driven magnets are mounted on the orthogonal coordinates (X-Y coordinates) at an equal distance from the origin. However, the present invention is not necessarily limited to this. They may not be mounted at the equal distance from the origin, but may be disposed on the positions out of the coordinate axes, or the number of the driven magnets mounted may not be four.

In this case, in each of the above-described embodiments, it may be so configured that a plurality of the driven magnets that are convenient for moving in the directions indicated from outside are selected and energized by the operation control systems 2, 202, 203, 204 - - - , and by the resultant force, the movable table unit 15 may be transported towards the moving direction indicated from outside.

Further, each of the above-described embodiments has been described by referring to the case where the movable table unit 15 is formed with the movable table 1 and the auxiliary table 5. However, the movable table unit 15 may be formed with the movable table 1 alone.

In this case, each of the driven magnets 6A–6D (or 6A–6D, 16A–16D) may be mounted on the movable table 1 side and the driving coils 7, 721, 731 - - - and the braking plate 9 may be mounted to the opposing face of the fixing plate so as to face the driven magnets. The table holding mechanism 2 is in a configuration so as to hold the movable table 1 directly without having the auxiliary table 5 therebetween.

With this, the size and weight of the entire apparatus can be further reduced. Thus, it is convenient that the portability and the applicability can be improved.

Moreover, each of the above-described embodiments has been described by referring to the case where the one comprising the original position returning function for the movable table is mounted as the table holding mechanism. However, the original position returning function for the movable table may be isolated from the table holding mechanism (as a means comprising the original position returning function) to be separately mounted. In this case, as long as the means comprising the original position returning function operates simultaneously with the table holding mechanism, it is technically the same as the table holding mechanism of each embodiment described above.

Further, each of the above-described embodiments has been described by referring to the case where each driving coil is mounted on the fixing coil 8. However, each driving coil may be respectively mounted to be buried in the fixing coil 8, with each of the coil sides corresponding to the driven magnets 6A–6D, 16A–16D being exposed on the driven magnets 6A–6D, 16A–16D side.

With this, the spatial region of the electromagnetic driving means part can be more decreased. Thus, it is convenient that the size and weight of the entire apparatus can be more reduced.

As described above, in the embodiments, when the electromagnetic driving means is operated for energizing the ring-shape driving coil and selecting and energizing one, two or more of the driven magnets corresponding to the moving direction among each of the driven magnets in accordance with a command from outside, by the resultant force of the electromagnetic driving force (reaction force) working on each of the driven magnet, the movable table can be transported two-dimensionally in an arbitrary direction (in the outward direction from the center of the ring-shape driving coil) within a prescribed limited range held by the table holding mechanism.

In this case, the magnitude of the electromagnetic force can be set through variably controlling the energizing directions of both the ring-shape driving coil and the driven magnets. Thus, the speed of transporting the movable table can be set at will and, in this respect, the applicability can be further improved.

Further, as for the transportation of the movable table unit, the magnitude of the current flown into the ring-shape driving coil of the electromagnetic driving means and a prescribed driven magnet can be continuously changed analogically or can be set to the prescribed magnitude. Thus, by balancing it with the original position returning force of the table holding mechanism, it is possible to set the transporting distance by micron unit. Therefore, the precise processing movable table can be precisely and smoothly transported in a prescribed direction within the same plane.

Furthermore, with the configuration in which the electromagnetic driving means is held by utilizing the space between the movable table unit and the fixing plate, the entire electromagnetic driving means can be disposed within a thin-plate space. Also, the double structure in which the X-axis direction and Y-axis direction do not cross each other is not employed as the driving mechanism. Thus, it enables to reduce the size and weight of the electromagnetic driving means, which leads to reduction of the size and weight of the entire apparatus.

Moreover, the driving coils formed in a single shape are used as the driving coils so that the composing and mounting work at the time of production become easy and the productivity can be improved. Thus, the complicated energize-control becomes unnecessary at the time of operation as well. Therefore, it is possible to provide an excellent precise processing stage apparatus capable of achieving quick start-up when starting the entire apparatus, which has not been achieved conventionally.

Further, as described above, by disposing the coils sides of at least a group of four driving coils individually on the X axis and Y axis and disposing each of the driven magnets correspondingly, for example, for the movement in the direction along the X axis, it is possible to stop the energizing operation to the driving coils on the Y axis and each of the corresponding driven magnets. In this respect, consumption of the electric power and the temperature increase can be effectively suppressed.

Further, it becomes possible to form the driving coil by adjoining the two small angular coils and to individually dispose the driving coil on the X axis and Y axis in such a manner that the coil sides of the driving coils become orthogonal to each axis on the X-Y plane assumed with the origin being the center on the fixing plate. Thereby, it is possible to individually and effectively output the electromagnetic force to each of the corresponding driven magnets, respectively, and it enables to generate the different magnitude of the electromagnetic driving force separately to each driven magnet. Moreover, by simultaneously actuating the energizing current to both the driving coils and the corresponding driven magnets, the transportation speed in a prescribed direction can be set fast. Also, for example, it enables to correspond to the shift in the moving direction more promptly.

Further, it becomes possible to mount the two large and small ring-shape driving coils coaxially on the same plane as the driving coil and to mount each of the four driven magnets by corresponding to each rings-shape driving coil. Thus, for controlling the transportation of the movable table, it is possible to execute the moving action of the movable table unit more promptly and precisely.

Further, in the precise processing stage apparatus, it is possible to employ a configuration in which the driven magnets are individually disposed in the area of the driving coil where the X axis and Y axis by corresponding to the coil sides of the driving coil.

Since the mounting area of a plurality of the driven magnets is limited to the part of the driving coil, where the X axis and Y axis cross with each other, practically, it becomes easy to specify (calculate) the transporting direction. Thus, overall drive-control of the driven magnets can be simplified. Therefore, it enables to promptly correspond to the change in the transporting direction of the movable table unit and, at the same time, enables to promptly correspond to the transportation control and the like (for example, switching control of the direction or correction when there is a position shift or the like generated) of the movable table unit as well.

Further, by using at least four rectangular driving coils as the driving coils and doubling the number of the driven magnets, the electromagnetic driving force generated between the rectangular driving coils and each driven magnet can be substantially doubled. Thereby, transporting drive of the movable table can be executed more promptly and precisely.

Moreover, it is possible to mount at least a group of four driving coils as the driving coil in such a manner that the coil sides of each driving coil is disposed along the X axis or Y axis and the driven magnets are respectively disposed on the X axis or the Y axis by individually facing the coil sides. Thus, it becomes possible to output each electromagnetic driving force outputted by the electromagnetic driving means in the direction orthogonal to the X axis or Y axis and in the rotating direction. Therefore, it enables to rotationally drive the movable table within a prescribed angle without additionally mounting another rotational driving means, thereby further improving the applicability. As a result, it is possible to provide an excellent precise processing stage apparatus, which has not been achieved conventionally.

It enables to form the driving coil with at least four rectangular driving coils and further to dispose each of the driven magnets individually by respectively corresponding to each coil side of each rectangular driving coil positioned in parallel to the X axis and the Y axis. Thus, the electromagnetic driving force generated between each driving coil and each corresponding driven magnets can be substantially doubled for the entire apparatus. Thereby, the driving control of the movable table can be executed more promptly and precisely.

In the precise processing stage apparatus, by using the permanent magnet for each driven magnets instead of the electromagnets, the energizing control for each driven magnet becomes unnecessary so that it does not require the wiring circuit for each driven magnet. Thus, the configuration of the electromagnetic driving means can be further simplified and the size and weight can be more reduced. Therefore, the control subject can be reduced for drive-controlling the movable table so that the quick-responsiveness of the control operation can be achieved. Moreover, the productivity and the durability of the entire apparatus can be further improved.

Moreover, it enables to form the driving coil by a single cross-shape driving coil formed in a cross-frame shape as a whole and to individually dispose each driven magnet by respectively corresponding to each coil side of the single cross-shape driving coil positioned in parallel to the X axis and Y axis. Thus, it enables to output each electromagnetic driving force outputted by the electromagnetic driving means in the direction orthogonal to the X axis or Y axis and in the rotating direction. Accordingly, it becomes possible to rotationally drive the movable table within a prescribed angle without separately mounting additional rotational driving means. Therefore, it is possible to provide an excellent precise processing stage apparatus with the improved applicability, which has not been achieved conventionally.

It enables to dispose the braking plate made of a conductive material by facing each driven magnet with a small space therebetween and to fix the braking plate to be mounted on the driving coil side.

Therefore, even if the electromagnetic driving means is suddenly driven or the action is suddenly stopped, an appropriate braking force without contact is generated on the movable table side by the eddy current braking which is generated between each driven magnet and the braking plate. Thereby, the movable table unit can be smoothly transported under the stable state without a slight oscillation.

The braking plate may be formed with a single plate member which can commonly correspond to each of the driven magnets.

With this, the number of the components can be reduced, the assembling process of the entire apparatus can be simplified, the maintenance characteristic and the durability of the entire apparatus can be improved.

The mounting areas of the driving coil and each of a plurality of the driven magnets mounted by corresponding thereto may be switched to be mounted as a whole while maintaining the relation of correspondence between each driving coil and the driven magnets.

It may also be configured without the fixing plate through holding the braking plate by the main body and fixing and mounting the driving coil to the braking plate.

Since the fixing plate becomes unnecessary, the size and weight can be more reduced.

An operation control system may be provided along the electromagnetic driving means for individually energize-controlling the driving coil of the electromagnetic driving means and each driven magnet according to a command from outside so as to output a prescribed driving force towards the prescribed moving direction of the movable table unit.

Therefore, one, two or more of the driven magnets which effectively functions is to be selected to be activated towards the moving direction of the movable table, so that the movable table can be surely moved in a prescribed direction.

The operation control system may be in a configuration comprising: an energizing direction setting function for setting and maintaining the energizing direction for the driving coil in one direction or other; a driving coil energizing control function for variably setting the magnitude of the current flown into driving coil; a magnetic pole variable setting function which operates according to the energizing direction of the driving coil for variably setting and maintaining the magnetic poles of the driven magnets; and a table action control function for variably setting the magnitudes of the magnetic force of each of the driven magnets according to a command from outside while adjusting the transporting direction and transporting force for the movable table unit thereby.

Thereby, it enables to provide an excellent precise processing stage apparatus capable of precisely and surely transporting the movable table in an arbitrary direction on the same plane at an arbitrary speed by simply adjusting the current flown into the driving coil, or the current flown into the driving coil and each driven magnet, which has not been achieved conventionally.

Seventeenth Embodiment

Figure 77:
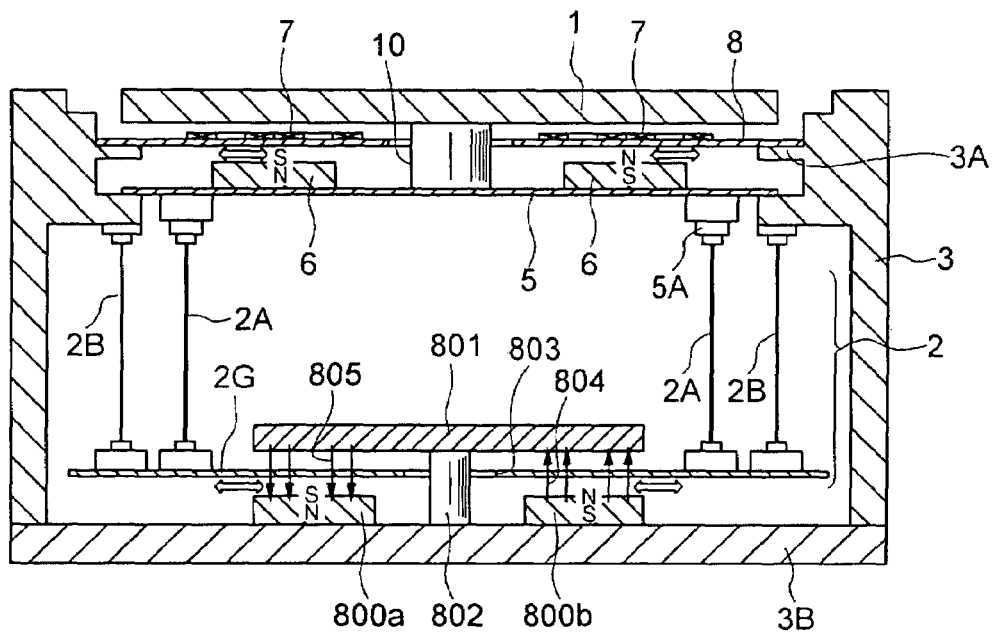
FIG. 77 is an illustration of a seventeenth embodiment of the present invention, which is the case where the electromagnetic braking mechanism is mounted to both the movable table and the table holding mechanism.
Figure 78:
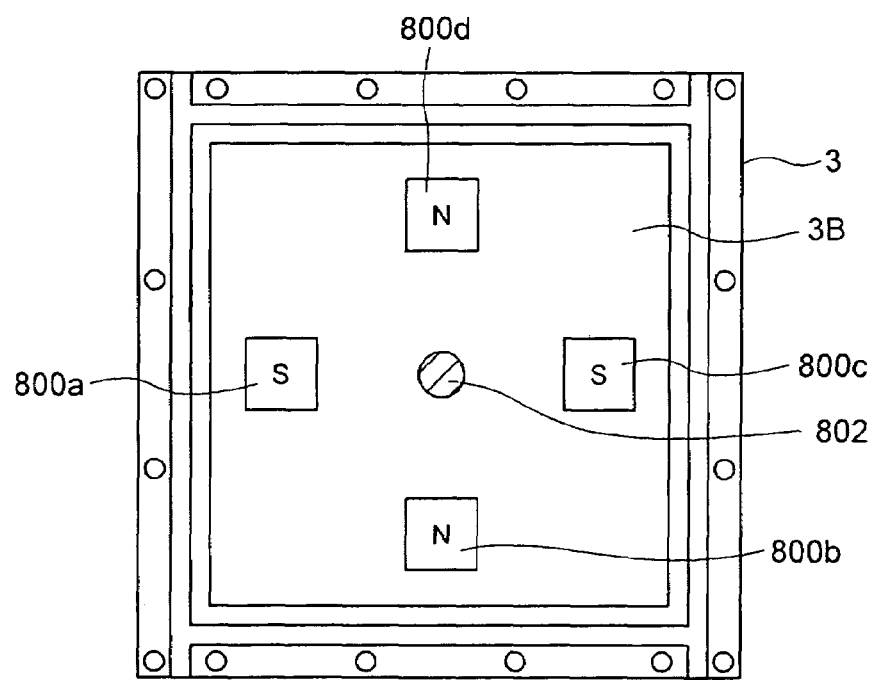
FIG. 78 is an illustration showing a positioning example of the braking magnets in the electromagnetic braking mechanism in the state where the bottom part of the main body is removed from the main body and the braking plate is also removed.

The seventeenth embodiment according to the present invention as shown in FIG. 77 and FIG. 78 relates to improvements in the electromagnetic braking mechanism of the first embodiment shown in FIG. 1. Specifically, the first embodiment shown in FIG. 1 is the case where braking is applied only to the movable table 1 by the electromagnetic braking mechanism (the braking magnet and the braking plate), whereas the seventeenth embodiment shown in FIG. 77 relates to the configuration in which braking is applied to both the movable table 1 and the table holding mechanism 2 by the electromagnetic braking mechanism.

The seventeenth embodiment as shown in FIG. 77 illustrates the case of selecting the intermediate plate (intermediate member) 2G from the table holding mechanism 2 for applying braking to the intermediate plate 2G by the electromagnetic braking mechanism.

In FIG. 77, the configuration for applying braking to the movable table 1 by the electromagnetic braking mechanism is the same as that of FIG. 1. Thus, the configuration for applying braking to the intermediate plate 2G by the electromagnetic braking mechanism will be described. The configuration for applying braking to the movable table 1 by the electromagnetic braking mechanism is not limited to the one shown in FIG. 1 but the electromagnetic braking mechanism described in the aforementioned embodiments can be employed.

As shown in FIG. 77, the electromagnetic braking mechanism for applying braking to the table holding mechanism, especially to the intermediate plate 2G, is formed by a combination of braking magnets 800a–800b and a braking plate 801 as the configuration employed in the above-described embodiments.

The braking plate 801 is held and supported by a supporting shaft 802 being provided stood up from a base part 3B of the case main body 3 to be in parallel to the intermediate plat 2G. The braking plate 801 faces the intermediate plate 2G by being supported by the supporting shaft 802.

In the embodiment, four braking magnets are used. The four braking magnets 800a–800d are supported to the base part 3B of the case main body 3. The braking magnets 800a–800d face the intermediate plate 2G by being supported to the case main body 3. That is, the braking magnets 800a–800d are disposed in the positions to face each other with the intermediate plate 2G in between. The braking magnets 800a–800d are respectively disposed in the positions at equal intervals in the circumferential direction of the supporting shaft 802 with the supporting shaft 802 being the center. Further, the braking magnets 800a–800d are disposed in such a manner that the magnetic poles of the neighboring braking magnets become alternate. Specifically, for example, when the magnetic pole of the neighboring braking magnets 800a is set to bet the south pole, the braking magnets 800b or 800d is disposed to be the north pole.

Therefore, in the embodiment, a magnetic flux 804 from the north pole of the braking magnet (800b or 800d) flows into the south pole of the braking magnet (800a or 800c) through the braking plate 801, thereby forming a magnetic path.

The electromagnetic braking mechanism (the braking magnets 800a–800d, the braking plate 801) as shown in FIG. 77 and FIG. 78 generates the braking force according to the braking principle shown in FIG. 9 and suppress a slight reciprocal movement generated in the table holding mechanism 2 within a short time through applying the braking force to the table holding mechanism 2, especially to the intermediate plate 2G.

Next, the comparison of braking forces in the embodiment and in the conventional case which comprises no electromagnetic braking mechanism is shown in FIGS. 79(A), (B). In FIGS. 79(A), (B), the lateral axis is time and the longitudinal axis is the amplitude of the slight reciprocal action. As shown in FIG. 79(A), it is evident from the comparison with the conventional case shown in FIG. 79(B) that the seventeenth embodiment of the present invention can suppress the slight reciprocal action generated at the time of applying braking force within a shorter time, since braking is applied to both the movable table 1 and the table holding mechanism 2 by the electromagnetic braking mechanism.

INDUSTRIAL APPLICABILITY

As described above, in the present invention, through relatively displacing the braking magnets and the nonmagnetic/conductive braking plate of the electromagnetic braking mechanism by synchronizing with the movement of the movable table, the eddy current in the magnitude proportional to the moving speed of the movable table is generated in the braking plate. Also, the braking force based on the mutual magnetic effect between the magnetic force by the eddy current which is generated in the braking plate and the magnetic force of the braking magnets is generated. Thus, by receiving the braking force of the electromagnetic braking mechanism, it is possible to suppress the slight reciprocal action of the movable table within a short time.

What is claimed is:

1. A precise processing stage apparatus, comprising:
   a movable table installed in a main body part for supporting a work piece;
   a table holding mechanism installed in the main body part for allowing a movement of the movable table in arbitrary directions within a same plane;
   an electromagnetic driving means installed in the main body part for supplying a feed to the movable table within the same plane; and
   an electromagnetic braking mechanism for generating a braking force to stop the movable table at an arbitrary position on the same plane, wherein:
   the electromagnetic driving means comprises, as a pair, a plurality of driven magnets and a driving coil for generating a magnetic force working on a magnetic force of the driven magnets according to an energizing direction so as to supply a feed to the movable table through a mutual magnetic effect between the driven magnets and the driving coil;
   either the driven magnet or the driving coil is fixed at a prescribed position while the other is disposed to be integrally movable with the movable table;
   the electromagnetic braking mechanism includes braking magnets which face with each other and relatively move by synchronizing with the movement of the movable table and a nonmagnetic/conductive braking plate; and
   either the braking magnet or the braking plate is fixed at a prescribed position and the other is disposed to be movable by synchronizing with the movement of the movable table, and a pair of the braking magnets and the braking plate is for generating a braking force by a mutual magnetic effect between a magnetic force by an eddy current generated in the braking plate in accordance with the movement of the movable table and a magnetic force of the braking magnets.

2. The precise processing stage apparatus according to claim 1, wherein the electromagnetic braking mechanism is for applying braking only to the movable table.

3. The precise processing stage apparatus according to claim 1, wherein the electromagnetic braking mechanism is for applying braking to the movable table and the table holding mechanism.

4. The precise processing stage apparatus according to claim 1, wherein the electromagnetic braking mechanism comprises a plurality of pairs of the braking magnets and the braking plate.

5. The precise processing stage apparatus according to claim 1, wherein the electromagnetic braking mechanism is mounted in the center of the movable table.

6. The precise processing stage apparatus according to claim 1, wherein the braking plate of the electromagnetic braking mechanism is formed as a single plate for the plurality of braking magnets.

7. The precise processing stage apparatus according to claim 1, wherein the movable table is held by the table holding mechanism directly or through an auxiliary table which is connected in parallel and integrally with the movable table.

8. The precise processing stage apparatus according to claim 7, wherein the table holding mechanism comprises:
- at least one set of three rod-type elastic members provided in parallel on a same circumferential of a peripheral edge of the movable table with a prescribed space in between, whose one end being planted to the movable table;
- at least another set of three rod-type elastic members in same length provided in parallel on a same circumferential with a prescribed space in between on an outer side of the one set of each rod-type elastic member by corresponding to the each rod-type elastic member, whose one end being held by the main body; and
- an intermediate member for integrally holding other ends of the one and the another sets of each rod-type elastic member while maintaining the parallel state, wherein
- the each of two pairs of rod-type elastic members of the table holding mechanism is formed with a rod-type elastic member such as a piano wire in same strength and same length.

9. The precise processing stage apparatus according to claim 8, wherein: as for the braking magnets or the braking plate of the electromagnetic braking mechanism, one is provided to be integrally movable with the movable table and the other is provided to the main body part.

10. The precise processing stage apparatus according to claim 8, wherein:
- as for the braking magnets or the braking plate of the electromagnetic braking mechanism, one is provided to be integrally movable with the movable table and the other is provided to the main body part; and
- further, as for the braking magnets or the braking plate of the electromagnetic braking mechanism, one is provided to be integrally movable with the intermediate member and the other is provided to the main body part.

11. The precise processing stage apparatus according to claim 1, wherein the braking magnets of the electromagnetic braking mechanism are formed with the driven magnets.

12. The precise processing stage apparatus according to claim 1, wherein the braking magnets of the electromagnetic braking mechanism are formed separately from the driven magnets.

13. The precise processing stage apparatus according to claim 1, wherein the braking magnets of the electromagnetic braking mechanism are formed with either permanent magnets or electromagnets.

14. The precise processing stage apparatus according to claim 1, wherein the table holding mechanism comprises an original position returning force for returning the movable table to an original position.

15. The precise processing stage apparatus according to claim 1, wherein the driven magnets and the driving coil are fixed at prescribed positions on a plurality of axes, which are obtained by being equally divided in a circumferential direction with a reference being a single axis passing through an origin set within a plane where the movable table moves.

16. The precise processing stage apparatus according to claim 15, wherein the plurality of axes are a plurality of axes which are orthogonal to each other, passing through the origin set within the plane where the movable table moves.

17. The precise processing stage apparatus according to claim 15, wherein the plurality of axes are a plurality of axes which extend towards radial directions with the center being the origin set within the plane where the movable table moves.

18. The precise processing stage apparatus according to claim 14, wherein the original position of the movable table returned by the movable table holding mechanism coincides with the origin which is the reference of the axes set within the plane where the movable table moves.

19. The precise processing stage apparatus according to claim 15, wherein the pair of the driven magnets and the driving coils are disposed in positions sifted from the axes.

20. The precise processing stage apparatus according to claim 15, wherein:
- the plurality of driven magnets forming the electromagnetic driving means are disposed on each axis at positions at equivalent distances from the origin; and
- the plurality of driving coils forming the electromagnetic driving means are disposed by corresponding to the plurality of the driven magnets.

21. The precise processing stage apparatus according to claim 20, wherein the plurality of driven magnets disposed on the axes are disposed in line-symmetrical positions.

22. The precise processing stage apparatus according to claim 1, wherein the driven magnets of the electromagnetic driving means are formed with permanent magnets.

23. The precise processing stage apparatus according to claim 1, wherein the driven magnets of the electromagnetic driving means are formed with electromagnets, and energization to the driven magnets is selectively controlled either in a forward direction or reverse direction by synchronizing with the energization to the driving coils.

24. The precise processing stage apparatus according to claim 1, wherein the driving coils comprise coil sides for generating a magnetic force working on a magnetic force of the driven magnets.

25. The precise processing stage apparatus according to claim 1, wherein the driving coils are formed with a plurality of coils in different sizes being arranged on inner and outer sides.

26. The precise processing stage apparatus according to claim 1, wherein coil sides of the driving coils are formed in a cross shape or linear shape.

27. The precise processing stage apparatus according to claim 26, wherein the cross-shape coil sides of the driving coils are disposed in a state to be along the axes where the driven magnets are disposed.

28. The precise processing stage apparatus according to claim 26, wherein the linear-shape coil sides of the driving coils are disposed in a state to be along or across the axes where the driven magnets are disposed.

29. The precise processing stage apparatus according to claim 26, wherein the driving coils are formed by combining a plurality of small coils which can be individually energized, and the cross-shape or linear-shape coil sides are formed in the area where the small coils abut with each other.

30. The precise processing stage apparatus according to claim 29, wherein the small coils are formed in an angular shape.

31. The precise processing stage apparatus according to claim 29, wherein the angular shape of the small coils is a quadrangular, triangular, pentagonal or fan shape.

32. The precise processing stage apparatus according to claim 1, wherein the electromagnetic driving means comprises a plurality of pairs of the driven magnets and the driving coil.

33. The precise processing stage apparatus according to claim 1, wherein an outer dimension of the driving coil is set larger than that of the driven magnet.

34. The precise processing stage apparatus according to claim 1, wherein the electromagnetic driving means comprises an operation control system for linearly moving or linearly and rotationally moving the movable table through controlling energization for the driving coil.

35. The precise processing stage apparatus according to claim 34, wherein the operation control system comprises:
 a coil driving control means for energize-controlling the driving coils of the electromagnetic driving means according to a control mode;
 a program storage to which a plurality of control programs for a plurality of control modes specifying the moving directions, rotation directions, the amount of operation and the like of the movable table are stored;
 a data storage to which a prescribed coordinate data and the like are stored to be used at the time of executing each of the control programs; and
 an operation command input section for giving a command to the coil driving control means for performing a prescribed control operation on the driving coils.

36. The precise processing stage apparatus according to claim 35, wherein control modes of the operation control system comprise:
 a first to a fourth control modes for moving the movable table in positive and negative directions of each axis with an intersection point of the two orthogonal axes being an origin;
 a fifth to an eighth control modes for moving the movable table in directions within each quadrant being sectioned by the two orthogonal axes; and
 a ninth and a tenth control modes for rotating the movable table in a clockwise direction or counterclockwise direction within a plane formed by the two orthogonal axes.

37. The precise processing stage apparatus according to claim 35, wherein the operation control system further comprises:
 a plurality of position detecting sensors for detecting moving information of the movable table to be outputted outside; and
 a positional information arithmetic circuit for specifying the moving direction of the movable table and amount of change and the like through performing a prescribed arithmetic calculation based on information detected by the position detecting sensors so as to output it outside as positional information.

38. The precise processing stage apparatus according to claim 1, wherein the electromagnetic driving means comprises an operation control system which is actuated according to a command from outside for moving the movable table in a prescribed moving direction through individually controlling the driving coils and the driven magnets of the electromagnetic driving means.

39. The precise processing stage apparatus according to claim 38, wherein the operation control system comprises:
 an energizing direction setting function for setting and maintaining an energizing direction of the driving coils in one direction;
 a driving coil energizing control function for variably setting magnitude of the energizing direction of the driving coils;
 a magnetic pole variably setting function which operates according to the energizing direction of the driving coils for individually setting and maintaining the magnetic poles of the driven magnets;
 a magnetic force magnitude setting function for individually and variably setting the magnitude of the magnetic force of each driven magnet according to a command from outside; and
 a table action control function for adjusting the transporting direction and transporting force for the movable table by appropriately operating the various functions.

* * * * *